United States Patent

Watanabe et al.

[11] Patent Number: 5,875,284
[45] Date of Patent: Feb. 23, 1999

[54] NEURO-FUZZY-INTEGRATED DATA PROCESSING SYSTEM

[75] Inventors: Nobuo Watanabe, Zama; Akira Kawamura, Kawasaki; Ryushuke Masuoka, Tokyo; Yuri Owada, Yokohama; Kazuo Asakawa, Kawasaki; Shigenori Matsuoka, Yokohama; Hiroyuki Okada, Tokyo, all of Japan

[73] Assignee: Fujitsu Limited, Kawasaki, Japan

[21] Appl. No.: 773,576

[22] PCT Filed: Mar. 12, 1991

[86] PCT No.: PCT/JP91/00334

§ 371 Date: Jun. 9, 1992

§ 102(e) Date: Jun. 9, 1992

[87] PCT Pub. No.: WO91/14226

PCT Pub. Date: Sep. 19, 1991

[30] Foreign Application Priority Data

| Mar. 12, 1990 | [JP] | Japan | 2-060256 |
| Mar. 12, 1990 | [JP] | Japan | 2-060257 |
| Mar. 12, 1990 | [JP] | Japan | 2-060258 |
| Mar. 12, 1990 | [JP] | Japan | 2-060259 |
| Mar. 12, 1990 | [JP] | Japan | 2-060260 |
| Mar. 12, 1990 | [JP] | Japan | 2-060261 |
| Mar. 12, 1990 | [JP] | Japan | 2-060262 |
| Mar. 12, 1990 | [JP] | Japan | 2-060263 |
| Mar. 19, 1990 | [JP] | Japan | 2-066851 |
| Mar. 19, 1990 | [JP] | Japan | 2-066852 |
| Jul. 27, 1990 | [JP] | Japan | 2-197919 |

[51] Int. Cl.$^6$ ............................................ G06F 15/18
[52] U.S. Cl. ........................... 395/11; 395/3; 395/10; 395/22
[58] Field of Search ...................... 395/3, 10, 11, 395/22, 24, 27

[56] References Cited

U.S. PATENT DOCUMENTS 5,012,430  4/1991  Sakurai .............................. 395/11
5,191,638  3/1993  Wakami et al. ...................... 395/11

FOREIGN PATENT DOCUMENTS

| 1-183763 | 7/1989 | Japan. |
| WO 89/11684 | 11/1989 | Japan. |
| 2-189635 | 7/1990 | Japan .............................. G06F 9/44 |
| 2-231670 | 9/1990 | Japan. |
| 2-292602 | 12/1990 | Japan .............................. G05B 13/02 |

OTHER PUBLICATIONS

"The 37th (Latter Half of 1988) National Convention's Lecture Treatises (II)" (Received on Dec. 12, 1988 by Industrial Property Library), Information Processing Society of Japan, pp. 1386–1387.

"The 40th (Former Half of 1990) National Convention's Lecture Treaties (I)" (Received on Jun. 12, 1990 by Industrial Property Library), Information Processing Society of Japan, pp. 148–149.

*Primary Examiner*—Tariq R. Hafiz
*Attorney, Agent, or Firm*—Staas & Halsey

[57] ABSTRACT

The present invention relates to a data processing system in a hierarchical network configuration for executing applicable data processes in a comprehensible and executable form. The present invention allows data processing capabilities to be established with high precision in a short time based on a fuzzy-neuro-integrated concept. A fuzzy model is generated by a data processing system in the form of membership functions and fuzzy rules as technical information relating to a control target. According to this fuzzy model, a weight value of the connection between neurons is set and a pre-wired neural network is established. Then, the data of the control target are learned by the neural network. The connection state and a weight value of the neural network after the learning enable tuning of the fuzzy model.

54 Claims, 143 Drawing Sheets rule1 : if (X is small) and (Y is small) then z is middle rule2 : if (X is small) and (Y is big) then z is big rule3 : if (X is middle) then z is small rule4 : if (X is big) and (Y is small) then z is middle rule5 : if (X is big) and (Y is big) then z is big

Fig. 6

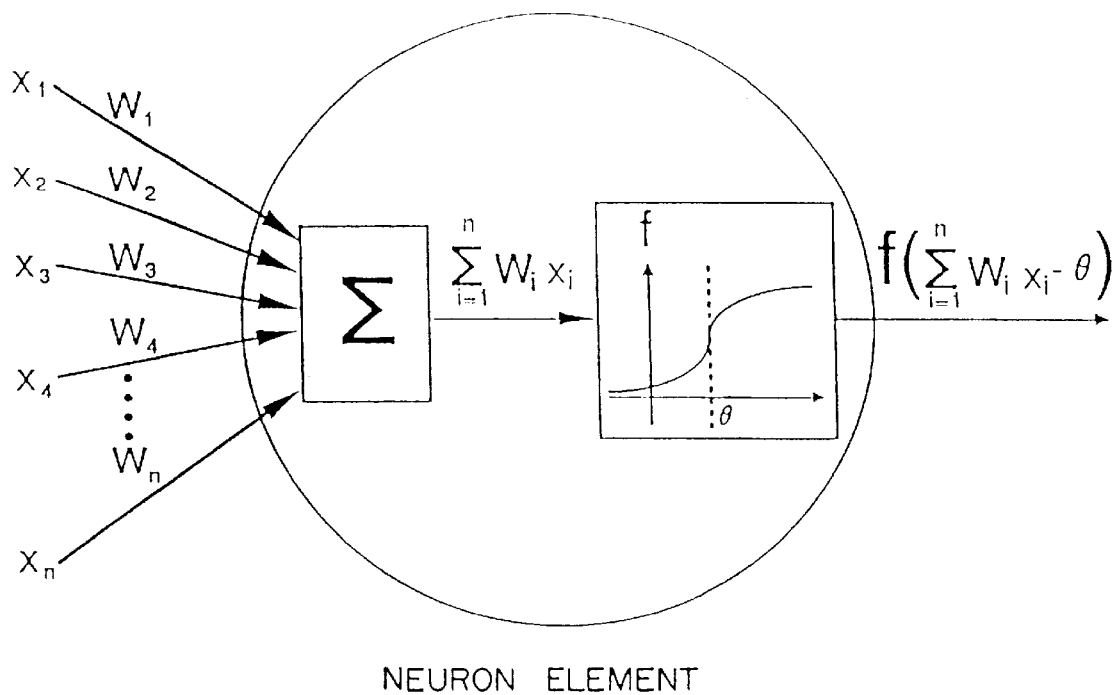

NEURON ELEMENT $$y = f(x_1, x_2, \ldots, x_n) = \frac{1}{1 - e^{-(\sum_{i=1}^{n} w_i x_i - \theta)}} : \text{SIGMOID FUNCTION} \quad \text{①}$$

$$w_i = s[x_i] \quad \text{②}$$

$$\theta = \begin{cases} 0.5s\left\{\sum_{i=1}^{n}[x_i] + (n-2t)\right\} = s\left\{(\text{NUMBER OF POSITIVE INPUT}) - t\right\} & \text{③} \\ 0.5s\left\{\sum_{i=1}^{n}[x_i] - (n-2t)\right\} = -s\left\{(\text{NUMBER OF NEGATIVE INPUT}) - t\right\} & \text{④} \end{cases}$$

$$s > 0, \ 0 < t < 1$$

$$[x_i] = \begin{cases} +1 & (x_i : \text{WHEN POSITIVE}) \\ -1 & (x_i : \text{WHEN NEGATIVE}) \end{cases} \quad \text{⑤}$$

Fig. 12 w1=12 w2=-12 th=6 w1=-12
w2=-12
th=-6 rule-1: if X is small then Z = 0.2
rule-2: if X is medium then Z = 0.8
rule-3: if X is large then Z = 0.6

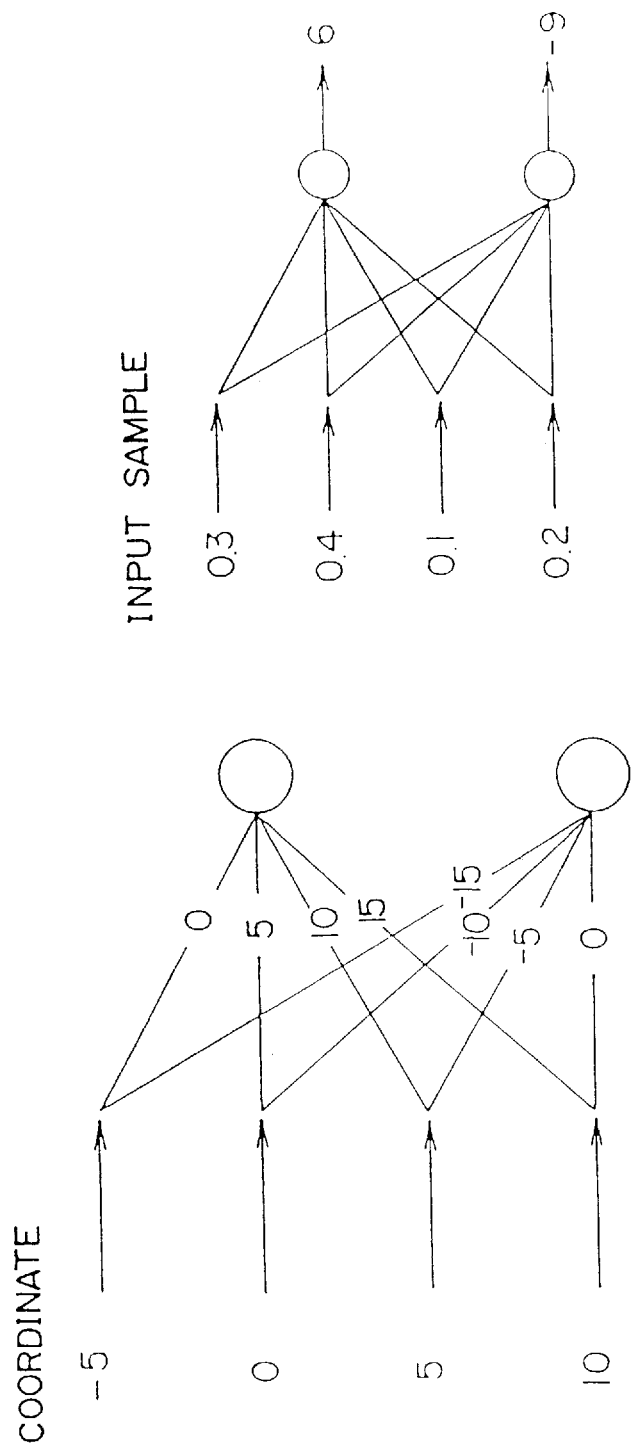

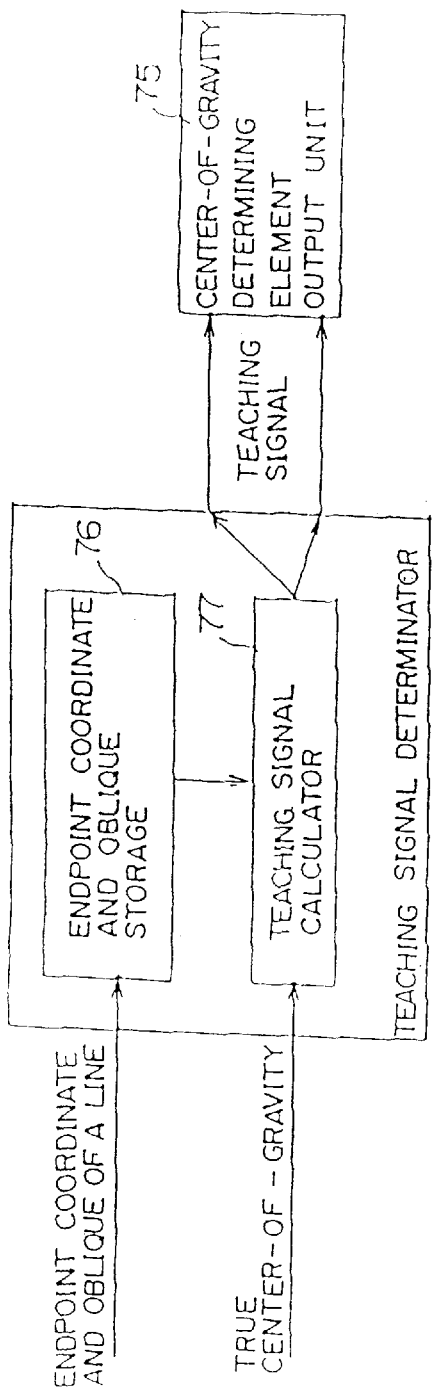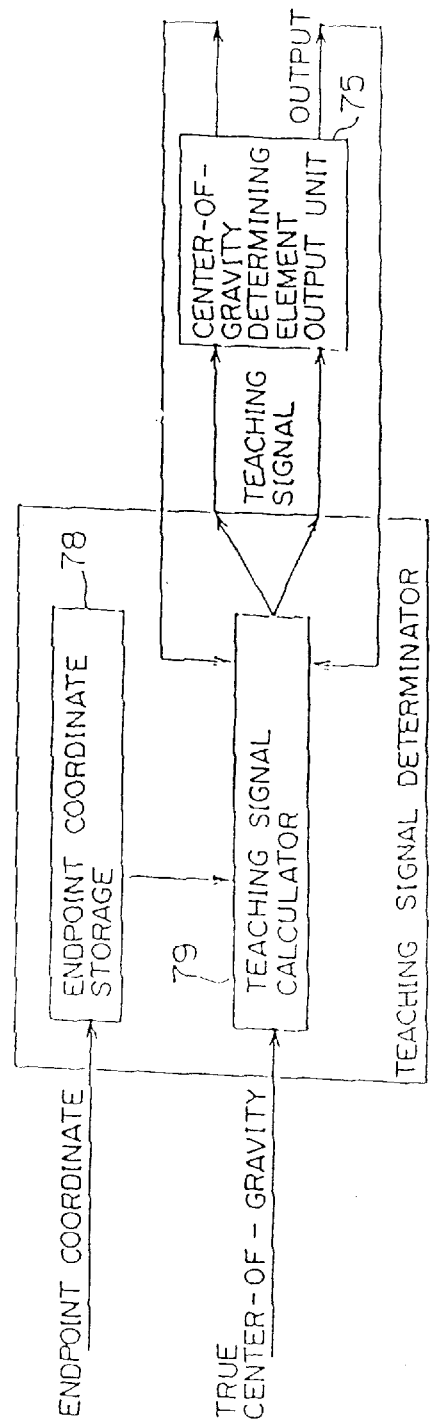
Fig. 33A
Fig. 33B

| COORDINATE (1.0) | COORDINATE (2.0) | COORDINATE (3.0) | COORDINATE (4.0) | COORDINATE (5.0) | CENTER-OF-GRAVITY OUTPUT UNIT | TRUE CENTER-OF-GRAVITY |
|---|---|---|---|---|---|---|
| 5.731883 | 1.453450 | 7.925300 | 6.050800 | 4.844300 | 3.23101 | 3.10852 |
| 9.907483 | 0.828000 | 9.418250 | 1.175033 | 3.871333 | 2.6863 | 2.65807 |
| 0.381033 | 3.112383 | 4.079300 | 6.525100 | 9.047667 | 4.05716 | 4.01117 |
| 5.123167 | 8.124683 | 8.919000 | 7.327600 | 0.699650 | 2.79499 | 2.81344 |
| 9.632783 | 8.648850 | 2.515450 | 7.656450 | 3.201550 | 2.66613 | 2.65119 |
| 6.402767 | 5.408617 | 8.144950 | 2.895383 | 1.316350 | 2.61093 | 2.58479 |
| 7.151683 | 5.326917 | 7.790800 | 1.074033 | 3.405183 | 2.67313 | 2.62983 |
| 8.387867 | 6.565117 | 7.693950 | 8.025950 | 4.327917 | 2.90836 | 2.88488 |
| 0.815433 | 4.933950 | 3.446783 | 9.967350 | 1.795817 | 3.5072 | 3.47134 |
| 8.256283 | 9.942850 | 2.604533 | 0.259733 | 3.288133 | 2.33818 | 2.33688 |

Fig. 42

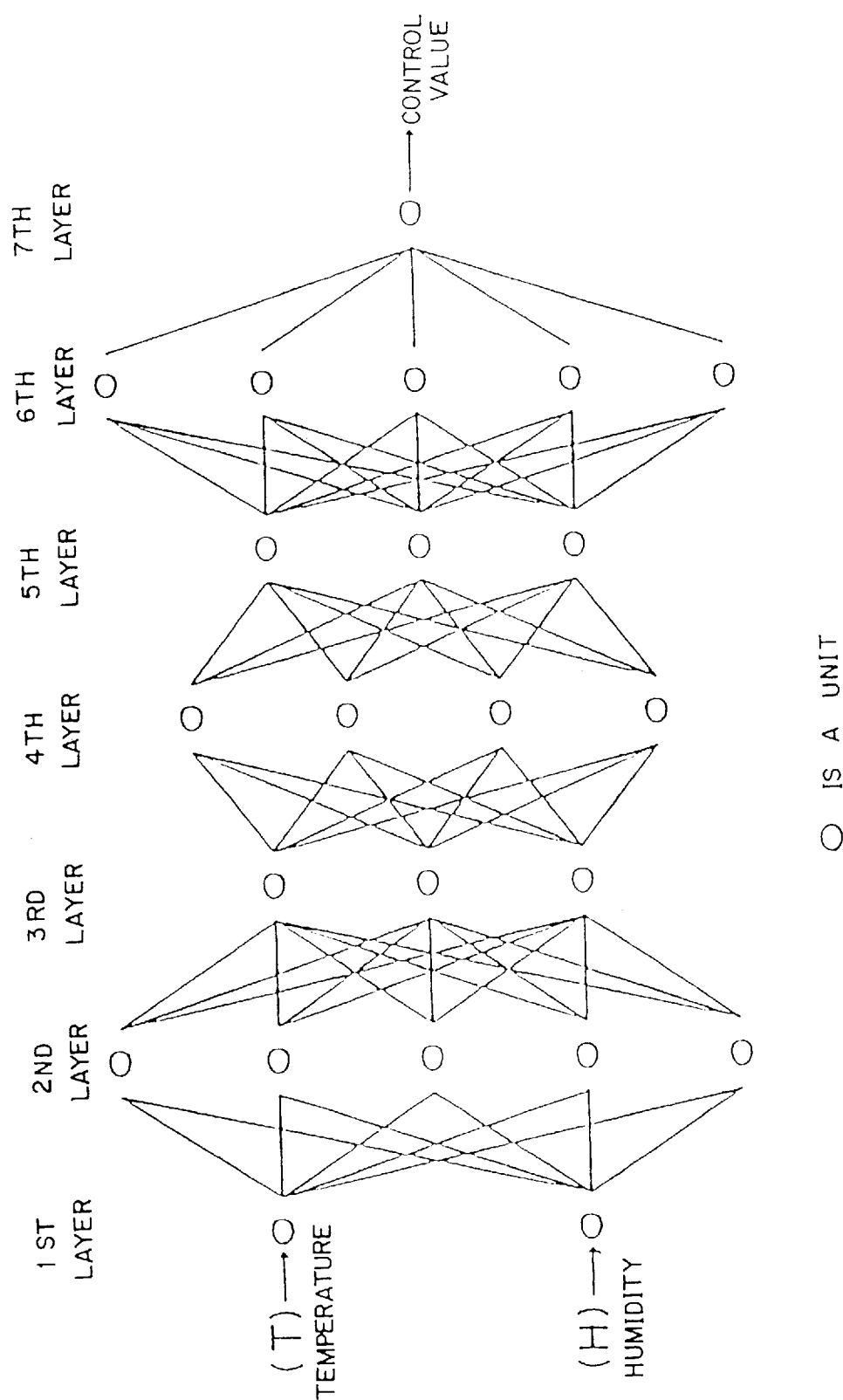

| PATTERN (T) | INPUT DATA (H) | | TEACHING DATA |
|---|---|---|---|
| pattern | 0.000000 | 0.000000 -> | 0.239501 |
| pattern | 0.000000 | 0.100000 -> | 0.231779 |
| pattern | 0.000000 | 0.200000 -> | 0.224057 |
| pattern | 0.000000 | 0.300000 -> | 0.216335 |
| pattern | 0.000000 | 0.400000 -> | 0.208613 |
| pattern | 0.000000 | 0.500000 -> | 0.200891 |
| pattern | 0.125000 | 0.000000 -> | 0.244969 |
| pattern | 0.125000 | 0.100000 -> | 0.250611 |
| pattern | 0.125000 | 0.200000 -> | 0.256254 |
| pattern | 0.125000 | 0.300000 -> | 0.261898 |
| pattern | 0.125000 | 0.400000 -> | 0.267541 |
| pattern | 0.125000 | 0.500000 -> | 0.273184 |
| pattern | 0.250000 | 0.000000 -> | 0.250436 |
| pattern | 0.250000 | 0.100000 -> | 0.269444 |
| pattern | 0.250000 | 0.200000 -> | 0.288452 |
| pattern | 0.250000 | 0.300000 -> | 0.307460 |
| pattern | 0.250000 | 0.400000 -> | 0.326468 |
| pattern | 0.250000 | 0.500000 -> | 0.345476 |
| pattern | 0.375000 | 0.000000 -> | 0.255904 |
| pattern | 0.375000 | 0.100000 -> | 0.288276 |
| pattern | 0.375000 | 0.200000 -> | 0.320650 |
| pattern | 0.375000 | 0.300000 -> | 0.353023 |
| pattern | 0.375000 | 0.400000 -> | 0.385396 |
| pattern | 0.375000 | 0.500000 -> | 0.417768 |
| pattern | 0.500000 | 0.000000 -> | 0.261371 |
| pattern | 0.500000 | 0.100000 -> | 0.307109 |
| pattern | 0.500000 | 0.200000 -> | 0.352847 |
| pattern | 0.500000 | 0.300000 -> | 0.398585 |
| pattern | 0.500000 | 0.400000 -> | 0.444323 |
| pattern | 0.500000 | 0.500000 -> | 0.490061 |
| pattern | 0.625000 | 0.000000 -> | 0.266838 |
| pattern | 0.625000 | 0.100000 -> | 0.325941 |
| pattern | 0.625000 | 0.200000 -> | 0.385045 |
| pattern | 0.625000 | 0.300000 -> | 0.444147 |
| pattern | 0.625000 | 0.400000 -> | 0.503251 |
| pattern | 0.625000 | 0.500000 -> | 0.562353 |
| pattern | 0.750000 | 0.000000 -> | 0.272306 |
| pattern | 0.750000 | 0.100000 -> | 0.344774 |
| pattern | 0.750000 | 0.200000 -> | 0.417242 |
| pattern | 0.750000 | 0.300000 -> | 0.489710 |
| pattern | 0.750000 | 0.400000 -> | 0.562178 |
| pattern | 0.750000 | 0.500000 -> | 0.634646 |
| pattern | 0.875000 | 0.000000 -> | 0.277774 |
| pattern | 0.875000 | 0.100000 -> | 0.363606 |
| pattern | 0.875000 | 0.200000 -> | 0.449439 |
| pattern | 0.875000 | 0.300000 -> | 0.535273 |
| pattern | 0.875000 | 0.400000 -> | 0.621106 |
| pattern | 0.875000 | 0.500000 -> | 0.706938 |
| pattern | 1.000000 | 0.000000 -> | 0.283241 |
| pattern | 1.000000 | 0.100000 -> | 0.382439 |
| pattern | 1.000000 | 0.200000 -> | 0.481637 |
| pattern | 1.000000 | 0.300000 -> | 0.580835 |
| pattern | 1.000000 | 0.400000 -> | 0.680033 |
| pattern | 1.000000 | 0.500000 -> | 0.779231 |

Fig. 59

WEIGHT
VALUE OF
CONNECTION

| 1ST LAYER | unit 1 | unit 2 | THRESHOLA |
|---|---|---|---|
| 2ND LAYER | | | |
| unit 1 | 9.837255 | 7.262174 | -7.017962 |
| unit 2 | 16.940039 | 29.362230 | -22.945482 |
| unit 3 | 40.535816 | -11.804261 | 3.073970 |
| unit 4 | -24.674812 | -35.905754 | 40.922157 |
| unit 5 | -0.350252 | 29.805536 | -2.244010 |

| 2ND LAYER | unit 1 | unit 2 | unit 3 | unit 4 | unit 5 | THRESHOLA |
|---|---|---|---|---|---|---|
| 3RD LAYER | | | | | | |
| unit 1 | 4.434628 | 1.091688 | 4.745871 | -2.076021 | -1.539795 | -1.089275 |
| unit 2 | -0.935567 | -3.147207 | -0.972488 | 5.545168 | -1.231860 | 2.197909 |
| unit 3 | 1.082492 | 4.355460 | 3.647050 | -4.148389 | 3.535996 | -1.887074 |

| 3RD LAYER | unit 1 | unit 2 | unit 3 | THRESHOLA |
|---|---|---|---|---|
| 4TH LAYER | | | | |
| unit 1 | 0.869552 | -3.136942 | 2.192525 | -0.270594 |
| unit 2 | 1.700024 | -2.675952 | 1.031357 | 0.477263 |
| unit 3 | -0.990510 | 3.795377 | -2.570006 | 0.563337 |
| unit 4 | -2.919650 | 2.395035 | -0.851663 | -0.298260 |

| 4TH LAYER | unit 1 | unit 2 | unit 3 | unit 4 | THRESHOLA |
|---|---|---|---|---|---|
| 5TH LAYER | | | | | |
| unit 1 | -0.670683 | -0.883608 | 1.977856 | 1.345935 | -0.942335 |
| unit 2 | -1.729006 | -1.296576 | 1.410757 | 1.207974 | 0.289243 |
| unit 3 | 1.151012 | 0.545511 | -1.507194 | -0.271645 | -0.187166 |

| 5TH LAYER | unit 1 | unit 2 | unit 3 | THRESHOLA |
|---|---|---|---|---|
| 6TH LAYER | | | | |
| unit 1 | 1.499008 | 0.683354 | -0.417099 | -1.004039 |
| unit 2 | 1.109334 | 1.826634 | -1.311215 | -0.962052 |
| unit 3 | -1.157394 | -1.031889 | -0.008739 | 0.363765 |
| unit 4 | -0.365476 | 0.520628 | -0.945119 | -0.752229 |
| unit 5 | -0.995855 | -1.170342 | 1.563843 | 0.065126 |

| 6TH LAYER | unit 1 | unit 2 | unit 3 | unit 4 | unit 5 | THRESHOLA |
|---|---|---|---|---|---|---|
| 7TH LAYER | | | | | | |
| unit 1 | -0.796175 | -1.288287 | 1.217719 | -0.602998 | 1.316371 | 0.072931 |

Fig. 60

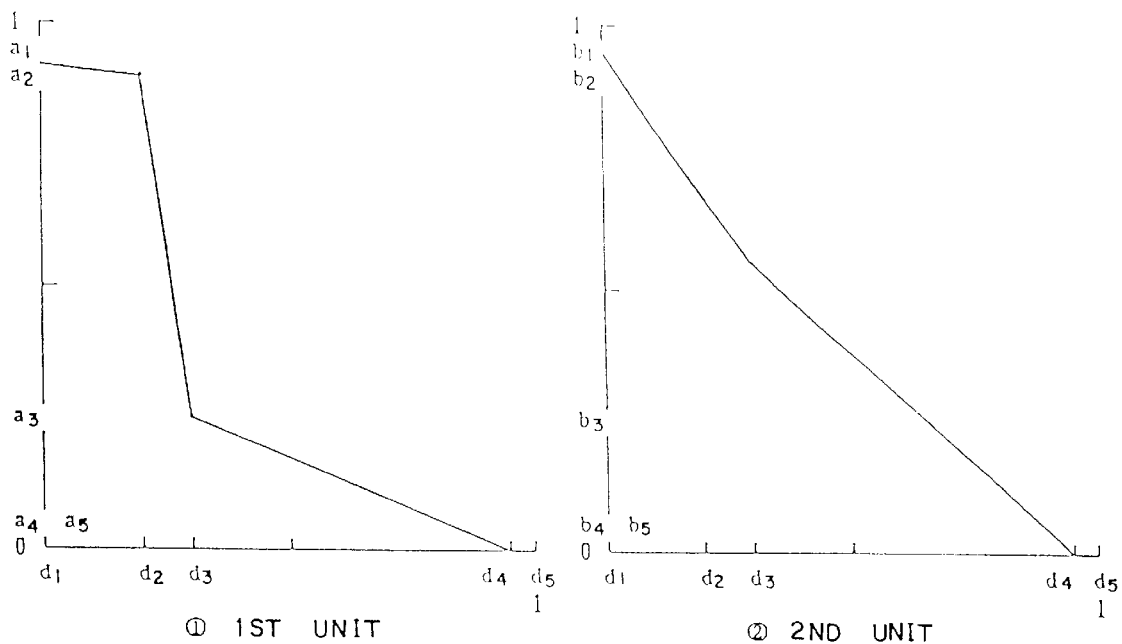
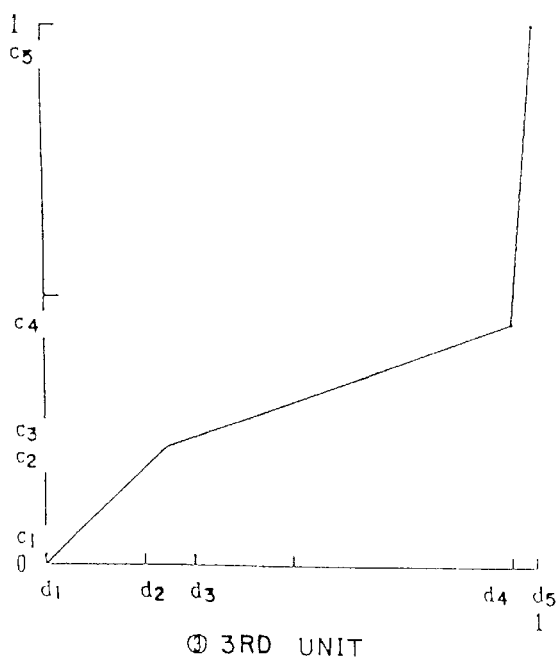
Fig. 67

| WEIGHT VALUE OF CONNECTION 1ST LAYER / 2ND LAYER | unit 1 | unit 2 | THRESHOLD |
|---|---|---|---|
| unit 1 | 9.837255 | ++++++ | -7.017962 |
| unit 2 | ++++++ | 29.362230 | -22.945482 |
| unit 3 | 40.535816 | ++++++ | 3.073970 |
| unit 4 | ++++++ | -35.905754 | 40.922157 |
| unit 5 | ++++++ | 29.805536 | -2.244010 |

| 2ND LAYER / 3RD LAYER | unit 1 | unit 2 | unit 3 | unit 4 | unit 5 | THRESHOLD |
|---|---|---|---|---|---|---|
| unit 1 | 4.434628 | ++++++ | 4.745871 | ++++++ | ++++++ | -1.089275 |
| unit 2 | ++++++ | -3.147207 | ++++++ | 5.545168 | ++++++ | 2.197909 |
| unit 3 | ++++++ | 4.355460 | ++++++ | -4.148389 | ++++++ | -1.887074 |

| 3RD LAYER / 4TH LAYER | unit 1 | unit 2 | unit 3 | THRESHOLD |
|---|---|---|---|---|
| unit 1 | ++++++ | -3.136942 | 2.192525 | -0.270594 |
| unit 2 | 1.700024 | -2.675952 | ++++++ | 0.477263 |
| unit 3 | ++++++ | 3.795377 | -2.570006 | 0.563337 |
| unit 4 | -2.919650 | 2.395035 | ++++++ | -0.298260 |

| 4TH LAYER / 5TH LAYER | unit 1 | unit 2 | unit 3 | unit 4 | THRESHOLD |
|---|---|---|---|---|---|
| unit 1 | ++++++ | ++++++ | 1.977856 | 1.345935 | -0.942335 |
| unit 2 | -1.729006 | -1.296576 | ++++++ | ++++++ | 0.289243 |
| unit 3 | ++++++ | ++++++ | ++++++ | ++++++ | -0.187166 |

| 5TH LAYER / 6TH LAYER | unit 1 | unit 2 | unit 3 | THRESHOLD |
|---|---|---|---|---|
| unit 1 | 1.499008 | 0.683354 | -0.417099 | -1.004039 |
| unit 2 | 1.109334 | 1.826634 | -1.311215 | -0.962052 |
| unit 3 | -1.157394 | -1.031889 | -0.008739 | 0.363765 |
| unit 4 | -0.365476 | 0.520628 | -0.945119 | -0.752229 |
| unit 5 | -0.995855 | -1.170342 | 1.563843 | 0.065126 |

| 6TH LAYER / 7TH LAYER | unit 1 | unit 2 | unit 3 | unit 4 | unit 5 | THRESHOLD |
|---|---|---|---|---|---|---|
| unit 1 | -1.288287 | -0.796175 | -0.602998 | 1.217719 | 1.316371 | 0.072931 |

Fig. 68

WEIGHT VALUE OF CONNECTION

| 1ST LAYER | unit 1 | unit 2 | THRESHOLD |
|---|---|---|---|
| 2ND LAYER | | | |
| unit 1 | 9.837255 | ###### | -7.017962 |
| unit 2 | ###### | 29.362230 | -22.945482 |
| unit 3 | 40.535816 | ###### | 3.073970 |
| unit 4 | ###### | -35.905754 | 40.922157 |
| unit 5 | ###### | 29.805536 | -2.244010 |

| 2ND LAYER | unit 1 | unit 2 | unit 3 | unit 4 | unit 5 | THRESHOLD |
|---|---|---|---|---|---|---|
| 3RD LAYER | | | | | | |
| unit 1 | 4.434628 | ###### | 4.745871 | ###### | ###### | -1.089275 |
| unit 2 | ###### | -3.147207 | ###### | 5.545168 | ###### | 2.197909 |
| unit 3 | ###### | 4.355460 | ###### | -4.148389 | ###### | -1.887074 |

| 3RD LAYER | unit 1 | unit 2 | unit 3 | THRESHOLD |
|---|---|---|---|---|
| 4TH LAYER | | | | |
| unit 1 | ###### | -3.136942 | ###### | -0.270594 |
| unit 2 | 1.700024 | -2.675952 | ###### | 0.477263 |
| unit 3 | ###### | 3.795377 | ###### | 0.563337 |
| unit 4 | -2.919650 | 2.395035 | ###### | -0.298260 |

| 4TH LAYER | unit 1 | unit 2 | unit 3 | unit 4 | THRESHOLD |
|---|---|---|---|---|---|
| 5TH LAYER | | | | | |
| unit 1 | ###### | ###### | 1.977856 | 1.345935 | -0.942335 |
| unit 2 | -1.729006 | -1.296576 | ###### | ###### | 0.289243 |
| unit 3 | ###### | ###### | ###### | ###### | -0.187166 |

| 5TH LAYER | unit 1 | unit 2 | unit 3 | THRESHOLD |
|---|---|---|---|---|
| 6TH LAYER | | | | |
| unit 1 | 1.499008 | 0.683354 | -0.417099 | -1.004039 |
| unit 2 | 1.109334 | 1.826634 | -1.311215 | -0.962052 |
| unit 3 | -1.157394 | -1.031889 | -0.008739 | 0.363765 |
| unit 4 | -0.365476 | 0.520628 | -0.945119 | -0.752229 |
| unit 5 | -0.995855 | -1.170342 | 1.563843 | 0.065126 |

| 6TH LAYER | unit 1 | unit 2 | unit 3 | unit 4 | unit 5 | THRESHOLD |
|---|---|---|---|---|---|---|
| 7TH LAYER | | | | | | |
| unit 1 | -1.288287 | -0.796175 | -0.602998 | 1.217719 | 1.316371 | 0.072931 |

Fig. 71

WEIGHT VALUE OF CONNECTION

| 1ST LAYER / 2ND LAYER | unit 1 | unit 2 | THRESHOLD |
|---|---|---|---|
| unit 1 | 9.837255 | ****** | -7.017962 |
| unit 2 | ****** | 29.362230 | -22.945482 |
| unit 3 | 40.535816 | ****** | 3.073970 |
| unit 4 | ****** | -35.905754 | 40.922157 |
| unit 5 | ****** | 29.805536 | -2.244010 |

| 2ND LAYER / 3RD LAYER | unit 1 | unit 2 | unit 3 | unit 4 | unit 5 | THRESHOLD |
|---|---|---|---|---|---|---|
| unit 1 | 4.434628 | ****** | 4.745871 | ****** | ****** | -1.089275 |
| unit 2 | ****** | -3.147207 | ****** | 5.545168 | ****** | 2.197909 |
| unit 3 | ****** | 4.355460 | ****** | -4.148389 | ****** | -1.887074 |

| 3RD LAYER / 4TH LAYER | unit 1 | unit 2 | unit 3 | THRESHOLD |
|---|---|---|---|---|
| unit 1 | 0.869552 | -3.136942 | 2.192525 | -0.270594 |
| unit 2 | 1.700024 | -2.675952 | 1.031357 | 0.477263 |
| unit 3 | -0.990510 | 3.795377 | -2.570006 | 0.563337 |
| unit 4 | -2.919650 | 2.395035 | -0.851663 | -0.298260 |

| 4TH LAYER / 5TH LAYER | unit 1 | unit 2 | unit 3 | unit 4 | THRESHOLD |
|---|---|---|---|---|---|
| unit 1 | -0.670683 | -0.883608 | 1.977856 | 1.345935 | -0.942335 |
| unit 2 | -1.729006 | -1.296576 | 1.410757 | 1.207974 | 0.289243 |
| unit 3 | 1.151012 | 0.545511 | -1.507194 | -0.271645 | -0.187166 |

| 5TH LAYER / 6TH LAYER | unit 1 | unit 2 | unit 3 | THRESHOLD |
|---|---|---|---|---|
| unit 1 | 1.499008 | 0.683354 | -0.417099 | -1.004039 |
| unit 2 | 1.109334 | 1.826634 | -1.311215 | -0.962052 |
| unit 3 | -1.157394 | -1.031889 | -0.008739 | 0.363765 |
| unit 4 | -0.365476 | 0.520628 | -0.945119 | -0.752229 |
| unit 5 | -0.995855 | -1.170342 | 1.563843 | 0.065126 |

| 6TH LAYER / 7TH LAYER | unit 1 | unit 2 | unit 3 | unit 4 | unit 5 | THRESHOLD |
|---|---|---|---|---|---|---|
| unit 1 | -1.288287 | -0.796175 | -0.602998 | 1.217719 | 1.316371 | 0.072931 |

Fig. 73

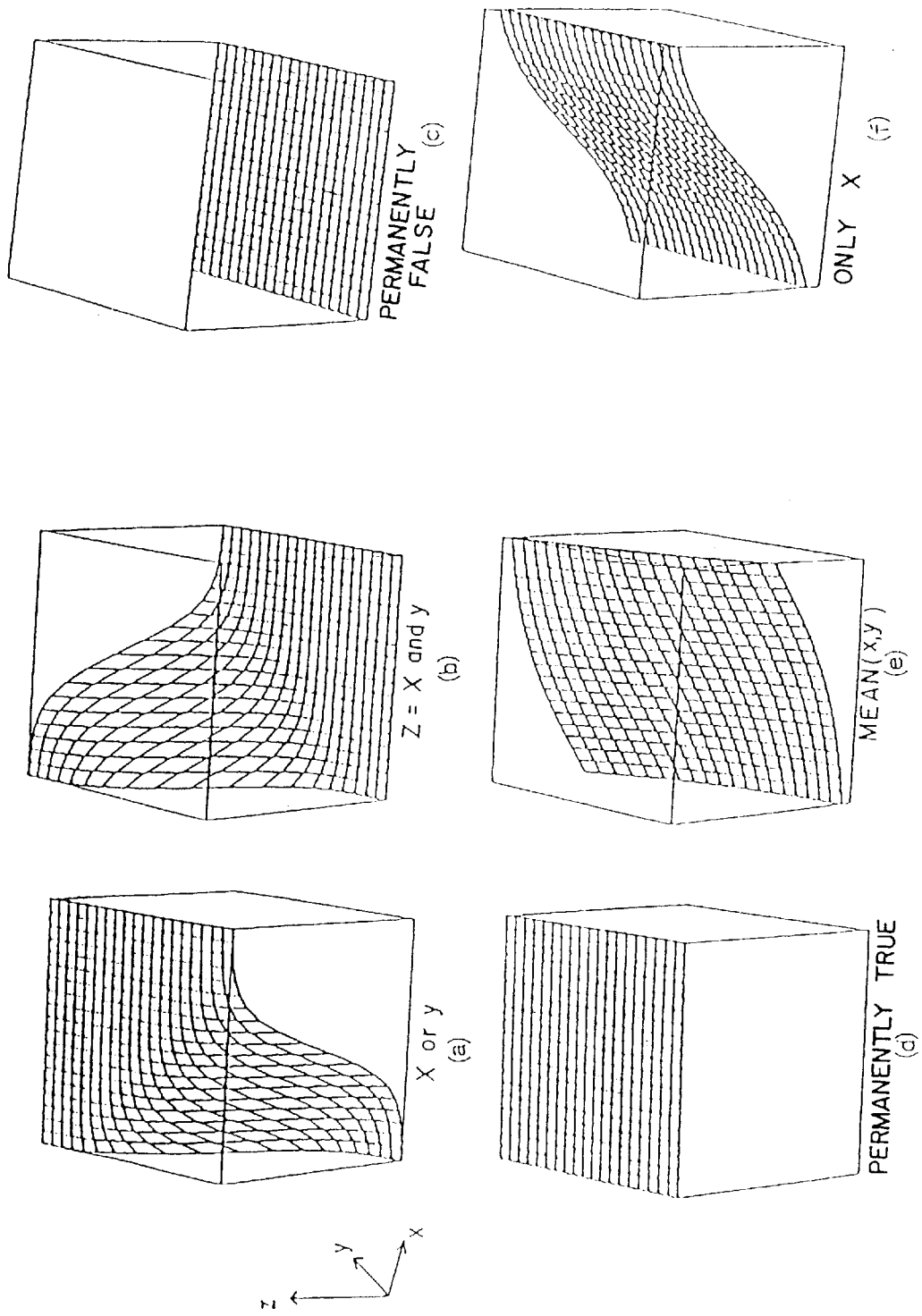

| $\theta > 0$ | $Wy > 0$ | $Wy < 0$ |
|---|---|---|
| $Wx > 0$ | xORy | xAND~y |
| $Wx < 0$ | ~xANDy | PERMANENTLY FALSE |

| $\theta < 0$ | $Wy > 0$ | $Wy < 0$ |
|---|---|---|
| $Wx > 0$ | PERMANENTLY TRUE | xOR~y |
| $Wx < 0$ | ~xORy | ~xAND~y |

Fig. 86A

| $\theta > 0$ | $Wy > 0$ | $Wy < 0$ |
|---|---|---|
| $Wx > 0$ | xANDy | PERMANENTLY FALSE |
| $Wx < 0$ | PERMANENTLY FALSE | PERMANENTLY FALSE |

| $\theta < 0$ | $Wy > 0$ | $Wy < 0$ |
|---|---|---|
| $Wx > 0$ | PERMANENTLY TRUE | PERMANENTLY TRUE |
| $Wx < 0$ | PERMANENTLY TRUE | ~xOR~y |

Fig. 86B

| $\theta > 0$ | $W_y > 0$ | $W_y < 0$ |
|---|---|---|
| $W_x > 0$ | MEAN (x, y) | PERMANENTLY FALSE |
| $W_x < 0$ | PERMANENTLY FALSE | PERMANENTLY FALSE |

| $\theta < 0$ | $W_y > 0$ | $W_y < 0$ |
|---|---|---|
| $W_x > 0$ | PERMANENTLY TRUE | PERMANENTLY TRUE |
| $W_x < 0$ | PERMANENTLY TRUE | MEAN (~x, ~y) |

Fig. 86C

|  | $\theta > 0$ | $\theta < 0$ |
|---|---|---|
| $W_x > 0$ | x | PERMANENTLY TRUE |
| $W_x < 0$ | PERMANENTLY FALSE | ~x |

Fig. 86D

|  | $\theta > 0$ | $\theta < 0$ |
|---|---|---|
| $W_y > 0$ | y | PERMANENTLY TRUE |
| $W_y < 0$ | PERMANENTLY FALSE | ~y |

Fig. 86E

| LOGICAL PRODUCT | 0.00 | 0.25 | 0.50 | 0.75 | 1.00 |
|---|---|---|---|---|---|
| 0.00 | 0.00 | 0.00 | 0.00 | 0.00 | 0.00 |
| 0.25 | 0.00 | 0.25 | 0.25 | 0.25 | 0.25 |
| 0.50 | 0.00 | 0.25 | 0.50 | 0.50 | 0.50 |
| 0.75 | 0.00 | 0.25 | 0.50 | 0.75 | 0.75 |
| 1.00 | 0.00 | 0.25 | 0.50 | 0.75 | 1.00 |

| LOGICAL SUM | 0.00 | 0.25 | 0.50 | 0.75 | 1.00 |
|---|---|---|---|---|---|
| 0.00 | 0.00 | 0.25 | 0.50 | 0.75 | 1.00 |
| 0.25 | 0.25 | 0.25 | 0.50 | 0.75 | 1.00 |
| 0.50 | 0.50 | 0.50 | 0.50 | 0.75 | 1.00 |
| 0.75 | 0.75 | 0.75 | 0.75 | 0.75 | 1.00 |
| 1.00 | 1.00 | 1.00 | 1.00 | 1.00 | 1.00 |

| ALGEBRAIC PRODUCT | 0.00 | 0.25 | 0.50 | 0.75 | 1.00 |
|---|---|---|---|---|---|
| 0.00 | 0.00 | 0.00 | 0.00 | 0.00 | 0.00 |
| 0.25 | 0.00 | 0.06 | 0.13 | 0.19 | 0.25 |
| 0.50 | 0.00 | 0.13 | 0.25 | 0.38 | 0.50 |
| 0.75 | 0.00 | 0.19 | 0.38 | 0.56 | 0.75 |
| 1.00 | 0.00 | 0.25 | 0.50 | 0.75 | 1.00 |

| ALGEBRAIC SUM | 0.00 | 0.25 | 0.50 | 0.75 | 1.00 |
|---|---|---|---|---|---|
| 0.00 | 0.00 | 0.25 | 0.50 | 0.75 | 1.00 |
| 0.25 | 0.25 | 0.44 | 0.63 | 0.81 | 1.00 |
| 0.50 | 0.50 | 0.63 | 0.75 | 0.88 | 1.00 |
| 0.75 | 0.75 | 0.81 | 0.88 | 0.94 | 1.00 |
| 1.00 | 1.00 | 1.00 | 1.00 | 1.00 | 1.00 |

| THRESHOLD PRODUCT | 0.00 | 0.25 | 0.50 | 0.75 | 1.00 |
|---|---|---|---|---|---|
| 0.00 | 0.00 | 0.00 | 0.00 | 0.00 | 0.00 |
| 0.25 | 0.00 | 0.00 | 0.00 | 0.00 | 0.25 |
| 0.50 | 0.00 | 0.00 | 0.00 | 0.25 | 0.55 |
| 0.75 | 0.00 | 0.00 | 0.25 | 0.50 | 0.75 |
| 1.00 | 0.00 | 0.25 | 0.50 | 0.75 | 1.00 |

| THRESHOLD SUM | 0.00 | 0.25 | 0.50 | 0.75 | 1.00 |
|---|---|---|---|---|---|
| 0.00 | 0.00 | 0.25 | 0.50 | 0.75 | 1.00 |
| 0.25 | 0.25 | 0.50 | 0.75 | 1.00 | 1.00 |
| 0.50 | 0.50 | 0.75 | 1.00 | 1.00 | 1.00 |
| 0.75 | 0.75 | 1.00 | 1.00 | 1.00 | 1.00 |
| 1.00 | 1.00 | 1.00 | 1.00 | 1.00 | 1.00 |

| ACUITY PRODUCT | 0.00 | 0.25 | 0.50 | 0.75 | 1.00 |
|---|---|---|---|---|---|
| 0.00 | 0.00 | 0.00 | 0.00 | 0.00 | 0.00 |
| 0.25 | 0.00 | 0.00 | 0.00 | 0.00 | 0.25 |
| 0.50 | 0.00 | 0.00 | 0.00 | 0.00 | 0.50 |
| 0.75 | 0.00 | 0.00 | 0.00 | 0.00 | 0.75 |
| 1.00 | 0.00 | 0.25 | 0.50 | 0.75 | 1.00 |

| ACUITY SUM | 0.00 | 0.25 | 0.50 | 0.75 | 1.00 |
|---|---|---|---|---|---|
| 0.00 | 0.00 | 0.25 | 0.50 | 0.75 | 1.00 |
| 0.25 | 0.25 | 1.00 | 1.00 | 1.00 | 1.00 |
| 0.50 | 0.50 | 1.00 | 1.00 | 1.00 | 1.00 |
| 0.75 | 0.75 | 1.00 | 1.00 | 1.00 | 1.00 |
| 1.00 | 1.00 | 1.00 | 1.00 | 1.00 | 1.00 |

Fig. 87

| AVERAGE VALUE | 0.00 | 0.25 | 0.50 | 0.75 | 1.00 |
|---|---|---|---|---|---|
| 0.00 | 0.00 | 0.13 | 0.25 | 0.38 | 0.50 |
| 0.25 | 0.13 | 0.25 | 0.38 | 0.50 | 0.63 |
| 0.50 | 0.25 | 0.38 | 0.50 | 0.63 | 0.75 |
| 0.75 | 0.38 | 0.50 | 0.63 | 0.75 | 0.88 |
| 1.00 | 0.50 | 0.63 | 0.75 | 0.88 | 1.00 |

| PERMANENTLY TRUE | 0.00 | 0.25 | 0.50 | 0.75 | 1.00 |
|---|---|---|---|---|---|
| 0.00 | 1.00 | 1.00 | 1.00 | 1.00 | 1.00 |
| 0.25 | 1.00 | 1.00 | 1.00 | 1.00 | 1.00 |
| 0.50 | 1.00 | 1.00 | 1.00 | 1.00 | 1.00 |
| 0.75 | 1.00 | 1.00 | 1.00 | 1.00 | 1.00 |
| 1.00 | 1.00 | 1.00 | 1.00 | 1.00 | 1.00 |

| ONLY X | 0.00 | 0.25 | 0.50 | 0.75 | 1.00 |
|---|---|---|---|---|---|
| 0.00 | 0.00 | 0.00 | 0.00 | 0.00 | 0.00 |
| 0.25 | 0.25 | 0.25 | 0.25 | 0.25 | 0.25 |
| 0.50 | 0.50 | 0.50 | 0.50 | 0.50 | 0.50 |
| 0.75 | 0.75 | 0.75 | 0.75 | 0.75 | 0.75 |
| 1.00 | 1.00 | 1.00 | 1.00 | 1.00 | 1.00 |

| PERMANENTLY FALSE | 0.00 | 0.25 | 0.50 | 0.75 | 1.00 |
|---|---|---|---|---|---|
| 0.00 | 0.00 | 0.00 | 0.00 | 0.00 | 0.00 |
| 0.25 | 0.00 | 0.00 | 0.00 | 0.00 | 0.00 |
| 0.50 | 0.00 | 0.00 | 0.00 | 0.00 | 0.00 |
| 0.75 | 0.00 | 0.00 | 0.00 | 0.00 | 0.00 |
| 1.00 | 0.00 | 0.00 | 0.00 | 0.00 | 0.00 |

| ONLY Y | 0.00 | 0.25 | 0.50 | 0.75 | 1.00 |
|---|---|---|---|---|---|
| 0.00 | 0.00 | 0.25 | 0.50 | 0.75 | 1.00 |
| 0.25 | 0.00 | 0.25 | 0.50 | 0.75 | 1.00 |
| 0.50 | 0.00 | 0.25 | 0.50 | 0.75 | 1.00 |
| 0.75 | 0.00 | 0.25 | 0.50 | 0.75 | 1.00 |
| 1.00 | 0.00 | 0.25 | 0.50 | 0.75 | 1.00 |

Fig. 88

PHASE:GROUP REFERENCE LIST

1ST EMBODIMENT

| PHASE | GROUP |
|---|---|
| 1 | Gb, Gc |
| 2 | Gb, Gc, Gd, Ge, Gf |

Fig. 112A

2ND EMBODIMENT

| PHASE | GROUP |
|---|---|
| 1 | Gd, Ge |
| 2 | Gb, Gc, Gd, Ge, Gf |

Fig. 112B

3RD EMBODIMENT

| PHASE | GROUP |
|---|---|
| 1 | Gd, Ge |
| 2 | Gb, Gc |
| 3 | Gb, Gc, Gd, Ge, Gf |

Fig. 112C

4TH EMBODIMENT

| PHASE | GROUP |
|---|---|
| 1 | Gb, Gc |
| 2 | Gd, Ge |
| 3 | Gb, Gc, Gd, Ge, Gf |

Fig. 112D

5TH EMBODIMENT

| PHASE | GROUP |
|---|---|
| 1 | Gb, Gc, Gd, Ge |
| 2 | Gb, Gc, Gd, Ge, Gf |

Fig. 112E

6TH EMBODIMENT

| PHASE | GROUP |
|---|---|
| 1 | Gb, Gc |
| 2 | Gf |
| 3 | Gb, Gc, Gd, Ge, Gf |

Fig. 112F

7TH EMBODIMENT

| PHASE | GROUP |
|---|---|
| 1 | Gd, Ge |
| 2 | Gf |
| 3 | Gb, Gc, Gd, Ge, Gf |

Fig. 112G

8TH EMBODIMENT

| PHASE | GROUP |
|---|---|
| 1 | Gd, Ge |
| 2 | Gb, Gc |
| 3 | Gf |
| 4 | Gb, Gc, Gd, Ge, Gf |

Fig. 112H

9TH EMBODIMENT

| PHASE | GROUP |
|---|---|
| 1 | Gb, Gc |
| 2 | Gd, Ge |
| 3 | Gf |
| 4 | Gb, Gc, Gd, Ge, Gf |

Fig. 112I

10TH EMBODIMENT

| PHASE | GROUP |
|---|---|
| 1 | Gb, Gc, Gd, Ge |
| 2 | Gf |
| 3 | Gb, Gc, Gd, Ge, Gf |

Fig. 112J

GROUP:CONNECTION REFERENCE LIST

| GROUP | INPUT CONNECTION |
|---|---|
| Ga | |
| Gb | Cab |
| Gc | Cbc |
| Gd | Ccd |
| Ge | Cde |
| Gf | Cef |
| Gg | Cfg |

Fig. 112K

| LEARNING SIGNAL | LEARNING SIGNAL |
|---|---|
| 0.000000 → 0.000000 1.000000 | 0.300000 → 0.200000 1.000000 |
| 0.010000 → 0.000000 1.000000 | 0.310000 → 0.220000 0.980000 |
| 0.020000 → 0.000000 1.000000 | 0.320000 → 0.240000 0.960000 |
| 0.030000 → 0.000000 1.000000 | 0.330000 → 0.260000 0.940000 |
| 0.040000 → 0.000000 1.000000 | 0.340000 → 0.280000 0.920000 |
| 0.050000 → 0.000000 1.000000 | 0.350000 → 0.300000 0.900000 |
| 0.060000 → 0.000000 1.000000 | 0.360000 → 0.320000 0.880000 |
| 0.070000 → 0.000000 1.000000 | 0.370000 → 0.340000 0.860000 |
| 0.080000 → 0.000000 1.000000 | 0.380000 → 0.360000 0.840000 |
| 0.090000 → 0.000000 1.000000 | 0.390000 → 0.380000 0.820000 |
| 0.100000 → 0.000000 1.000000 | 0.400000 → 0.400000 0.800000 |
| 0.110000 → 0.000000 1.000000 | 0.410000 → 0.420000 0.780000 |
| 0.120000 → 0.000000 1.000000 | 0.420000 → 0.440000 0.760000 |
| 0.130000 → 0.000000 1.000000 | 0.430000 → 0.460000 0.740000 |
| 0.140000 → 0.000000 1.000000 | 0.440000 → 0.480000 0.720000 |
| 0.150000 → 0.000000 1.000000 | 0.450000 → 0.500000 0.700000 |
| 0.160000 → 0.000000 1.000000 | 0.460000 → 0.520000 0.680000 |
| 0.170000 → 0.000000 1.000000 | 0.470000 → 0.540000 0.660000 |
| 0.180000 → 0.000000 1.000000 | 0.480000 → 0.560000 0.640000 |
| 0.190000 → 0.000000 1.000000 | 0.490000 → 0.580000 0.620000 |
| 0.200000 → 0.000000 1.000000 | 0.500000 → 0.600000 0.600000 |
| 0.210000 → 0.020000 1.000000 | 0.510000 → 0.620000 0.580000 |
| 0.220000 → 0.040000 1.000000 | 0.520000 → 0.640000 0.560000 |
| 0.230000 → 0.060000 1.000000 | 0.530000 → 0.660000 0.540000 |
| 0.240000 → 0.080000 1.000000 | 0.540000 → 0.680000 0.520000 |
| 0.250000 → 0.100000 1.000000 | 0.550000 → 0.700000 0.500000 |
| 0.260000 → 0.120000 1.000000 | 0.560000 → 0.720000 0.480000 |
| 0.270000 → 0.140000 1.000000 | 0.570000 → 0.740000 0.460000 |
| 0.280000 → 0.160000 1.000000 | 0.580000 → 0.760000 0.440000 |
| 0.290000 → 0.180000 1.000000 | 0.590000 → 0.780000 0.420000 |

Fig. 124

| LEARNING SIGNAL | | | LEARNING SIGNAL | | |
|---|---|---|---|---|---|
| 0.600000 | → | 0.800000 0.400000 | 0.800000 | → | 1.000000 0.000000 |
| 0.610000 | → | 0.820000 0.380000 | 0.810000 | → | 1.000000 0.000000 |
| 0.620000 | → | 0.840000 0.360000 | 0.820000 | → | 1.000000 0.000000 |
| 0.630000 | → | 0.860000 0.340000 | 0.830000 | → | 1.000000 0.000000 |
| 0.640000 | → | 0.880000 0.320000 | 0.840000 | → | 1.000000 0.000000 |
| 0.650000 | → | 0.900000 0.300000 | 0.850000 | → | 1.000000 0.000000 |
| 0.660000 | → | 0.920000 0.280000 | 0.860000 | → | 1.000000 0.000000 |
| 0.670000 | → | 0.940000 0.260000 | 0.870000 | → | 1.000000 0.000000 |
| 0.680000 | → | 0.960000 0.240000 | 0.880000 | → | 1.000000 0.000000 |
| 0.690000 | → | 0.980000 0.220000 | 0.890000 | → | 1.000000 0.000000 |
| 0.700000 | → | 1.000000 0.200000 | 0.900000 | → | 1.000000 0.000000 |
| 0.710000 | → | 1.000000 0.180000 | 0.910000 | → | 1.000000 0.000000 |
| 0.720000 | → | 1.000000 0.160000 | 0.920000 | → | 1.000000 0.000000 |
| 0.730000 | → | 1.000000 0.140000 | 0.930000 | → | 1.000000 0.000000 |
| 0.740000 | → | 1.000000 0.120000 | 0.940000 | → | 1.000000 0.000000 |
| 0.750000 | → | 1.000000 0.100000 | 0.950000 | → | 1.000000 0.000000 |
| 0.760000 | → | 1.000000 0.080000 | 0.960000 | → | 1.000000 0.000000 |
| 0.770000 | → | 1.000000 0.060000 | 0.970000 | → | 1.000000 0.000000 |
| 0.780000 | → | 1.000000 0.040000 | 0.980000 | → | 1.000000 0.000000 |
| 0.790000 | → | 1.000000 0.020000 | 0.990000 | → | 1.000000 0.000000 |
| | | | 1.000000 | → | 1.000000 0.000000 |

Fig. 125

| LEARNING SIGNAL | LEARNING SIGNAL | LEARNING SIGNAL |
|---|---|---|
| 0.000000→0.800000 | 0.340000→0.669298 | 0.680000→0.373408 |
| 0.010000→0.799880 | 0.350000→0.662004 | 0.690000→0.364683 |
| 0.020000→0.799520 | 0.360000→0.654558 | 0.700000→0.356060 |
| 0.030000→0.798920 | 0.370000→0.646965 | 0.710000→0.347550 |
| 0.040000→0.798082 | 0.380000→0.639231 | 0.720000→0.339163 |
| 0.050000→0.797004 | 0.390000→0.631361 | 0.730000→0.330908 |
| 0.060000→0.795688 | 0.400000→0.623360 | 0.740000→0.322799 |
| 0.070000→0.794134 | 0.410000→0.615235 | 0.750000→0.314844 |
| 0.080000→0.792345 | 0.420000→0.606990 | 0.760000→0.307053 |
| 0.090000→0.790319 | 0.430000→0.598633 | 0.770000→0.299438 |
| 0.100000→0.788060 | 0.440000→0.590169 | 0.780000→0.292010 |
| 0.110000→0.785568 | 0.450000→0.581604 | 0.790000→0.284780 |
| 0.120000→0.782844 | 0.460000→0.572945 | 0.800000→0.277760 |
| 0.130000→0.779891 | 0.470000→0.564198 | 0.810000→0.270960 |
| 0.140000→0.776710 | 0.480000→0.555370 | 0.820000→0.264393 |
| 0.150000→0.773304 | 0.490000→0.546469 | 0.830000→0.258070 |
| 0.160000→0.769673 | 0.500000→0.537500 | 0.840000→0.252003 |
| 0.170000→0.765821 | 0.510000→0.528471 | 0.850000→0.246204 |
| 0.180000→0.761750 | 0.520000→0.519390 | 0.860000→0.240685 |
| 0.190000→0.757462 | 0.530000→0.510263 | 0.870000→0.235459 |
| 0.200000→0.752960 | 0.540000→0.501098 | 0.880000→0.230537 |
| 0.210000→0.748247 | 0.550000→0.491904 | 0.890000→0.225933 |
| 0.220000→0.743326 | 0.560000→0.482687 | 0.900000→0.221660 |
| 0.230000→0.738199 | 0.570000→0.473456 | 0.910000→0.217730 |
| 0.240000→0.732871 | 0.580000→0.464219 | 0.920000→0.214156 |
| 0.250000→0.727344 | 0.590000→0.454984 | 0.930000→0.210951 |
| 0.260000→0.721622 | 0.600000→0.445760 | 0.940000→0.208129 |
| 0.270000→0.715709 | 0.610000→0.436555 | 0.950000→0.205704 |
| 0.280000→0.709608 | 0.620000→0.427378 | 0.960000→0.203688 |
| 0.290000→0.703324 | 0.630000→0.418238 | 0.970000→0.202096 |
| 0.300000→0.696860 | 0.640000→0.409143 | 0.980000→0.200941 |
| 0.310000→0.690221 | 0.650000→0.400104 | 0.990000→0.200238 |
| 0.320000→0.683411 | 0.660000→0.391128 | 1.000000→0.200000 |
| 0.330000→0.676436 | 0.670000→0.382227 | |

Fig. 128

| NUMBER | X | Y |
|---|---|---|
| 1 | 0.15 | 0.77 |
| 2 | 0.20 | 0.75 |
| 3 | 0.25 | 0.73 |
| 4 | 0.30 | 0.70 |
| 5 | 0.35 | 0.66 |
| 6 | 0.40 | 0.62 |
| 7 | 0.45 | 0.58 |
| 8 | 0.50 | 0.54 |
| 9 | 0.55 | 0.49 |
| 10 | 0.60 | 0.45 |
| 11 | 0.65 | 0.40 |
| 12 | 0.70 | 0.36 |
| 13 | 0.75 | 0.31 |
| 14 | 0.80 | 0.28 |
| 15 | 0.85 | 0.25 |

Fig. 133

| No. | FUZZY CONTROL RULE |
|---|---|
| 1 | IF TUI =ST THEN DDOS=PM |
| 2 | IF TUI =NM, TUSE=IL, TEMP=IS THEN DDOS=NM |
| 3 | IF TUI =SA, ALK =LA, TEMP=SA THEN DDOS=PM |
| 4 | IF ALK =SA, TUI =LA THEN DDOS=NM |
| 5 | IF TUSE=LA THEN DDOS=PM |
| 6 | IF TUUP=LA THEN DDOS=PB |
| 7 | IF TUUP=ML THEN DDOS=PM |
| 8 | IF TUUP=MM THEN DDOS=PS |
| 9 | IF FLOC=SA THEN DDOS=PM |
| 10 | IF STAT=LA THEN DDOS=PS |

Fig. 134

| | ABBRIVIA-TION | CONTENTS OF DATA |
|---|---|---|
| CONTROL STATE VALUE | TU1 | TURBIDITY OF ORIGINAL WATER 1 |
| | ALK | ALKALI LEVEL |
| | TEMP | WATER TEMPERATURE |
| | TUSE | TURBIDITY OF PROCESSED WATER |
| | TUUP | RISE OF TURBIDITY |
| | FLOC | FLOCK FORMING STATE |
| | STAT | START OF SYSTEM |
| CONTROL OPERATION VALUE | DDOS | CHEMICAL INJECTION RA |

Fig. 135

|  |  |  | $\omega_1$ | $O_1$ | $\omega_2$ | $O_2$ |
|---|---|---|---|---|---|---|
| TU1 | SA | BEFORE LEARNING | -0.14514707 | 4.1969274 | --- | --- |
| | | AFTER LEARNING | 1.403983 | 4.350542 | --- | --- |
| | MM | BEFORE LEARNING | 0.17022198 | -1.3609248 | 0.10789444 | -4.935631 |
| | | AFTER LEARNING | 2.4424 | -17.440763 | 3.059478 | -4.520046 |
| | LA | BEFORE LEARNING | 0.20095937 | -8.0011972 | --- | --- |
| | | AFTER LEARNING | -0.015246 | -8.135397 | --- | --- |
| | ST | BEFORE LEARNING | -0.18229623 | 4.08617 | --- | --- |
| | | AFTER LEARNING | -3.537188 | 3.883994 | --- | --- |
| ALK | SA | BEFORE LEARNING | -1.1594882 | 13.6239 | --- | --- |
| | | AFTER LEARNING | 0.124651 | 13.724 | --- | --- |
| | LA | BEFORE LEARNING | 0.856667 | -10.1857 | --- | --- |
| | | AFTER LEARNING | -0.168327 | -10.266788 | --- | --- |
| TEMP | IS | BEFORE LEARNING | 0.2849 | -2.492901 | --- | --- |
| | | AFTER LEARNING | 1.538085 | -2.350269 | --- | --- |
| | SA | BEFORE LEARNING | -0.17022198 | 2.0315994 | --- | --- |
| | | AFTER LEARNING | 3.649158 | -35.691 | --- | --- |

Fig. 136

|  |  |  | $\omega_1$ | $\theta_1$ | $\omega_2$ | $\theta_2$ |
|---|---|---|---|---|---|---|
| TUSE | LA | BEFORE LEARNING | 6.2322524 | -4.7988 | — | — |
|  |  | AFTER LEARNING | 9.9047 | 2.421 | — | — |
|  | IL | BEFORE LEARNING | -1.6564126 | 6.4848553 | — | — |
|  |  | AFTER LEARNING | -5.692 | -3.3689 | — | — |
| TUUP | MM | BEFORE LEARNING | 17.1924204 | -6.1033092 | 7.7903155 | -6.3880587 |
|  |  | AFTER LEARNING | 20.329296 | -14.989394 | 2.731560 | 11.169465 |
|  | ML | BEFORE LEARNING | 26.24 | 14.04 | 8.17 | 7.64 |
|  |  | AFTER LEARNING | 29.89 | -24.20 | 3.128 | -12.51 |
|  | LA | BEFORE LEARNING | 11.33 | -9.29 | — | — |
|  |  | AFTER LEARNING | 35.98 | -29.96 | — | — |
| FLOC | SA | BEFORE LEARNING | -55.397 | 8.59 | — | — |
|  |  | AFTER LEARNING | -53.916 | 14.8740 | — | — |
| STAT | LA | BEFORE LEARNING | 14.66 | -13.49 | — | — |
|  |  | AFTER LEARNING | 9.846 | -18.31 | — | — |

Fig. 137

| DDOS | $P_1$ | $P_2$ | $P_3$ |
|---|---|---|---|
| PM | −1.00 | 4.00 | 9.00 |
| NM | −9.00 | −4.00 | 1.00 |
| PB | 4.00 | 10.00 | — |
| PS | −2.00 | 2.00 | 6.00 |

Fig. 139

|   | CONTROL PRESENTATION DATA | | | | | | | CONTROL TEACHER DATA |
|---|---|---|---|---|---|---|---|---|
|   | TUI | ALK | TEMP | TUSE | TUUP | FLOC | STAT | DDOS |
| 1  | 5.0  | 13.7 | 11.5 | 0.4 | 0.0 | 0.5 | 1.0 | 2.4 |
| 2  | 5.0  | 13.7 | 11.5 | 0.5 | 0.0 | 0.5 | 0.0 | 3.1 |
| 3  | 5.0  | 13.9 | 11.6 | 0.5 | 0.0 | 0.5 | 0.0 | 3.0 |
| 4  | 5.0  | 13.7 | 11.7 | 0.4 | 0.0 | 0.5 | 0.0 | 2.9 |
| 5  | 6.0  | 13.4 | 11.7 | 0.5 | 0.0 | 0.5 | 0.0 | 2.0 |
| 6  | 19.0 | 14.2 | 11.0 | 0.4 | 0.3 | 0.3 | 1.0 | 0.0 |
| 7  | 28.0 | 13.8 | 10.7 | 0.7 | 0.5 | 0.3 | 0.0 | 0.5 |
| 8  | 32.0 | 13.8 | 10.5 | 0.9 | 1.0 | 0.3 | 0.0 | 3.3 |
| 9  | 33.0 | 13.8 | 10.5 | 0.9 | 1.0 | 0.3 | 0.0 | 4.4 |
| 10 | 33.0 | 13.8 | 10.6 | 0.9 | 1.0 | 0.3 | 0.0 | 4.7 |
| 11 | 26.0 | 13.2 | 10.0 | 0.9 | 1.0 | 0.3 | 1.0 | 4.1 |
| 12 | 24.0 | 13.2 | 9.7  | 0.7 | 0.8 | 0.8 | 0.0 | 2.3 |
| 13 | 23.0 | 13.2 | 9.6  | 1.1 | 0.8 | 0.8 | 0.0 | 2.1 |
| 14 | 22.0 | 13.1 | 9.6  | 1.5 | 0.8 | 0.8 | 0.0 | 2.4 |
| 15 | 21.0 | 13.3 | 9.6  | 1.3 | 0.0 | 0.8 | 0.0 | 2.3 |
| 16 | 19.0 | 13.0 | 9.3  | 1.1 | 0.0 | 0.5 | 1.0 | −0.8 |
| 17 | 18.0 | 13.0 | 9.0  | 2.3 | 0.0 | 0.5 | 0.0 | 1.2 |
| 18 | 17.0 | 13.0 | 9.0  | 1.4 | 0.0 | 0.5 | 0.0 | 2.5 |
| 19 | 17.0 | 12.9 | 9.0  | 1.0 | 0.0 | 0.5 | 0.0 | 0.1 |
| 20 | 16.0 | 12.8 | 9.1  | 1.1 | 0.0 | 0.5 | 0.0 | 0.1 |
| 21 | 13.0 | 12.7 | 9.1  | 0.8 | 0.0 | 0.5 | 1.0 | 0.4 |
| 22 | 12.0 | 12.8 | 9.1  | 1.4 | 0.0 | 0.5 | 0.0 | 0.6 |
| 23 | 11.0 | 12.8 | 9.3  | 1.4 | 0.0 | 0.5 | 0.0 | 0.8 |
| 24 | 11.0 | 12.8 | 9.6  | 1.3 | 0.0 | 0.5 | 0.0 | 0.8 |
| 25 | 10.0 | 13.0 | 9.8  | 1.1 | 0.0 | 0.5 | 0.0 | 1.0 |
| 26 | 9.0  | 12.8 | 9.5  | 0.7 | 0.0 | 0.5 | 1.0 | 0.7 |
| 27 | 9.0  | 13.0 | 9.2  | 1.1 | 0.0 | 0.5 | 0.0 | 0.9 |
| 28 | 12.0 | 13.0 | 9.0  | 0.9 | 0.5 | 0.5 | 0.0 | 0.7 |
| 29 | 13.0 | 13.4 | 8.8  | 0.9 | 0.0 | 0.3 | 0.0 | 1.5 |
| 30 | 15.0 | 13.3 | 8.7  | 0.7 | 0.0 | 0.3 | 0.0 | 0.8 |

Fig. 141

| No. | LEARNING DATA OF WEIGHT VALUES | | | 23/24 |
|---|---|---|---|---|
| | 21/23 | | | |
| | ① | ② | ③ | ① |
| 1 | 0.861039 | — | — | 0.861039 |
| 2 | 1.667528 | −0.07926 | −1.04362 | 0.640026 |
| 3 | −0.26281 | 1.475913 | −0.41636 | 0.567679 |
| 4 | 0.417323 | 2.010990 | — | 2.166885 |
| 5 | 1.038017 | — | — | 1.038017 |
| 6 | 1.142609 | — | — | 1.142609 |
| 7 | 0.025199 | — | — | 0.025199 |
| 8 | 0.064895 | — | — | 0.064895 |
| 9 | 0.999782 | — | — | 0.999782 |
| 10 | 0.020989 | — | — | 0.020900 |

Fig. 143

NEURO-FUZZY-INTEGRATED DATA PROCESSING SYSTEM

FIELD OF THE INVENTION

The present invention relates to a data processing system in a hierarchical i.e. layered network configuration for flexibly processing data in a comprehensible and executable form, and, more specifically, to a neuro-fuzzy-integrated data processing system in a neuro-fuzzy-integrated hierarchical network configuration for establishing high speed, high precision data processing capabilities.

BACKGROUND OF THE INVENTION

In a conventional serial processing computer (Neiman computer), it is very difficult to adjust data processing capabilities with the change of usage and environment. Accordingly, more flexible data processing units have been demanded and developed to process data using a parallel and distributed method in a new hierarchical network configuration specifically in the technical field of pattern recognition, applicable filter, etc. In this hierarchical network data processing unit, programs are not written explicitly, but an output signal (output pattern) provided by a network structure in response to an input signal (input pattern) presented for learning determines a weight value of an internal connection of a hierarchical network structure so that the output signal corresponds to a teaching signal (teacher pattern) according to a predetermined learning algorithm. When the weight value is determined by the above described learning process, a "flexible" data processing function can be realized such that the hierarchical network structure outputs a probable output signal even though an unexpected input signal is inputted.

In the data processing unit in this hierarchical network configuration, there is an advantage in that a weight value of an internal connection can be automatically determined only if a learning signal is generated. However, there is also a disadvantage in that the content of a data process which is dependent on a weight value is not comprehensible. A successful solution would allow this data processing unit in a network structure to be put into practical use. To practically control this data processing unit in a hierarchical network configuration, an effective means must be presented for high speed, high precision data processing.

In a data processing unit comprising a hierarchical network configuration, a hierarchical network comprises one kind of node called a "basic unit" and an internal connection having a weight value corresponding to an internal state value. FIG. 1 shows a basic configuration of a basic unit 1. The basic unit 1 is a multi-input/output (i/o) system. That is, it comprises a multiplier 2 for multiplying a plurality of inputs by respective weight values of an internal connection, an accumulator 3 for adding all products of the above described multiplications performed by the multiplier, and a function converter 4 for applying function conversion such as a non-linear threshold process to the resultant accumulation value so that a final output can be obtained.

Assuming that a layer h is a preprocess layer and a layer i is a post-process layer, the accumulator 3 of the i-th basic unit 1 in the layer i executes the following operation using expression (1), and the function converter 4 executes a threshold operation using expression (2).

$$x_{pi} = \Sigma_h y_{ph} W_{ih} \tag{1}$$

$$y_{pi} = 1/(1+\exp(-x_{pi}+\theta_i)) \tag{2}$$

where $h$: a unit number in the layer h $p$: a pattern number of an input signal $\theta_i$: a threshold of the i-th unit in the layer i $W_{ih}$: a weight value of an internal connection between the layers h and i $Y_{ph}$: output from the h-th unit in the layer h in response to an input signal in the p-th pattern.

The data processing unit in a hierarchical network configuration configures its hierarchical network such that a plurality of the above described basic units 1 are hierarchically connected as shown in FIG. 2 (with input signal values distributed and outputted as an input layer 1') thus performing a parallel data process by converting input signals into corresponding output signals.

The data processing unit in a hierarchical network configuration requires obtaining, by a learning process, a weight value of a hierarchical network structure which determines the data conversion. Specifically, a back propagation method attracts special attention for its practicality as an algorithm of the learning process. In the back propagation method, a learning process is performed by automatically adjusting a weight value $W_{ih}$ and a threshold $\theta_i$ through feedback of an error. As indicated by expressions (1) and (2), the weight value $W_{ih}$ and the threshold $\theta_i$ must be adjusted simultaneously, but the adjustment is very difficult because these values must be carefully balanced. Therefore, the threshold $\theta_i$ is included in the weight value $W_{ih}$ by providing a unit for constantly outputting "1" in the layer h on the input side and assigning the threshold $\theta_i$ as a weight value to the output, therefore allowing it to be processed as a part of the weight value. Thus, expressions (1) and (2) are represented as follows:

$$x_{pi} = \Sigma_h y_{ph} W_{ih} \tag{3}$$

$$y_{pi} = 1/(1+\exp(-x_{pi})) \tag{4}$$

In the back propagation method, as shown in the three-layer structure comprising a layer h, a layer i and a layer j in FIG. 2, the difference $(d_{pj}-y_{pj})$ between an output signal $y_{pj}$ and a teaching signal $d_{pj}$ is calculated when the output signal $y_{pj}$ outputted from the output layer in response to an input signal presented for learning and a teaching signal $d_{pj}$ for matching the output signal $y_{pj}$ are given. Then, the following operation is performed:

$$\alpha_{pj} = y_{pj}(1-y_{pj})(d_{pj}-y_{pj}) \tag{5}$$

followed by:

$$\Delta W_{ji}(t) = \epsilon \sum_p \alpha_{pj} y_{pi} + \zeta \Delta W_{ji}(t-1) \tag{6}$$

Thus, an updated weight value $\Delta W_{ji}(t)$ between the layers i and j is calculated, where t indicates the count of learnings.

Then, using the resultant $\alpha_{pj}$, the following operation is performed:

$$\beta_{pi} = y_{pi}(1-y_{pi}) \sum_j \alpha_{pj} W_{ji}(t-1) \tag{7}$$

followed by:

$$\Delta W_{ih}(t) = \epsilon \sum_p \beta_{pi} y_{ph} + \zeta \Delta W_{ih}(t-1) \tag{8}$$

Thus, an updated weight value $\Delta W_{ih}(t)$ between the layers h and i is calculated.

Then, weight values are determined for the following update cycles according to the updated value calculated as described above:

$$\left.\begin{array}{l} W_{ji}(t) = W_{ji}(t-1) + \Delta W_{ji}(t) \\ W_{ih}(t) = W_{ih}(t-1) + \Delta W_{ih}(t) \end{array}\right\} \quad (8a)$$

By repeating the procedure above, learning is completed when the weight values $W_{ji}$ and $W_{ih}$ are obtained where an output signal $y_{pj}$ outputted from the output layer in response to an input signal presented for learning corresponds to a teaching signal $d_{pj}$, a target of the output signal $y_{pj}$.

When the hierarchical network has a four-layer configuration comprising layers g, h, i, and j, the following operation is performed:

$$\gamma_{ph} = y_{ph}(1-y_{ph}) \sum_i \beta_{pi} W_{ih}(t-1) \quad (9)$$

followed by:

$$\Delta W_{hg}(t) = \epsilon \sum_p \gamma_{ph} y_{pg} + \zeta \Delta W_{hg}(t-1) \quad (10)$$

Thus, the updated amount $\Delta W_{hg}(t)$ of a weight value between the layers g and h can be calculated. That is, an updated amount $\Delta W$ of a weight value between the preceding layers can be determined from the value obtained at the last step at the output side and the network output data.

If the function converter 4 of the basic unit 1 performs linear conversion, the expression (5) above is represented as follows:

$$\alpha_{pj} = (d_{pj} - y_{pj}) \quad (11)$$

the expression (7) above is represented as follows:

$$\beta_{pi} = \sum_j \alpha_{pj} W_{ji}(t-1) \quad (12)$$

and the expression (9) above is represented as follows:

$$\gamma_{ph} = \sum_j \beta_{pj} W_{ji}(t-1)$$

Thus, an expected teaching signal is outputted from the output layer in response to an input signal presented for learning in the data processing unit in a hierarchical network configuration by assigning a learned weight value to an internal connection in the hierarchical network. Therefore, a data processing function can be realized such that the hierarchical network structure outputs a probable output signal even though an unexpected input signal is inputted.

It is certain that, in the data processing unit in a hierarchical network configuration, data can be appropriately converted with a desirable input-output function, and a more precise weight value of an internal connection can be mechanically learned if an additional learning signal is provided. However, there is also a problem in that the content of data conversion executed in the hierarchical network structure is not comprehensible, and that an output signal cannot be provided in response to data other than a learning signal. Therefore, an operator feels emotionally unstable when data are controlled, even in the normal operation of the data processing unit in a hierarchical network configuration, because an abnormal condition is very hard to properly correct. Furthermore, as a learning signal is indispensable for establishing a data processing unit in a hierarchical network, a desired data processing function may not be realized when sufficient learning signals cannot be provided.

On the other hand, "a fuzzy controller" has been developed and put into practical use recently for control targets which are difficult to model. A fuzzy controller controls data after calculating the extent of the controlling operation from a detected control state value by representing, in the if-then form, a control algorithm comprising ambiguity (such as determination of a human being) and executing this control algorithm based on a fuzzy presumption. A fuzzy presumption enables the establishment of an executable teacher for use with a complicated data processing function by grouping the combinations of input/output signals and connecting them ambiguously according to attribute information called "a membership relation." A fuzzy teacher generated by the fuzzy presumption has an advantage in that it is comparatively comprehensible, but has a difficult problem in that a value of a membership function cannot be determined precisely, and the exact relation of the connection between membership functions cannot be determined mechanically, thus requiring enormous labor and time to put desired data processing capabilities into practical use.

DISCLOSURE OF THE INVENTION

The present invention has been developed in the above described background, with the objectives of realizing highly precise data processing capabilities; providing a data processing unit in a hierarchical network configuration where the executable form is very comprehensible; and providing a high speed, high precision data processing system for establishing data processing capabilities using the data processing unit in a hierarchical network configuration by flexibly combining a data processing unit in a hierarchical network configuration and a fuzzy teacher.

FIG. 3 shows a configuration of the principle of the present invention.

In FIG. 3, 10 shows a fuzzy teacher described in a fuzzy presumption form and is subjected to a complicated data process according to an antecedent membership function for representing an ambiguous linguistic expression of an input signal in numerals, a consequent membership function for representing an ambiguous linguistic expression of an output signal in numerals, and rules for developing the connection relation between these membership functions in the if-then form. The fuzzy teacher 10 has a merit in that it is generated rather easily if it is a rough teacher. However, it is very difficult to determine a precise value of a membership function or an exact rules description.

An applicable type data processing unit 11 processes data according to the hierarchical network structure with a complete connection as shown in FIG. 2. It is referred to as a "pure neuro" in the present invention.

The applicable type data processing unit 11 has a merit in that an internal state mechanically assigned to an internal connection in a hierarchical network structure can be learned in the above described back propagation method. However, the content of data conversion is incomprehensible in this unit.

In FIG. 3, a pre-wired-rule-part neuro 12 and a completely-connected-rule-part neuro 13 show characteristics of the present invention. FIG. 4 shows a basic configuration of a pre-wired-rule-part neuro 12 and a completely-connected-rule-part neuro 13. In FIG. 4, the pre-wired-rule-part neuro and the completely-connected-rule-part neuro, or a consequent membership function realizer/non-fuzzy part 18 (except a part of the final output side) comprise a hierarchical neural network. Each part of the network is viewed from the input side of the hierarchical neural network and is divided according to each operation of the network.

In FIG. 4, an input unit 15 receives more than one input signal indicating the control state value of data to be controlled.

A antecedent membership function realizer 16 outputs a grade value indicating the applicability of one or more antecedent membership functions in response to one or more input signals distributed by the input unit 15.

A rule part 17 often comprises a hierarchical neural network having a plurality of layers and outputs using a grade value of the antecedent membership function outputted from the antecedent membership function realizer 16, and an enlargement or reduction rate of one or more consequent membership functions corresponding to one or more output signals as a grade value of a fuzzy rule.

The consequent membership function realizer/non-fuzzy part 18 calculates a non-fuzzy process and outputs an output signal after enlarging or reducing a consequent membership function using an enlargement or reduction rate of a consequent membership function outputted by the rule part 17. The calculation of the non-fuzzy process means obtaining a center-of-gravity calculation generally performed at the final step of the fuzzy presumption.

FIG. 5 shows a configuration of a typical example of a pre-wired-rule-part neuro. FIG. 5 nearly corresponds to FIG. 4, but is different in that the consequent membership function realizer/non-fuzzy part 18 in FIG. 4 comprises a consequent membership function realizer 18a, and a center-of-gravity calculation realizer 18b. Whereas, in FIG. 5, the pre-wired-rule-part neuro comprises a hierarchical neural network except a center-of-gravity calculator 27 in the center-of-gravity calculation realizer 18b. The input units of the antecedent membership function realizer 16, rule part 17, consequent membership function realizer 18a and the center-of-gravity calculation realizer 18b are connected to respective units in the preceding layer, but they are not shown in FIG. 5.

In FIG. 5, linear function units 22a–22d in the antecedent membership function realizer 16 output a grade value of a antecedent membership function. For example, the unit 21a outputs a grade value indicating the applicability of a membership function indicating "The input x is small."

Sigmoid function units 23a–23e in the rule part 17 connect the output units 22a–22e of the antecedent membership function realizer 16 to output units 24a, 24b, and 24c in the rule part. For example, when a rule 1 of a fuzzy teacher indicates "if (X is small) and (Y is small) then Z is middle," the units 22a and 22d are connected to the unit 23a, the unit 23a is connected to the unit 24b, and the connection of the units 22b, 22c, and 22e respectively to the unit 23a is not required.

The output units 24a, 24b, and 24c of the rule part 17 output an enlargement or a reduction rate of a consequent membership function. For example, the unit 24b outputs an enlargement or a reduction rate of a consequent membership function indicating "Z is middle"; the enlargement or reduction result of the consequent membership function is outputted by linear units 25a–25n in the consequent membership function realizer 18a using the output of the units 24a, 24b, and 24c; according to these results, two linear units 26a and 26b in a center-of-gravity determining element output unit 26 output two center-of-gravity determining elements $z_a$ and $z_b$ for calculating center-of-gravity. Using the result, a center-of-gravity calculator 27 obtains the output Z of the system as a center-of-gravity value.

In FIG. 5, for example, layers are not completely connected in the antecedent membership function realizer 16, but the connection is made corresponding to a antecedent membership function. When a rule of a fuzzy teacher is obvious, the pre-wired-rule-part neuro can be applicable.

When the rule 1 indicates:

"if (X is small) and (Y is small) then Z is middle," the connection of the unit 22b, 22c, and 22e respectively to the unit 23a is not required. Thus, the pre-wired-rule-part neuro is defined as a data processing system where only necessary parts are connected between the antecedent membership function realizer 26 and the rule part 17 (in the rule part 17) and between the rule part 17 and the consequent membership function realizer, according to the rules of a fuzzy teacher.

In FIG. 3, when rules as well as a membership function of the fuzzy teacher 10 are definite, a hierarchical pre-wired neural network having only necessary parts connected permits conversion of the fuzzy teacher 10 to the pre-wired-rule-part neuro 12. If rules are not definite, the fuzzy teacher 10 can be converted to the completely-connected-rule-part neuro 13 where, for example, only the antecedent and consequent membership function realizers are pre-wired.

As the present neuro is a completely-connected-rule-part neuro, the respective layers in the output units 22a–22e of the antecedent membership function realizer 16, in the units 23a–23e of the rule part, and in the output units 24a–24c of the rule part are completely connected.

In FIG. 5, the complete connection is performed between the output units 22a–22e of the antecedent membership function realizer 16 and the units 23a–23e of the rule part 17, and between the units 23a–23e of the rule part and the output units 24a, 24b, and 24c of the rule part. Thus, the data processing system in the hierarchical network configuration is called a completely connected neuro.

Furthermore, for example, the fuzzy teacher 10 can be converted to a pure neuro 11 by providing input/output data of the fuzzy teacher 10 for an applicable type of data processing unit; that is, a pure neuro 11 comprising a hierarchical neural network completely connected between each of adjacent layers.

Next, the applicable type of data processing unit, that is, the pure neuro 11, learns input/output data to be controlled. After the learning, a comparatively less significant connection in the pure neuro 11 (a connection having a smaller weight value) is disconnected,, or the network structure is modified to convert the pure neuro 11 to the pre-wired-rule-part neuro 12 or the completely-connected-rule-part neuro 13. Then, the fuzzy teacher 10 of the antecedent membership function, consequent membership function, fuzzy rule part, etc. can be extracted by checking the structure of the pre-wired-rule-part neuro 12. By checking the structure of the completely-connected-rule-part neuro 13, the fuzzy teacher 10 of the antecedent membership function and the consequent membership function can be extracted.

BRIEF DESCRIPTION OF THE DRAWINGS

FIG. 6 shows an embodiment of a fuzzy rule;

FIG. 12 shows a view for explaining how to set a weight value and a threshold of a neuron for realizing logical operation;

FIGS. 31A and 31B show the first embodiment of the output of a center-of-gravity determining element;

FIGS. 33A and 33B show a basic configuration of a teaching signal determiner;

FIG. 42 shows an output example of a center-of-gravity output unit;

FIG. 58 shows an embodiment of a pure neuro;

FIG. 59 shows an example of a learning pattern provided for a pure neuro shown in FIG. 58;

FIG. 60 shows the weight of the connection after the learning of a pure neuro shown in FIG. 58;

FIG. 67 shows a membership function corresponding to each unit of the fifth layer shown in FIG. 66;

FIG. 68 shows the weight of the connection in the pre-wired-rule-part neuro shown in FIG. 66;

FIG. 71 shows the weight of the connection of a pre-wired-rule-part neuro;

FIG. 73 shows the weight of a completely-connected-rule-part neuro shown in FIG. 72;

FIGS. 85a–85f show an example of a logical operation performed by a unit;

FIGS. 86A–86E show examples of administrative data of a logical operation administrator;

FIG. 87 shows examples of administrative data (1) of a logical operation input/output characteristic information administrator;

FIG. 88 shows examples of administrative data (2) of a logical operation input/output characteristic information administrator;

FIG. 106 shows a flowchart of a learning operation for learning information in the seventh embodiment;

FIGS. 112A–112K show an explanatory view of phase-group and group-connection reference lists;

FIG. 121 shows an explanatory view of a hierarchical network generated by a fuzzy teacher;

FIG. 122 shows an explanatory view of an input/output signal associated with data processing capabilities of a hierarchical network shown in FIG. 121;

FIGS. 123A and 123B show an explanatory view of another example of a hierarchical network generated by a fuzzy teacher;

FIG. 124 shows an explanatory view (1) of a learning signal for use in a learning process in a hierarchical network shown in FIG. 123;

FIG. 125 shows an explanatory view (2) of a learning signal for use in a learning process in a hierarchical network shown in FIG. 123;

FIG. 126 shows an explanatory view of an input/output signal associated with data processing capabilities of a hierarchical network shown in FIG. 123;

FIG. 127 shows an explanatory view of a membership function after being tuned by learning;

FIG. 128 shows an explanatory view of a learning signal for use in a learning process by an applicable type of data processing unit;

FIG. 129 shows an explanatory view of an applicable type of data processing unit operated by learning;

FIG. 130 shows an explanatory view of an input/output signal associated with the data processing capabilities of an applicable type of data processing unit shown in FIG. 129;

FIG. 131 shows an explanatory view of a hierarchical network used for simulating the generation of a fuzzy rule;

FIGS. 132A–132D show an explanatory view of a membership real number used for simulating the generation of a fuzzy rule;

Figure 138A:
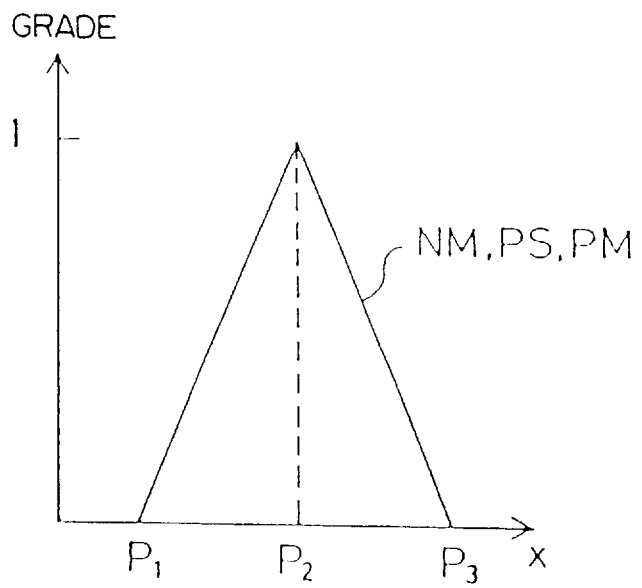
Figure 138B:
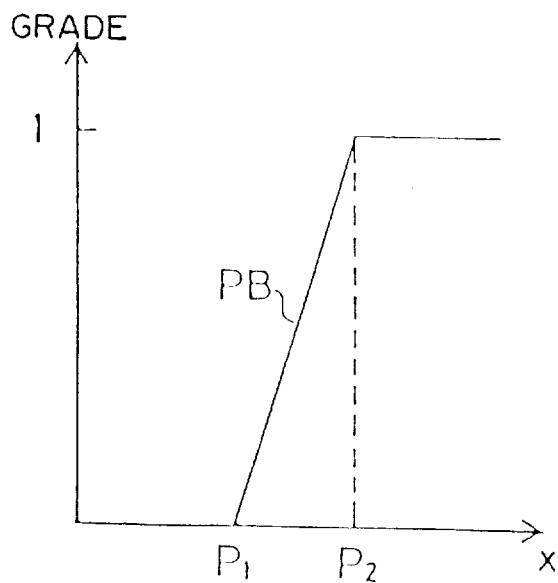
Figure 140:
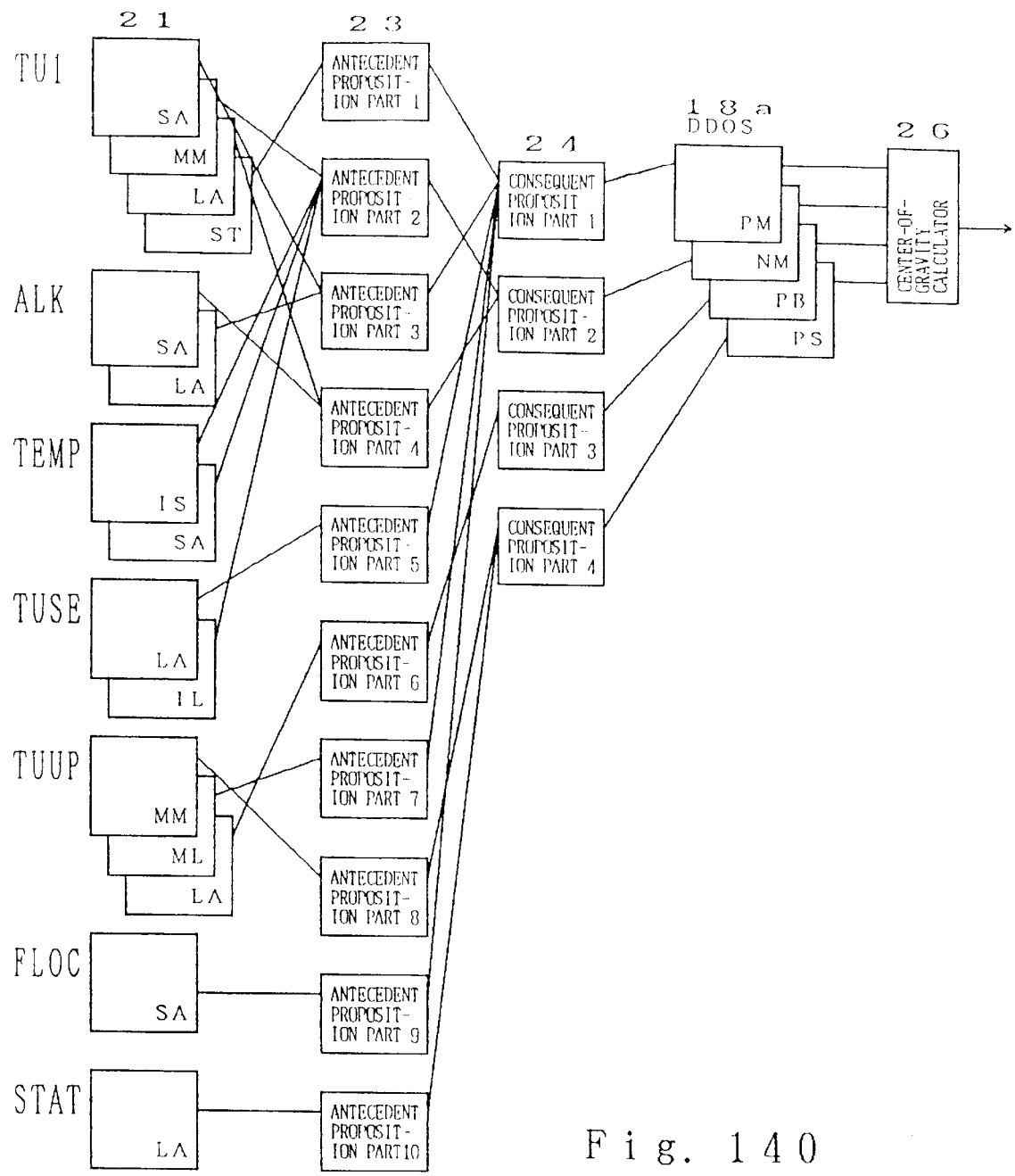
Figure 142A:
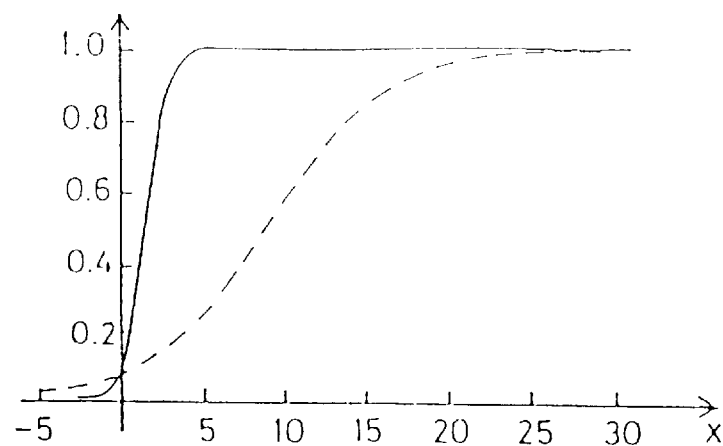
Figure 142B:
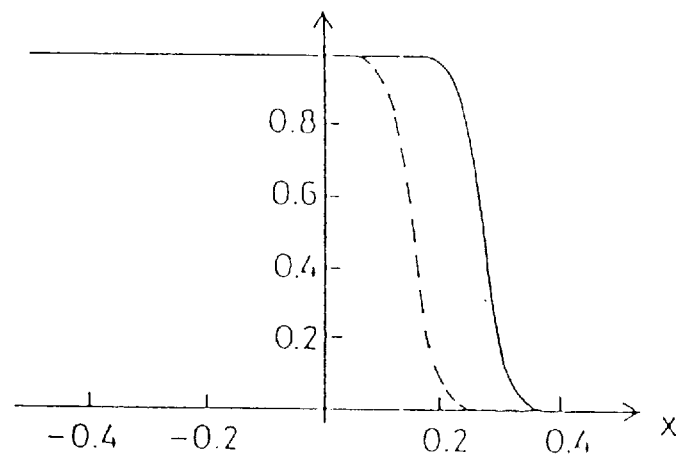
Figure 142C:
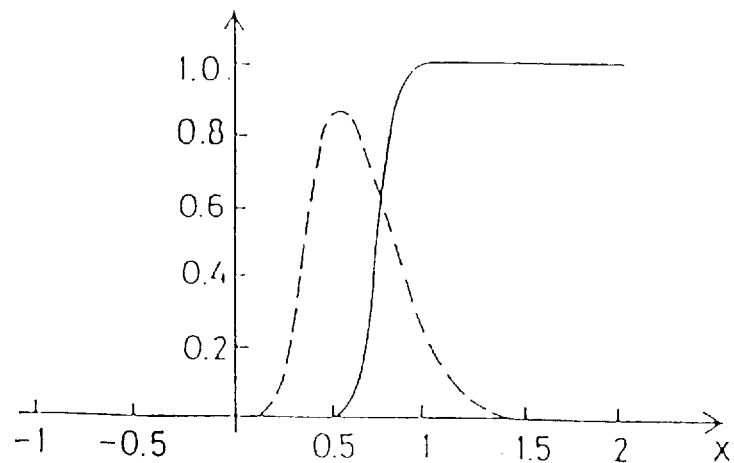
Figure 144:
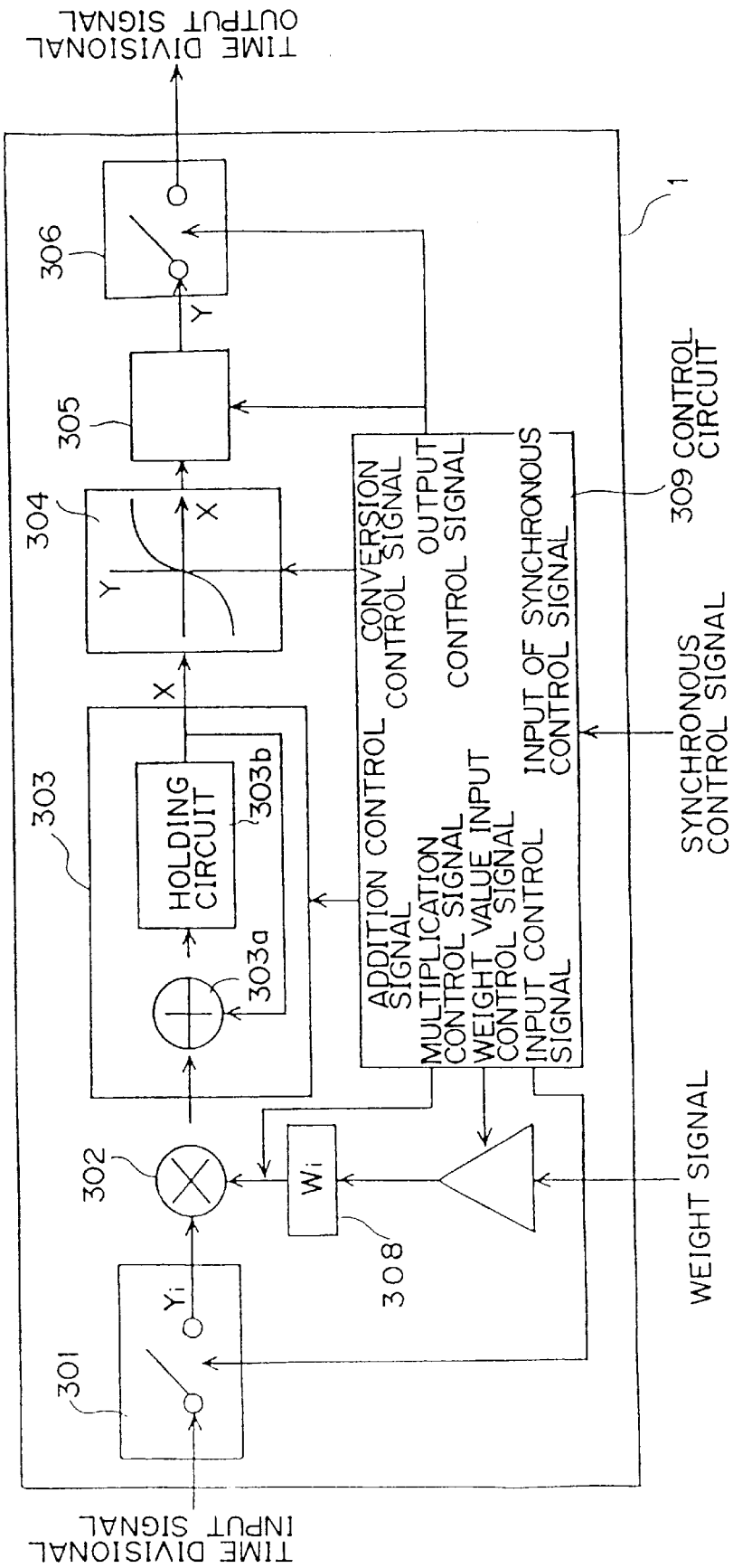
Figure 145:
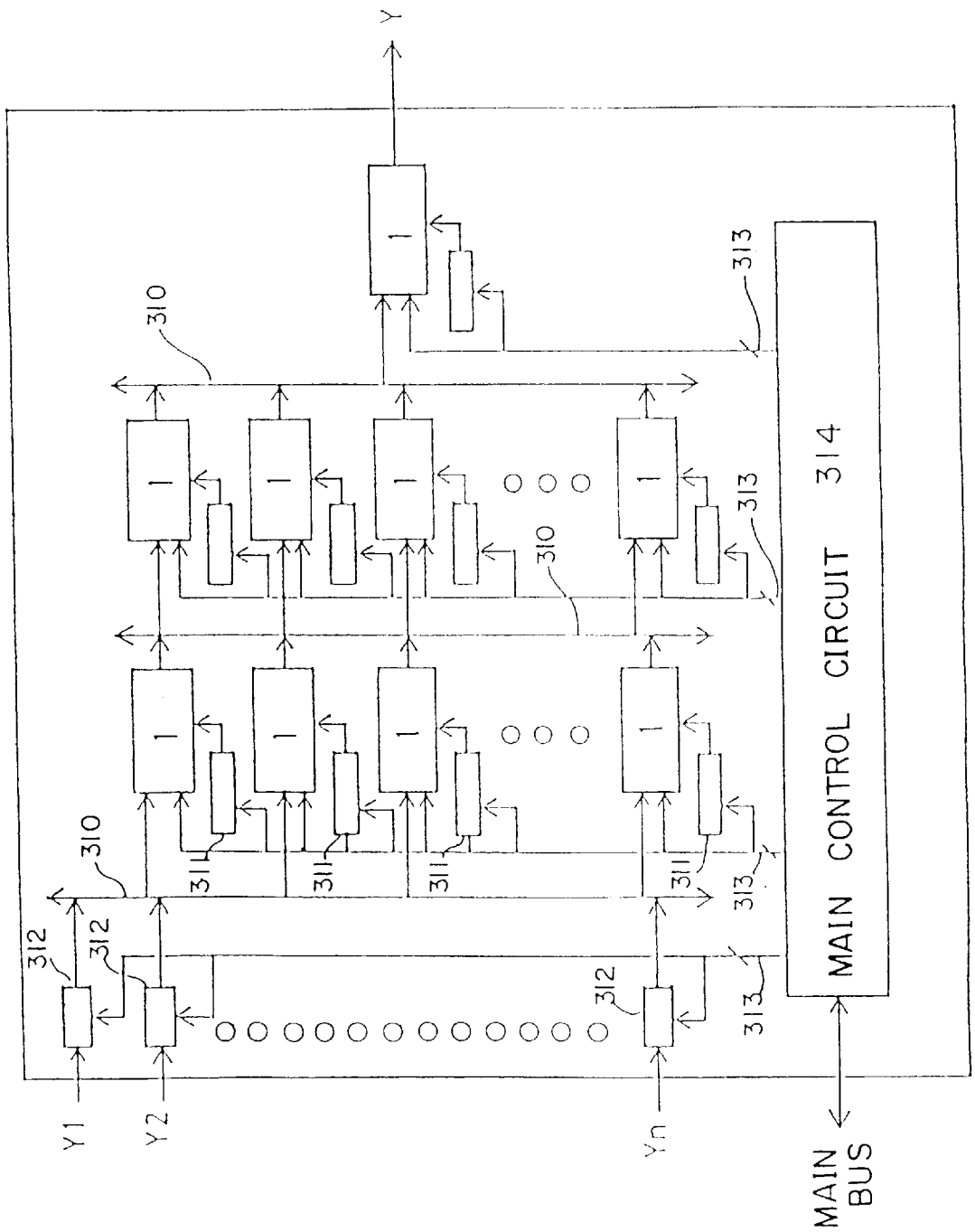

FIG. 133 shows an explanatory view of learning control data used for simulating the generation of a fuzzy rule;

FIG. 134 shows an explanatory view of a fuzzy control rule used for tuning simulation;

FIG. 135 shows a view for explaining values representing a control state and controlling operation used for tuning simulation;

FIG. 136 shows an explanatory view (1) of parameters and learning data for realizing membership functions used for tuning simulation;

FIG. 137 shows and explanatory view (2) of parameters for realizing membership functions used for tuning simulation;

FIGS. 138A and 138B show an explanatory view (1) of membership functions of a controlling operation used for tuning simulation;

FIG. 139 shows an explanatory view (2) of membership functions of a controlling operation used for tuning simulation;

FIG. 140 shows an explanatory view of a hierarchical network used for tuning simulation;

FIG. 141 shows an explanatory view of learning control data used for tuning simulation;

FIGS. 142A–142C show an explanatory view of membership functions tuned by learning weight values;

FIG. 143 shows an explanatory view of the learning data of weight values obtained by tuning simulation;

FIG. 144 shows an embodiment of a hardware configuration of a basic unit; and FIG. 145 shows an embodiment of a hardware configuration of a hierarchical network.

THE BEST MODE FOR PRACTICING THE PRESENT INVENTION

The present invention is described in association with the attached drawings as follows:

FIG. 6 shows an embodiment of a fuzzy rule, and shows examples of five fuzzy rules 1–5 defined between input Xs and Ys representing values of control states and output Zs representing values of control.

Figure 7:
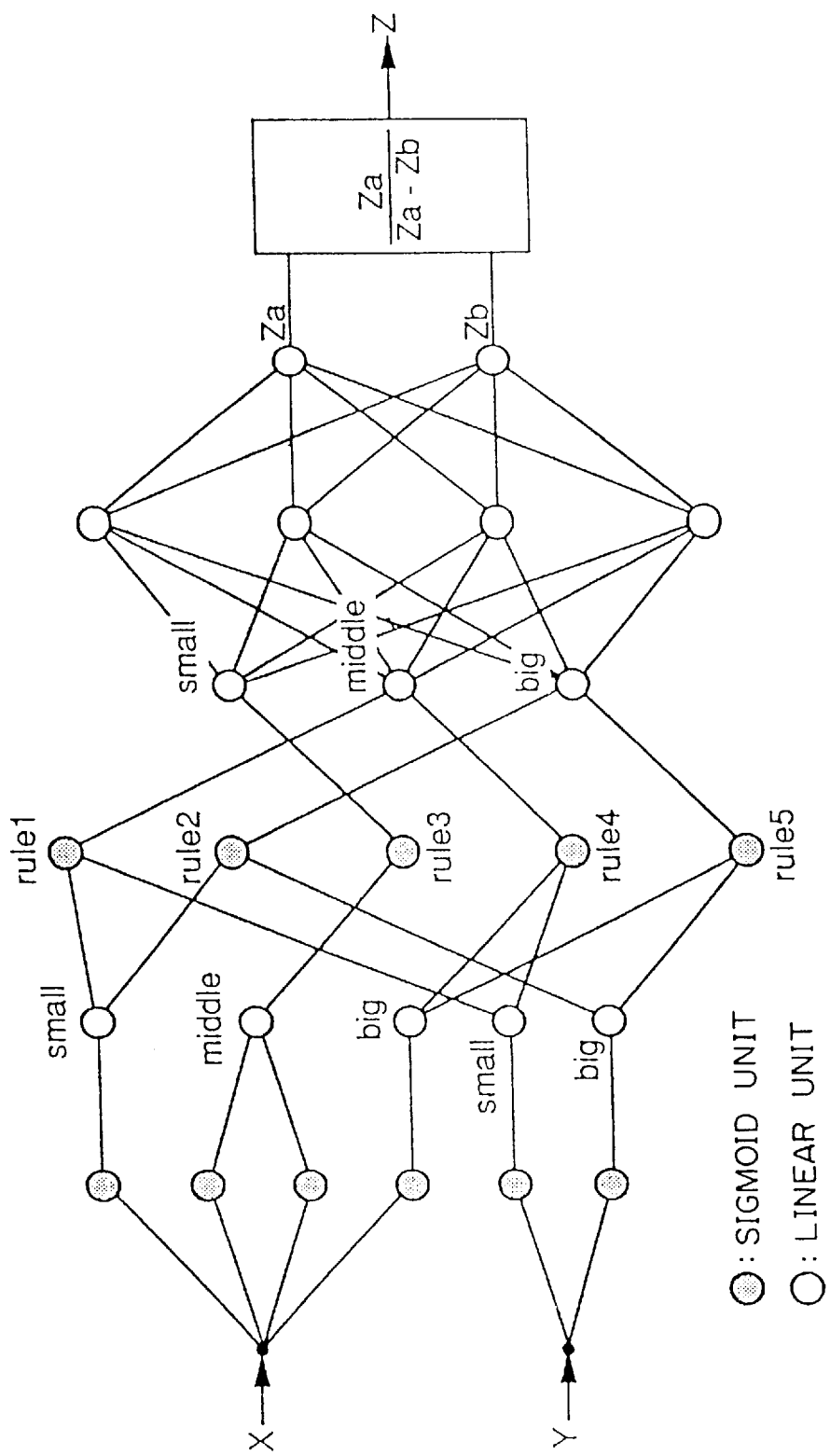
FIG. 7 shows an embodiment of a pre-wired-rule-part neuro corresponding to a fuzzy rule shown in FIG. 6.

FIG. 7 shows an embodiment of a pre-wired-rule-part neuro corresponding to the fuzzy rules shown in FIG. 6.

FIG. 7 shows the connection between the antecedent membership function realizer and the rule part, and the connection in the rule part according to the fuzzy rules shown in FIG. 6.

Figure 5:
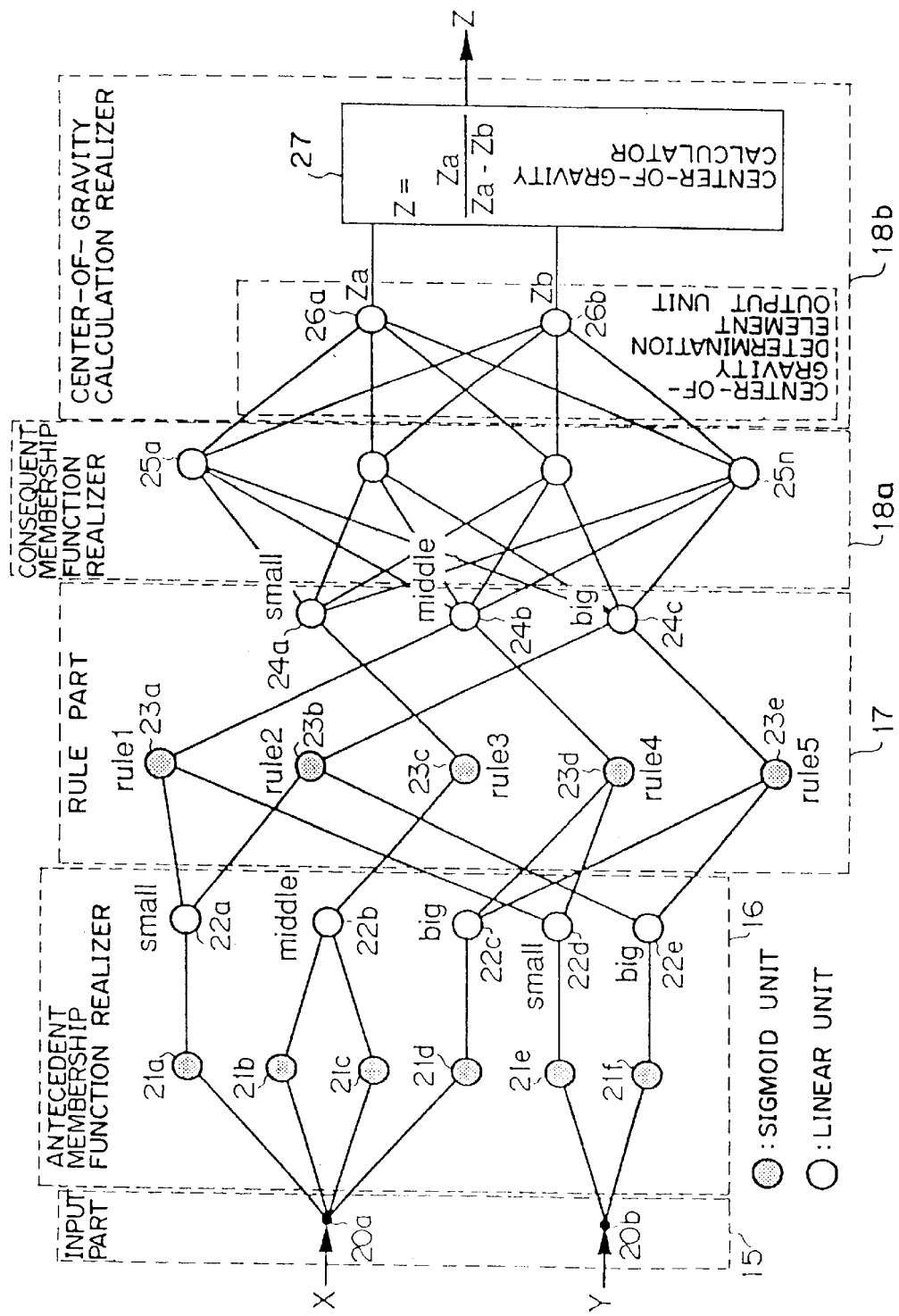
FIG. 5 shows a block diagram for explaining an example of a pre-wired-rule-part neuro.

In FIG. 5, the weight of an input connection and the settings of a threshold are described relating to Sigmoid function units 21a–21d for realizing the antecedent membership functions in the antecedent membership function realizer 16.

Figure 8:
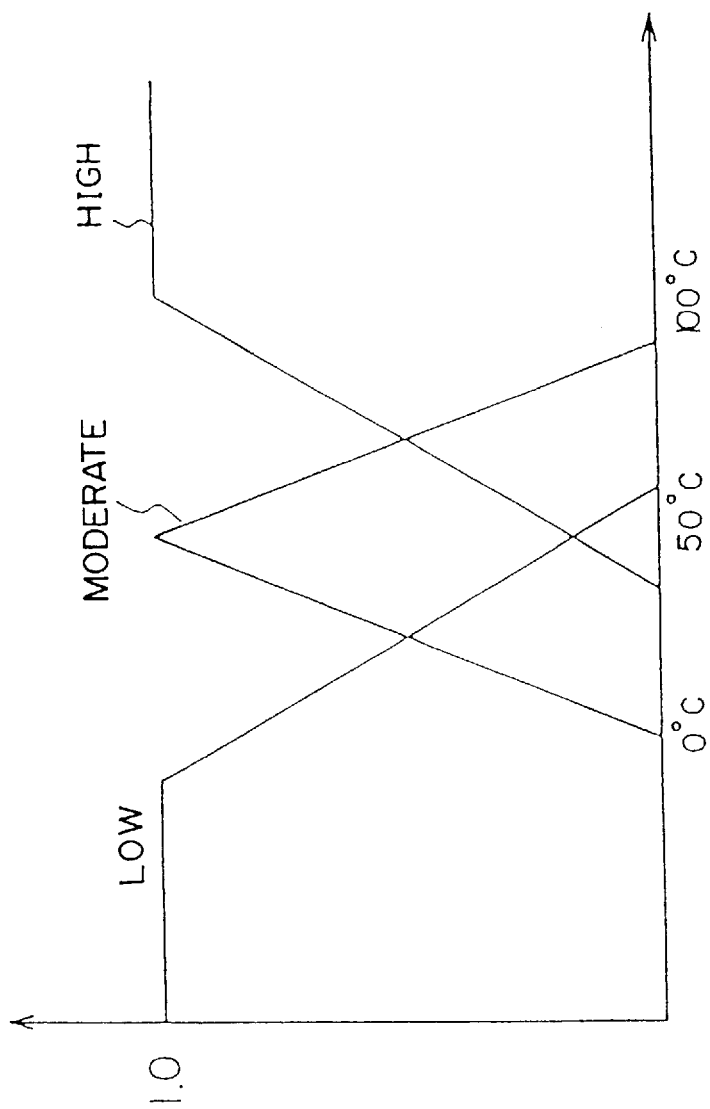
FIG. 8 shows an explanatory view of a membership function.

FIG. 8 shows an example of a membership function. The function of calculating a grade value of a antecedent membership function is shown as follows:

$$y = \frac{1}{1 + \exp(-\omega x + \theta)}$$

An output value y provided by a basic unit 1 indicates a function form similar to a membership function indicating "low temperature" shown in FIG. 8 if $\omega<0$, $\theta<0$; Y indicates a grade value of a function form similar to the membership function indicating "high temperature" shown in FIG. 8 if $\omega>0$, $\theta>0$. Therefore, as shown in FIG. 9B, setting a weight value $\omega$ and threshold $\theta$ appropriately for the input of the basic unit 1 realizes membership functions in the function forms indicating "low temperature" and "high temperature" shown in FIG. 8.

A difference y between output values provided by two basic units 1 is obtained as follows:

$$y = \frac{1}{1 + \exp(-\omega_1 x + \theta_1)} - \frac{1}{1 + \exp(-\omega_2 x + \theta_2)}$$

Figure 10A:
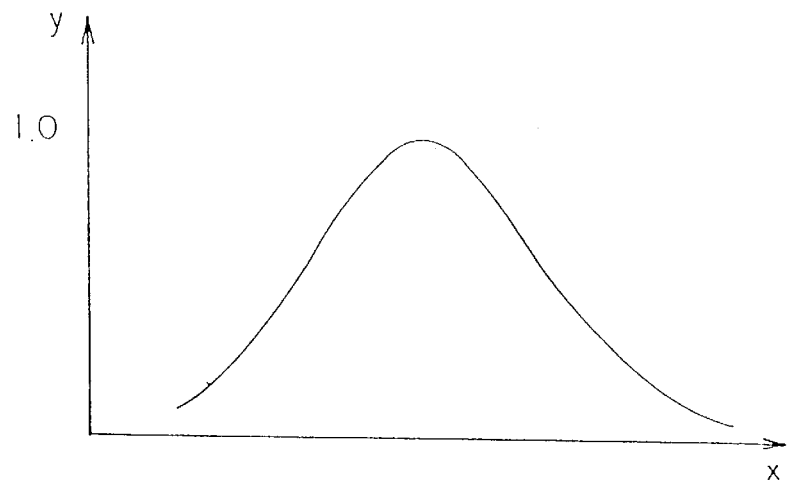
FIGS. 10A and 10B shows a view (2) for explaining the capabilities of calculating a grade value of a antecedent membership function.
Figure 10B:
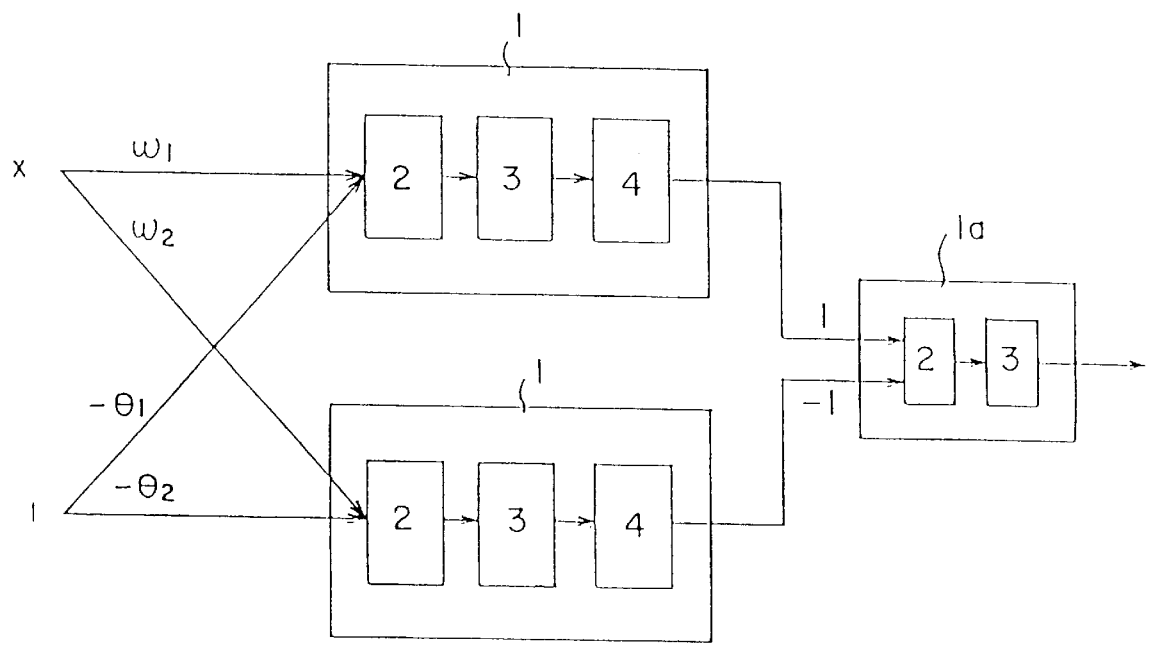

As shown in FIG. 10A, the value y takes the function form similar to a membership function indicating "moderate temperature" shown in FIG. 8. Therefore, as shown in FIG. 10B, products of the multiplication of output values of two basic units 1 by 1 and −1 respectively are applied as input. Then, using a subtracter 1a comprising basic units which are not provided with a threshold processor 4 (this configuration enables calculation of the difference between output values of two basic units 1), weight values $\omega_1$ and $\omega_2$, and thresholds $\theta_1$ and $\theta_2$, the input values of two basic units 1 can be set appropriately, thereby realizing allocation of a membership function in the function form indicating "moderate temperature."

In the above described configuration, weight values and thresholds for input values of these basic units 1 can be modified, thus further modifying antecedent membership function forms.

Figure 11A:
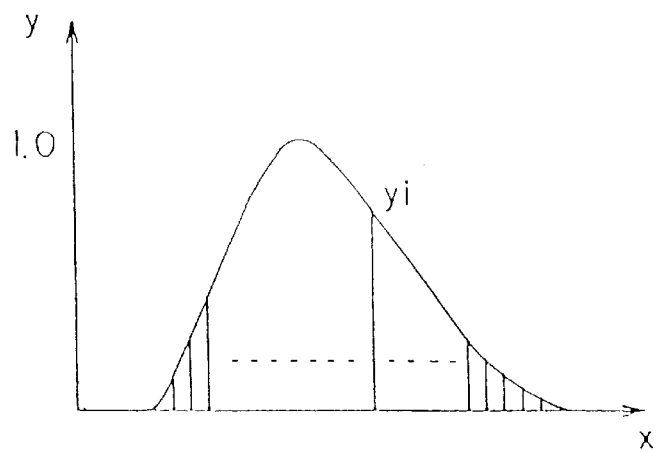
FIGS. 11A and 11B show a view for explaining the capabilities of outputting a grade value of a consequent membership function.
Figure 11B:
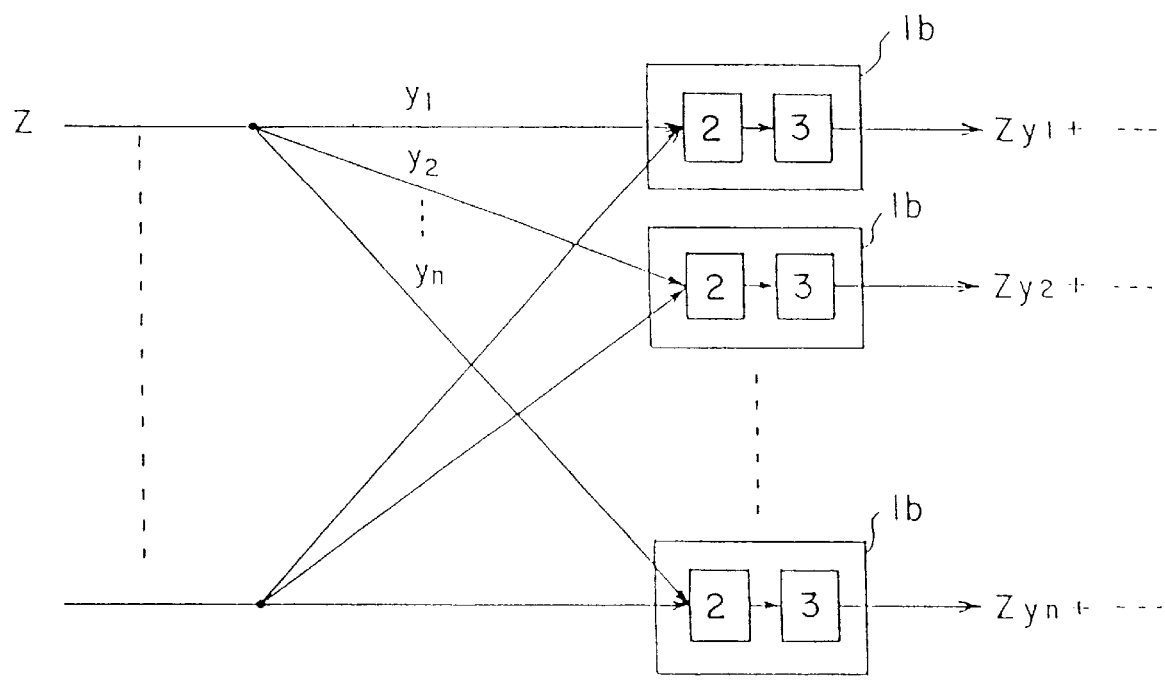

As shown in FIG. 11A, the outputting function of a grade value of a consequent membership function is obtained as follows: First, a consequent membership function is divided into many small segments where a grade value $y_i$ is specified for each segment. Next, as shown in FIG. 11B, grade value output units 1b comprising basic units 1 which are not provided with a threshold processor 4 must be supplied for the number of grade values (n). Then, $y_1$ is set as a weight value for the input of the grade value output unit described above. As shown in FIG. 11B, output of the same kind such as the opening of a bulb A, or a grade value of a consequent membership function associated with a value representing controlling operation, etc. is applied to the same grade value output unit 1b. Such grade value output units 1b are configured such that a function sum of grade values of reduced membership functions associated with allocated values representing controlling operation is outputted.

In the above described configuration, weight values for input values of these grade value output units 1*b* are modified, thereby further modifying the function forms of consequent membership functions.

Next, functions of Sigmoid function units 23*a*14 23*e* in the rule part 17 shown in FIG. 5 are described as follows:

In a rule 1 shown in FIG. 6, an antecedent realizer indicates that multiplying operation "X is small" by "Y is small" in a fuzzy logic, and the Sigmoid function units 23*a*–23*e* require comprising such a fuzzy logic operating function.

FIG. 12 shows an example of setting a weight value and threshold where the logic operating function is realized using a single neuron element. FIG. 12 shows how to determine a weight value $W_i$ and a threshold $\theta$.

Figure 13:
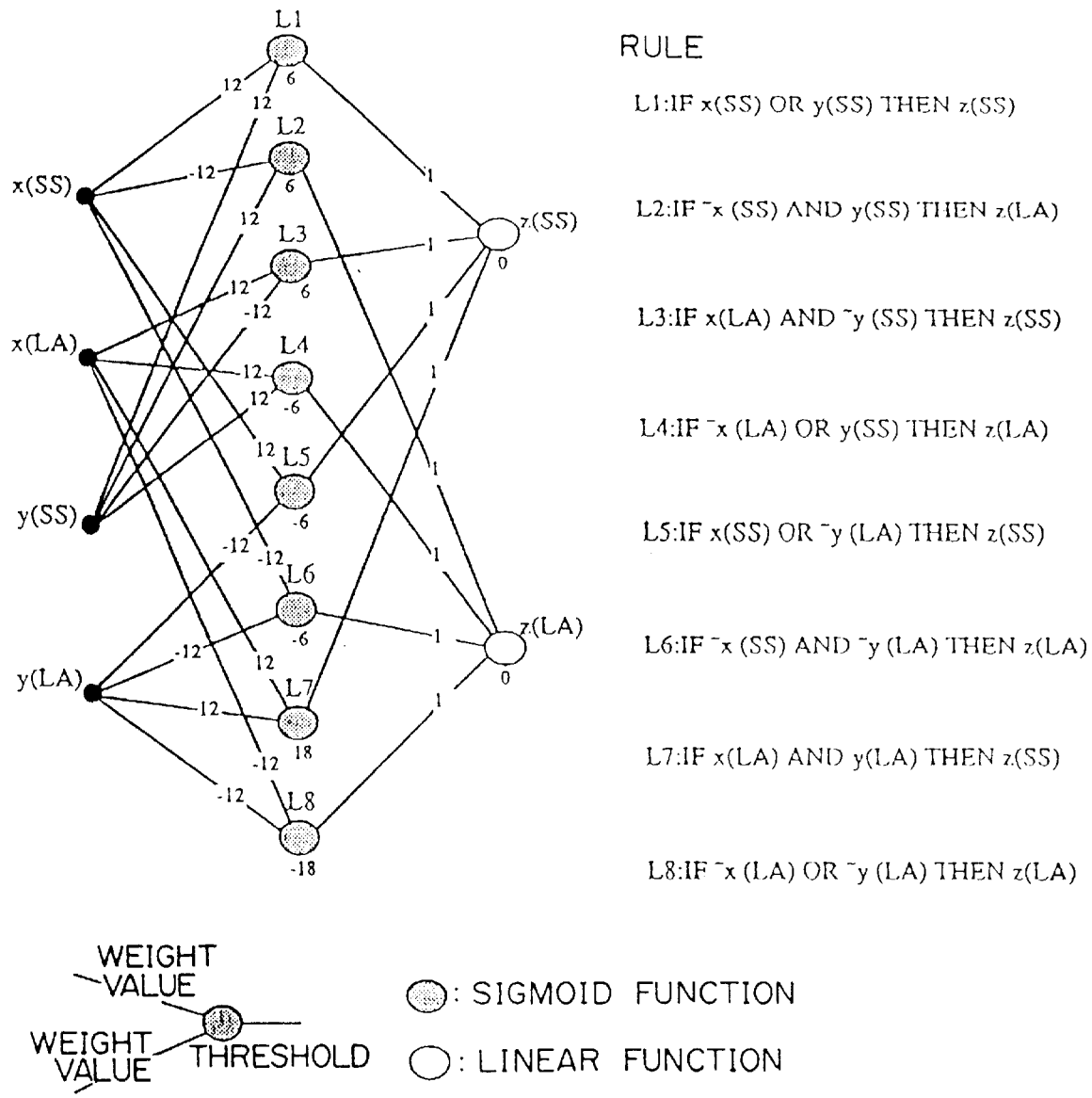
FIG. 13 shows an embodiment of a rule part in the setting method shown in FIG. 12.

FIG. 13 shows an embodiment of a rule part using the method of setting a weight value and a threshold as shown in FIG. 12. In FIG. 13, eight fuzzy rules are indicated where x(SS) shows "input X is small", x(LA) shows "input X is large", and ~x shows negation of x, that is, if 1 is true and 0 is false, it indicates 1−x.

Figure 14A:
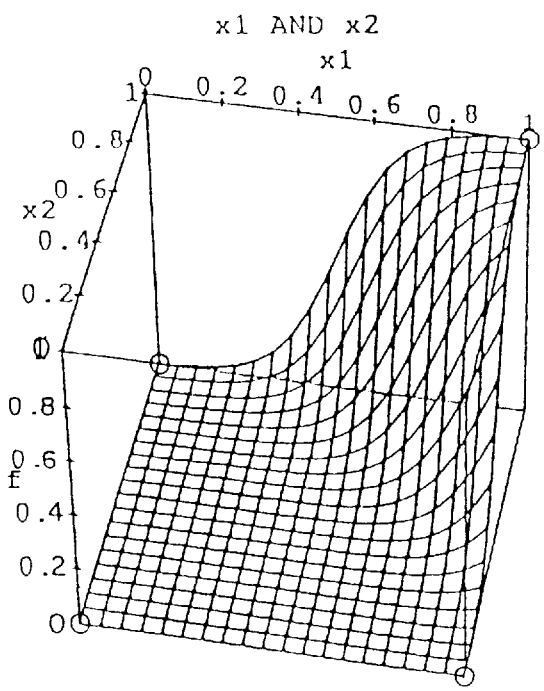
FIGS. 14A and 14B show logical multiplying operations using $X_1$ and $X_2$.
Figure 14B:
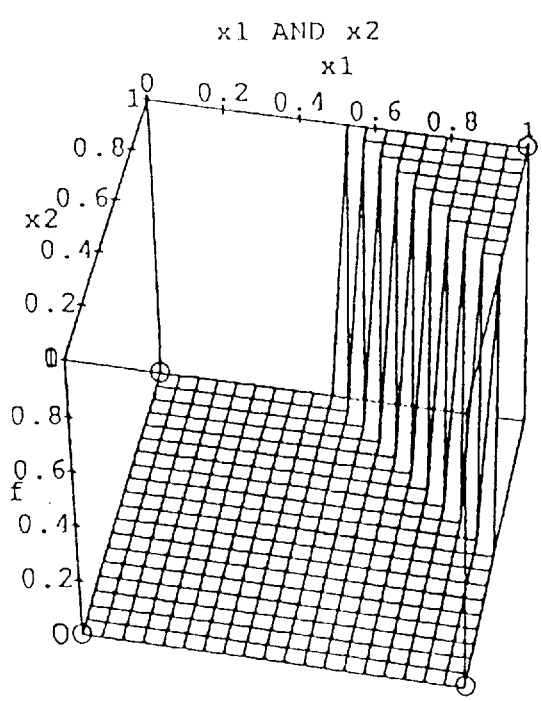
Figure 15A:
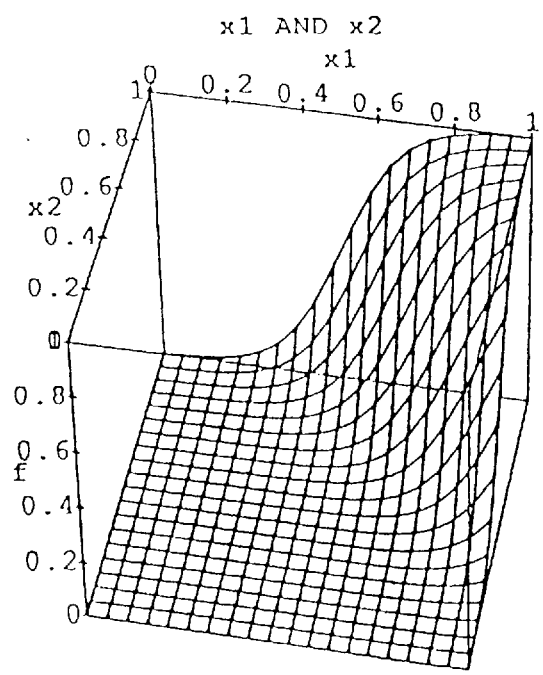
FIGS. 15A–15H show logical operation using two input data from the fuzzy control method.
Figure 15B:
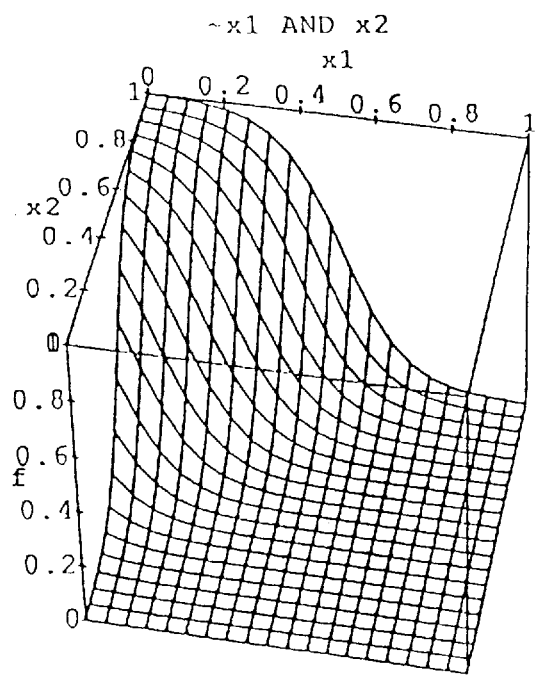
Figure 15C:
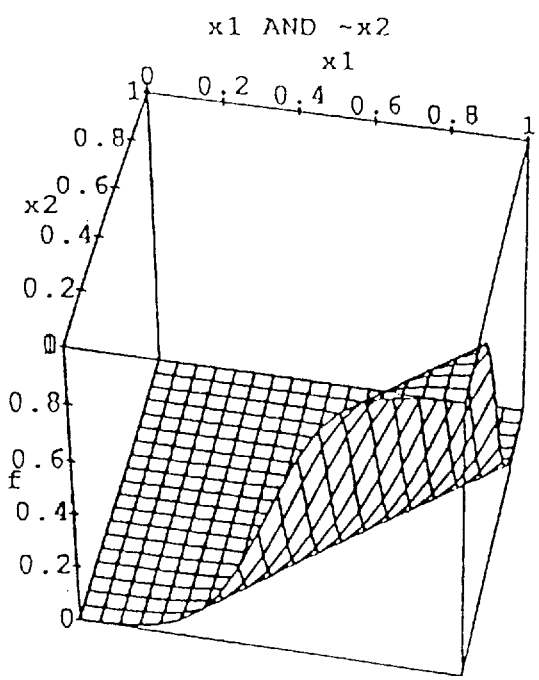
Figure 15D:
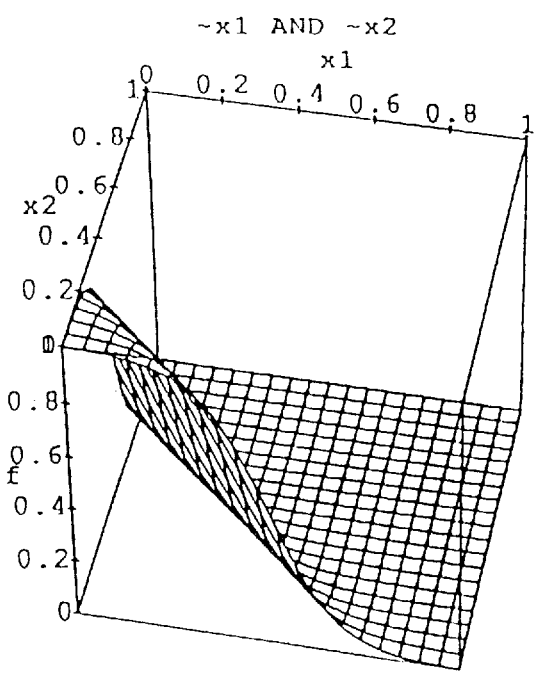
Figure 15E:
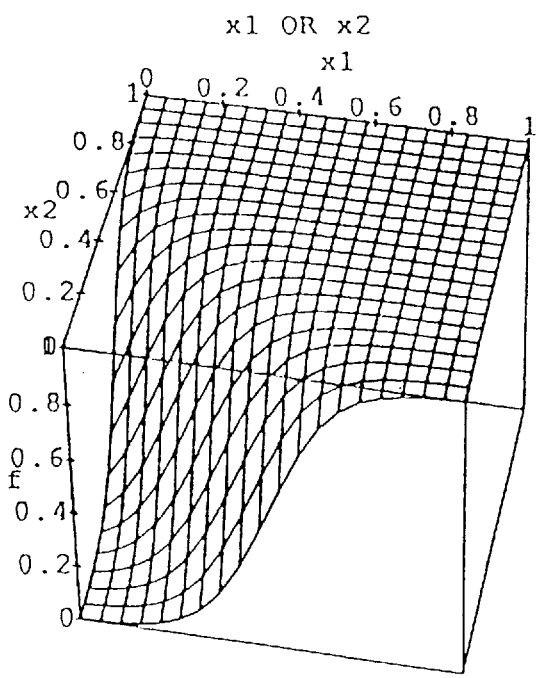
Figure 15F:
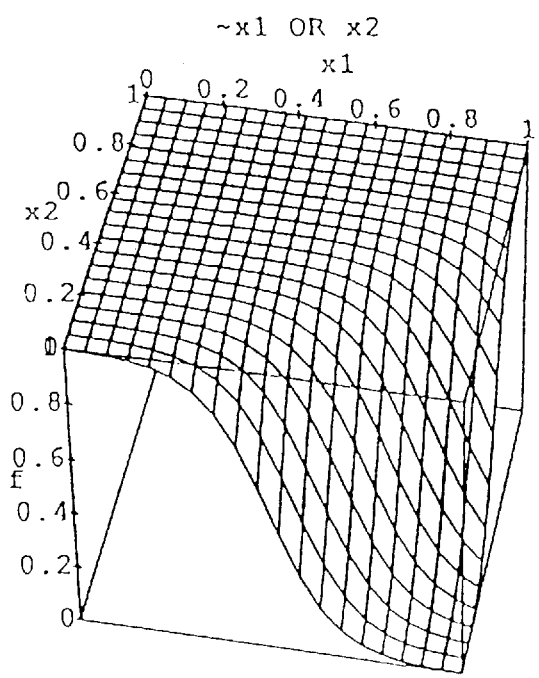
Figure 15G:
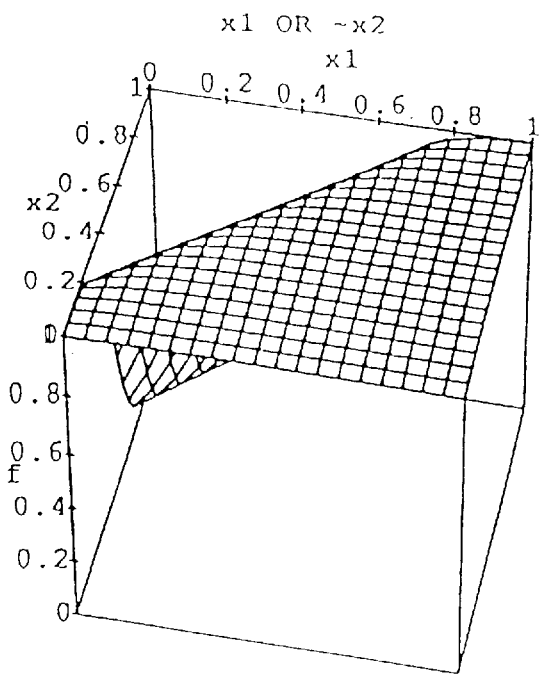
Figure 15H:
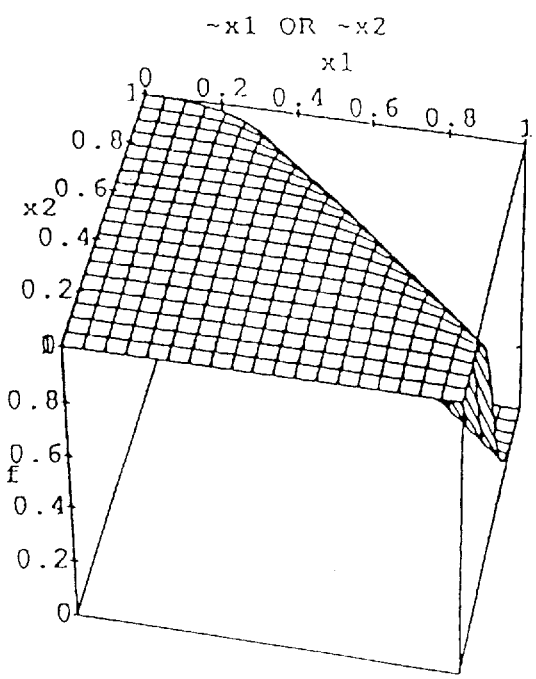

FIG. 14 shows an example of an approximation of a limit product of a fuzzy logic operation using two inputs $x_1$ and $x_2$ where S=12 and t=0.5 are applied in FIG. 12. FIG. 14B shows an example where S=10,000 and t=0.5. In this example, the precision of an approximation can be improved when an input value is 1 or 0 with the increase of value S, but the flexibility of the intermediate step is lost.

FIG. 15 shows examples of fuzzy logic multiplying and adding operations using two inputs; a weight value and threshold can be determined based on FIG. 12.

The above described antecedent and consequent membership functions and a neuron for performing a fuzzy logic operation in the rule part are used in learning such that a sum of squares of an error can be minimized in the back propagation method described before. However, the required condition of an approximation of a membership function, etc. is not always limited to minimizing a sum of squares of an error. For example, there are other conditions such as "the maximum of the variation of output in response to the variation of input must conform to the oblique of a membership function," that is, the upper limit of the sensitivity must be determined as, "a sum of errors must be minimized," "the maximum error must be minimized," etc. However, the back propagation method cannot present appropriate measures to these requirements.

First, if an approximate relation of a membership function defined in FIG. 16 exists between input X and output Y in a non-linear neuron, a weight value and a threshold are determined as follows assuming that the maximum oblique of a characteristic function of a neuron equals the oblique between a and b of a membership function, that is, 1/b−a. Obtaining these values means obtaining the variation of output in response to the variation of input, that is, an approximation for determining the upper limit of the sensitivity, which cannot be obtained by learning.

In this embodiment, characteristics of a non-linear neuron can be referred to as a Sigmoid function and a high-pervaulic tangent function as follows:

$$f(x) = \frac{1}{1 + \exp(-wx + \theta)}$$

Assuming that the above f(x) is a Sigmoid function of a neuron, the following expression exists:

$$f'(x) = \frac{w\exp(-wx + \theta)}{(1 + \exp(-wx + \theta))^2}$$

When w is positive, the Sigmoid function $$x = \frac{\theta}{w}$$

representing the maximum oblique, which is obtained as follows:

$$f'\left(\left|\frac{\theta}{w}\right|\right) = \frac{w\exp(0)}{(1 + \exp(0))^2} = \frac{w}{4}$$

Accordingly, assume the above oblique equals the oblique $$\frac{1}{b-a}$$

at the middle point $$\frac{a+b}{2}$$

of the membership function, and solve the following equation:

$$\frac{\theta}{w} = \frac{a+b}{2}, \frac{w}{4} = \frac{1}{b-a}$$

Thus, the following values can be obtained:

$$w = \frac{4}{b-a}, \theta = \frac{2(a+b)}{b-a}$$

These values are obtained when the characteristic of a neuron is referred to as a tanh function, but the following expression should be used to obtain the values easily:

$$f(x) = 0.5 + 0.5\tanh(wx - \theta) = \frac{1}{1 + \exp(-2wx + 2\theta)}$$

Thus, the following weight value and threshold can be obtained:

$$2w = \frac{4}{b-a}, 2\theta = \frac{2(a+b)}{b-a}$$

Figure 17:
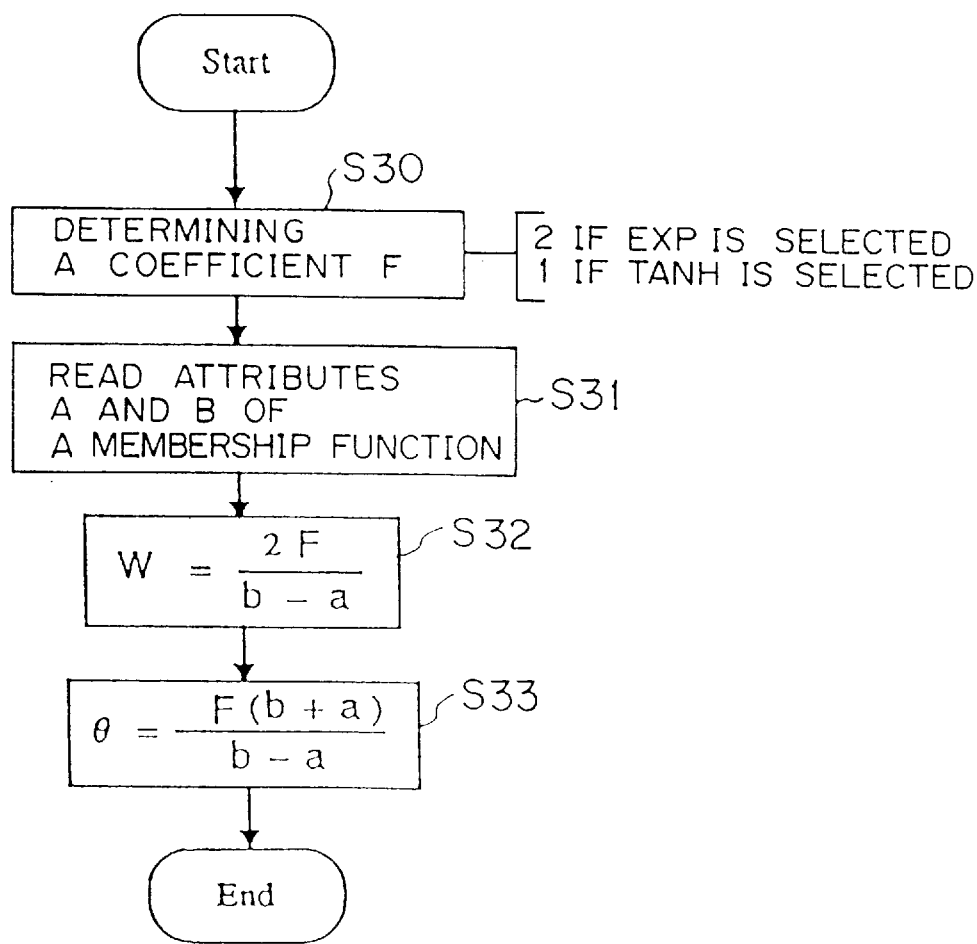
FIG. 17 shows a flowchart of a process for obtaining an approximation used to determine the upper limit of the sensitivity.

FIG. 17 shows a flowchart of a process of obtaining an approximation for determining the upper limit of the sensitivity. In FIG. 17, a value of definition F is determined in step (S) 30. If exp is implied as a characteristic of a neuron, F equals 2; if tanh is implied, F equals 1. Then, attribute values a and b of the membership function are read in S31, a weight value is calculated in S32, and a threshold is calculated in S33, thus terminating the process.

Figure 16:
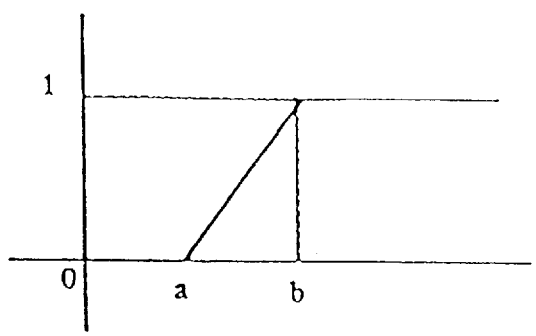
FIG. 16 shows the first example of an approximation of a membership function.

Next, an approximation for minimizing an integral value of an error absolute value is described as follows:

The approximation cannot be realized by learning, and the form of a membership function is to be the same as that shown in FIG. 16.

First, the necessary conditions for minimizing an integral value of an error absolute value is described. The approximation where the following function is used for tanh(wx) is obtained:

$$m(x) = \begin{cases} -1 : x < -1 \\ x : -1 <= x < 1 \\ 1 : 1 <= x \end{cases}$$

Figure 18:
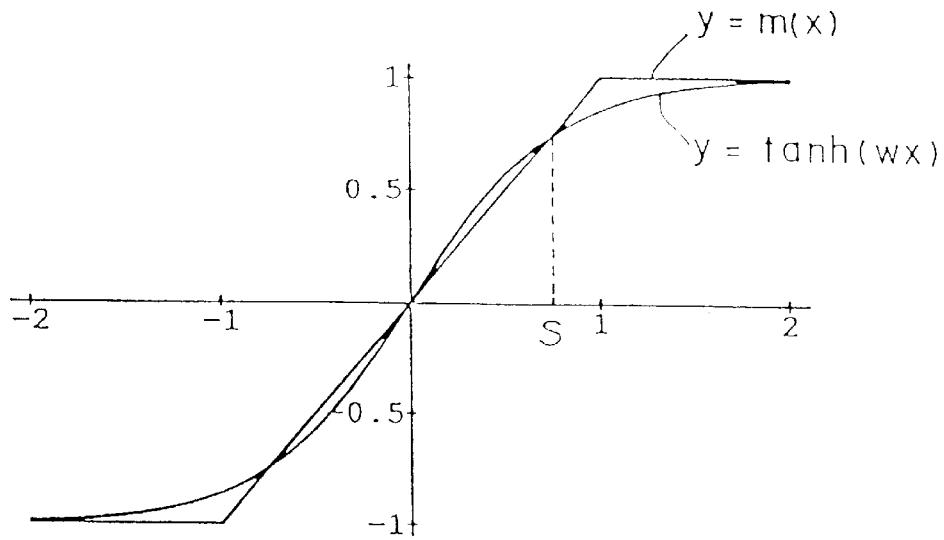
FIG. 18 shows a graph using $y=m(x)$ and $y=\tanh(wx)$.

FIG. 18 shows a graph of m(x) and tanh(wx). Assuming that the coordinate of x of the intersection of these two functions in the first quadrant is "s", s equals tanh(ws), that is:

$$w = \frac{\tanh^{-1}s}{s} = \frac{1}{2s} \log\left(\frac{1+s}{1-s}\right)$$

Obtain a value of w for minimizing the following function:

$$B(w) = \int_0^s (\tanh(wx) - x)dx + \int_s^1 (x - \tanh(wx))dx + \int_1^\infty (1 - \tanh(wx))dx$$

The first paragraph is expressed as follows:

$$\text{1st paragraph} = \frac{1}{w} \log \cosh(ws) - \frac{s^2}{2}$$

The addition of the second and third paragraphs is expressed as, follows:

$$\text{2nd + 3rd paragraph} = \int_s^1 (x-1)dx + \int_s^\infty (1 - \tanh(wx))dx =$$

$$-\frac{1}{2} - \frac{s^2}{2} + \frac{1}{w}(\log 2 + \log \cosh(ws))$$

Therefore, $$B(w) = -\frac{1}{2} - s^2 + \frac{2}{w} \log \cosh(ws)$$

Thus, obtained is $$\frac{dB(w)}{dw}.$$

Then, the following equation exists:

$$\frac{dB(w)}{dw} = -2ss' - \frac{\log 2}{w^2} - \frac{2}{w^2} \log \cosh(ws) +$$

$$\frac{2}{w} \tanh(ws)(s + ws') = -2(s - \tanh(ws))s' - \frac{\log 2}{w^2} -$$

$$\frac{2}{w^2} \log\cosh(ws) + \frac{2s}{w} \tanh(ws) =$$

$$\frac{2}{w}\left(s\tanh(ws) - \frac{1}{w} \log \sqrt{2} \cosh(ws)\right) =$$

$$\frac{2}{w}\left(s^2 - \frac{1}{w} \log\left(\sqrt{\frac{2}{1 - \tanh^2(ws)}}\right)\right) =$$

$$\frac{2}{w}\left(s^2 + \frac{1}{2w} \log\left(\frac{1 - s^2}{2}\right)\right)$$

Obtain a value of s in the above equation where $$\frac{dB(w)}{dw} = 0:$$

$$s^2 = -\frac{1}{2w} \log\left(\frac{1-s^2}{2}\right)$$

$$= -\frac{1}{2} \frac{2s}{\log\left(\frac{1+s}{1-s}\right)} \log\left(\frac{(1+s)(1-s)}{2}\right)$$

$$s\log\left(\frac{1+s}{1-s}\right) = -\log\left(\frac{(1+s)(1-s)}{2}\right)$$

$$s\log(1+s) - s\log(1-s) = -\log(1+s) - \log(1-s) + \log 2$$
$$(1+s)\log(1+s) + (1-s)\log(1-s)$$
$$= \log 2(1+s)^{1+s}(1-s)^{1-s} = 2$$

The value of s to satisfy the above equation is approximately 0.7799, and then w equals 1.3401.

Assuming that the membership function f(x) shown in FIG. 16 is f(x), the following expression exists:

$$f(x) = \frac{1}{2} m\left(\frac{2}{b-a}\left(x - \frac{a+b}{2}\right)\right) + \frac{1}{2}$$

$$= \frac{1}{2} \tanh\left(\frac{2 \times 1.3401}{b-a} x - \frac{(a+b) \times 1.3401}{b-a}\right) + \frac{1}{2}$$

The value can be obtained using a Sigmoid function, but the following expression should be used to obtain the value easily:

$$f(x) = \frac{1}{1 + \exp(-wx + \theta)} = 0.5 + 0.5\tanh$$

$$\left(\frac{w}{2} x - \frac{\theta}{2}\right)$$

As a result, $$\frac{w}{2} = \frac{2 \times 1.3401}{b-a}, \quad \frac{\theta}{2} = \frac{(a+b) \times 1.3401}{b-a}$$

Figure 19:
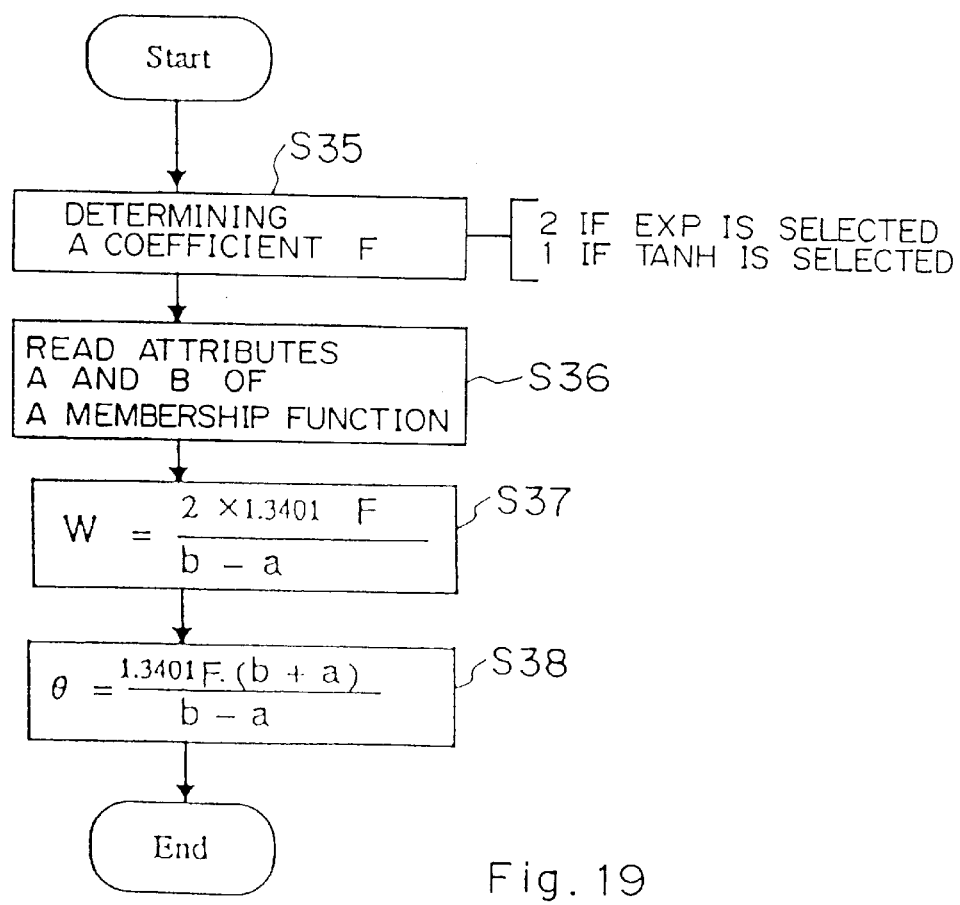
FIG. 19 shows a flowchart of a process for obtaining an approximation having an integral value of an error absolute value as the minimum value.

FIG. 19 shows a flowchart of a process for obtaining an approximation for minimizing an integral value of an error absolute value. The process in FIG. 19 is the same as that in FIG. 17 except that a weight value and a threshold are obtained in S37 and S38, respectively, after being multiplied by 1.3401.

As the third phase, the approximation for minimizing an integral value of squares of an error is obtained.

The form of a membership function is to be the same as that shown in FIG. 16.

First, the approximation of the following function is obtained for tanh(wx):

$$m(x) = \begin{cases} -1 : x < -1 \\ x : -1 < x \& x < 1 \\ 1 : 1 \leq x \end{cases}$$

Then, a value of w is obtained for minimizing the following function:

$$B(x) = \int_0^1 (x - \tanh(wx))^2 dx + \int_1^\infty (1 - \tanh(wx))^2 dx$$

When the following condition is given:

$$F(x) = \int_0^x \tanh(t) dt$$

$$\text{1st paragraph} = \frac{4}{3} - \frac{2}{w^2} F(w) - \frac{1}{w} \tanh(w)$$

$$\text{2nd + 3rd paragraph} = \frac{1}{w} \log\left(\frac{4}{e}\right) - 2 + \frac{2}{w} \log\cosh(w) + \frac{1}{w} \tanh(w)$$

Therefore, the following expression exists:

$$\frac{dB(w)}{dw} = \frac{1}{w^3} \left\{ 4F(w) - w \left( \log\left(\frac{4}{e}\right) + 2\log\cosh(w) \right) \right\}$$

A value of w is obtained for an approximation where dB(w)/dw=0, resulting in w=1.3253.

When the membership function in FIG. 16 is (x), the following expression exists:

$$f(x) = \frac{1}{2} m\left( \frac{2}{b-a} \left( x - \frac{a+b}{2} \right) \right) + \frac{1}{2} \cong$$

$$\frac{1}{2} \tanh\left( \frac{2 \times 1.3253}{b-a} x - \frac{(a+b) \times 1.3253}{b-a} \right) + \frac{1}{2}$$

The values can be obtained using a Sigmoid function, but they are obtained easily in the following expression:

$$f(x) = \frac{1}{1 + \exp(-wx + \theta)} = 0.5 + 0.5 \tanh\left( \frac{w}{2} x - \frac{\theta}{2} \right)$$

As a result, the following values are obtained:

$$\frac{w}{2} = \frac{2 \times 1.3253}{b-a}$$

$$\frac{\theta}{2} = \frac{(a+b) \times 1.3253}{b-a}$$

Figure 20:
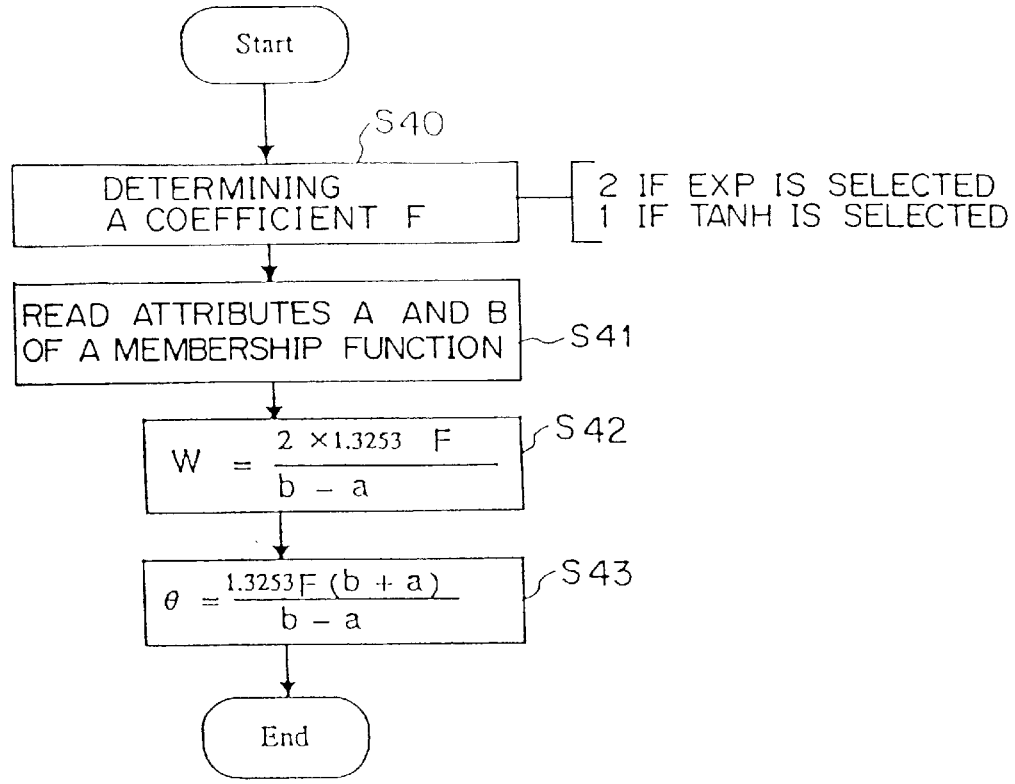
FIG. 20 shows a flowchart of a process for obtaining an approximation having an integral value of two squares of an error.

FIG. 20 shows a flowchart of a process for obtaining an approximation for minimizing an integral value of squares of an error. FIG. 20 is the same as FIGS. 17 and 19 except that a weight value and a threshold are obtained after being multiplied by 1.3253 in S42 and S43.

As the fourth phase, an approximation for minimizing the maximum error is described as follows:

The approximation also cannot be obtained by learning, and the form of a membership function is the same as that shown in FIG. 16.

First, an approximation of the following function is obtained for tanh(wx):

$$m(x) = \begin{cases} -1: x < -1 \\ x: -1 < x \& x < 1 \\ 1: 1 \leq x \end{cases}$$

Assuming that the coordinate of x of the intersection of the functions shown in FIG. 18 in the first quadrant is "s", s equals tanh(ws), that is:

$$w = \frac{\tanh^{-1} s}{s} = \frac{1}{2s} \log\left( \frac{1+s}{1-s} \right)$$

An error marks the maximum value at either the point x0(0<x0<s) or the point 1.

x0 shows a point of d/dx (tanh(wx)−x)=0, and x0 can be obtained as follows:

$$x0 = \frac{1}{w} \cosh^{-1} \sqrt{w_o}$$

where an error is obtained in the following expression:

$$\tanh(\cosh^{-1} \sqrt{w}) - \frac{1}{w} \cosh^{-1} \sqrt{w} =$$

$$\tanh(\log(\sqrt{w} + \sqrt{w-1})) - \frac{1}{w} \cosh^{-1} \sqrt{w} =$$

$$\frac{\sqrt{w} + \sqrt{w-1} - \frac{1}{\sqrt{w} + \sqrt{w-1}}}{\sqrt{w} + \sqrt{w-1} - \frac{1}{\sqrt{w} + \sqrt{w-1}}} - \frac{1}{w} \cosh^{-1} \sqrt{w} =$$

$$\sqrt{1 - \frac{1}{w}} - \frac{1}{w} \cosh^{-1} \sqrt{w}$$

Next, an error when X=1 is indicated as 1-tanh(w). The antecedent of these two functions shows a monotonous increase and the consequent shows a monotonous decrease in the range of w>0, w marks the minimum value of an error when a value of w meets the following expression:

$$\sqrt{1 - \frac{1}{w}} - \frac{1}{w} \cosh^{-1} \sqrt{w} = 1 - \tanh(w)$$

An approximation is obtained as w=1.412.

When a membership function in FIG. 16 is f(x), the following expression exists:

$$f(x) = \frac{1}{2} m\left( \frac{2}{b-a} \left( x - \frac{a+b}{2} \right) \right) + \frac{1}{2} \cong$$

$$\frac{1}{2} \tanh\left( \frac{2 \times 1.412}{b-a} x - \frac{(a+b) \times 1.412}{b-a} \right) + \frac{1}{2}$$

The values are obtained using a Sigmoid function, but they can be easily obtained in the following expression:

$$f(x) = \frac{1}{1 + \exp(-wx + \theta)} = 0.5 + 0.5 \tanh$$

$$\left( \frac{w}{2} x - \frac{\theta}{2} \right)$$

As a result, a weight value and a threshold are obtained as follows:

$$\frac{w}{2} = \frac{2 \times 1.412}{b-a}$$

$$\frac{\theta}{2} = \frac{(a+b) \times 1.412}{b-a}$$

Figure 21:
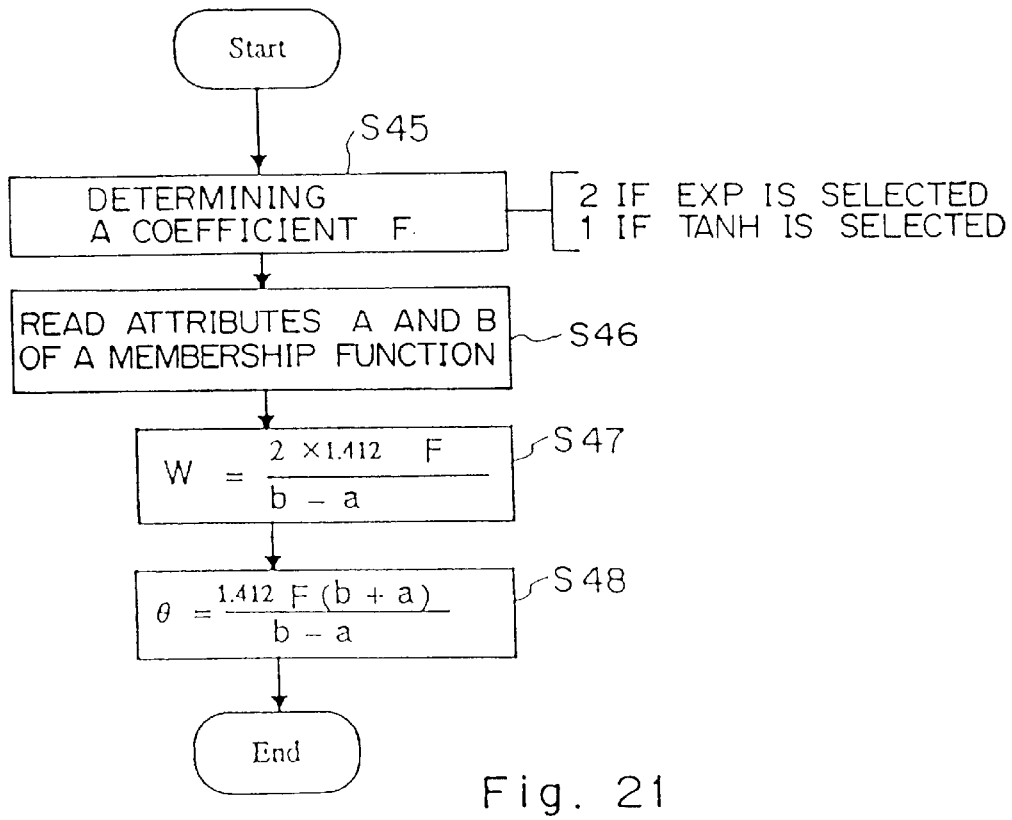
FIG. 21 shows a flowchart of a process for obtaining an approximation for minimizing the maximum error.

FIG. 21 shows a flowchart of a process for obtaining an approximation for minimizing the maximum error. FIG. 21 is the same as FIGS. 17, 19, and 20 except that a weight value and a threshold are obtained after being multiplied by 1.412 in S47 and S48.

Figure 9A:
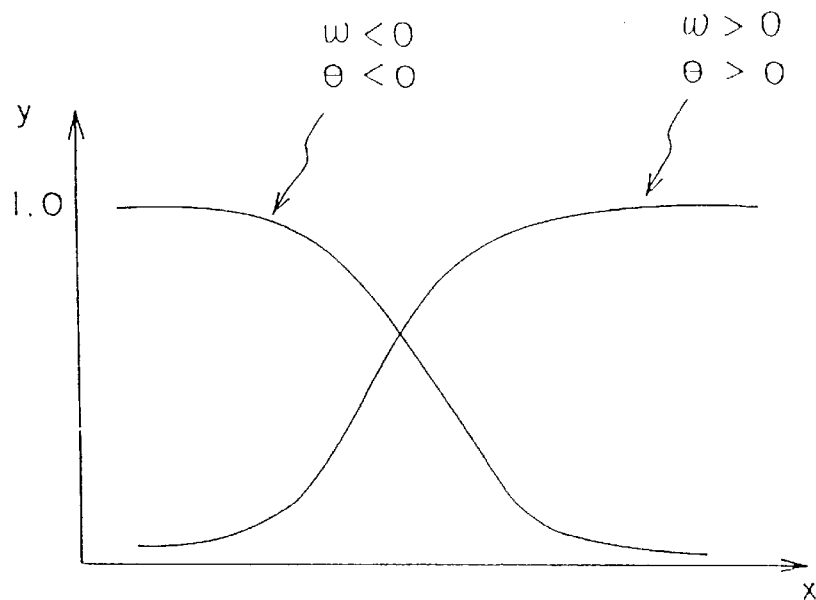
FIGS. 9A and 9B show a view (1) for explaining the capabilities of calculating a grade value of a antecedent membership function.
Figure 9B:
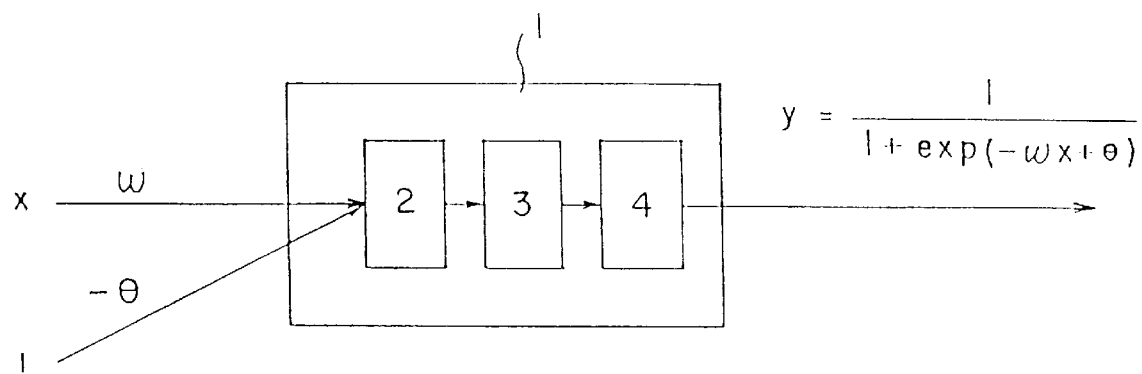

In FIGS. 17, 19, 20, and 21, a membership function shown in FIG. 16 (that is, a membership function indicating "Y is large" as shown in FIG. 9A) is referred to. However, if an approximation of a form of a membership function indicating "Y is small" is obtained, the approximation can be obtained by multiplying a weight value w and a threshold by −1, respectively. Unless higher precision is required in the multiplication by 1.3401 in S37 and S38, the number of significant digits can be reduced.

Figure 22:
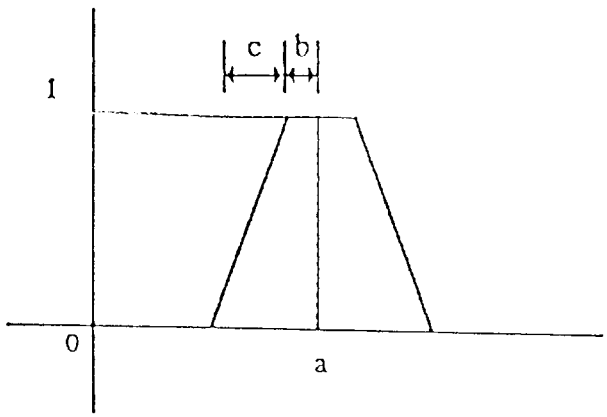
FIG. 22 shows the second example of an approximation of a membership function.

Next, a method for obtaining an approximation of a membership function without learning is described where the form of the membership function indicates "Y is moderate" as shown in FIG. 10. FIG. 22 shows a form of a membership function to be approximated. The membership function takes a symmetrical form relative to X=a. First, an approximation is obtained for determining the upper limit of the sensitivity.

Figure 23:
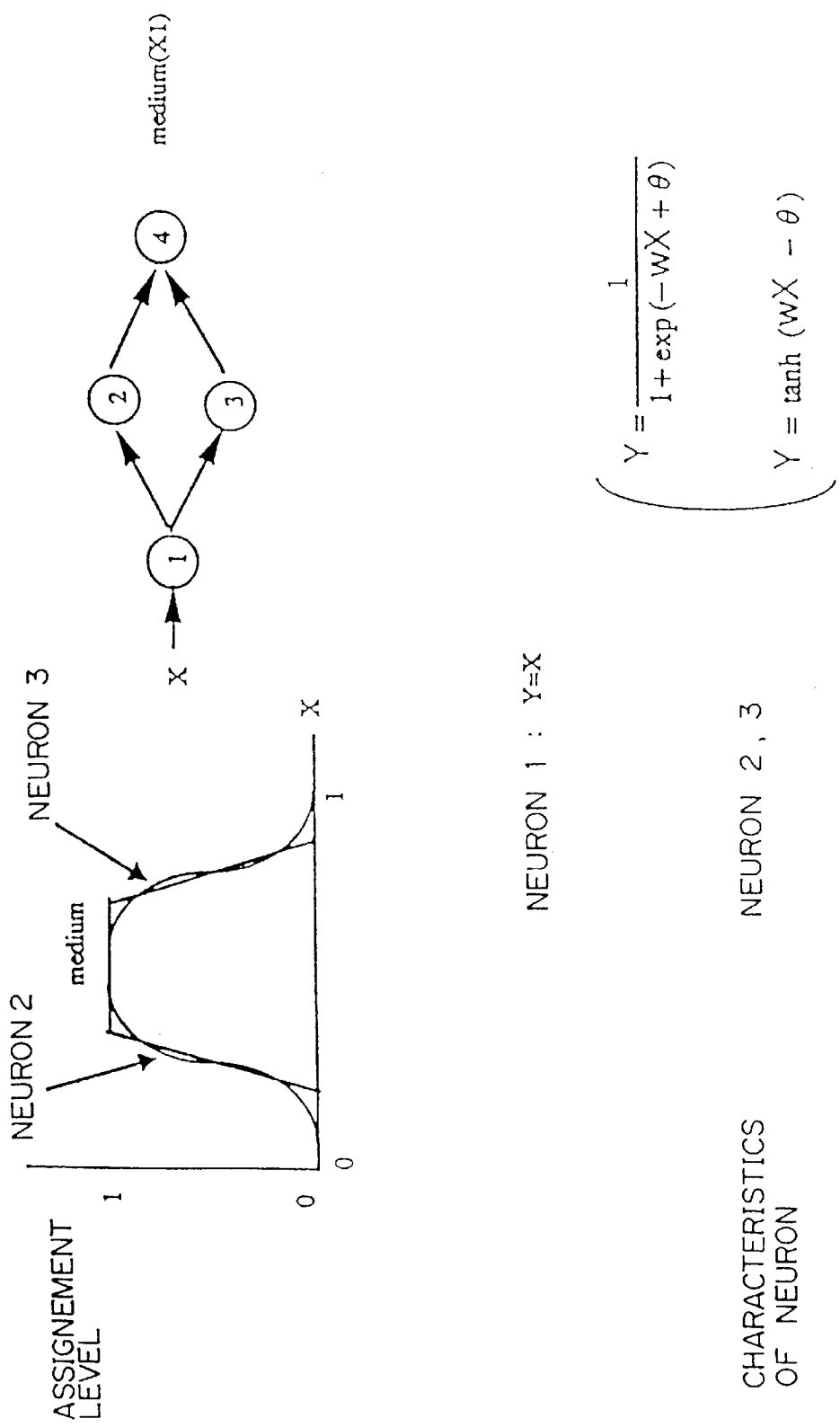
FIG. 23 shows a three-layer network for realizing an approximation of a membership function shown in FIG. 22.

FIG. 23 shows an explanatory view of a three-layer neural network for realizing the above described approximation. In FIG. 23, the first layer comprises a piece of a neuron which outputs an input value as is. The second layer comprises two pieces of neurons which have a non-linear characteristic and its weight value and threshold are determined in a flowchart described later. The third layer comprises a piece of a neuron for outputting a result after subtracting one (1) from the sum of the output by two neurons in the second layer.

Then, a weight value and a threshold of the neurons of the second layer is determined as follows:

If a Sigmoid function of a neuron is obtained in the following expression:

$$f(w) = \frac{1}{1 + \exp(-wx + \theta)}$$

Then following expression is derived:

$$f'(x) = \frac{w\exp(-wx + \theta)}{(1 + \exp(-wx + \theta))^2}$$

When w is positive, the Sigmoid function $$x = \frac{\theta}{w}$$

results in the maximum oblique which is expressed as follows:

$$f\left(\frac{\theta}{w}\right) = \frac{w\exp(0)}{(1 + \exp(0))^2} = \frac{w}{4}$$

This oblique is assumed to equal the oblique 1/c at the middle point $$\frac{(a - b - c) + (a - b)}{2}$$

of the upward-slope of the membership function as follows:

$$\frac{\theta}{w} = \frac{(a - b - c) + (a - b)}{2}, \frac{w}{4} = \frac{1}{c}$$

Thus, the following values are obtained:

$$w = \frac{4}{c}, \theta = \frac{2a - 2b - c}{c}$$

These are the weight value and the threshold of the first neuron of the second layer.

Likewise, the weight value and the threshold of the second neuron can be obtained as follows:

$$\frac{\theta}{w} = \frac{(a + b + c) + (a + b)}{2}, \frac{w}{4} = -\frac{1}{c}$$

Thus, the following values are obtained:

$$w = -\frac{4}{c}, \theta = \frac{2a + 2b + c}{2}$$

These values can be obtained using a tanh function, but the following expression should be used to obtain the values easily:

$$f(x) = 0.5 + 0.5\tanh(wx - \theta) = \frac{1}{1 + \exp(-2wx + 2\theta)}$$

Thus, obtained are:

$$2w = \frac{4}{c}, 2\theta = \frac{2a - 2b - c}{c}$$

and $$2w = -\frac{4}{c}, 2\theta = \frac{2a + 2b + 2c}{c}$$

Figure 24:
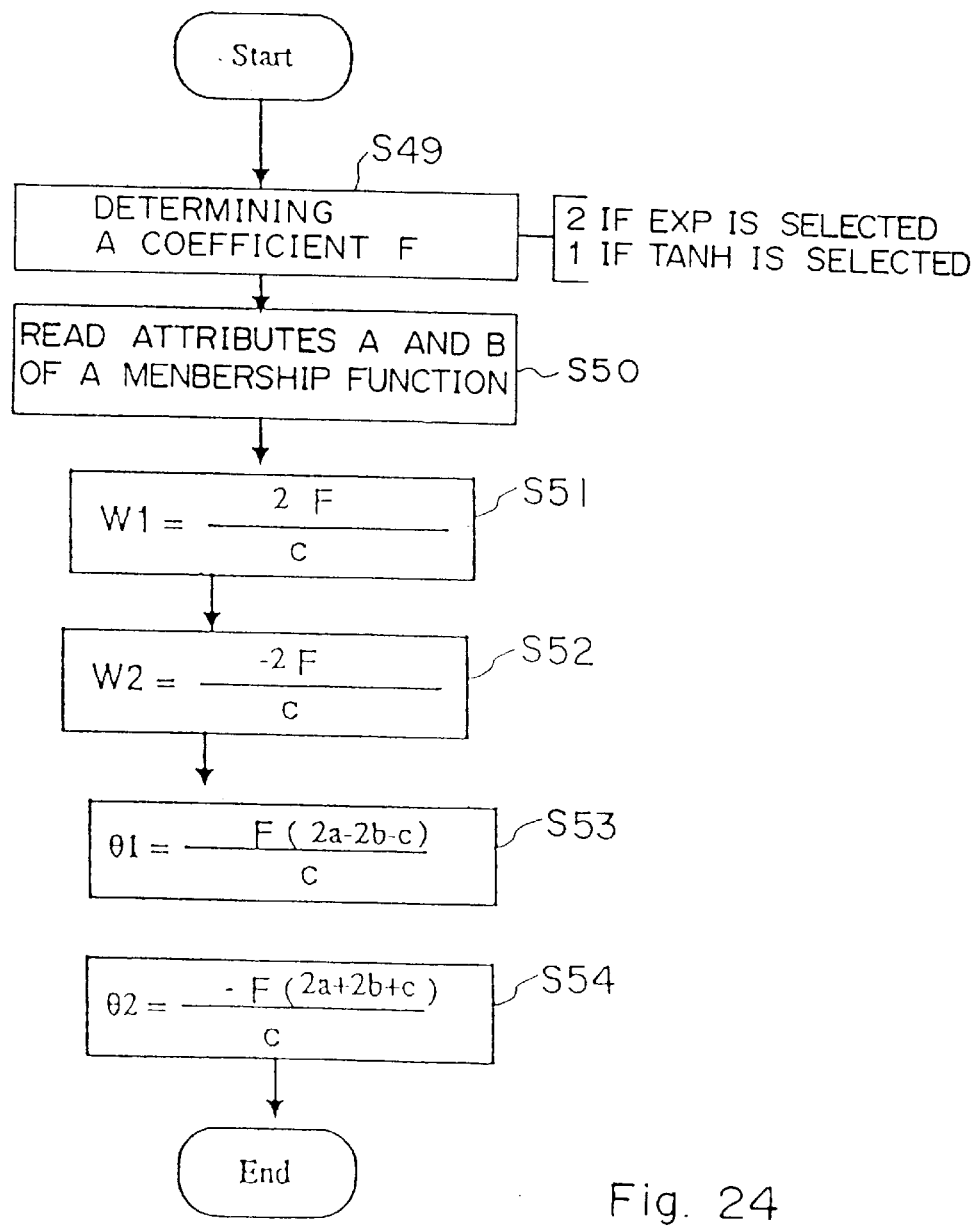
FIG. 24 shows a flowchart of a process for determining a weight value and a threshold of an approximation used to determine the upper limit of the sensitivity.

FIG. 24 shows a flowchart for determining a weight value and a threshold of the second layer for determining the upper limit of the sensitivity. In FIG. 24, after performing the same process in S49 and S50 as that in S30 and S31 shown in FIG. 17, a weight value for the two units in the second layer is obtained in S51 and S52, and a threshold in S53 and S54, thus terminating the process.

Next, an approximation for minimizing the maximum error of a membership function formed as shown in FIG. 22 is obtained. An approximation for minimizing the maximum error can be realized in the same three-layer neural network as that shown in FIG. 23. As in the case of the approximation for determining the upper limit of the sensitivity, a weight value and a threshold of two neurons of the second layer are determined, and the approximation is described as follows:

First, an approximation for the following function is to be obtained using tanh(wx):

$$m(x) = \begin{cases} -1: x < -1 \\ x: -1 < x \& x < 1 \\ 1: 1 < x \end{cases}$$

If the coordinate of x of the intersection of the two functions in the first quadrant as shown in FIG. 18 is assumed to be "s", s equals tanh(ws), that is:

$$w = \frac{\tanh^{-1} s}{s} = \frac{1}{2s} \log\left(\frac{1 + s}{1 - s}\right)$$

An error marks the maximum value at either of the points x0 (0<x0<s) or 1.

x0 is a point which satisfies the expression $$\frac{d}{dx}(\tanh(wx) - x) = 0,$$

therefore:

$$x0 = \frac{1}{w} \cosh^{-1}\sqrt{w_o}$$

where an error is obtained as follows:

$$\tanh(\cosh^{-1}\sqrt{w}) - \frac{1}{w}\cosh^{-1}\sqrt{w} =$$

$$\tanh(\log(\sqrt{w} + \sqrt{w-1})) - \frac{1}{w}\cosh^{-1}\sqrt{w} =$$

$$\frac{\sqrt{w} + \sqrt{w-1} - \frac{1}{\sqrt{w} + \sqrt{w-1}}}{\sqrt{w} + \sqrt{w-1} - \frac{1}{\sqrt{w} + \sqrt{w-1}}} - \frac{1}{w}\cosh^{-1}\sqrt{w} =$$

$$\sqrt{1 - \frac{1}{w}} - \frac{1}{w}\cosh^{-1}\sqrt{w}$$

Next, an error when X=1 is 1-tanh(w). In these two functions, when x>0, the antecedent indicates a monotonous increase, while the consequent indicates a monotonous decrease. A value of w for minimizing an error can be obtained as follows:

$$1 - \frac{1}{w} - \frac{1}{w}\cosh^{-1}\overline{w} = 1 - \tanh(w)$$

An approximation indicates W=1.412

If an upwardslope of the membership function shown in FIG. 22 is assumed to be f(x), the following expression exists:

$$f(x) = \frac{1}{2} m \left( \frac{2}{(a-b)-(a-b-c)} \left( x - \frac{(a-b-c)+(a-b)}{2} \right) \right)$$

$$+ \frac{1}{2} = \frac{1}{2} m \left( \frac{2}{c} \left( x - \frac{2a-2b-c}{2} \right) \right) + \frac{1}{2} =$$

$$\frac{1}{2} m \left( \frac{2}{c} x - \frac{2a-2b-c}{c} \right) + \frac{1}{2} =$$

$$\frac{1}{2} \tanh\left( \frac{2 \times 1.412}{c} x - \frac{(2a-2b-c) \times 1.412}{c} \right) + \frac{1}{2}$$

Likewise, the following expression exists for the downwardslope:

$$f(x) = \frac{1}{2} m \left( \frac{-2}{(a+b+c)-(a+b)} \left( x - \frac{(a+b)+(a+b+c)}{2} \right) \right) +$$

$$\frac{1}{2} = \frac{1}{2} m \left( \frac{-2}{c} \left( x - \frac{2a+2b+c}{2} \right) \right) + \frac{1}{2} =$$

$$\frac{1}{2} m \left( -\frac{2}{c} x - \frac{-(2a+2b+c)}{c} \right) + \frac{1}{2} =$$

$$\frac{1}{2} \tanh\left( -\frac{2 \times 1.412}{c} x - \frac{-(2a+2b+c) \times 1.412}{c} \right) + \frac{1}{2}$$

Then, a weight value and a threshold for a tanh function can be obtained.

These values can be obtained using a Sigmoid function, but they are easily obtained in the following expression:

$$f(x) = \frac{1}{1 + \exp(-wx + \theta)} = 0.5 + 0.5\tanh\left(\frac{w}{2}x - \frac{\theta}{2}\right)$$

Thus, obtained are:

$$\frac{w}{2} = \frac{2 \times 1.412}{c}$$

$$\frac{\theta}{2} = \frac{(2a-2b-c) \times 1.412}{c}$$

and $$\frac{w}{2} = \frac{2 \times 1.412}{c} \quad \frac{\theta}{2} = \frac{-(2a+2b+c) \times 1.412}{c}$$

Figure 25:
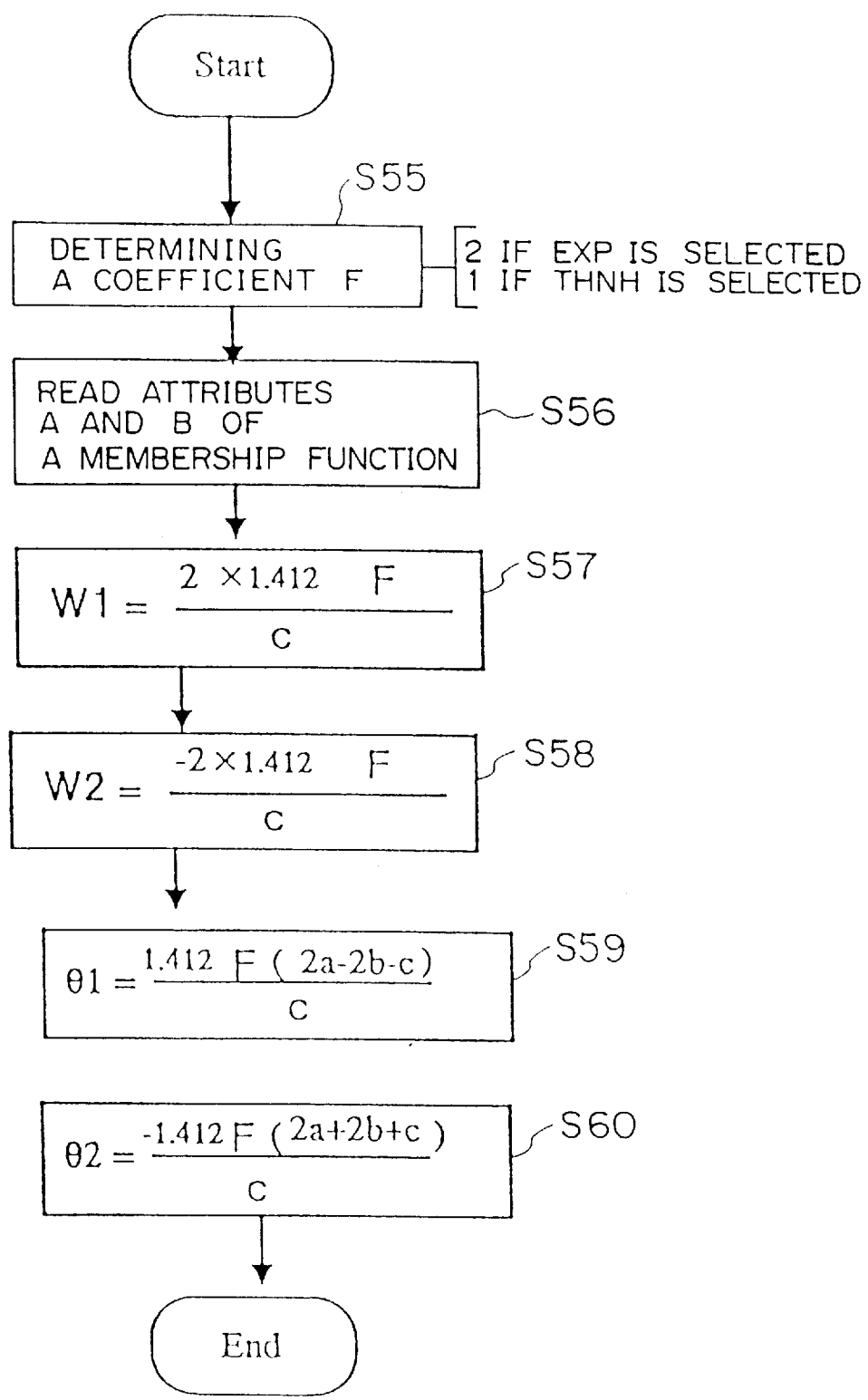
FIG. 25 shows a flowchart of a process which determines a weight value and a threshold of an approximate value for minimizing the maximum error.

FIG. 25 shows a flowchart for determining a weight value and a threshold of two units of the second layer for obtaining an approximation for minimizing the maximum error. FIG. 25 is different from FIG. 24 (used for determining the upper limit of the sensitivity) in that a weight value and a threshold are multiplied by 1.412 respectively when processed in S57 and S60. Unless higher precision is required in the multiplication, the number of significant digits in 1.412 can be reduced.

As described in FIG. 11, a consequent membership function can be realized as described in association with FIG. 5 such that a weight value of input connection for linear units 25*a*–25*n* on the consequent membership function realizer 18*a* is set as a grade value of a consequent membership function at each abscissa after dividing the form of the membership function into multiple segments. The connection between Sigmoid function units 23*a*–23*e* in the rule part 17 and the linear units 24*a* and 24*b* is determined by a fuzzy rule.

Figure 26:
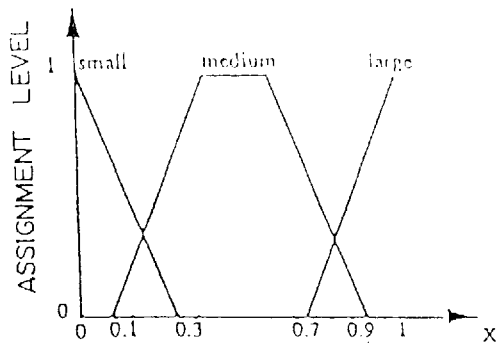
FIG. 26 shows an example of a special fuzzy rule.

However, if a fuzzy rule is unique, only a part of the connection exists, while the other parts do not. That is, a weight value is determined as zero. FIG. 26 shows such a type of fuzzy rule. In FIG. 26, a form of a antecedent membership function is predetermined as shown in the figure. However, a consequent membership function is not provided as being formed, but rather specified as a value of the output Z.

Figure 27:
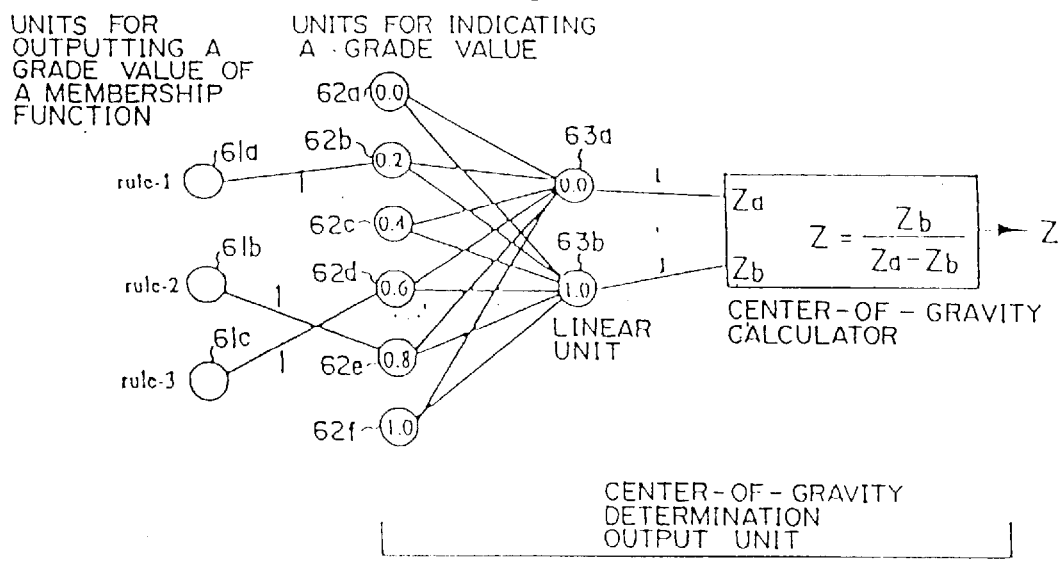
FIG. 27 shows an embodiment of a hierarchical network following the rule part corresponding to the fuzzy rule shown in FIG. 26.

FIG. 27 shows an embodiment of a rule part and the following parts in a hierarchical network corresponding to the fuzzy rule shown in FIG. 26. In FIG. 27, those units corresponding to the output units 24*a* and 24*b* do not exist. For example, a unit 61*a* corresponding to the unit 23*a* is connected to a unit 62*b* for outputting a grade value at the point of the coordinate=0.2 of the consequent membership function corresponding to the unit 25*b* shown in FIG. 5, and its value is determined as 1. Likewise, according to rule 2, the weight value of the connection between a unit 61*b* and a unit 62*e* for outputting a grade value of a consequent membership function at the abscissa of 0.8 is determined as 1. According to rule 3, the weight value of the connection between a unit 61*c* and a unit 62*d* for outputting a grade value of a consequent membership function at the abscissa of 0.6 id determined as 1.

In FIG. 27, only one input is applied to each of neurons 62*a*–62*f* of the second layer, but more than two inputs can be reasonably applied. In this case, if the units 62*a*–62*f* are linear units, they output an algebraic sum of the grade value output of multiple rules. If the units 62*a*–62*f* output the maximum value of input, they output a logical sum of the grade values of multiple of rules.

Figure 28:
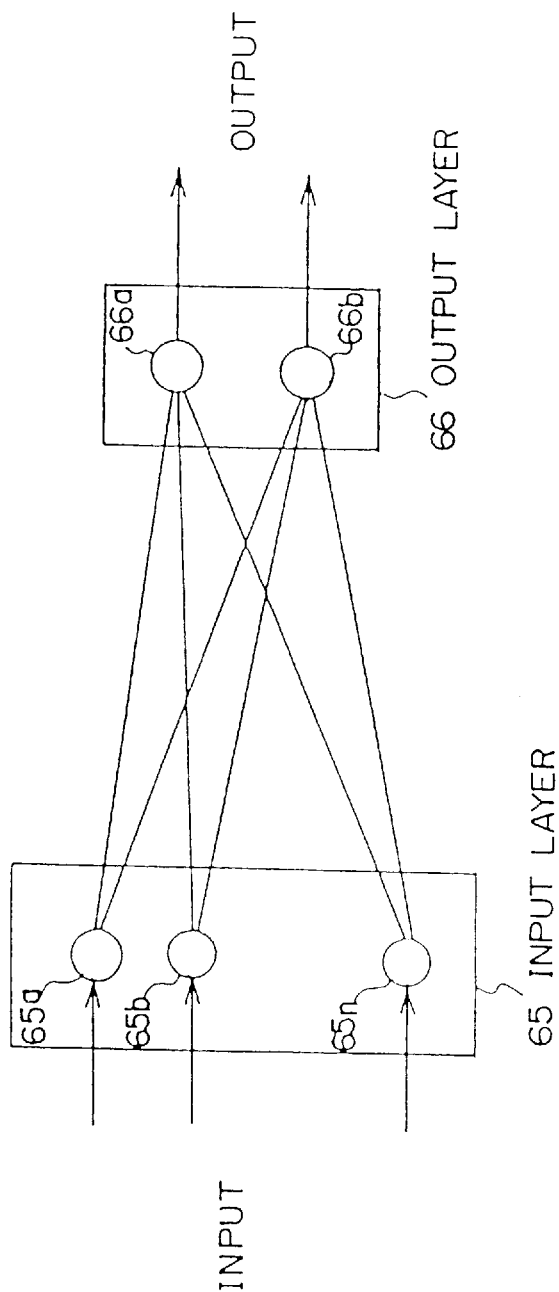
FIG. 28 shows a basic configuration of a center-of-gravity determining element output unit.

Next, a center-of-gravity determining element output unit 26 in the center-of-gravity calculation realizer 18b shown in FIG. 5 is described. FIG. 28 shows a basic configuration of a center-of-gravity determining element output unit. In FIG. 5, an input unit in the center-of-gravity determining element output unit is skipped. However, in FIG. 28, they are shown as units 65a–65n. Units 66a and 66b of the output layer correspond to the units 26a and 26b shown in FIGS. 5 , and output two center-of-gravity determining elements required for the center-of-gravity calculation by the center-of-gravity calculator 27.

The units 65a–65n of the input layer shown in FIG. 28 are connected one-to-one to the linear units 25a–25n of the consequent membership function realizer shown in FIG. 5, thus outputting grade values as a result of enlargement or reduction of a consequent membership function at an abscissa of each of segments of the consequent membership function. A unit of an input layer 65 and a unit of an output layer 66 are completely connected. Using the weight value of the connection determined by an expression described later and the output of the units 65a–65n of the input layer, two center-of-gravity determining elements are outputted by the units 66a and 66b.

Figure 29:
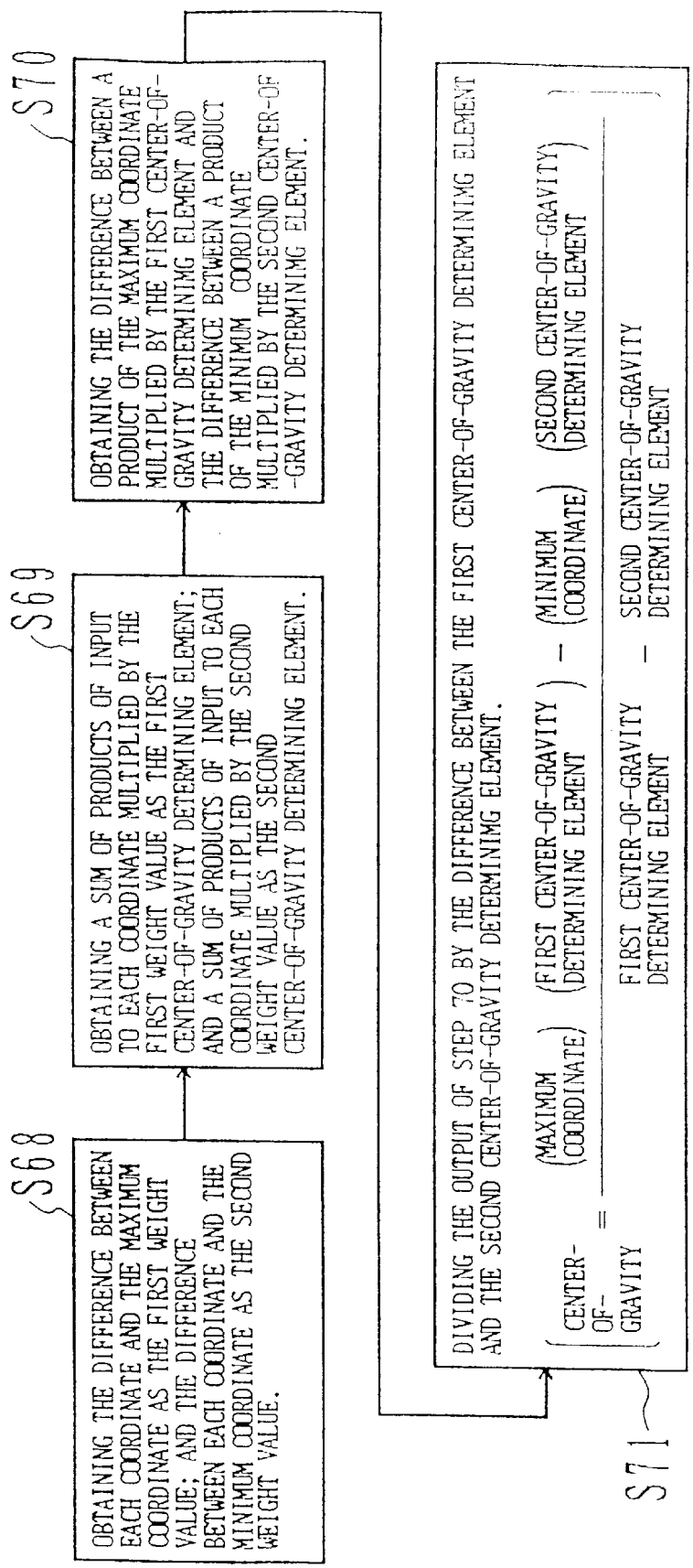
FIG. 29 shows a flowchart for calculating center-of-gravity.

FIG. 29 shows a flowchart of a center-of-gravity calculation method in the center-of-gravity calculation realizer 18b.

In FIG. 29, the first weight value is obtained as the difference between each coordinate and the maximum value of coordinates; the second weight value is obtained as the difference between each coordinate and the minimum value of coordinates.

Next, the first center-of-gravity determining element is obtained in S69 as a sum of the products input to each coordinate and the first weight value, while the second center-of-gravity determining element is obtained as a sum of the products input to each coordinate and the second weight value.

Then, a final center-of-gravity calculation is performed by the center-of-gravity calculator 27 shown in FIG. 5. First, in S70, the difference is obtained between the product of the maximum coordinate and the first center-of-gravity determining element and the product of the minimum coordinate and the second center-of-gravity determining element. In S71, a center-of-gravity is obtained finally by dividing the output of S70 by the difference between the first center-of-gravity determining element and the second center-of-gravity determining element.

Figure 30:
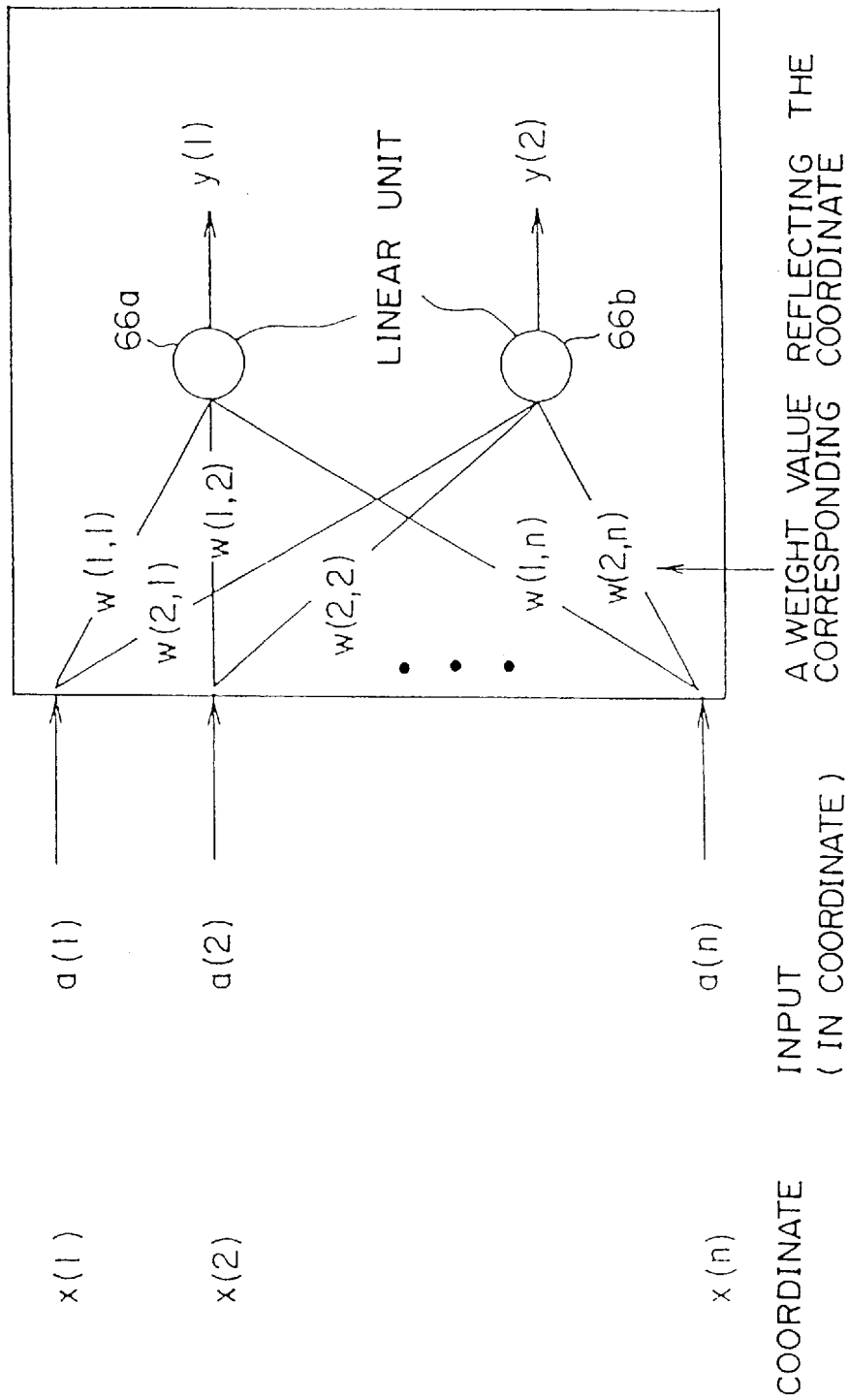
FIG. 30 shows an embodiment of a center-of-gravity determining element output unit

FIG. 30 shows a view for explaining how to determine a weight value of the connection between the input layer and the output layer shown in FIG. 28. In FIG. 30, the units 65a–65n of the input layer are skipped for simplification. The units 66a and 66b are linear units for obtaining an input sum only, then outputting two center-of-gravity determining elements y(1) and y(2).

In FIG. 30, a weight value of the connection between a unit of the input layer (not shown in FIG. 30) and the linear units 66a and 66b can be obtained as follows with the minimum value of coordinates assumed to be x(1), the maximum value x(n), and any coordinate x(i):

$$w(1,i) = x(i) - x(1) \biggr\} \quad (14)$$
$$w(2,i) = x(i) - x(n)$$

Otherwise, "c" is assumed to be a constant to obtain a weight value as follows:

$$w(1,i) = c\{x(i) - x(1)\} \biggr\} \quad (15)$$
$$w(2,i) = c\{x(i) - x(n)\}$$

In FIG. 30, a weight value is obtained as follows using center-of-gravity determining elements y(1) and y(2) outputted by two linear units 66a and 66b:

$$x(c) = \frac{x(n) \cdot y(1) - x(1)y(2)}{y(1) - y(2)} \quad (16)$$

In expression (16), assuming $x(1)=0$, $x(n)=1$, $y(1)=Z_a$, and $y(2)=Z_b$, the expression $Z=Z_a/(Z_a-Z_b)$ in a block of the center-of-gravity calculator 27 shown in FIG. 5 can be obtained.

FIG. 31 shows the first embodiment of the output of a center-of-gravity determining element. FIG. 31A shows each coordinate and a weight value of each connection calculated using a coordinate, and FIG. 31B shows an example of an input value and a responsive output value of a center-of-gravity determining element. When a center-of-gravity is calculated using expression (16), the value equals 1.

Figures 32A, 32B:
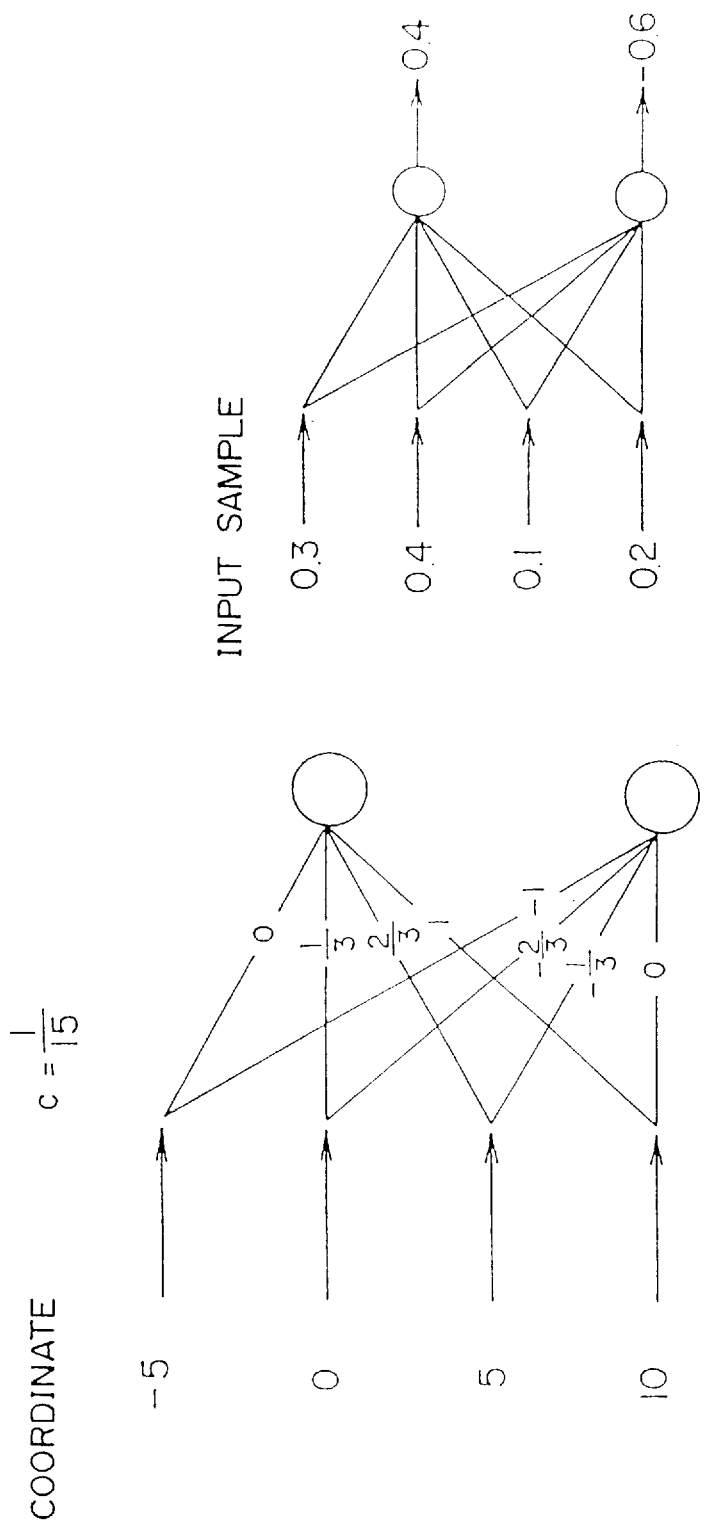
FIGS. 32A and 32B show the second embodiment of the output of a center-of-gravity determining element.

FIG. 32 shows the second embodiment of the output of a center-of-gravity determining element. FIG. 32 shows an example where a constant c is assumed to be $1/15$ in expression (15). FIG. 32A shows each coordinate and weight value of each connection, and FIG. 32B shows each input value and output values of a center-of-gravity determining element. Using expression (16), a center-of-gravity value equals 1.

FIG. 33 shows a basic configuration of a teaching signal determiner for providing a signal for a center-of-gravity determining element output unit. FIG. 33 shows a basic configuration of a teaching signal determiner for providing a signal for a center-of-gravity determining element output unit in a neural network which outputs two center-of-gravity determining elements required for a center-of-gravity calculation in the final presuming process of a fuzzy neuro integrated system. FIG. 33A shows a basic configuration of the first embodiment described later. A center-of-gravity determining element output unit 75 outputs two center-of-gravity determining elements required for calculating a center-of-gravity using a plurality of coordinates on a number line as described above and input values in response to this plurality of coordinates.

An endpoint coordinate and oblique storage 76 stores two endpoint coordinates (maximum and minimum) in a plurality of coordinates and oblique of a line intersecting a center-of-gravity. A teaching signal calculator 77 obtains a teaching signal to be provided for two center-of-gravity determining elements (for calculating a center-of-gravity using a true center-of-gravity value inputted during learning) in a neural network corresponding to the center-of-gravity determining element output unit 75, and, using endpoint coordinates and oblique of a line intersecting a center-of-gravity stored in the endpoint coordinate and oblique storage 76, outputs the signal to the center-of-gravity determining element output unit 75. In this calculation, a teaching signal is determined by an expression representing a line which intersects an inputted true center-of-gravity and has the oblique stored in the endpoint coordinate and oblique storage 76.

FIG. 33B shows a basic configuration of the second embodiment described later. In FIG. 33B, the operation of the center-of-gravity determining element output unit 75 is the same as that shown in FIG. 33A. An endpoint coordinate storage 78 stores two endpoint coordinates (maximum and minimum) coordinates in a plurality of coordinates. A teaching signal calculator 79 obtains and outputs a teaching signal for two center-of-gravity determining elements using a true center-of-gravity value inputted during learning of a neural network corresponding to the center-of-gravity determining element output unit 75, two center-of-gravity determining element values outputted by the center-of-gravity determining element output unit 75, and two endpoint coordinates stored in the endpoint coordinate storage 78. In the calculation, the teaching signal is determined by an expression of a line which has the same oblique as that of a line determined by output values of two center-of-gravity determining elements and intersects a true center-of-gravity.

The above described center-of-gravity determining elements are assigned an opposite sign to each other because signs of weight values are opposite to each other in the calculation process. Therefore, one is positive while the other is negative. When these two center-of-gravity determining element values are assumed to be vectors in the vertical direction to a coordinate axis, a positive sign generates a downward vector and a negative sign indicates an upward vector. A vector corresponding to the first center-of-gravity determining element is set at the minimum coordinate in a plurality of coordinates, that is, the point $x(1)$ vector, while a vector corresponding to the second center-of-gravity determining element is set at the maximum coordinate in a plurality of coordinates, that is, the point $x(n)$. Then, an intersection of the line connecting the ends of these vectors and the x axis is defined as a center-of-gravity.

In FIG. 33A, a grade and sign of a vector are obtained at two endpoint coordinates using an expression of a line which intersects a true center-of-gravity inputted during learning of a neural network forming the center-of-gravity determining element output unit 75 and has the oblique stored in the endpoint coordinate and oblique storage 76. These values are provided for the center-of-gravity determining element output unit 75 as a teaching signal for two center-of-gravity determining elements.

In FIG. 33B, a grade and sign of a vector are obtained at two endpoint coordinates using an expression of a line which has the same oblique as that of a line connecting the ends of two vectors corresponding to two center-of-gravity determining elements outputted by the center-of-gravity determining element output unit 75 and intersects a true center-of-gravity. These values are provided for the center-of-gravity determining element output unit as a teaching signal.

Figure 34:
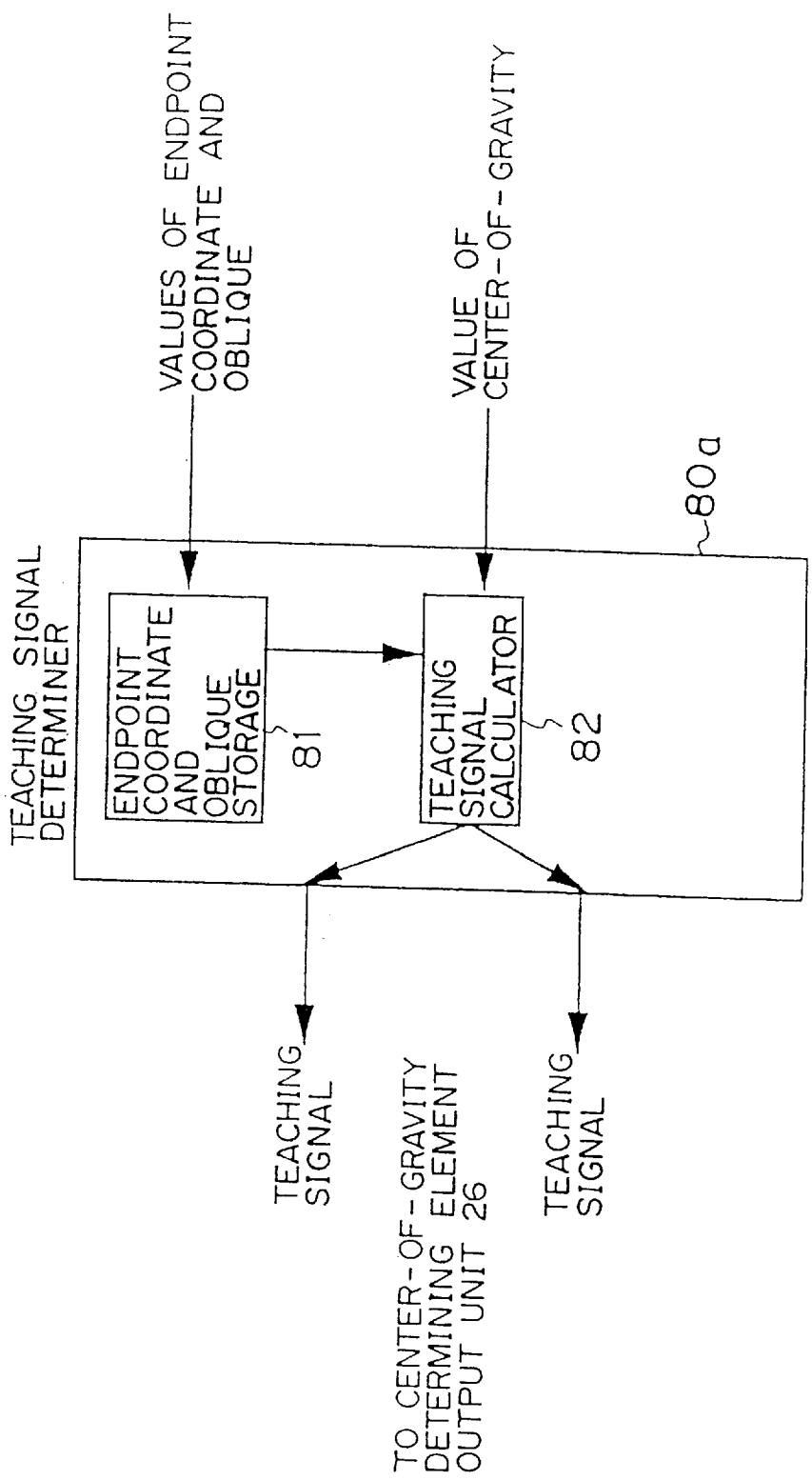
FIG. 34 shows a configuration of the first embodiment of a teaching signal determiner.
Figure 35:
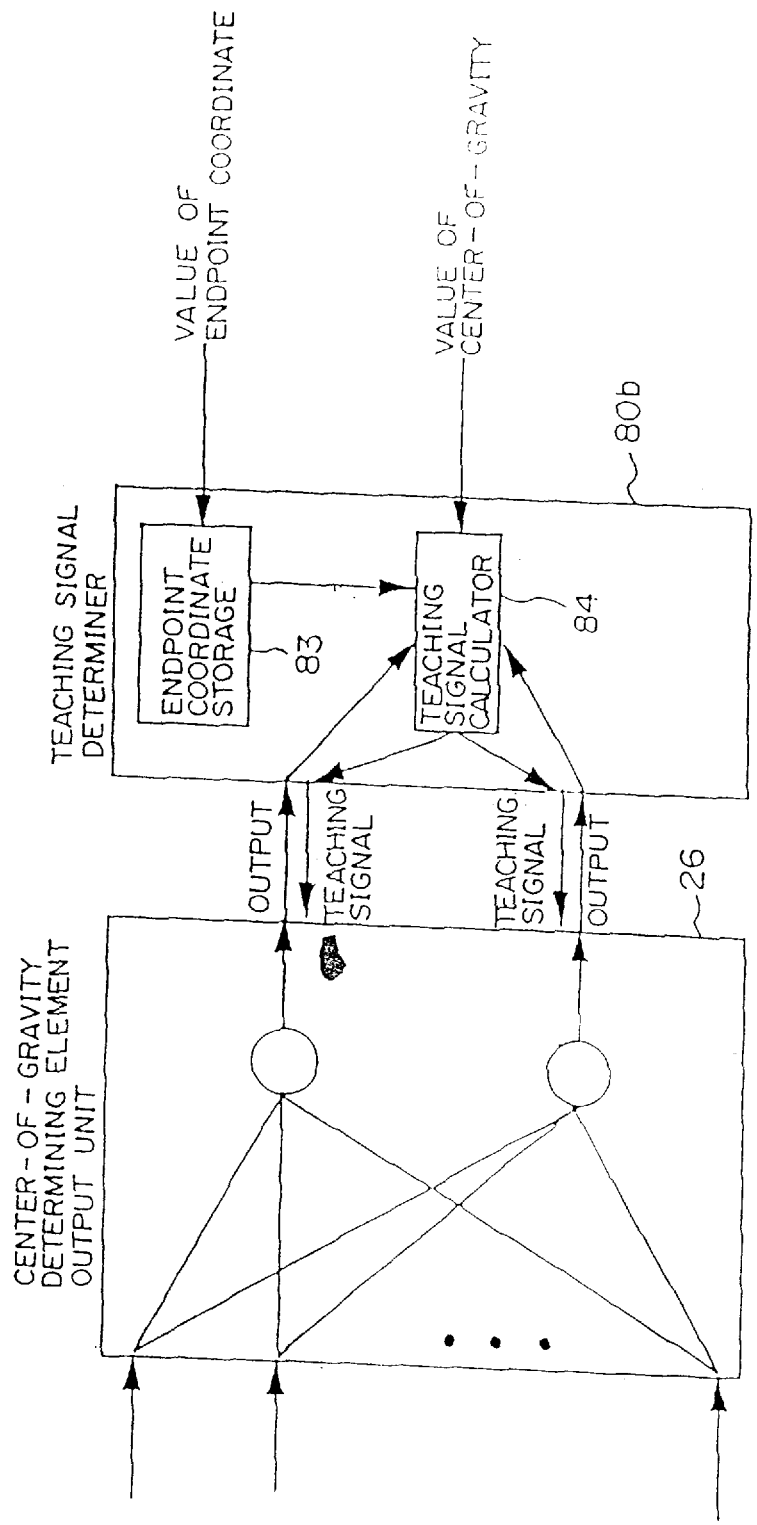
FIG. 35 shows a configuration of the second embodiment of a teaching signal determiner.

FIGS. 34 and 35 show a configuration of an embodiment of a teaching signal determiner. FIG. 34 corresponds to FIG. 33A, while FIG. 35 corresponds to FIG. 33B. In these figures, the center-of-gravity determining element output unit 26 shows an embodiment shown in FIG. 30. In FIG. 34, a teaching signal determiner 80a comprises an endpoint coordinate and oblique storage 81 for storing an oblique value of a line intersecting endpoint coordinates and a center-of-gravity and a teaching signal calculator 82 for outputting a teaching signal using a center-of-gravity value inputted during learning of a neural network forming the center-of-gravity determining element output unit 26 and using a value stored in the endpoint coordinate and oblique storage 81.

In FIG. 35, a teaching signal determiner 80b comprises an endpoint coordinate storage 83 for storing endpoint coordinate values and a teaching signal calculator 84 for calculating a teaching signal using output values of two center-of-gravity determining elements, a true center-of-gravity value, and endpoint coordinate values stored in the endpoint coordinate storage 83, then provides the value for the center-of-gravity determining element output unit 26.

Figure 36A:
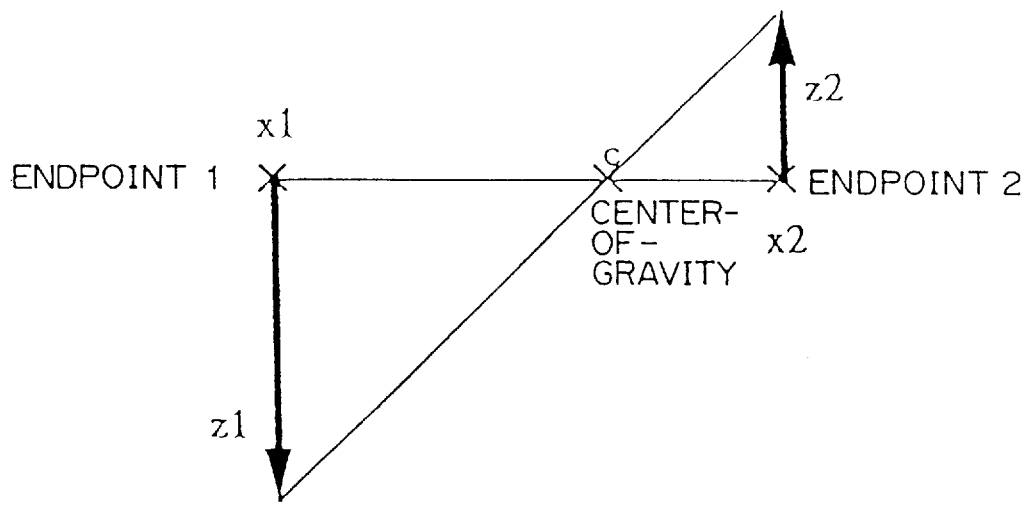
FIGS. 36A and 36B show an embodiment of expressions performed by a teaching signal calculator.
Figure 36B:
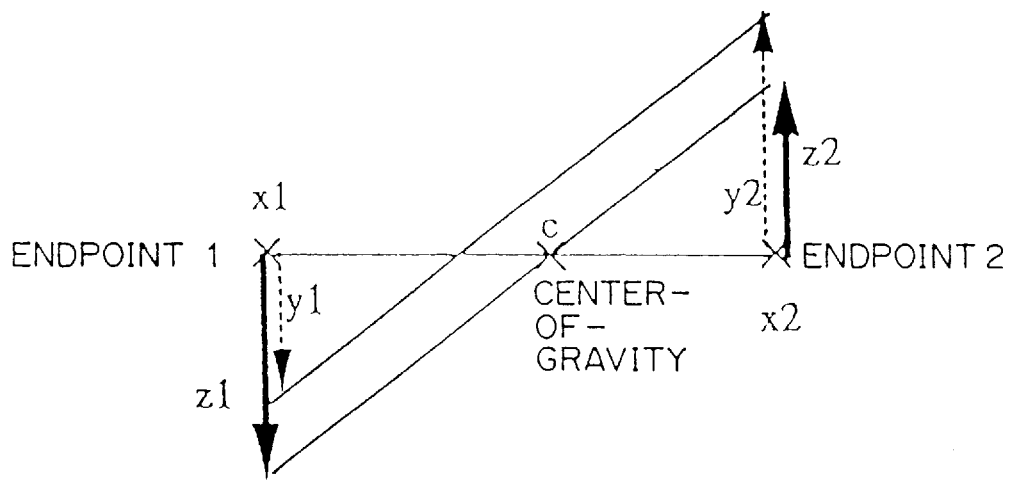

FIG. 36 shows embodiments of calculation methods used in the teaching signal calculator. FIG. 36A shows a method used for the first embodiment; FIG. 36B shows a method used for the second embodiment. In FIG. 36A, assuming that the oblique of a line intersecting a center-of-gravity C is "a", a value of a teaching signal at the minimum coordinate in a plurality of coordinates (that is, at $x_1$, is $z_1$) and a value of a teaching signal at the maximum coordinate (that is, at $x_2$, is $z_2$), then teaching signals are obtained as follows:

$$z_1 = a(c - x_1) \atop z_2' = a(c - x_2)} \quad (17)$$

In FIG. 36B, assuming that the minimum coordinate, that is, the first center-of-gravity determining element as output of the center-of-gravity determining element output unit at $x_1$, is $y_1$ (and a value of a teaching signal is $z_1$) and the maximum coordinate, that is, the second center-of-gravity determining element as output of the center-of-gravity determining element output unit at $x_2$, is $y_2$ (and a value of a teaching signal is $z_2$) then values of teaching signals are given as follows:

$$z_1 = \{(y_2 - y_1)/(x_2 - x_1)\}(c - x_1) \atop z_2 = \{(y_2 - y_1)/(x_2 - x_1)\}(c - x_2)} \quad (18)$$

Figure 37A:
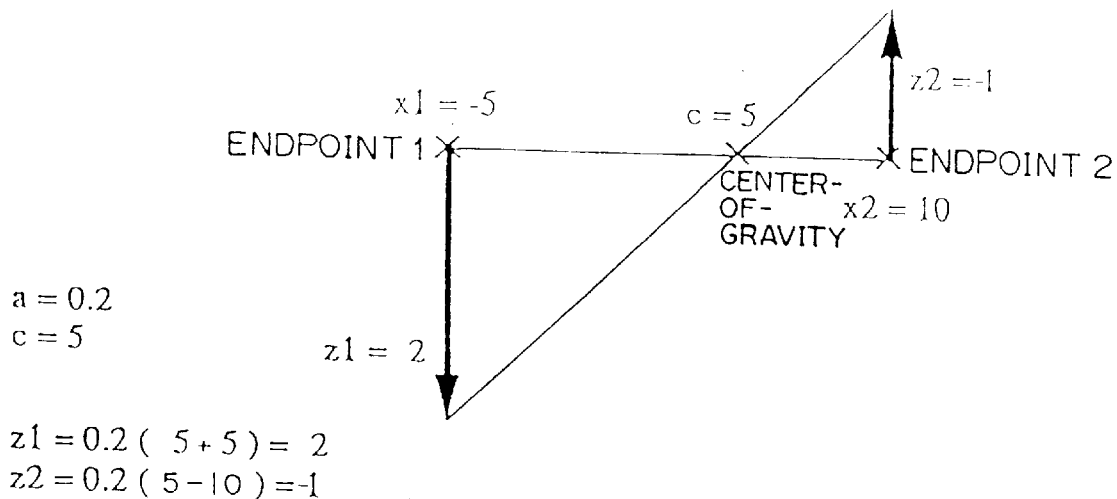
FIGS. 37A and 37B show an embodiment of the output of a teaching signal.

FIG. 37 shows output examples of teaching signals. In FIG. 37A, when endpoint coordinates $-5$, $10$ and the oblique $0.2$ of a line are stored in the endpoint coordinate and oblique storage 81 shown in FIG. 34 and a coordinate 5 of a true center-of-gravity is inputted to the teaching signal calculator 82, two teaching signal values are determined as $z_1=2$ and $z_2=-1$.

Figure 37B:
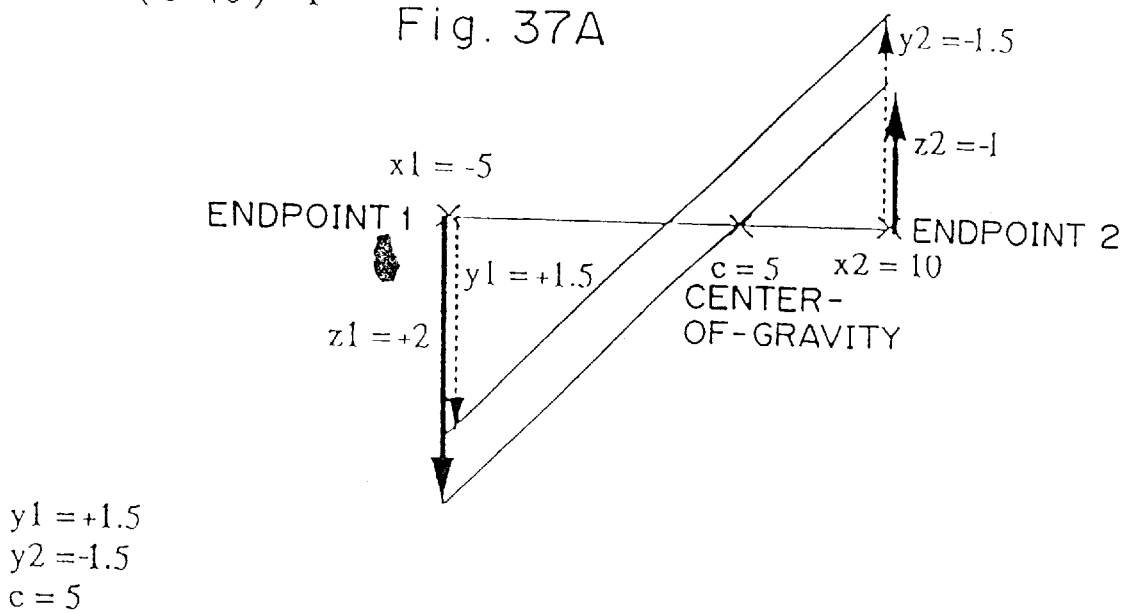

FIG. 37B, when endpoint coordinates $-5$ and $10$ are stored in the endpoint coordinate storage 83 shown in FIG. 35 and output $y_1=-1.5$ and $y_2=1.5$ of the center-of-gravity determining element output unit 26, and a true center-of-gravity coordinate 5 are inputted to the teaching signal calculator 84, two teaching signal values are determined as $Z_1=+2$ and $z_2=-1$.

In the above description, the calculation of obtaining a center-of-gravity value performed at the final step of fuzzy presumption is conducted by the center-of-gravity calculator 27 using two center-of-gravity determining elements as the final output of a hierarchical neural network as shown in FIGS. 5 and 7. However, the whole center-of-gravity calculation realizer 18b can be configured as a neural network. In this case, the whole center-of-gravity calculation realizer is a neural network including the division by the center-of-gravity calculator 27, and a center-of-gravity value is outputted from an output unit. Then, a hierarchical network is learned in the back propagation method, for example, such that a correct center-of-gravity value can be obtained by the hierarchical neural network.

Figure 38:
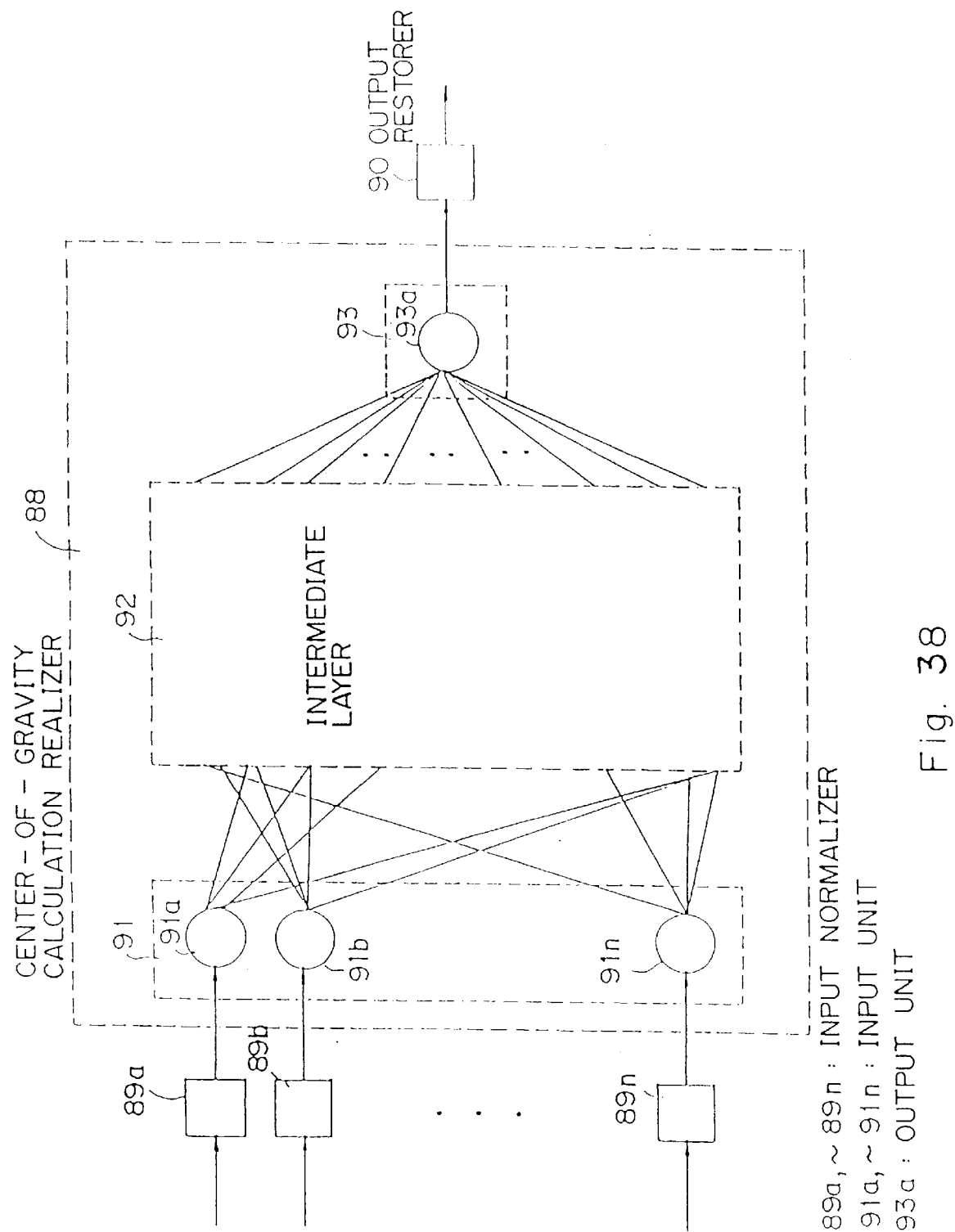
FIG. 38 shows an embodiment of a hierarchical neural network as a center-of-gravity calculation realizer.

FIG. 38 shows an embodiment of a hierarchical neural network as a center-of-gravity calculation realizer. In FIG. 38, a center-of-gravity calculation realizer 88 comprises an input layer 91, one or multiple intermediate layers 92, and an output layer 93, where the input layer comprises units 91a–91n for receiving values from the linear units 25a–25n of the consequent membership function realizer shown in FIG. 5, and the output layer 93 comprises only one unit 93a.

In FIG. 38, input normalizers 89a–89n correspond to each of the input units 91a–91n prior to the center-of-gravity calculation realizer 88 and are provided to make the operation of the input units 91a–91n sensitive by linearly converting the output of the consequent membership function realizers 25a–25n to the range where the input units are kept sensitive: that is, an oblique value of a Sigmoid function is large. For example, when a unit characteristic is a Sigmoid function f(x), the range of x is determined as $\{x;|f'(x)|>\alpha\}$ ($\alpha>0$) An output restorer 90 is provided following the center-of-gravity calculation realizer 88 to map an output value outputted by an output unit 93a based on an appropriate function within the predetermined coordinate values. These input normalizer and output restorer functions are not always required.

Figure 39:
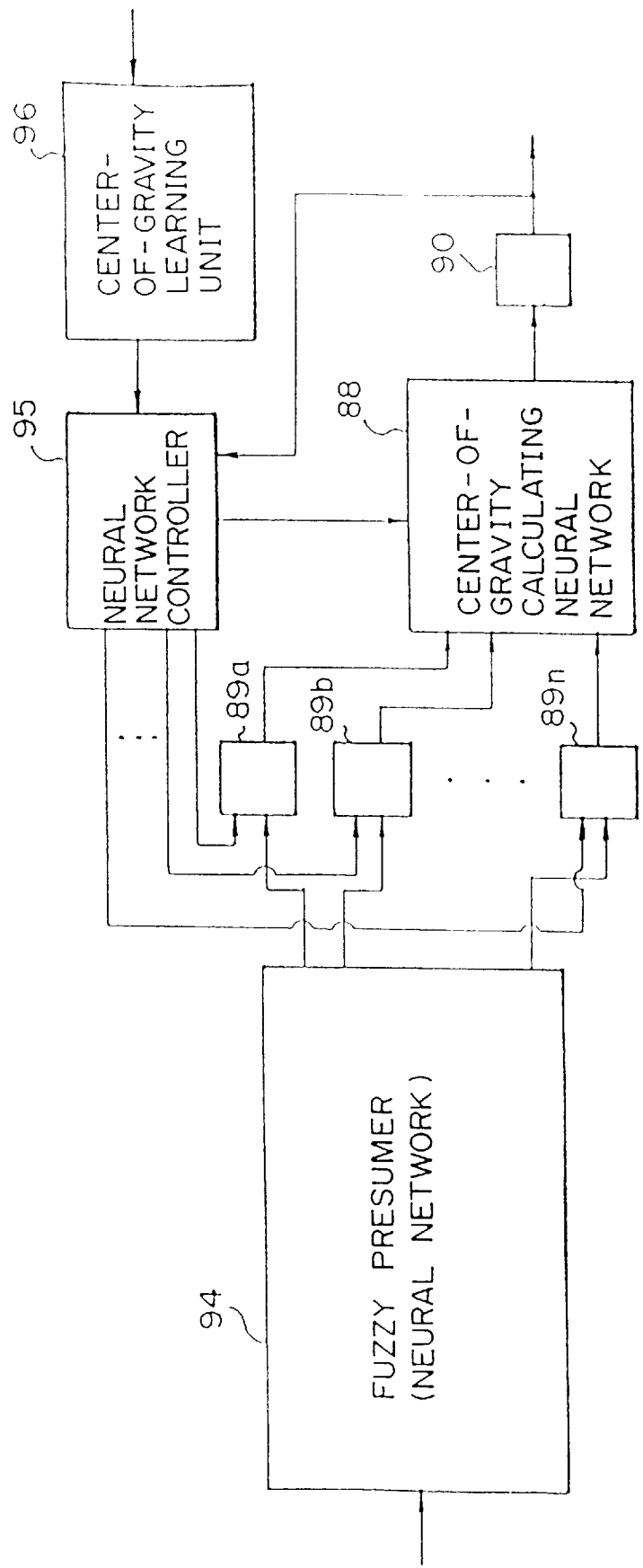
FIG. 39 shows a total configuration of a center-of-gravity output unit comprising a fuzzy presumer.

FIG. 39 shows a total configuration of a center-of-gravity output unit comprising a fuzzy presumer. In FIG. 39, the unit comprises, in addition to the configuration shown in FIG. 38, a fuzzy presumer 94, a neural network controller 95, and a center-of-gravity learning unit 96. The fuzzy presumer 94 shows a hierarchical neural network up to the consequent membership function realizer 18a in FIG. 5, and each of the output of the linear units 25a–25n is inputted to the center-of-gravity calculation neural network 88 through the input normalizers 89a–89n. The neural network controller 95 controls setting, modifying, etc. of internal states such as a weight value of the connection and a threshold of a unit in the center-of-gravity calculation neural network 88. The center-of-gravity learning unit 96 generates teacher data at the learning of the center-of-gravity calculation neural network 88.

Figure 40:
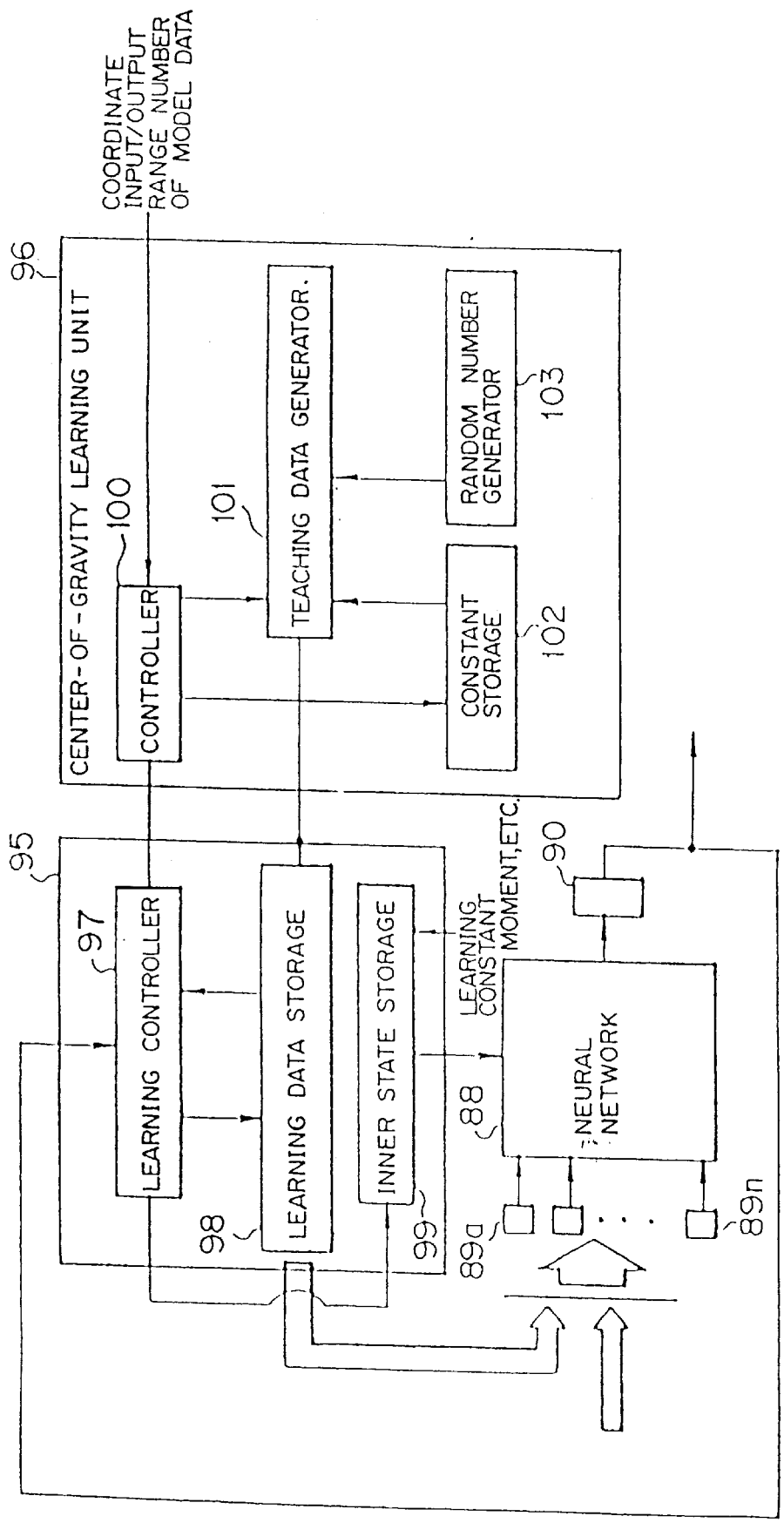
FIG. 40 shows a detailed configuration of a neural network controller and a center-of-gravity

FIG. 40 shows an embodiment of the center-of-gravity output unit indicating in detail the neural network controller 95 and the center-of-gravity learning unit 96. The center-of-gravity learning unit 96 comprises a controller 100 for performing various control on the center-of-gravity learning unit 96, a constant storage 102 for storing coordinates received externally, input/output ranges, and the number of teacher data, a random number generator 103 for generating random numbers, and a teacher data generator 101 for generating teacher data for learning based on constants stored in the constant storage 102 and random numbers generated by the random number generator.

As shown in FIG. 40, the neural network controller 95 comprises a learning data storage 98 for storing teacher data generated by the teacher data generator 101 as learning data, an internal state storage 99 for storing a weight value associated with a connection line between units of the neural network 88, a threshold for use in a threshold process of each unit, and internal state data for controlling the neural network 88 using a learning constant, moment, etc., and a learning controller 97 for inputting learning data stored in the learning data storage 98 in the neural network 88, comparing an output value indicating center-of-gravity outputted by the neural network 88 with teacher data indicating center-of-gravity, and controlling the variation of internal states stored in the internal state storage 99.

Figure 41:
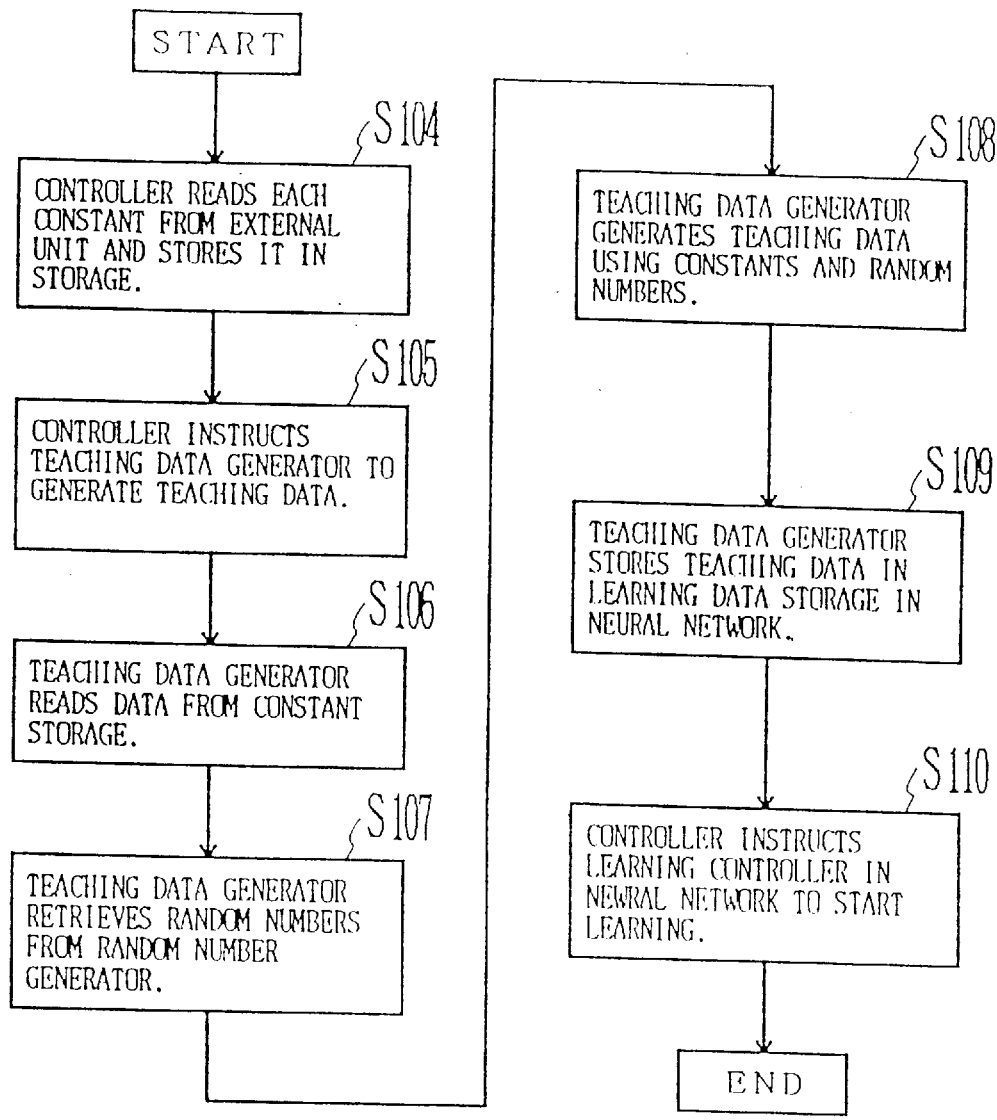
FIG. 41 shows a flowchart of a process of a center-of-gravity learning unit.

As shown in the flowchart in FIG. 41, in step S104, the controller 100 of the center-of-gravity learning unit 96 externally reads coordinates, input/output ranges, and number of teacher data to store them in the constant storage 102.

In step S105, the controller 100 instructs the teacher data generator 101 to generate teacher data.

In step S106, the teacher data generator 101 reads constant data from the constant storage 102.

In step S107, the teacher data generator 101 obtains random numbers from the random number generator 103, and in step S108, the teacher data generator 101 generates teacher data based on the read-out constants and random numbers read. Then, the output of the teacher data are calculated according to the input data generated based on the random numbers.

In step S109, the teacher data generator 101 transmits the teacher data to the learning data storage 98 of the neural network control 95 for storage.

In step S110, the controller 100 of the learning unit 96 issues a learning instruction to the learning controller 97 of the neural network controller 95.

In the present embodiment, corresponding data are mapped in the range $0.2 \leq t \leq 0.8$ where a unit is sensitive in the predetermined input range assuming that predetermined coordinates on a number line are $\{1, 2, 3, 4, 5\}$, an input range of a value corresponding to each coordinate is (equivalent to the "quality") $0 \leq t \leq 10$, the input/output range of the unit is $0 \leq t \leq 1$, and coordinates and values identified by the coordinates are within the predetermined input range. Then, the following linear function of the normalizer 89i (i=1, 2, ... ) is used:

$$\text{input} = 0.6y/10 + 0.2 \tag{19}$$

and an appropriate linear function used by the output restorer 90 is as follows:

$$c = 4(\text{output} - 0.2)/0.6 + 1 \tag{20}$$

FIG. 42 shows a center-of-gravity value outputted by the center-of-gravity output unit using a neural network obtained in an embodiment and an actual center-of-gravity, where the maximum allowance of an error is 0.12249 and the average value of an error is 0.036018 by with regard to 10 data.

In the above described examples, functions of the input normalizer and the output restorer are linear functions. However, they are not limited to linear functions, but can be non-linear functions.

Next, a calculation network is described as the third embodiment of the center-of-gravity calculation realizer 18b. The center-of-gravity calculation realizer 18b determines system output as a center-of-gravity value at the last step of the fuzzy presumption as follows:

$$Z = \int z \cdot \text{grade}(z) dz / \int \text{grade}(z) dz = \sum_i z_i \cdot \text{grade}(z_i) / \sum_i \text{grade} \tag{21}$$

That is, a value of center-of-gravity can be obtained by dividing an integral value of the product of an abscissa Z of the consequent membership function and a grade value at the abscissa associated with Z by an integral value of a grade value at the abscissa associated with Z.

Figure 43:
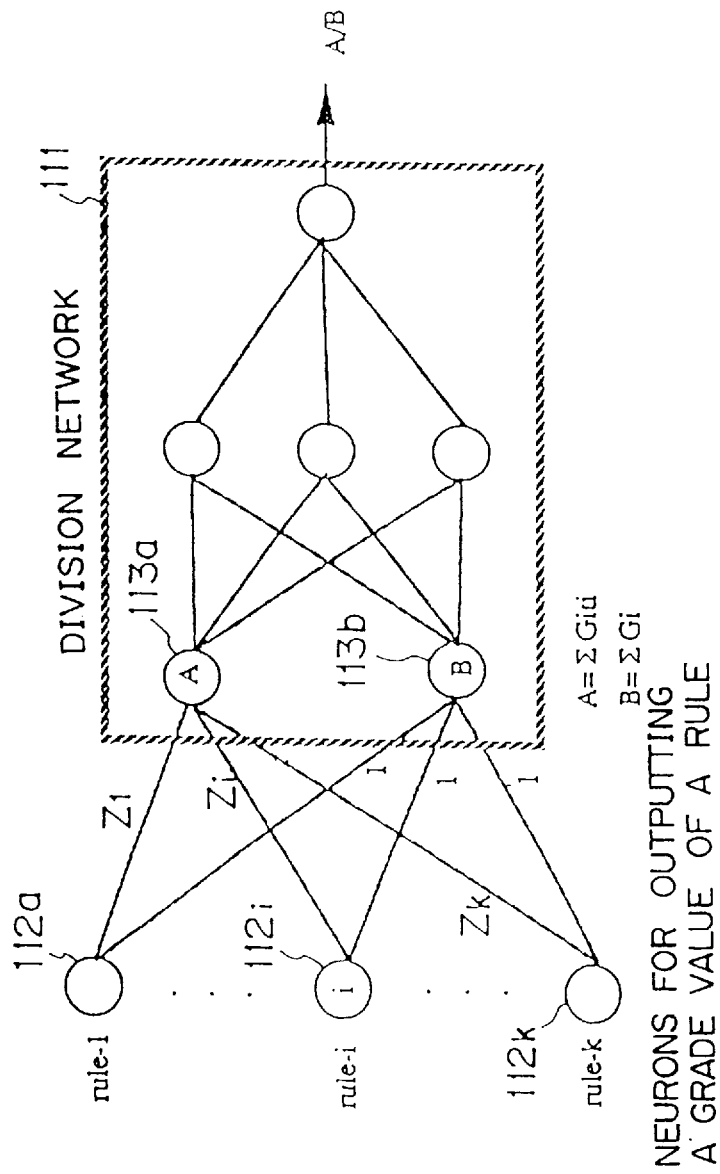
FIG. 43 shows a division network of a center-of-gravity calculation realizer.

FIG. 43 shows an explanatory view of a division network as a center-of-gravity calculation realizer depending on the above described method of obtaining center-of-gravity. In FIG. 43, fuzzy rules where the output units 24a and 24b in the rule part 17 shown in FIG. 5 are not required as in the case shown in FIG. 27; that is, fuzzy rules shown in FIG. 26 are considered.

Therefore, in FIG. 43, units 112a–112k corresponds to the Sigmoid functions 23a–23e in the rule part 17 shown in FIG. 5, where the grade value at the abscissa Z in expression (21) corresponds to the grade value of the rule. Then, the weight of the connection between the units 112a–112k and the first input unit A in a division network 111 equals a value $z_1 \ldots z_i \ldots z_k$ of the abscissa of the consequent membership function, while the weight of the connection between the units 112a–112k and the other unit B always equals '1'. Therefore, a center-of-gravity value can be obtained by the division network 111 where a result of division of the output (A) of the unit 113a by the output (B) of the unit 113b is obtained. Then, the division network 111 learns how to perform division in the back propagation method.

Figure 44:
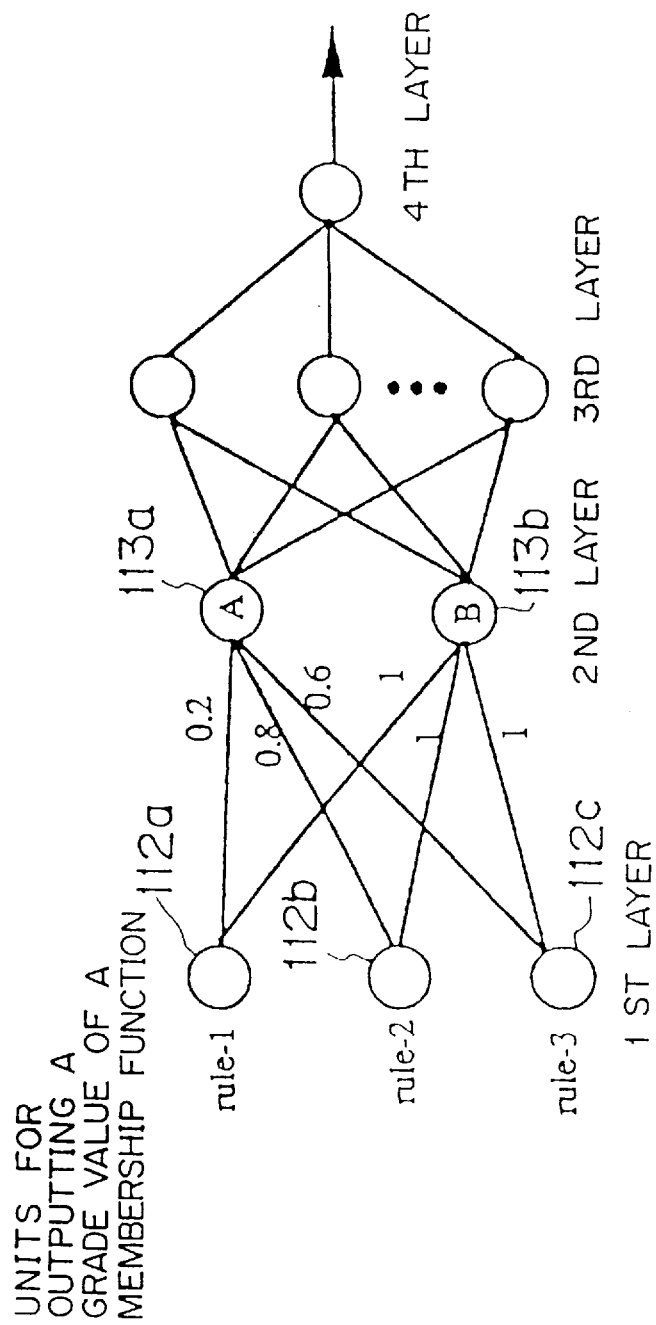
FIG. 44 shows an embodiment of a division network.

FIG. 44 shows an embodiment of a division network. FIG. 44 corresponds to the fuzzy rule shown in FIG. 26. The weight of the connection between the units 112a–112c and the unit 113a indicates a value of the abscissa of the consequent membership function 0.2, 0.8, or 0.6, and the weight value of the units 112a–112c between the unit 113b always equals '1'.

Figure 1:
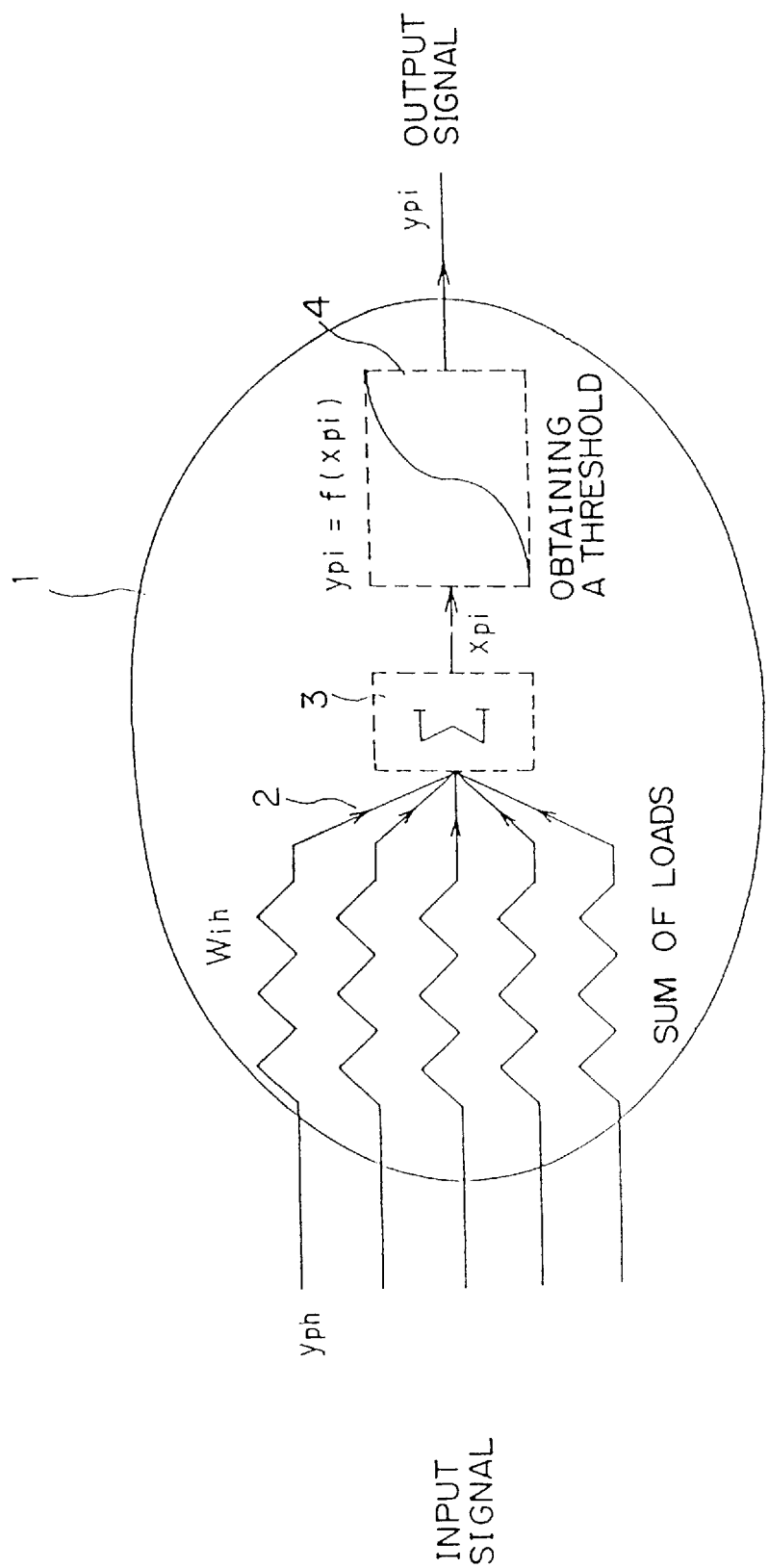
FIG. 1 shows a basic configuration of a basic unit.
Figure 2:
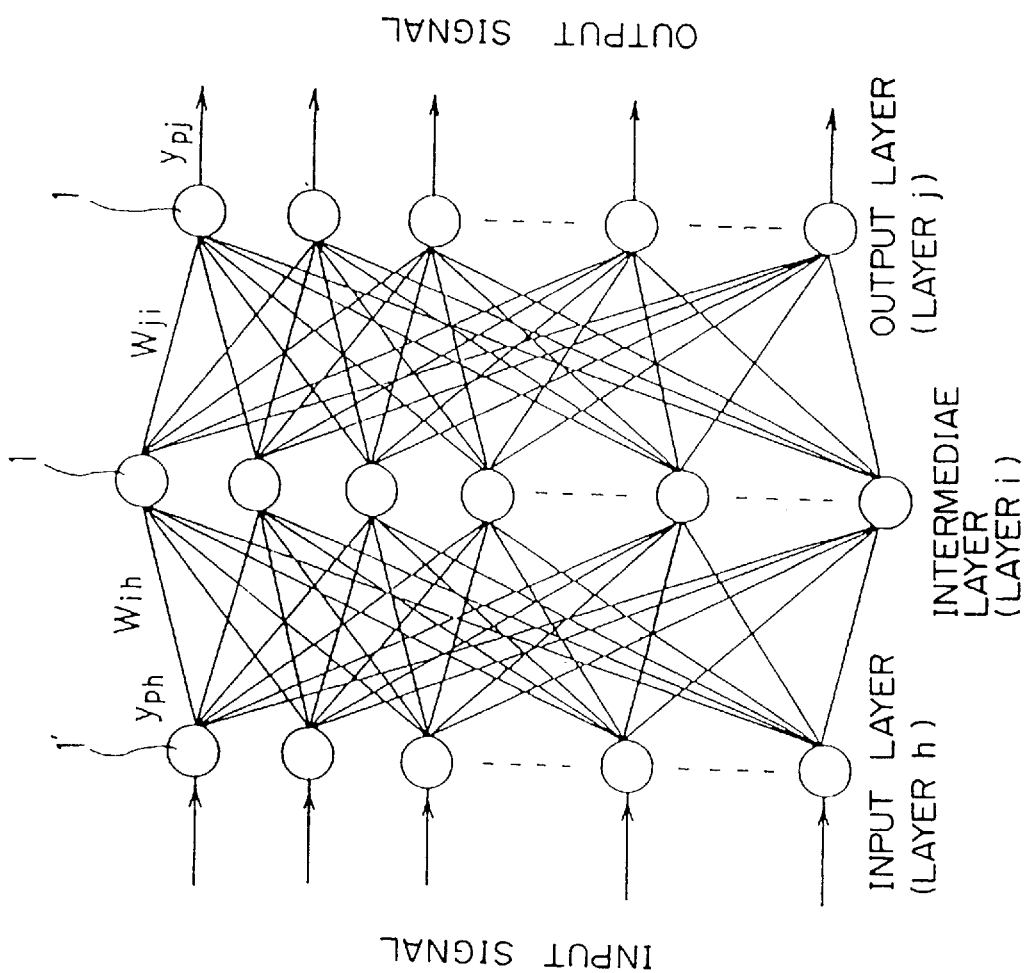
FIG. 2 shows a basic configuration of a hierarchical network.
Figure 3:
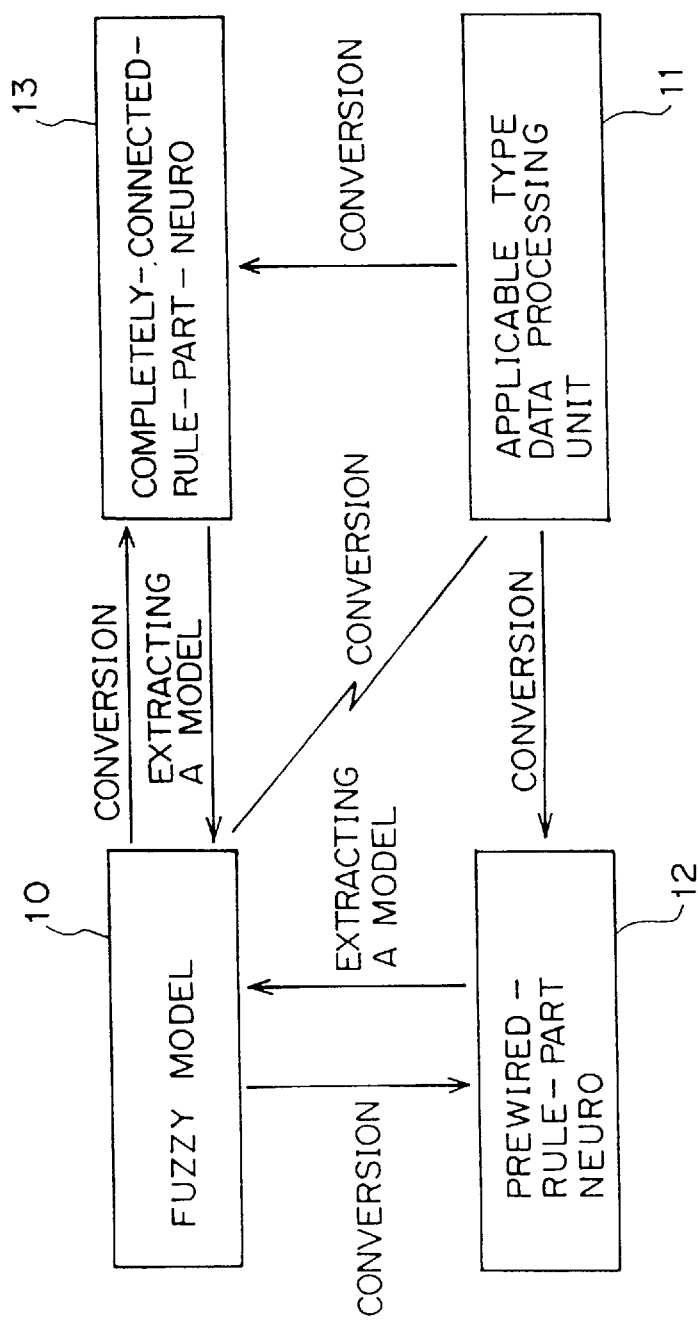
FIG. 3 shows a principle configuration of the present invention.

Next, the conversion of a network structure from the pure neuro 11 described in FIG. 3 to the pre-wired-rule-part neuro 12, or to the completely-connected-rule-part neuro 13, or the conversion of a network structure from the completely-connected-rule-part neuro 13 not shown in FIG. 3 to the pre-wired-rule-part neuro 12 is described in detail together with the extraction of fuzzy models from the pre-wired-rule-part neuro 12 or from the completely-connected-rule-part neuro 13.

Figure 45:
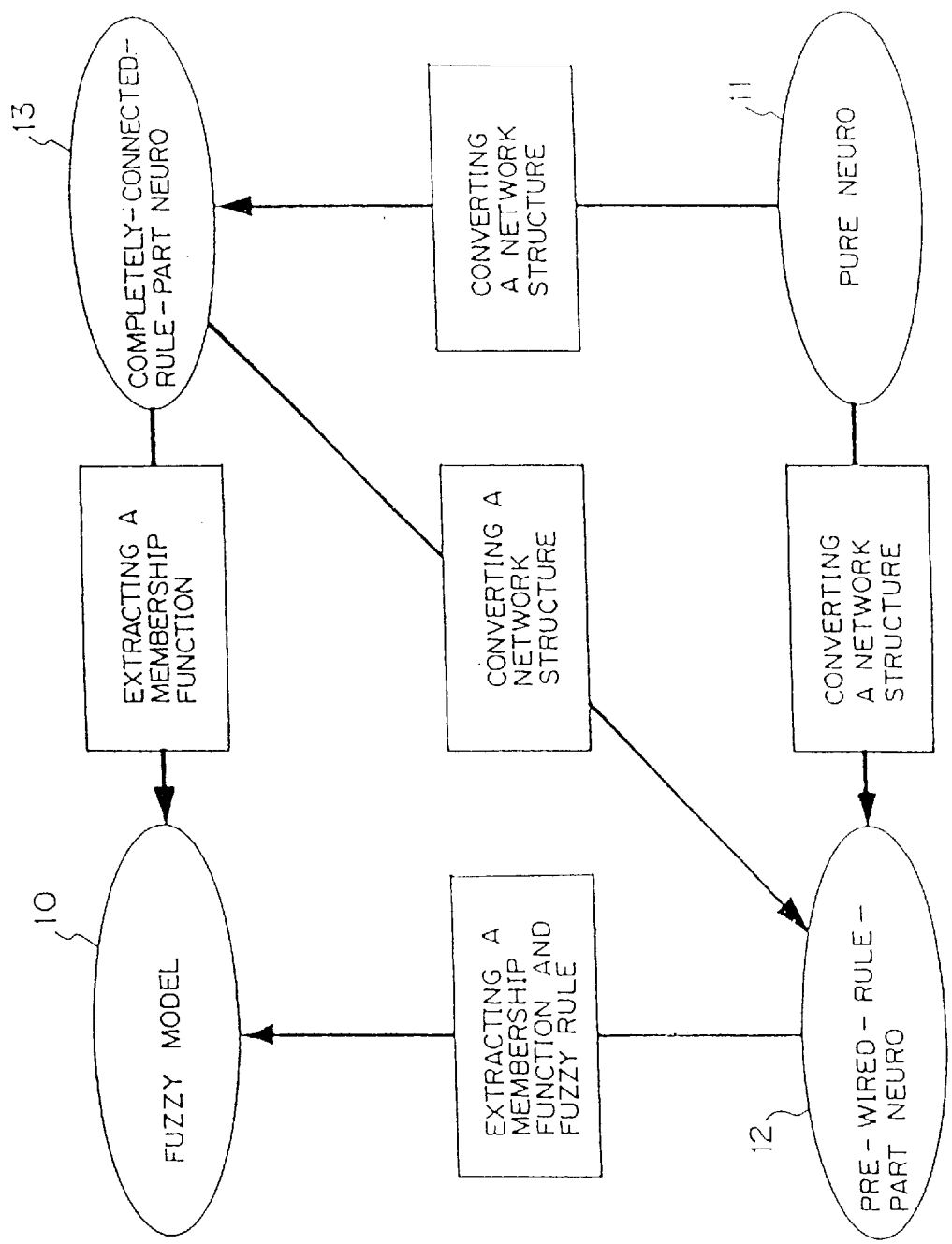
FIG. 45 shows a concept for converting a network structure and extracting a fuzzy teacher.

FIG. 45 shows the conversion of a network structure and a conceptual view of extracting a fuzzy teacher. The pre-wired-rule-part neuro 12 or the completely-connected-rule-part neuro 13 is obtained by converting a network structure from the pure neuro 11. The pre-wired-rule-part neuro 12 is obtained by the conversion of a network structure from the completely-connected-rule-part neuro 13. The fuzzy teacher 10 can be obtained from the pre-wired-rule-part neuro 12 after a membership function and a fuzzy rule are extracted therefrom, while the fuzzy teacher 10 can be obtained from the completely-connected-rule-part neuro 13 after a membership function is extracted therefrom.

Figure 46:
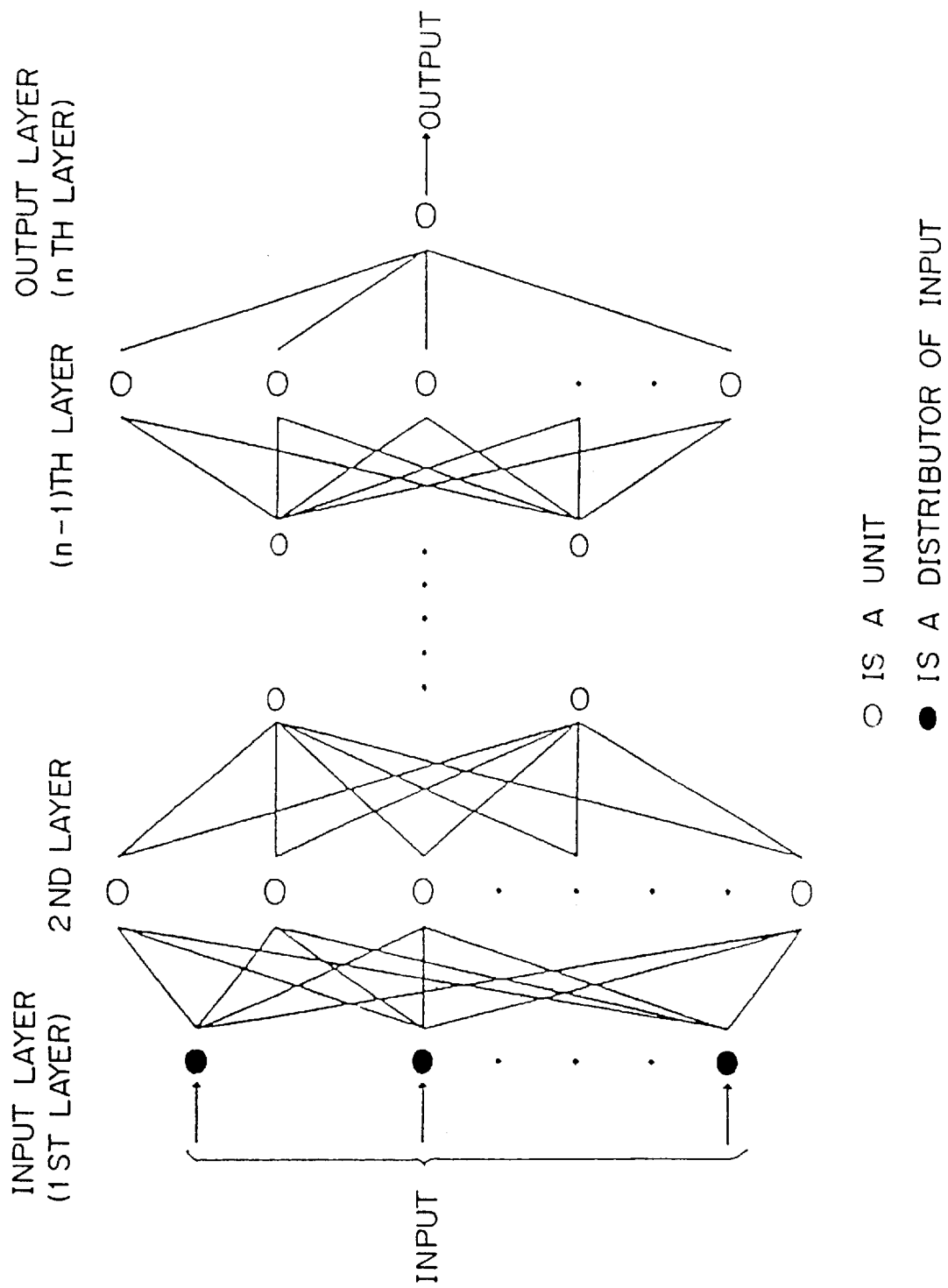
FIG. 46 shows a configuration of a pure neuro.

FIG. 46 shows a configuration of an applicable type data processor 11 shown in FIG. 3. In the case where a neuro-fuzzy integrated system comprises only units like a pure neuro described above, non-fuzzy calculation as the final step of fuzzy presumption is performed using only a neural network.

The input layer (the first layer) of the input part for inputting data, the output layer (the nth layer) for outputting the value of controlling operation on the process result, and the intermediate layer (the second layer—the (n-1) layer) are shown in FIG. 46. The intermediate layer can comprise a plurality of layers. Complete connection of these layers between units generates a pure neuro.

Figure 47:
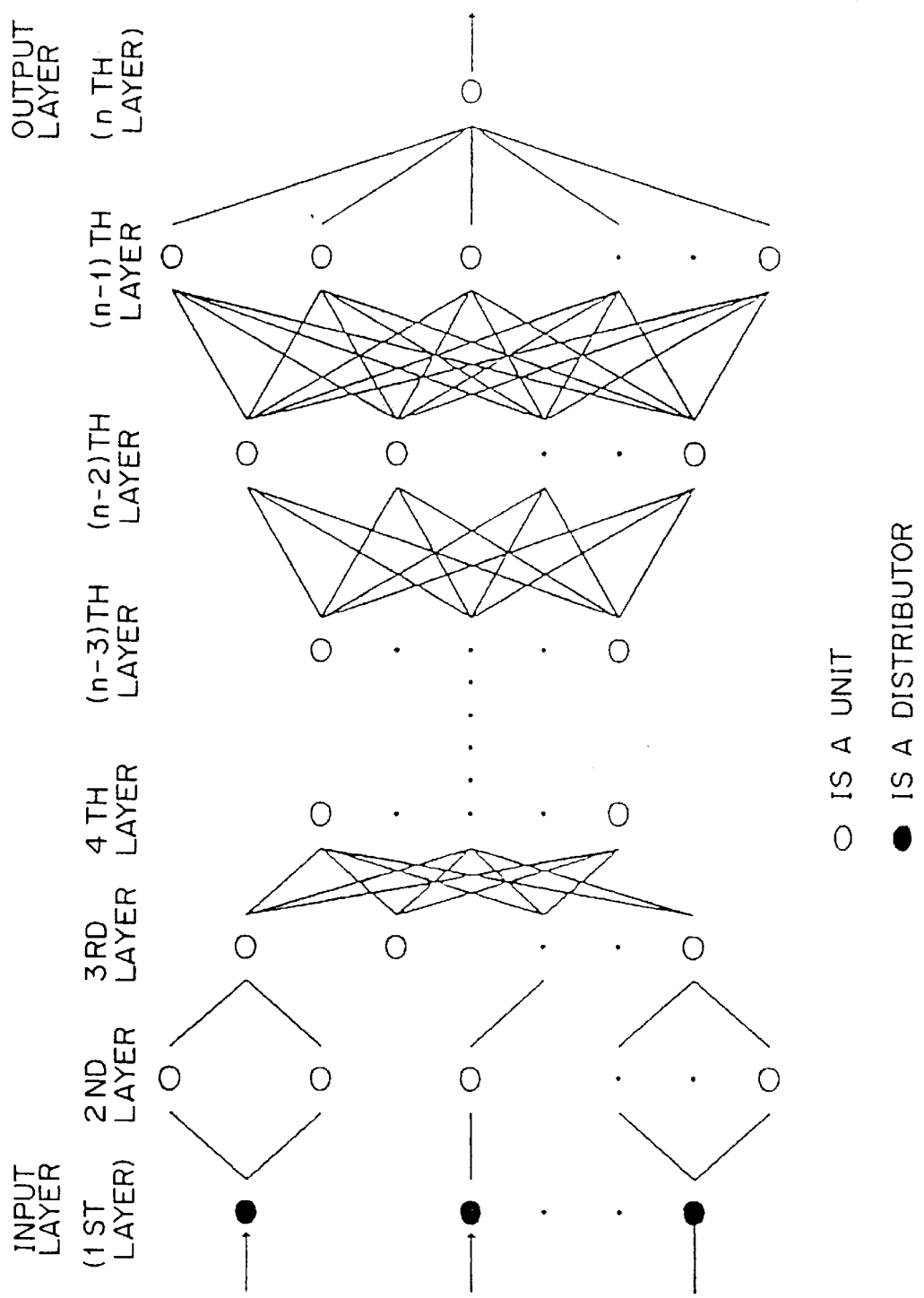
FIG. 47 shows a configuration comprising only units of a completely-connected-rule-part neuro.

FIG. 47 shows an example of a completely-connected-rule-part neuro 6 having a configuration comprising only units.

In FIG. 47, a completely-connected-rule-part neuro comprises an input layer of the input part (the first layer); the second layer for realizing the antecedent membership function; the third layer for indicating a grade value of the antecedent membership function in each unit; the (n–2)th layer from the fourth layer of the rule part, where each of units in the (n–2)th layer indicates an enlargement/reduction rate of each consequent membership function; the (n–1)th layer for realizing a consequent membership function, and an output layer (the nth layer) of the output part for outputting the results of a non-fuzzy process. Among them, layers from the fourth layer to the (n–2)th layer of the rule part are completely connected, featuring a completely-connected-rule-part neuro.

Figure 48:
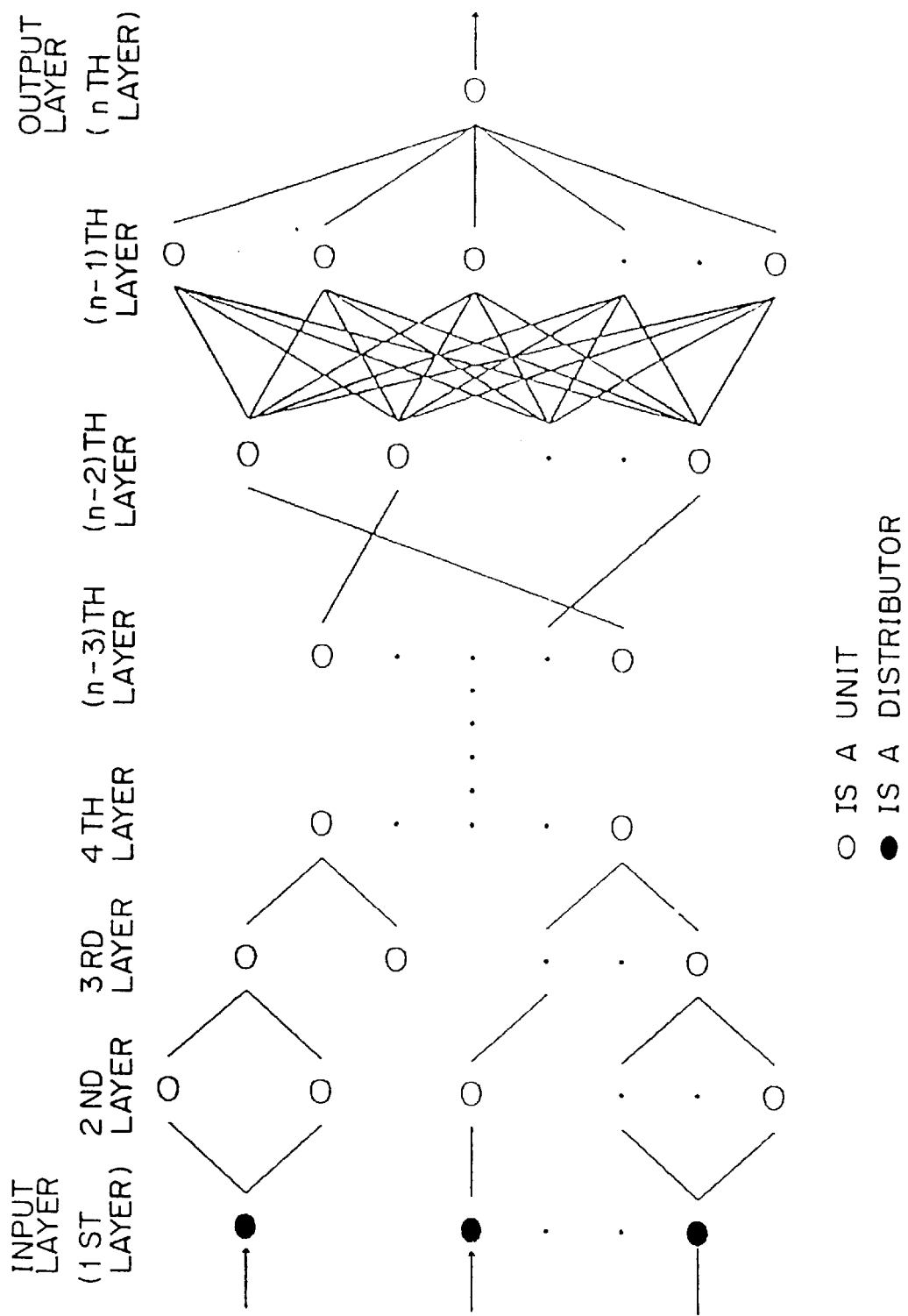
FIG. 48 shows a configuration comprising only units of a pre-wired-rule-part neuro.

Next, FIG. 48 shows an example of a configuration of a pre-wired-rule-part neuro 7 comprising only units.

In FIG. 48, the hierarchical configuration from the input layer (the first layer) to the output layer (the nth layer) is the same as that shown in FIG. 47. However, unlike the completely-connected-rule-part neuro shown in FIG. 47, it is not completely connected from the fourth to the (n–3)th layer of the rule part; instead, the connection is made and the weight is set according to fuzzy rules, thus featuring a pre-wired-rule-part neuro.

In the pure neuro in FIG. 46, the completely-connected-rule-part neuro in FIG. 47, and the pre-wired-rule-part neuro in FIG. 48, the first layer corresponds to the input part 15 in FIG. 5, the second layer corresponds to the units 21a–21d of the antecedent membership function realizer 16, the third layer corresponds to the units 22a–22d, the fourth layer corresponds to the units 23a–23e of the rule part, the (n–2)th layer corresponds to the units 24a and 24b, and the (n–1)th layer corresponds to the consequent membership function realizer 18a. However, the nth layer (output layer) calculates for a non-fuzzy process, not for obtaining a center-of-gravity value.

In FIG. 46, a membership function for input can be clarified by deleting the connection (whichever is less significant) in the weight of the connection between the input layer and the second layer of a pure neuro, and the weight of the connection between the second and the third connection. To extract a consequent membership function, the weight values of the connection of units of the (n–1)th layer and the connection of units connected to these units of the (n–2)th layer are rearranged such that the weight values of the connection between the (n–1)th layer and the output layer (the nth layer) are arranged in ascending order.

The above described procedure enables the conversion of a pure neuro to a completely-connected-rule-part neuro.

Next, a membership function for input can be extracted by deleting the connection (whichever is less significant) in the weight of the connection between the input layer and the second layer of a pure neuro, and the weight of the connection between the second and the third connection. A fuzzy rule can be extracted by deleting the connection (whichever is less significant) in the connection from the third layer to the (n–2)th layer.

Finally, to extract a consequent membership function, the weight values of the connection of units of the (n–1)th layer and the connection of units connected to these units of the (n–2)th layer are re-arranged such that the weight values of the connection between the (n–1)th layer and the output layer (the nth layer) are arranged in ascending order.

The above described procedure enables the conversion of a pure neuro to a pre-wired-rule-part neuro. Likewise, a completely-connected-rule-part neuro can be converted to a pre-wired-rule-part neuro.

In the hierarchical neural network in the conventional pure neuro structure, the internal rules of a learned system are distributed to all connections as "weight". Therefore, it is very difficult to isolate the internal rules. In the present invention, the conversion to a pre-wired-rule-part neuro or a completely-connected-rule-part neuro enables extraction of internal rules in the form of a fuzzy teacher.

The extraction of a fuzzy teacher can be conducted by deleting a unit or connection of less significance to hold present information processing capabilities of the whole network.

Next, the extraction of a fuzzy teacher from a pre-wired-rule-part neuro, a completely-connected-rule-part neuro, or a pure neuro is described using the names shown in FIG. 5.

1. Extraction of a fuzzy rule from a pre-wired-rule-part neuro

The process of analyzing a pre-wired-rule-part neuro comprises a logical element process of converting a rule-part unit to include the capabilities of a logical element and a rule-part unit deleting process.

1-1. A logical element process for a rule-part neuro

The following procedure comprising steps (1)–(8) are performed for each unit of a rule part. In steps (1) and (2), negative-sign weight in the connection is integrated to positive-sign weight as a preprocess for preventing a logic from becoming incomprehensible with a negative sign. In steps (3)–(6), input/output characteristics of each unit are checked and their amplitudes (dynamic ranges) are adjusted so that a contribution rate can be determined only by a weight value of the connection between the latter membership function parts. In steps (7) and (8), a logical element that matches input/output characteristics of units can be determined.

(1) When the weight of the connection between a rule-part and a latter membership function realizer is negative, steps (a) and (b) are performed.
- (a) The sign of weight of the connection between the rule-part and the latter membership function realizer must be turned positive.
- (b) The sign of weight (including a threshold) of the connection between the antecedent membership function realizer and the rule part should be inverted. (This process eliminates negative signs.)

(2) The process (a) is performed for every weight (including a threshold) of the connection between the antecedent membership function realizer and the rule-part.

If the sign of a weight value (including a threshold) is negative, steps (i) and (ii) are preformed.
- (i) Any negative sign of weight (including a threshold) is recorded.
- (ii) A sign of weight (including a threshold) is turned positive.

(3) Data are inputted to check input/output characteristics of a unit and resultant output obtained.

(4) Check the maximum and minimum values of the output.

(5) An output value is normalized according to the following expression:

$$X = (x - \text{min.})/(\text{max.} - \text{min.})$$

where x shows an output value before the conversion, and X shows an output value after the conversion.

(6) The weight of the connection is converted between a rule part and a latter membership function part. (The converted weight can be considered the importance of a fuzzy rule.)

$$W = w \times (\text{max.} - \text{min.})$$

where w shows a weight value before the conversion, and W shows a weight value after the conversion.

(7) Normalized input/output data and input/output data for reference to logical elements are matched.

(8) The result of step (7) and the information of (2), (a), and (i) determine which logical operation a unit is performing. If the result is determined as "permanently true" or "permanently false", the unit is deleted.

1-2. Deletion of a unit in the rule part

Check the weight of the connection between the rule part and the latter membership function part, and reserve the connection for the number of desired fuzzy rules in the descending order from the largest weight. Then, further reserve only the rule-part units connected to the above described reserved connection and the connection between the antecedent membership function part and the rule part connected to these units.

Figure 49:
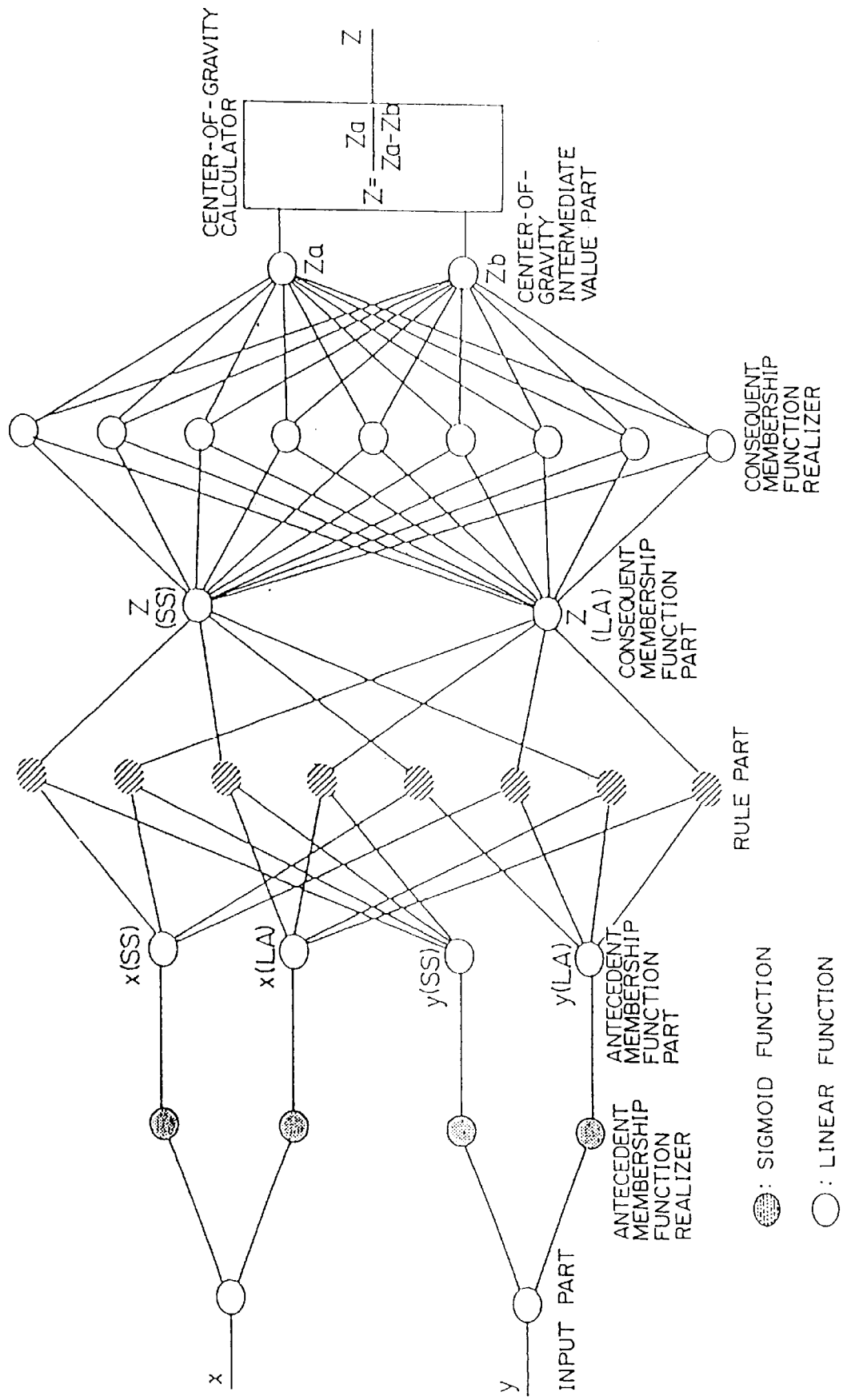
FIG. 49 shows a state of a pre-wired-rule-part neuro before extracting a fuzzy rule.
Figure 50:
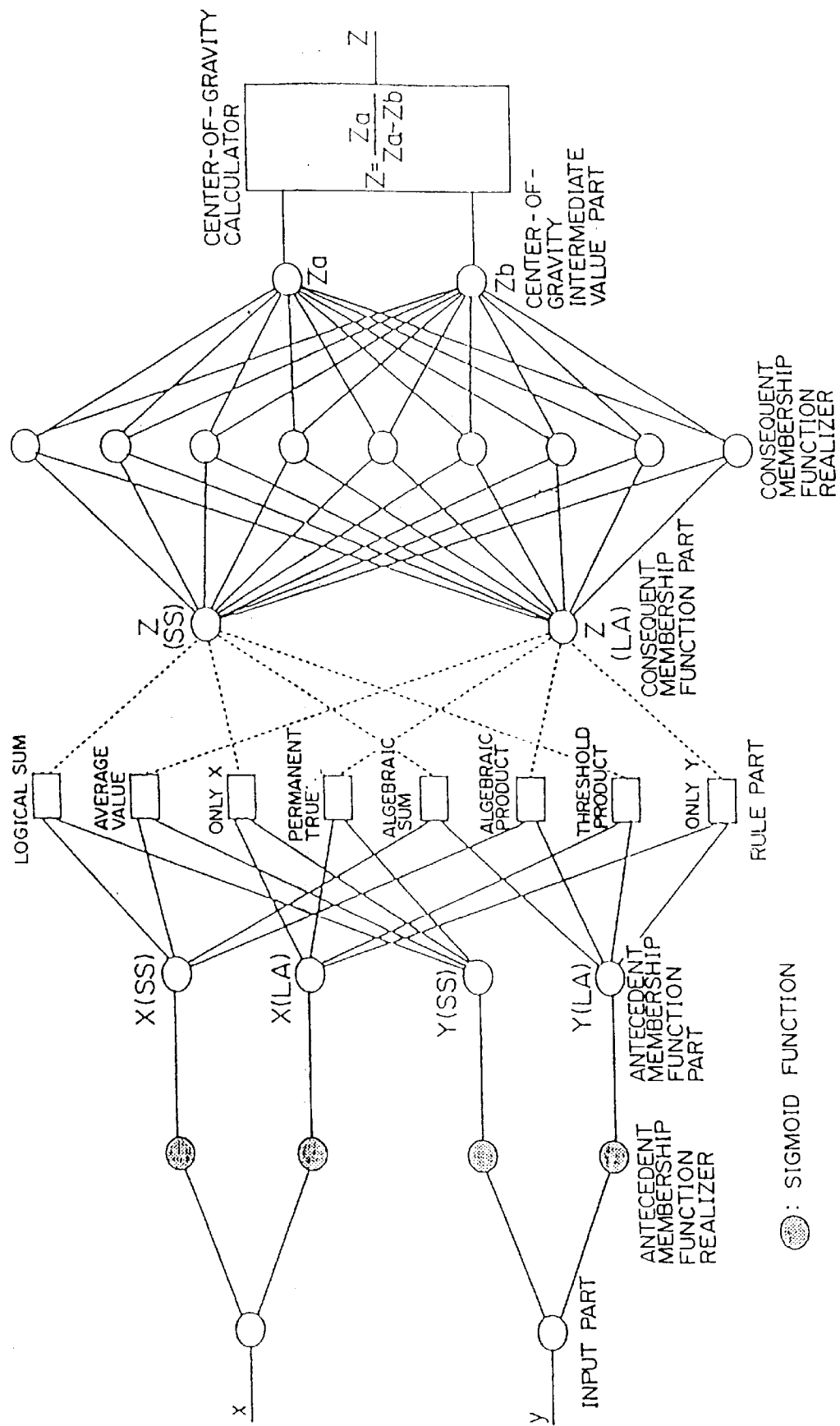
FIG. 50 shows a state of a pre-wired-rule-part neuro where the rule part is represented as a logical element.
Figure 51:
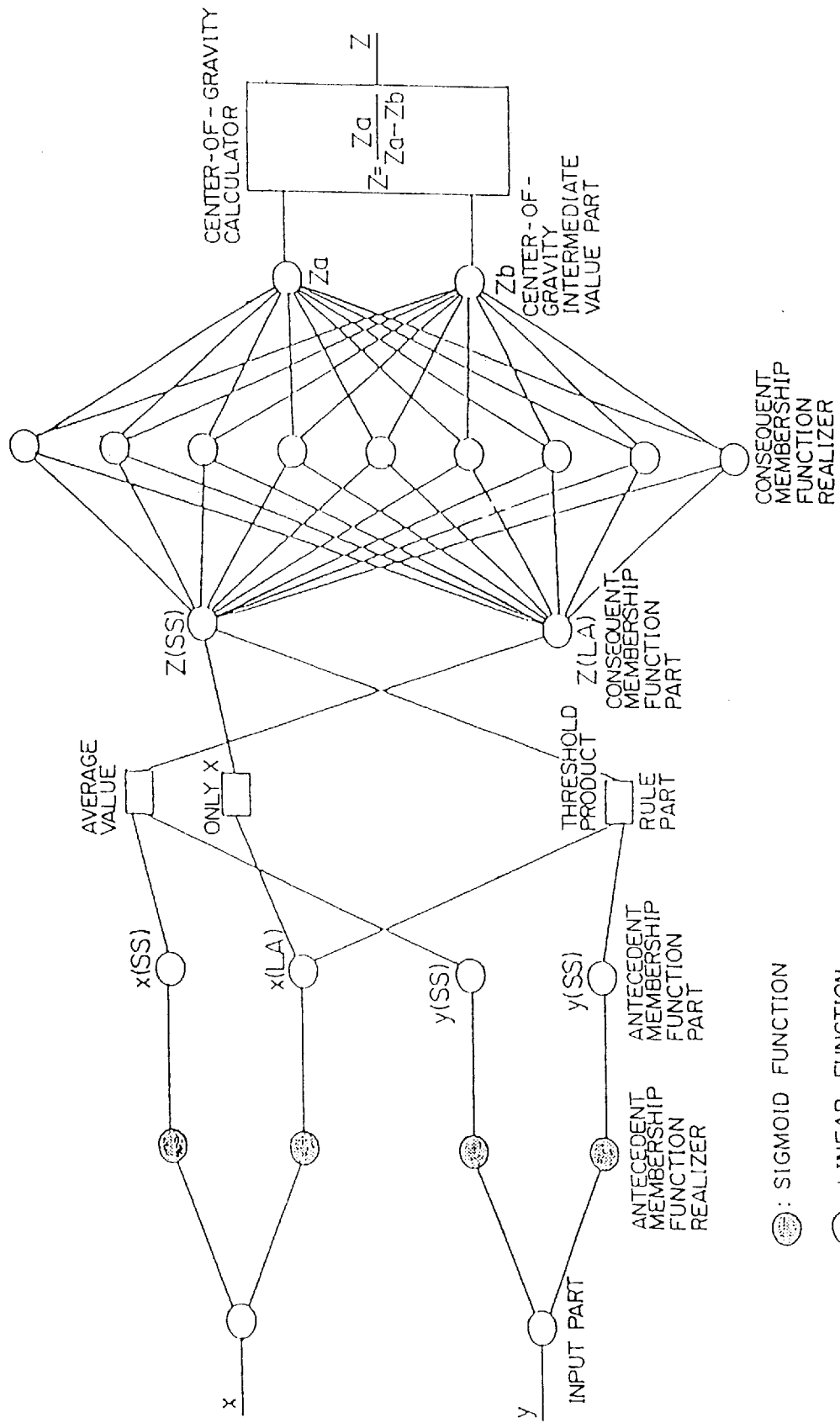
FIG. 51 shows a state of a rule part where the desired fuzzy rule number of units remain.

FIGS. 49–51 shows examples.

In FIGS. 49–57, the antecedent membership function realizer 16 shown in FIG. 5 is divided into the antecedent membership function realizer (the second layer) and the antecedent membership function part (the third layer); the rule part 17 is divided into the fourth layer of the rule part and the latter membership function part (the fifth layer). The center-of-gravity determining element output unit 26 corresponds to the center-of-gravity intermediate value, and the center-of-gravity calculator 27 corresponds to the center-of-gravity calculator.

FIG. 49 shows the state of the pre-wired-rule-part neuro before the logical element process. The state shown in FIG. 50 can be obtained by performing a logical process on each unit of the rule part. In FIG. 50, capabilities of each unit in the rule part are converted to logical element capabilities represented by a logical sum, average value, X only, permanent truth, algebraic sum, algebraic product, critical product, and Y only. In FIG. 51, three lines of the connection are selected in descending order from the larger weight in the connection indicated in broken line between the rule part and the latter membership function part shown in FIG. 50. Then, the rule-part units connected to the selected connection described above are reserved. The other units are deleted together with the connection before and after the deleted units to extract three fuzzy rules.

The logical element capabilities of the three units reserved in the rule part shown in FIG. 51 comprise an average value, X only, and critical product. Fuzzy rules can be represented using these logical element capabilities as follows:

if average value ((x(SS), y(SS)); then z(LA)
if x(LA); then z(SS)
If critical product (x(LA), y(LA)); then z(SS)

2. Extraction of a fuzzy rule from a completely-connected-rule-part neuro

A process of analyzing a completely-connected-rule-part neuro comprises a process for converting the structure of a completely-connected-rule-part neuro to a pre-wired-rule-part neuro after simplifying each connection between the antecedent membership function part of the completely-connected-rule-part neuro and the rule part, and between the rule part and the latter membership function part. Procedures 2-1 through 2-3 are indicated as follows: 2-1. Simplification of the connection between the antecedent membership function realizer and the rule part Steps (1)–(3) are performed for each unit of the rule part.
(1) Units in the antecedent membership function part are grouped for each input variable.
(2) Step (a) is performed for each group.
- (a) In a group, the connection having the maximum absolute value of weight between the antecedent membership function part and the rule part must be selected and reserved. (One line of the connection is reserved in one group for each unit in the rule part.)
(3) In the connection reserved in step (2) between the antecedent membership function part and the rule part, the connection having the first and the second largest absolute values of weight is reserved.

2-2. Simplification of the connection between the rule part and the latter membership function realizer Steps (1) and (2) are performed for each unit in the rule part.
(1) Units in the latter membership function part are grouped for each output variable.
(2) Step (a) is performed for each group.
- (a) In a group, the connection having the maximum absolute value of weight between the rule part and the latter membership function parts must be selected and reserved.

2-3. The trailing steps are the same as those for the pre-wired-rule-part neuro.

FIGS. 52–57 show practical examples.

Figure 52:
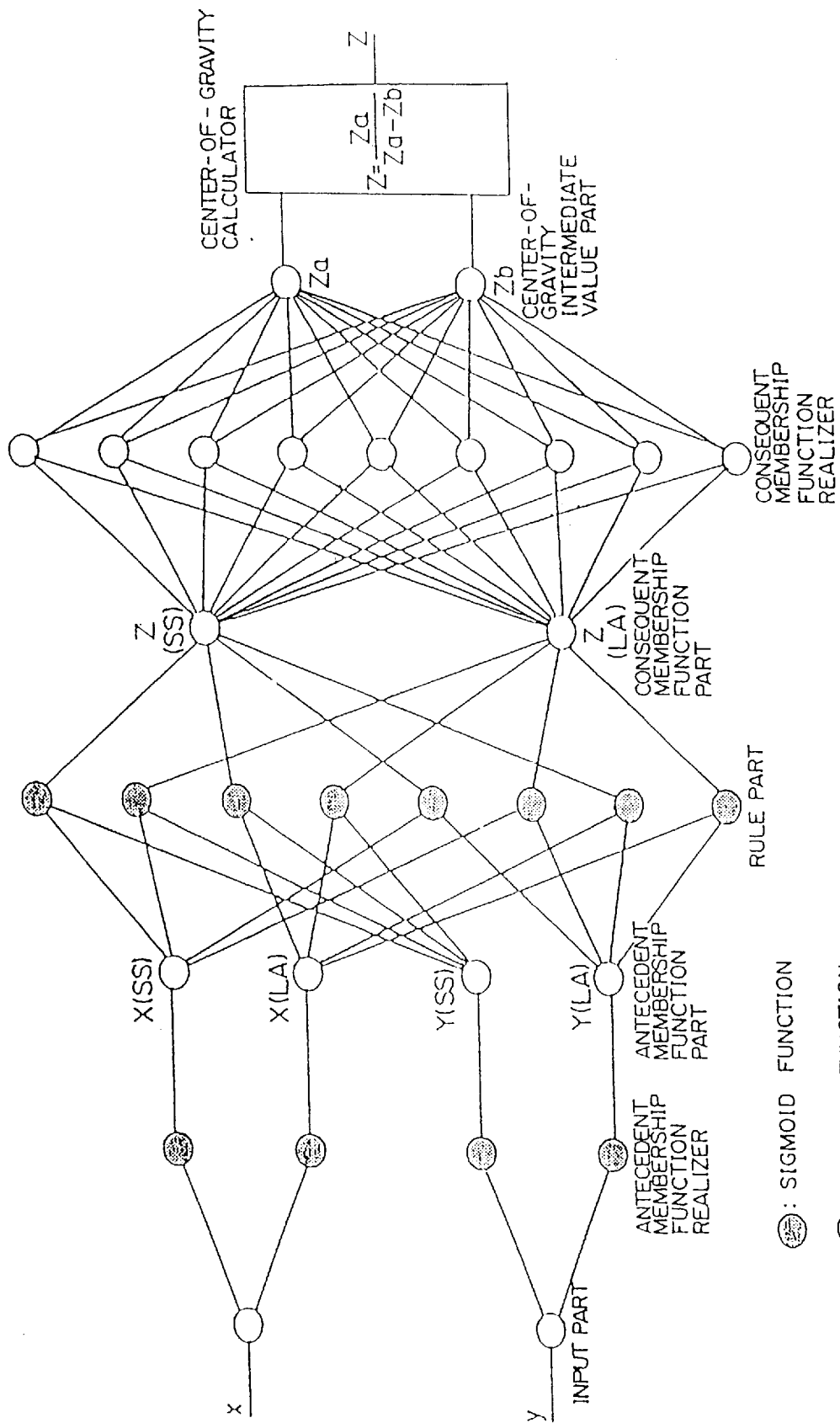
FIG. 52 shows a state of a completely-connected-rule-part neuro before extracting a fuzzy rule.
Figure 53:
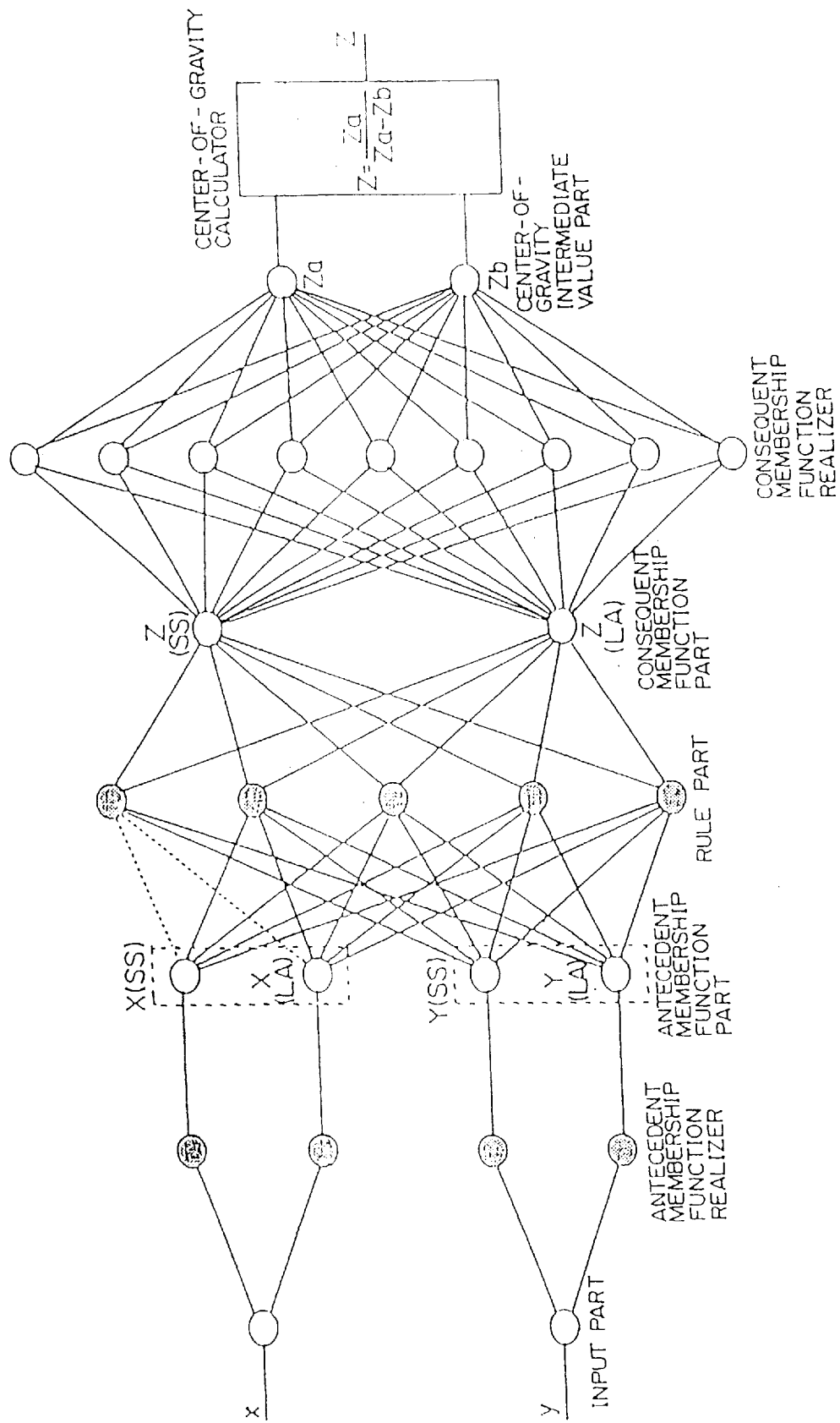
FIG. 53 shows a state of a completely-connected-rule-part neuro where the antecedent membership function output units are grouped.
Figure 54:
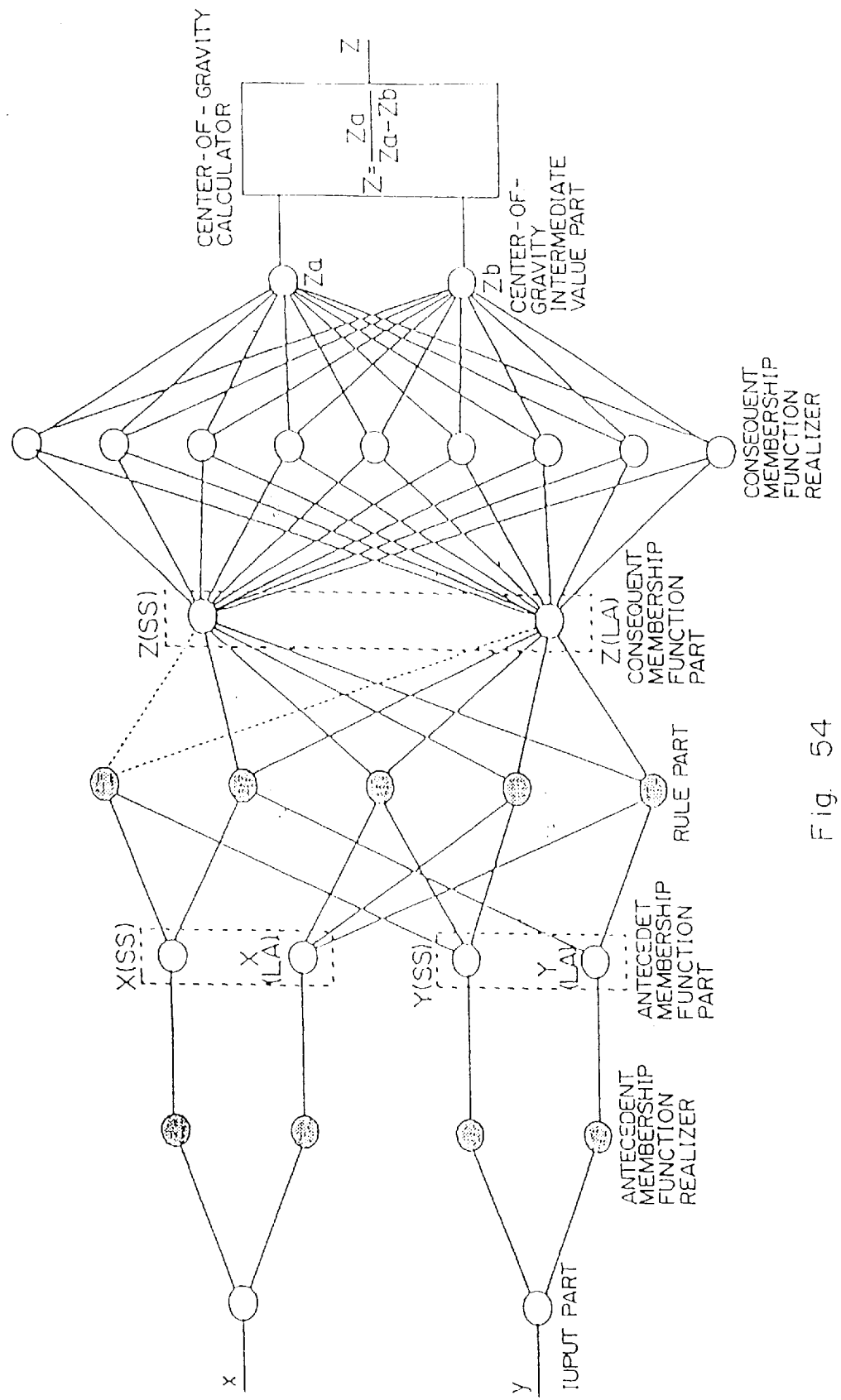
FIG. 54 shows a state of a completely-connected rule where the connection between the antecedent membership function output unit and the rule part are simplified.
Figure 55:
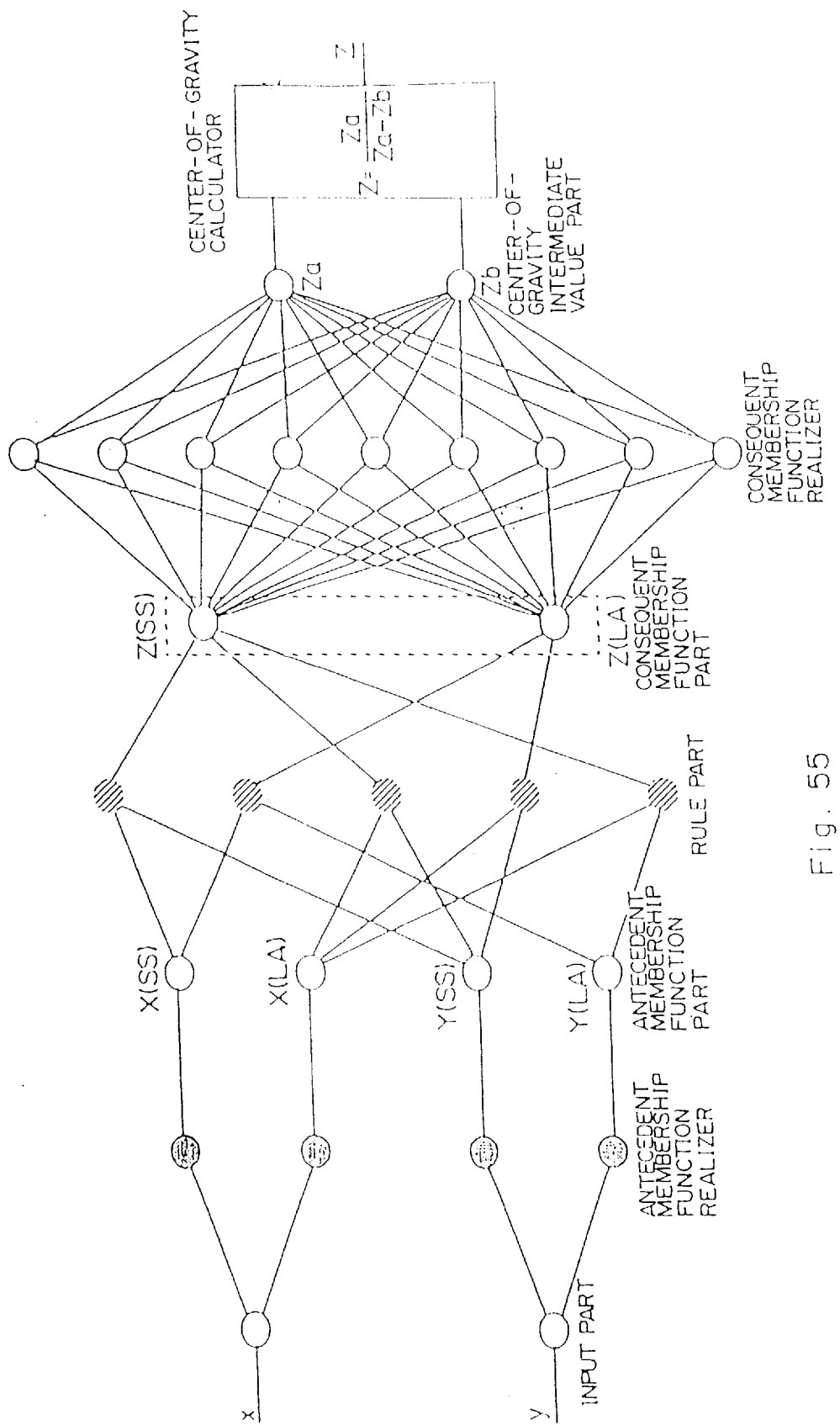
FIG. 55 shows a state of a completely-connected rule where the connection between the rule part and the consequent membership function output unit is simplified.
Figure 56:
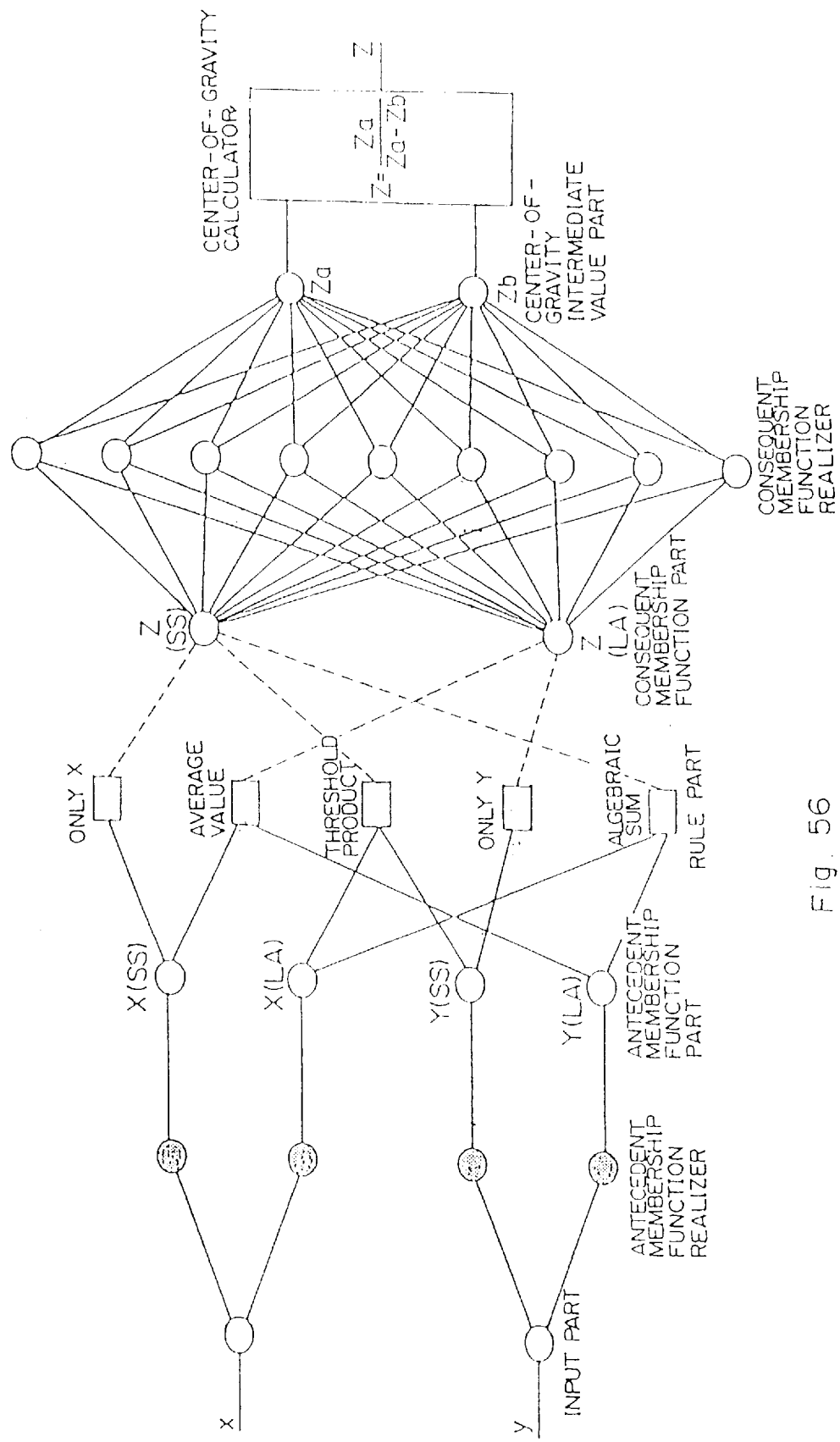
FIG. 56 shows a state of a completely-connected rule where the rule units are represented as a logical element.
Figure 57:
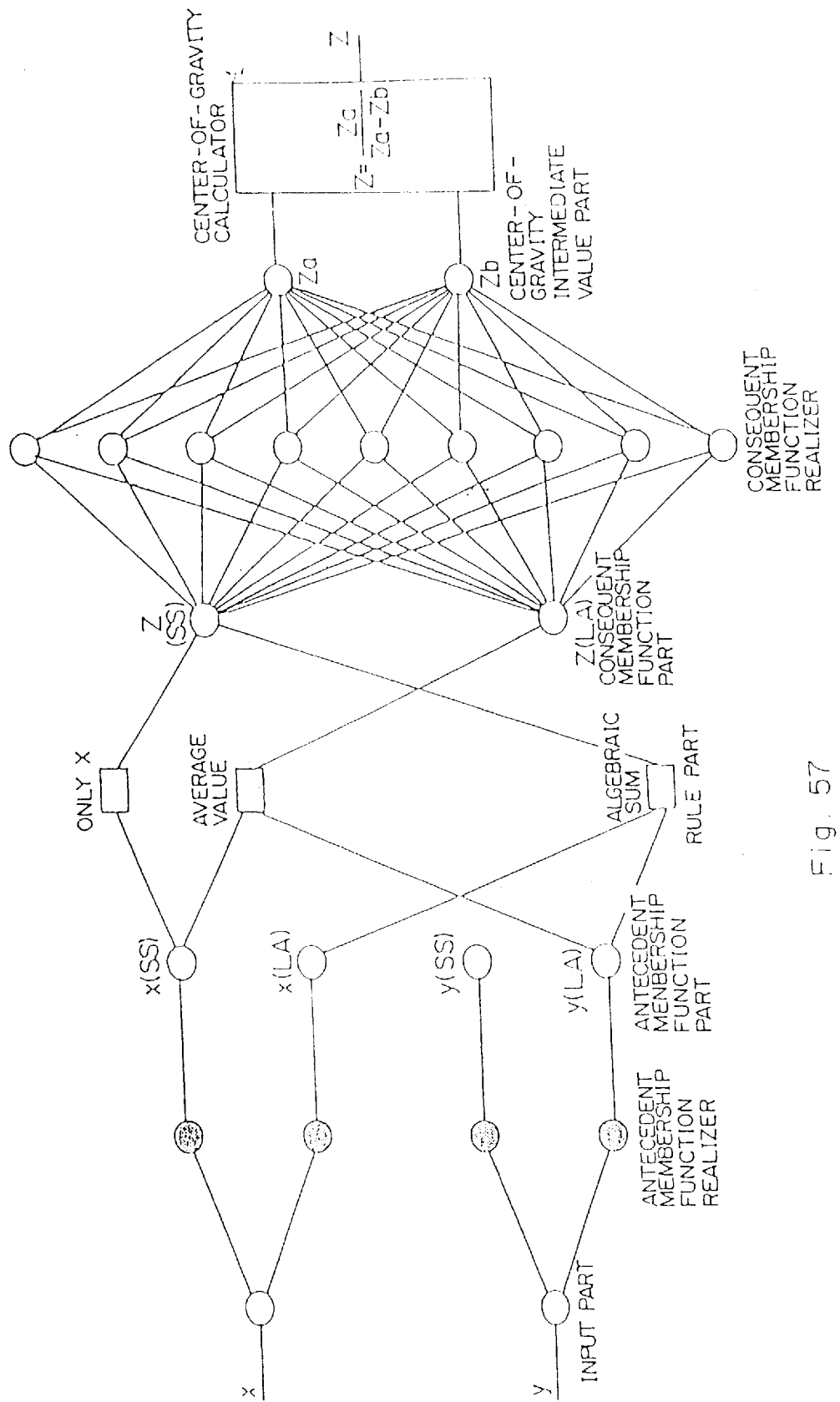
FIG. 57 shows the state of a completely-connected-rule-part where the desired fuzzy rule number of rule units remain active.

FIG. 52 shows an example of a completely-connected-rule-part neuro before extracting a fuzzy rule. FIG. 53 shows a process of grouping units in the antecedent membership function part for each of input variable x and y in each unit. FIG. 54 shows the state shown in FIG. 53 where the weight of the connection from a group of each antecedent membership function part in each unit of the rule part is checked, and the connection having the maximum weight value is reserved. Then, two lines of the connection having a larger weight value in each unit of the rule part are selected, and all the others are deleted, thus indicating a simplified state. FIG. 55 shows the state shown in FIG. 54 where units in the latter membership function part are grouped for the output variable Z. However, in this case, only one group exists. A simplified state is shown with one line of the connection having the maximum weight value in the connection to groups of each unit in the rule part, deleting all other lines. FIG. 56 shows the state of FIG. 55 where each unit of the rule part is subjected to the logical element process. FIG. 57 shows the state where three (corresponding to the number of desired fuzzy rules) of the units of the rule part subjected to the logical element process as shown in FIG. 56 are selected according to a weight value of the connection to the latter membership function part.

The logical element capabilities of the three units selected in FIG. 57 comprises only x, an average number, and an algebraic sum, where a fuzzy rule can be represented as follows:

if x(SS); then z(SS)

if average value (xSS), y(LA)); then z(la)

if algebraic sum (x(LA), y(LA)); then z(SS)

3. Extraction of a membership function and a fuzzy rule from a pure neuro

An available system controls the temperature and humidity. It indicates the control performed at the predetermined temperature and humidity. The following expression is required for this process:

Control values=0.81T+0.1H(0.99T–14.3)+46.3 where T shows the temperature (°C.), and H shows the humidity (%).

FIG. 58 shows a hierarchical pure neuro network which learns system data. The network comprises seven layers from the input layer to the output layer. Temperature and humidity is applied as two kinds of input, and controlled values are given as output. A total of fifty-four (54) learning patterns are given by an available system. These patterns are normalized, which is shown in FIG. 59. In each layer in FIG. 58, the first layer comprises 2 units, the second layer 5 units, the third layer 3 units, the fourth layer 4 units, the fifth layer 3 units, the sixth layer 5 units, and the seventh layer 1 unit. These layers are completely connected for learning. After the learning, a weight value of the connection is shown in FIG. 60. A fuzzy teacher can be extracted from the obtained neural network.

Figure 61:
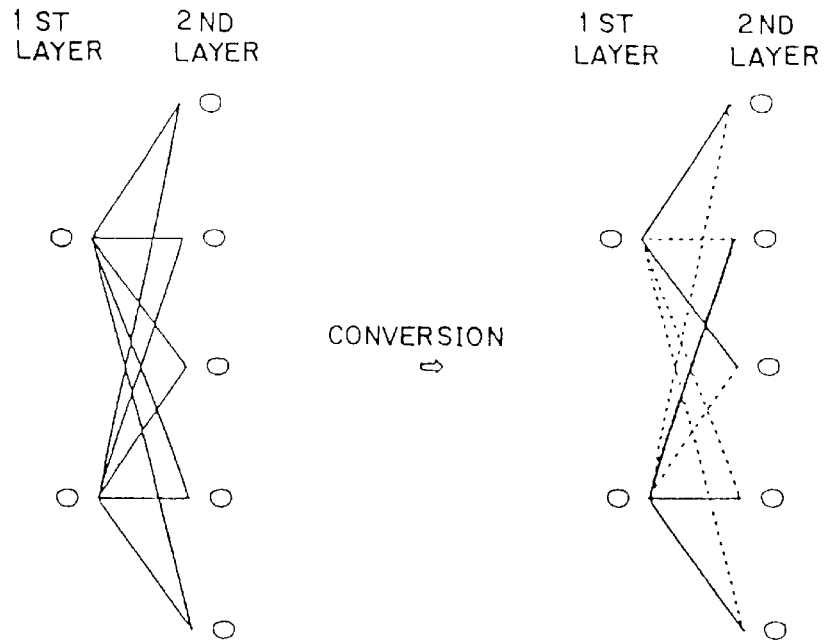
FIG. 61 shows a conversion procedure (1) for a pure neuro shown in FIG. 58.

In the state shown in FIG. 58, a fuzzy teacher can hardly be extracted. Thus, the pure neuro is converted to the structure of a pre-wired-rule-part neuro. The converting procedure is shown as follows:

(1) Among the units in the second layer, the connection having the largest weight value is reserved from a unit in the second layer to a unit in the first layer. All the other connections are deleted. This process is shown in FIG. 61. In FIG. 61, a broken line indicates a deletion.

Figure 62:
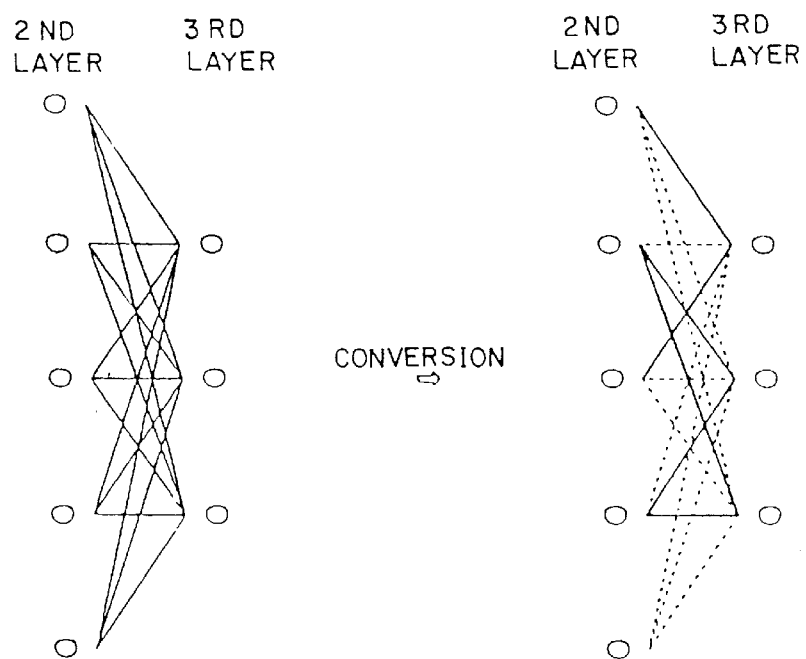
FIG. 62 shows a conversion procedure (2) for a pure neuro shown in FIG. 58.

(2) A few lines of the connection having a larger weight value are reserved from the units in the third layer to the units in the second layer, and the other connection is deleted, which is shown in FIG. 62. In the example shown in FIG. 62, two lines each are reserved from each unit. In FIG. 62, a broken line indicates a deleted connection.

Figure 63:
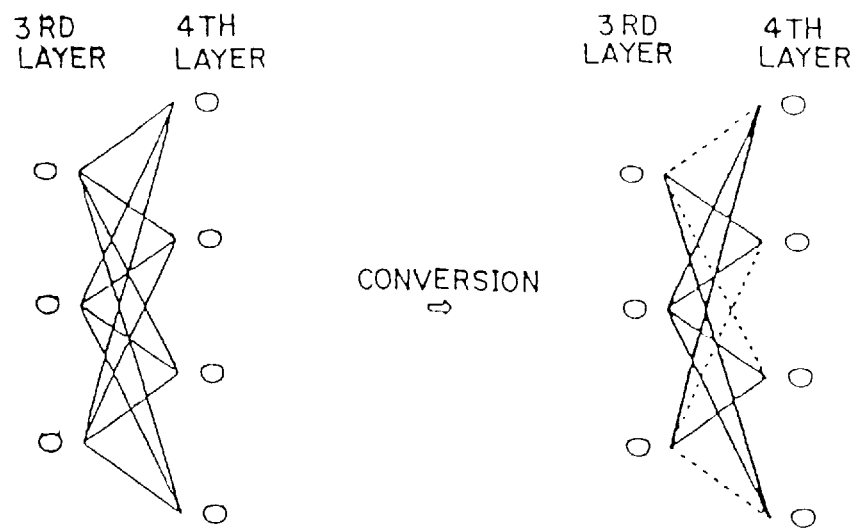
FIG. 63 shows a conversion procedure (3) for a pure neuro shown in FIG. 58.

(3) A few lines of the connection having a larger weight value are reserved from the units in the fourth layer to the units in the third layer, and the other connection is deleted, which is shown in FIG. 62. In the example shown in FIG. 63, two lines each are reserved from each unit. In FIG. 63, a broken line indicates deleted connection.

Figure 64:
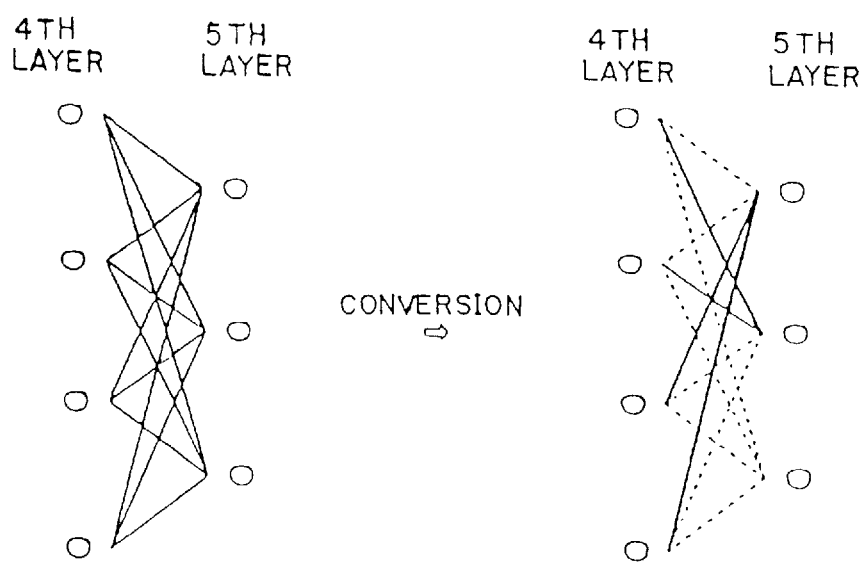
FIG. 64 shows a conversion procedure (4) for a pure neuro shown in FIG. 58.

(4) Among the units in the fourth layer, the connection having the largest weight value is reserved from a unit in the fourth layer to a unit in the fifth layer. All other connections are deleted. This process is shown in FIG. 64. In FIG. 64, a broken line indicates a deletion.

Figure 65:
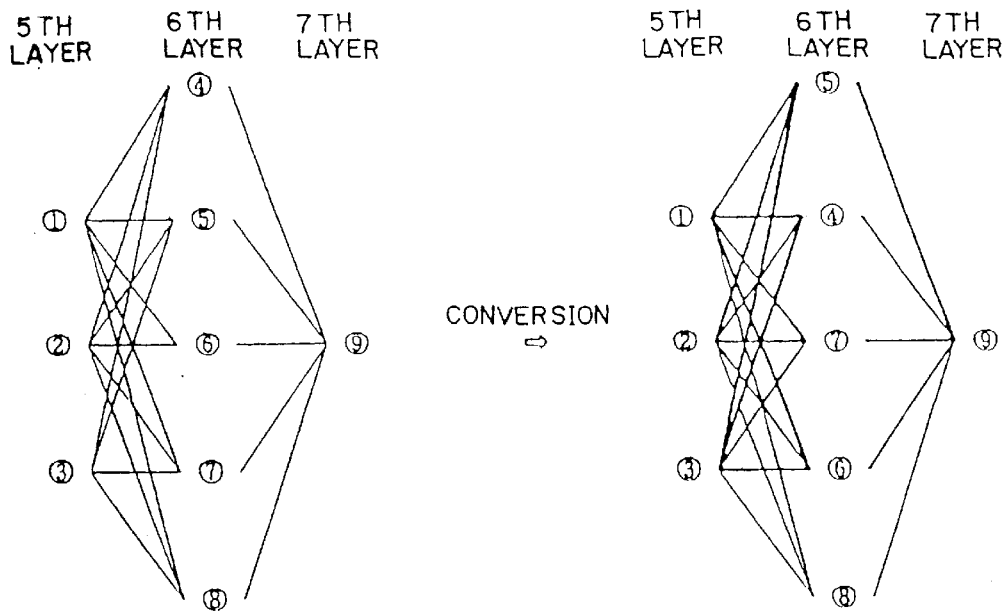
FIG. 65 shows a conversion procedure (5) for a pure neuro shown in FIG. 58.

(5) In the connection where the weight of the connection between the sixth layer and the seventh layer is arranged in the ascending order from the smallest weight value, the weight of the connection from the units in the sixth layer (④–⑧ in FIG. 21 ) and from the units in the fifth layer connected to these units is rearranged, which is shown in FIG. 65.

Figure 66:
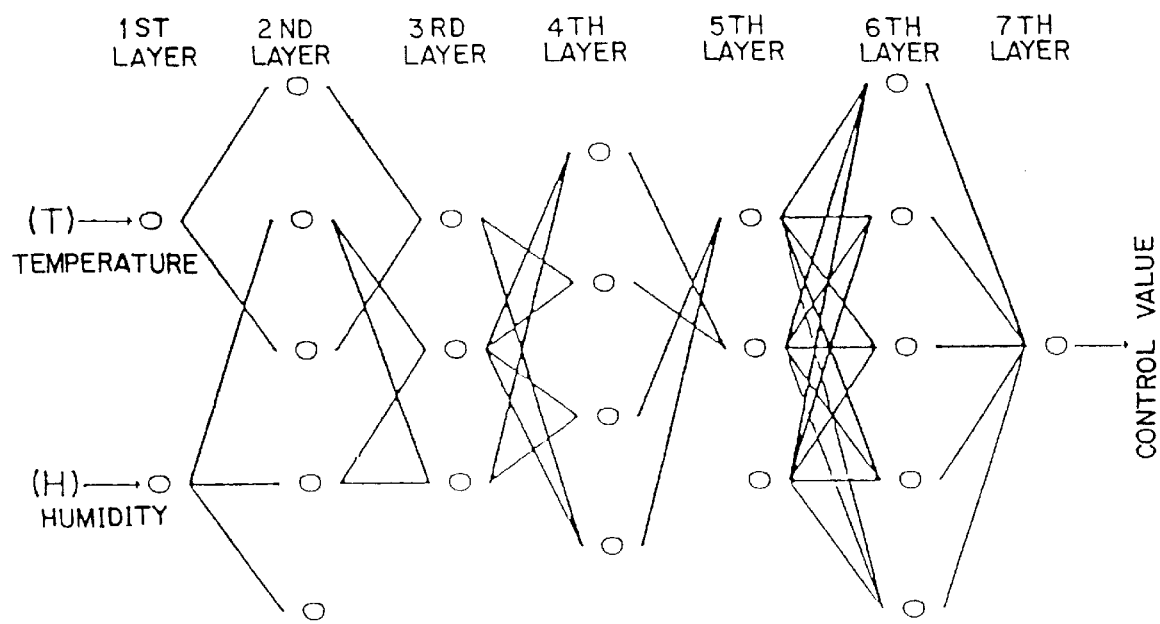
FIG. 66 shows a pre-wired-rule-part neuro converted from a pure neuro shown in FIG. 58.

FIG. 66 shows a pre-wired-rule-part neuro subjected to the above procedures. In the first layer, two variables indicating the temperature and humidity are applied. Each unit in the second and third layers corresponds to a antecedent membership function, and the fourth layer corresponds to a rule. Each unit in the fifth and sixth layers corresponds to a latter membership function. In the seventh layer, non-fuzzy calculation is performed to issue an output value.

In FIG. 66, in tracing the weight of the connection from each unit in the third layer (three units in FIG. 66) which outputs a grade value of a antecedent membership function, the first unit in the third layer outputs a grade value of a antecedent membership function associated with the temperature (T) of an input variable. The second and third units, when traced likewise, output a grade value of a antecedent membership function associated with the humidity (H) of an input variable.

Next, each unit in the fourth layer (four units in FIG. 66) corresponds to a fuzzy rule. A fuzzy rule can be read by analyzing the weight of the connection between the layers before and after the fourth layer. In association with each unit of the fifth layer (three units in FIG. 66), the weight of the connection between the fifth and sixth layers compared with the weight of the connection between the sixth and seventh layers is normalized. This is indicated in a graph as shown in FIGS. 67-①–67-③. In FIG. 67, the abscissa shows the weight of the connection between the sixth and seventh layers. That is, it shows where the grade value of an output value of a unit in the sixth layer points to on the axis of coordinates of an output value of a latter membership function. The axis of ordinates shows the weight of the connection from a unit in the sixth layer to a unit in the fifth layer. That is, it corresponds to a grade value at the specified point on the axis of an output value of a latter membership function corresponding to each unit in the fifth layer.

In FIG. 67, weight values of the connection from each unit in the sixth layer to units in the seventh layer are $d_1, d_2, d_3, d_4,$ and $d_5$ respectively. ① shows a latter membership function, and weight values of the connection from the first unit to all units in the sixth layer are $a_1, a_2, a_3, a_4,$ and $a_5$ respectively. ② shows a latter membership function corresponding to the second unit, and weight values of the connection from the second unit to all units in the sixth layer are $b_1$, $b_2$, $b_3$, $b_4$, and $b_5$ respectively. ③ shows a latter membership function corresponding to the third unit, and weight values of the connection from the third unit to all units in the sixth layer are $c_1$, $c_2$, $C_3$, $C_4$, and $C_5$ respectively.

FIG. 68 shows weight values of the connection of the pre-wired-rule-part neuro after the conversion. In FIG. 68, ****** shows a weight value of the deleted connection.

Figure 69:
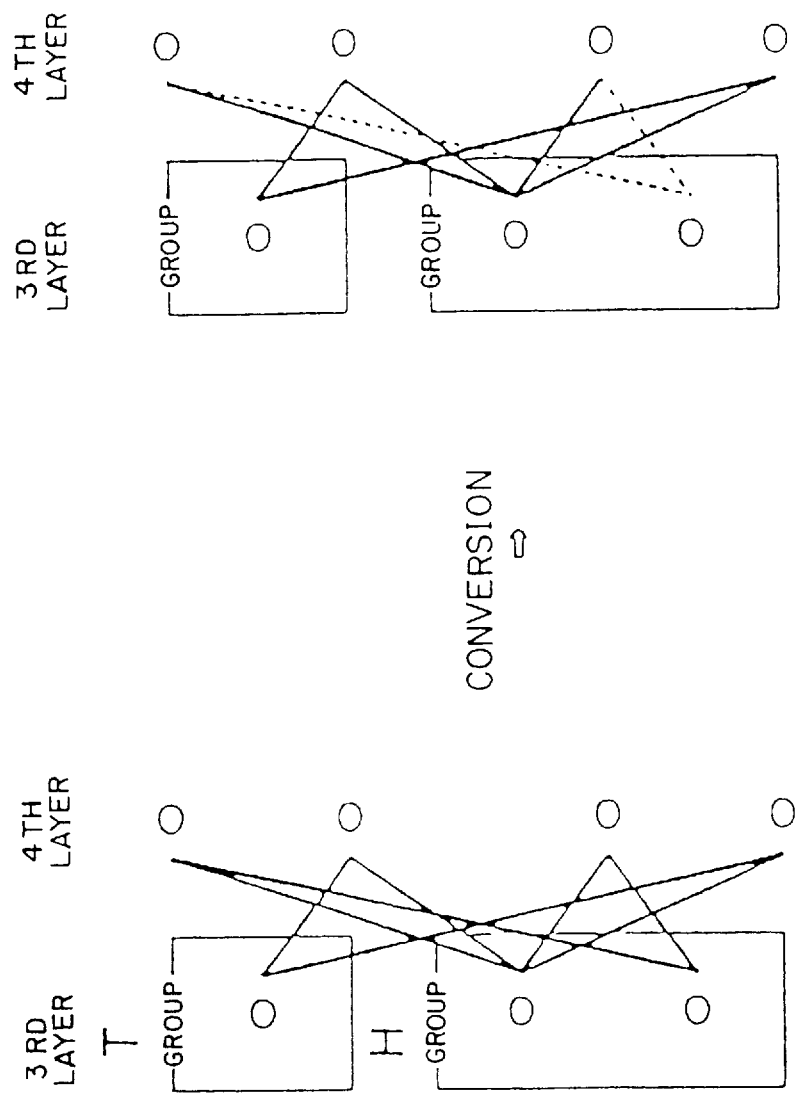
FIG. 69 shows another conversion procedure for a pure neuro shown in FIG. 58.
Figure 70:
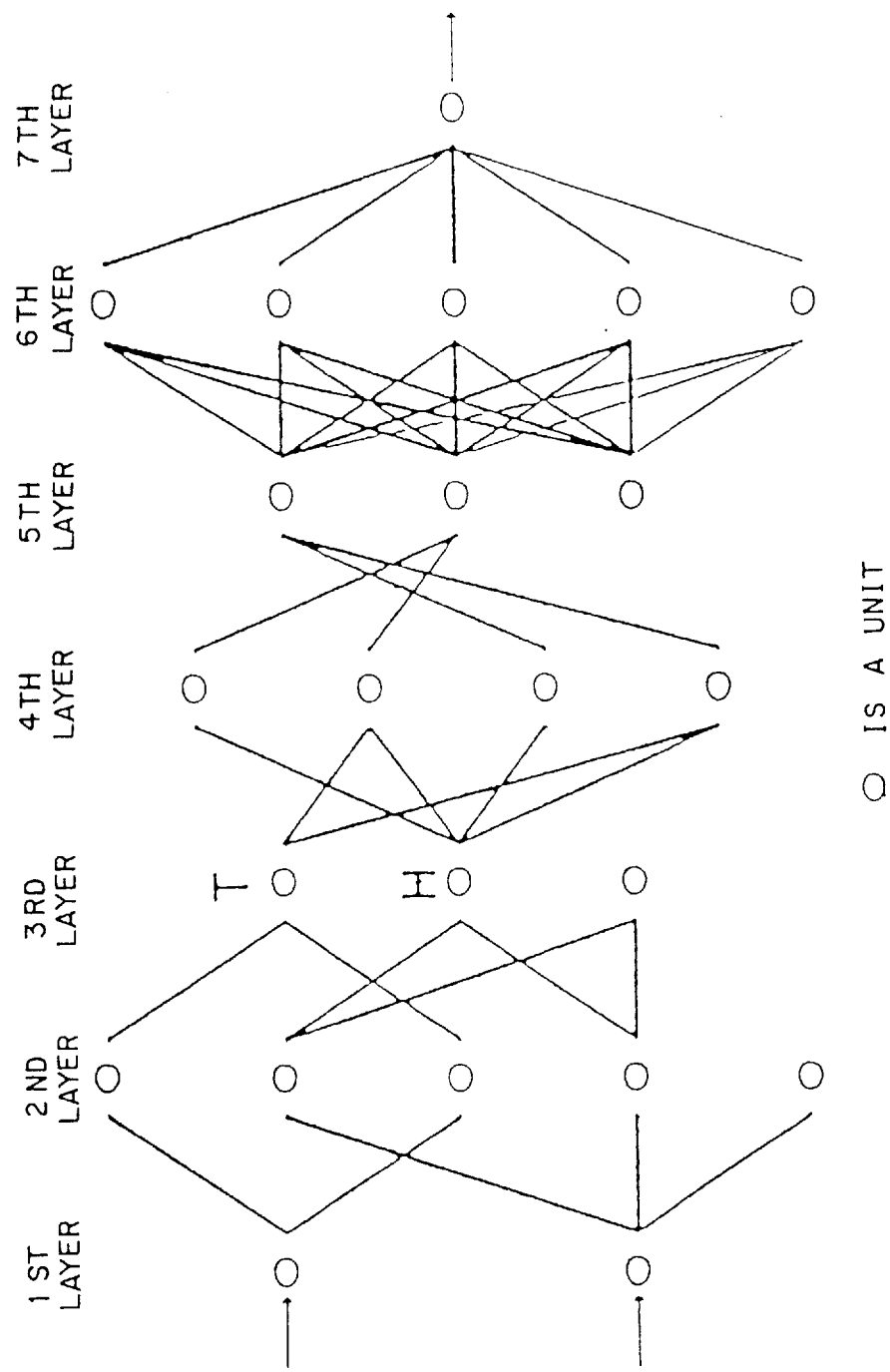
FIG. 70 shows a configuration of a pre-wired-rule-part neuro after the conversion shown in FIG. 69.

In the above example, the conversion procedure (3) is adopted, but (3) can be replaced with the grading process for the units in the third layer. For example, as shown in FIG. 69, the units in the third layer can be graded to a temperature group and a humidity group in response to input variables. Then, only one line of the connection from a unit concentrating on the units in the fourth layer are reserved, and all other lines are deleted. The broken line in FIG. 69 shows a weight value of the deleted connection. FIG. 70 shows a pre-wired-rule-part neuro after the conversion described above. Weight values of the connection are shown in FIG. 71. In FIG. 71, ****** shows a weight value of the deleted connection.

Figure 72:
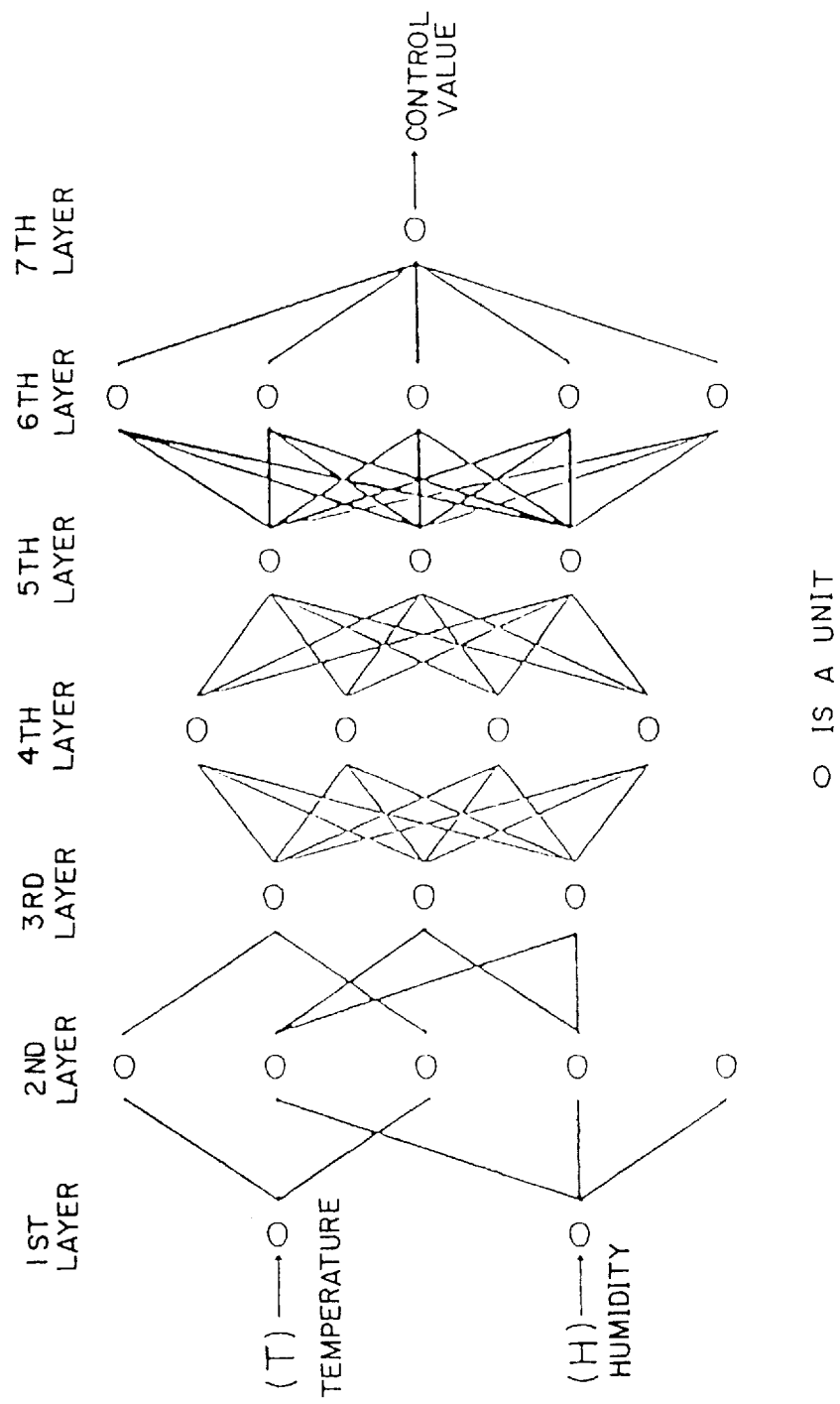
FIG. 72 shows an embodiment of a completely-connected-rule-part neuro.

In the above described conversion procedure from a pure neuro to a pre-wired-rule-part neuro, performing only steps (1), (2), and (5) generates the completely-connected-rule-part neuro shown in FIG. 72. In the first layer, two variables representing temperature and humidity, respectively, are inputted. The second and third layers correspond to a antecedent membership function; the units in the fifth and sixth layers correspond to a latter membership function. Calculation in the sixth and seventh layers is performed for a non-fuzzy process, thus outputting a resultant output value.

In FIG. 72, in tracing the weight of the connection from each unit in the third layer (three units in FIG. 66) which outputs a grade value of a antecedent membership function, the first unit in the third layer outputs a grade value of a antecedent membership function associated with the temperature (T) of an input variable. The second and third units, when traced likewise, outputs a grade value of a antecedent membership function associated with the humidity (H) of an input variable.

Next, in association with each unit of the fifth layer (three units in FIG. 66), the weight of the connection between the fifth and sixth layers compared with the weight of the connection between the sixth and seventh layers is normalized. This is indicated in a graph as shown in FIGS. 67-①–67-③. In FIG. 67, the abscissa shows the weight of the connection between the sixth and seventh layers. That is, it shows where the grade value of an output value of a unit in the sixth layer points to on the axis of coordinates of an output value of a latter membership function. The axis of ordinates shows the weight of the connection from a unit in the sixth layer to a unit in the fifth layer. That is, it corresponds to a grade value at the specified point on the axis of an output value of a latter membership function corresponding to each unit in the fifth layer. Weight values of the connection are shown in FIG. 73. In FIG. 73, ****** shows a weight value of the deleted connection.

Figure 74:
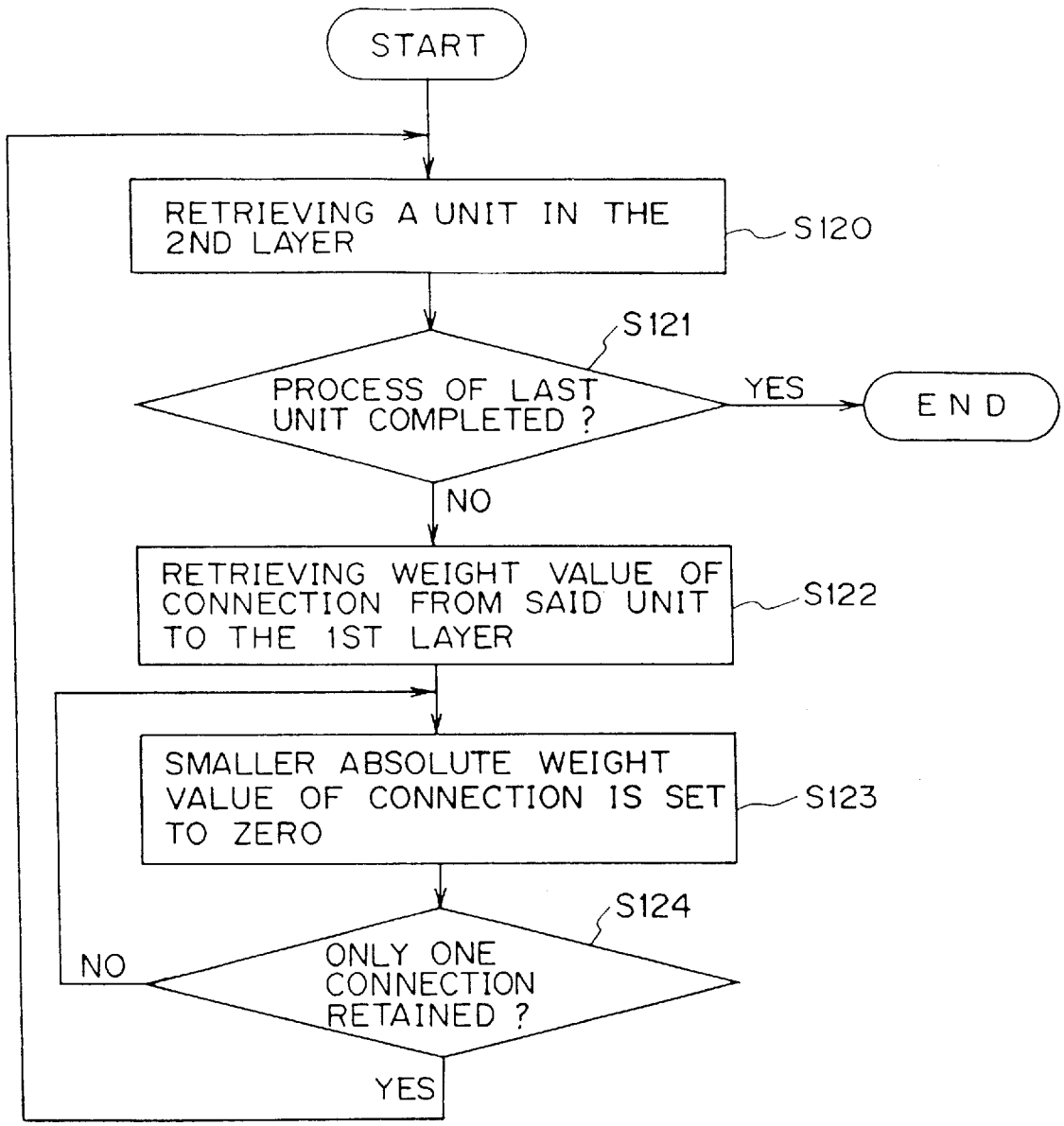
FIG. 74 shows a flowchart (1) of a process after the conversion of a network structure.

FIGS. 74–78 show flowcharts of the conversion of the network structure described above. FIG. 74 corresponds to the process of the conversion procedure (1) shown in FIG. 61, indicating a flow of processes between the first and second layers; that is, a conversion procedure between the input part and the antecedent membership function part in FIG. 52, where one unit in the second layer is retrieved in S120. A determination is made as to whether or not a process of the last unit in the second layer is completed in S121 and a weight value of the connection from the first layer to the unit is retrieved in S122 when the process of the last unit is not completed yet.

In S123, the minimum absolute value in the weight values of the connection is considered 0. In S124, determination is made as to whether or not only one line of the connection is reserved. If more than one line is reserved, the process is restarted at S123. When only one line of the connection is reserved in S124, control is returned to S120, the next unit in the second layer is retrieved, the process is restarted at S121, and the whole conversion procedure is completed when the process of the last unit in the second layer terminates.

Figure 75:
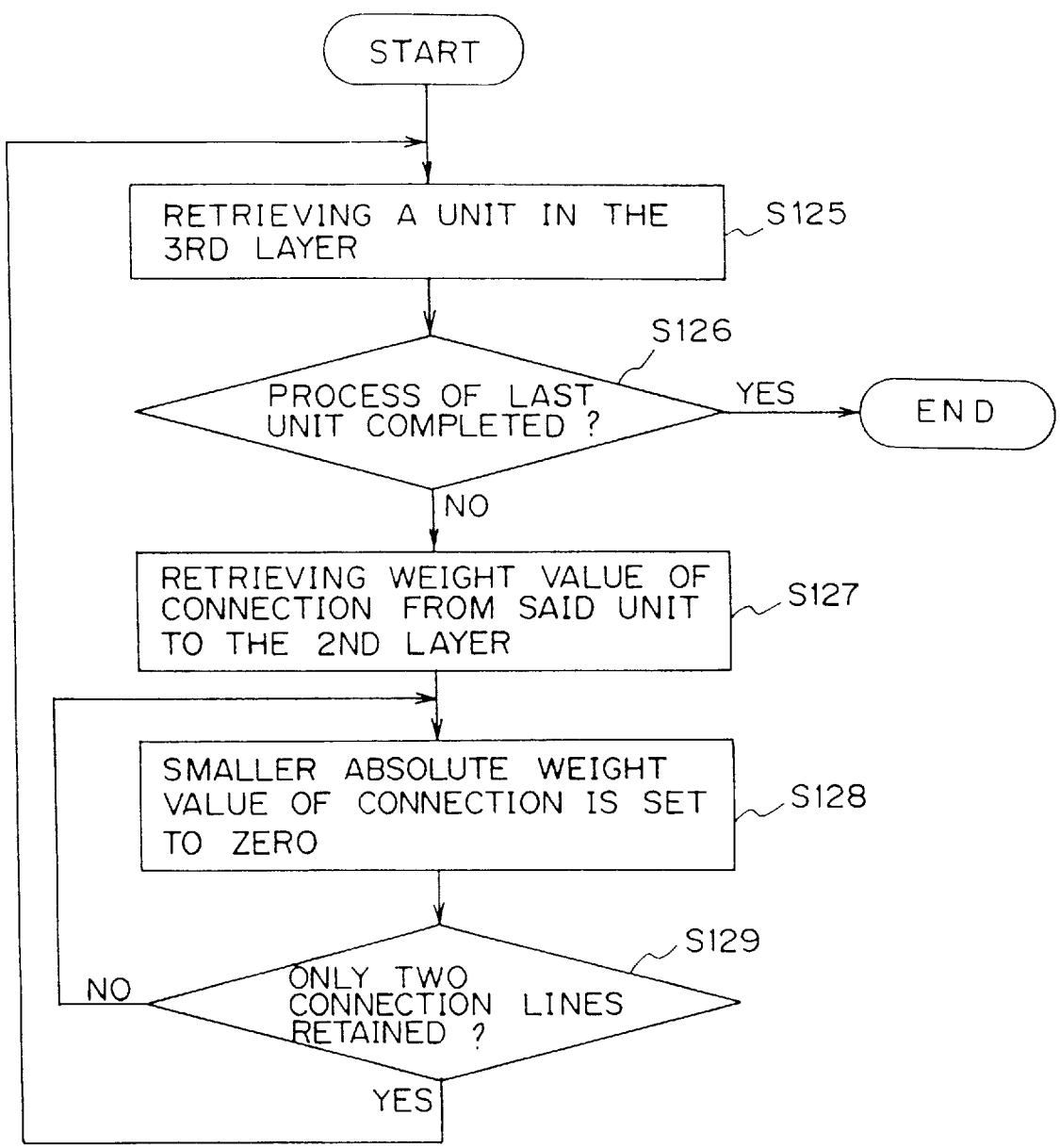
FIG. 75 shows a flowchart (2) of a process after the conversion of a network structure.

FIG. 75 shows a flowchart of a conversion procedure (2) shown in FIG. 62. The second and third layers and FIG. 52 show a flowchart of a conversion procedure of the connection between the antecedent membership function part and the antecedent membership function output part. This process resembles FIG. 74, but is different in that the connection to a unit in the third layer is deleted with two lines of the connection reserved in S129.

Figure 76:
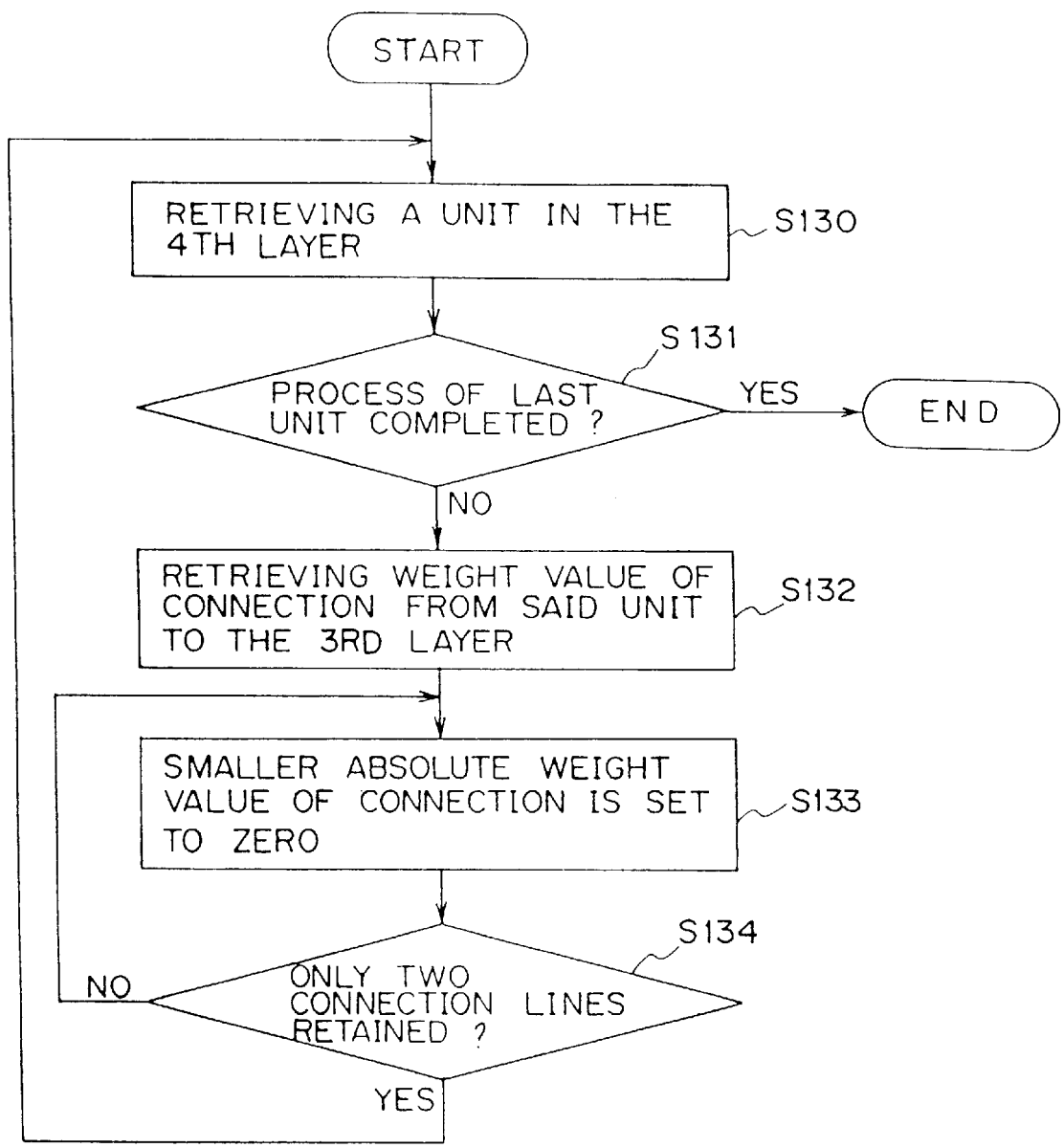
FIG. 76 shows a flowchart (3) of a process after the conversion of a network structure.

FIG. 76 shows a flowchart of a conversion procedure between the third and fourth layers, that is, the conversion procedure (3) shown in FIG. 63. In FIG. 52, it corresponds to deletion of the connection between the antecedent membership function part and the rule part. This process is essentially identical to the conversion procedure between the second and third layers shown in FIG. 75.

Figure 77:
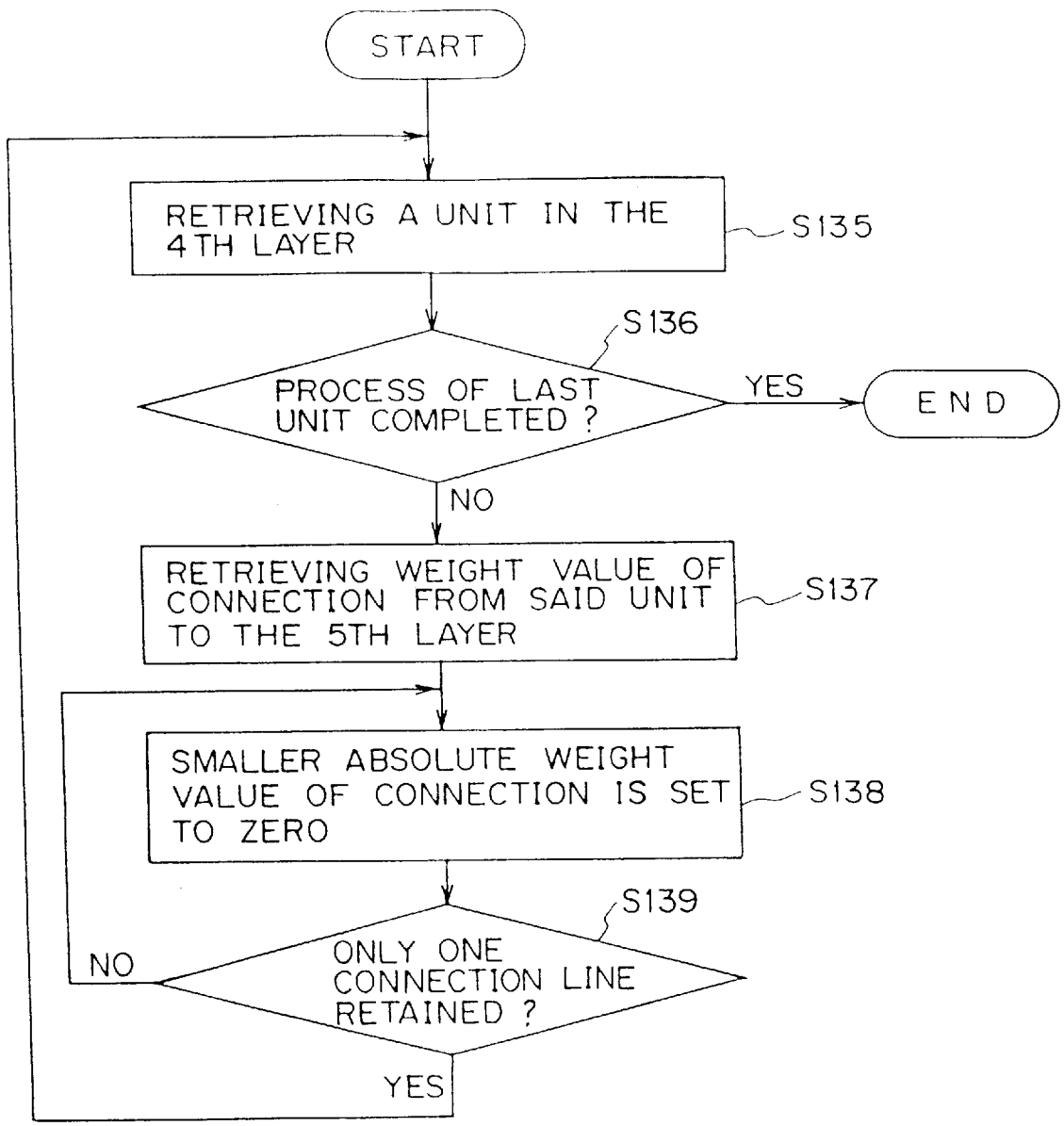
FIG. 77 shows a flowchart (4) of a process after the conversion of a network structure.

FIG. 77 shows a flowchart of the process between the fourth and fifth layers, that is, a deletion of the connection between the rule part and the latter membership function part. One unit in the fourth layer is retrieved in S135, the weight of the connection from the last unit in the fourth layer to a unit in the fifth layer is retrieved in S137 if the process of the last unit in the fourth layer is not completed yet in S136, one line of the connection having a larger weight value is reserved in S138 and S139, and the procedure is repeated until the process of the last unit is completed in S136.

Figure 78:
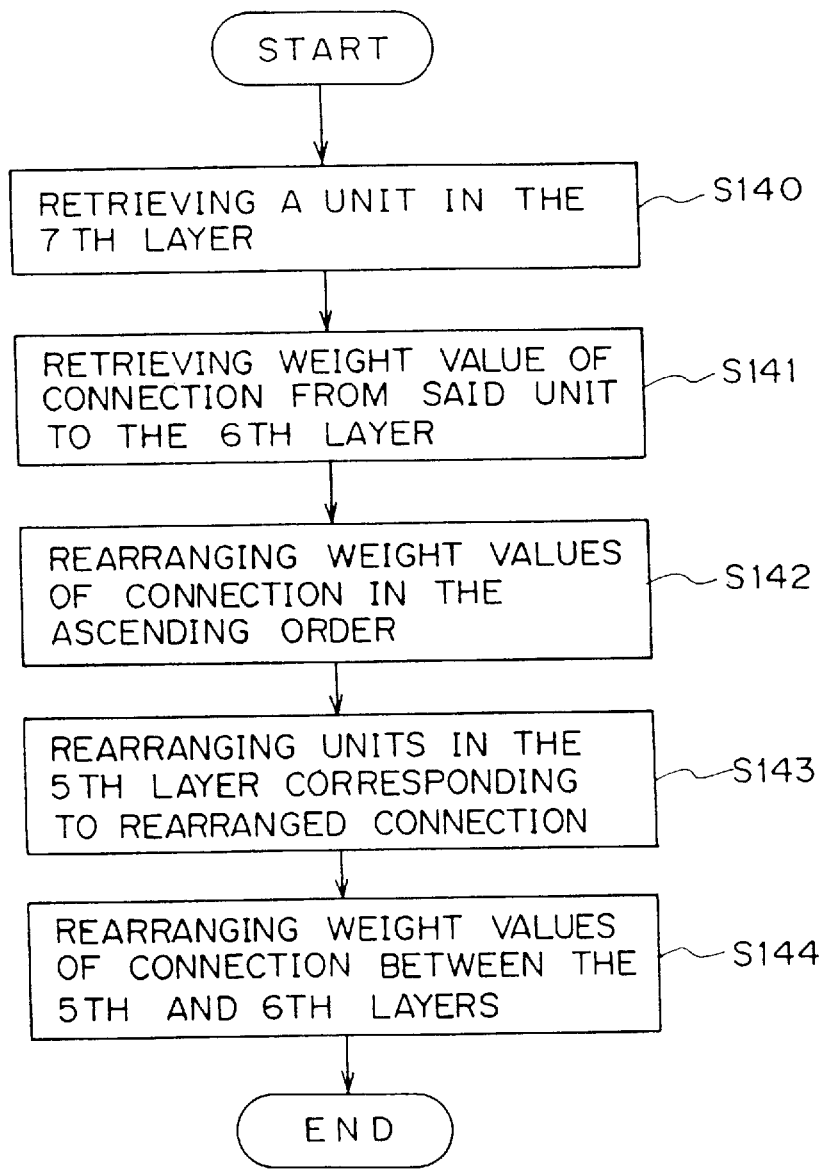
FIG. 78 shows a flowchart (5) of a process after the conversion of a network structure.

FIG. 78 shows a conversion procedure (5) shown in FIG. 65, that is, a re-arranging process of weight values of the connection as a conversion procedure between the fifth and seventh layers. This corresponds to a conversion procedure between the latter membership function part and the non-fuzzy process output in FIG. 52. In FIG. 78, a unit in the seventh layer, that is, an output unit is retrieved in S140, all weight values of the connection from the sixth layer to the unit are retrieved in S141, weight values are rearranged in ascending order from the smallest value in S142, units in the sixth layer are rearranged corresponding to the rearranged connection in S143, and weight values of the connection from the fifth layer to the sixth layer are rearranged in S144 corresponding to the rearrangement, thus terminating the process.

Figure 79:
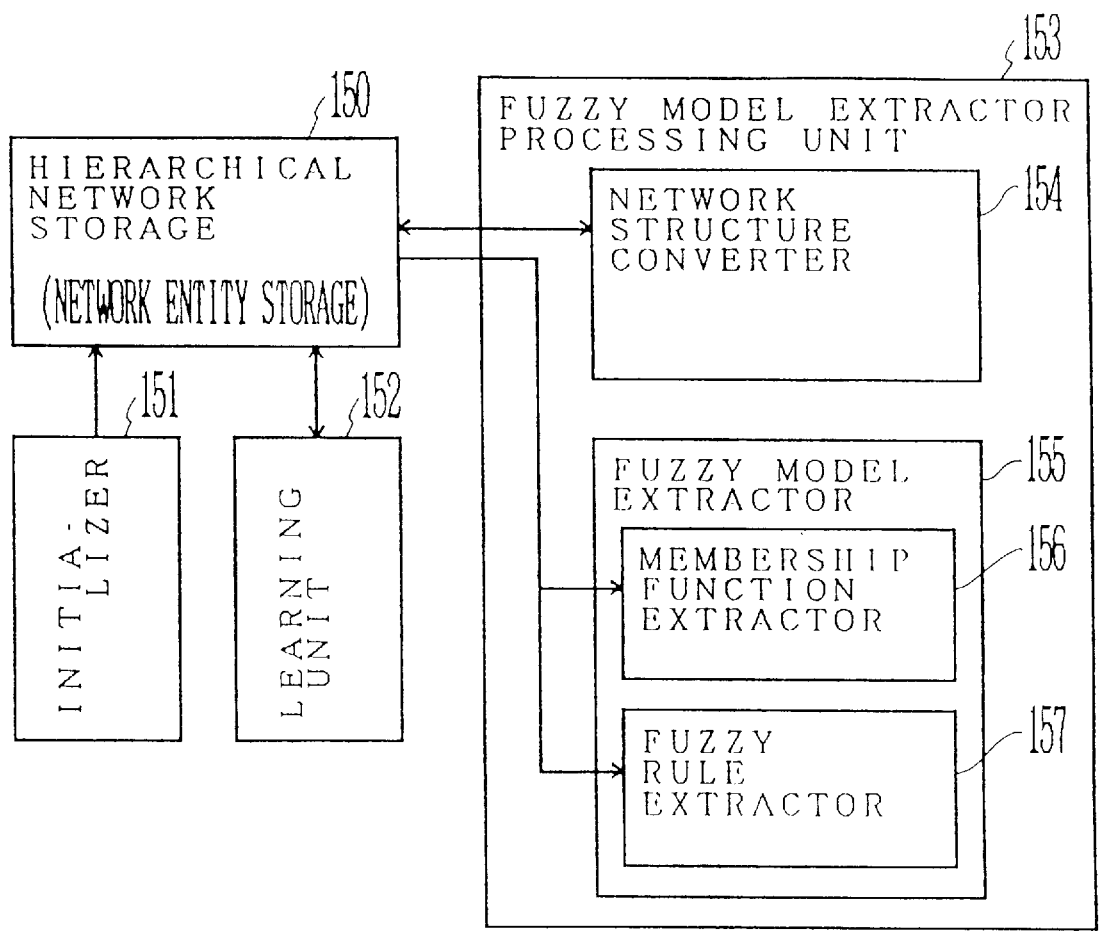
FIG. 79 shows a total configuration of a neuro-fuzzy-integrated data processing system.

Next, a system configuration of a neuro-fuzzy-integrated data process system associated with the present invention is described as follows:

FIG. 79 shows a total system configuration. In FIG. 79, 150 shows a hierarchical network storage unit for storing the entity of a hierarchical neural network; 151 shows an initializer for initializing a antecedent membership function realizer, latter membership function realizer, and center-of-gravity calculator, and rule part respectively in the hierarchical neural network; 152 shows a learning unit for making a hierarchical neural network learn a target system; 153 shows a fuzzy teacher extractor for extracting a membership function and a fuzzy rule of a fuzzy teacher from a learned hierarchical neural network; 154 shows a network structure converter for converting a pure neuro to a completely-connected-rule-part neuro or to a pre-wired-rule-part neuro, or converting a completely-connected-rule-part neuro to a pre-wired-rule-part neuro; 155 shows a fuzzy teacher extractor for extracting a fuzzy teacher from a completely-connected-rule-part neuro or a pre-wired-rule-part neuro; 156 shows a membership function extractor for extracting a membership function; and 157 shows a fuzzy rule extractor for extracting a fuzzy rule. The detailed explanation associated with FIG. 79 is given as follows:

The hierarchical network storage 150 stores a network of a pre-wired-rule-part neuro, completely-connected-rule-part neuro, or a pure neuro, and a network in the conversion process of these network structures.

In the initialization, the initializer 151 sets, for example, a pre-wired-rule-part neuro as a hierarchical network. For setting a antecedent membership function, a weight value and a threshold are determined for Sigmoid function units. 21a–21d shown in FIG. 5 as described in FIGS. 8–10.

Figure 80:
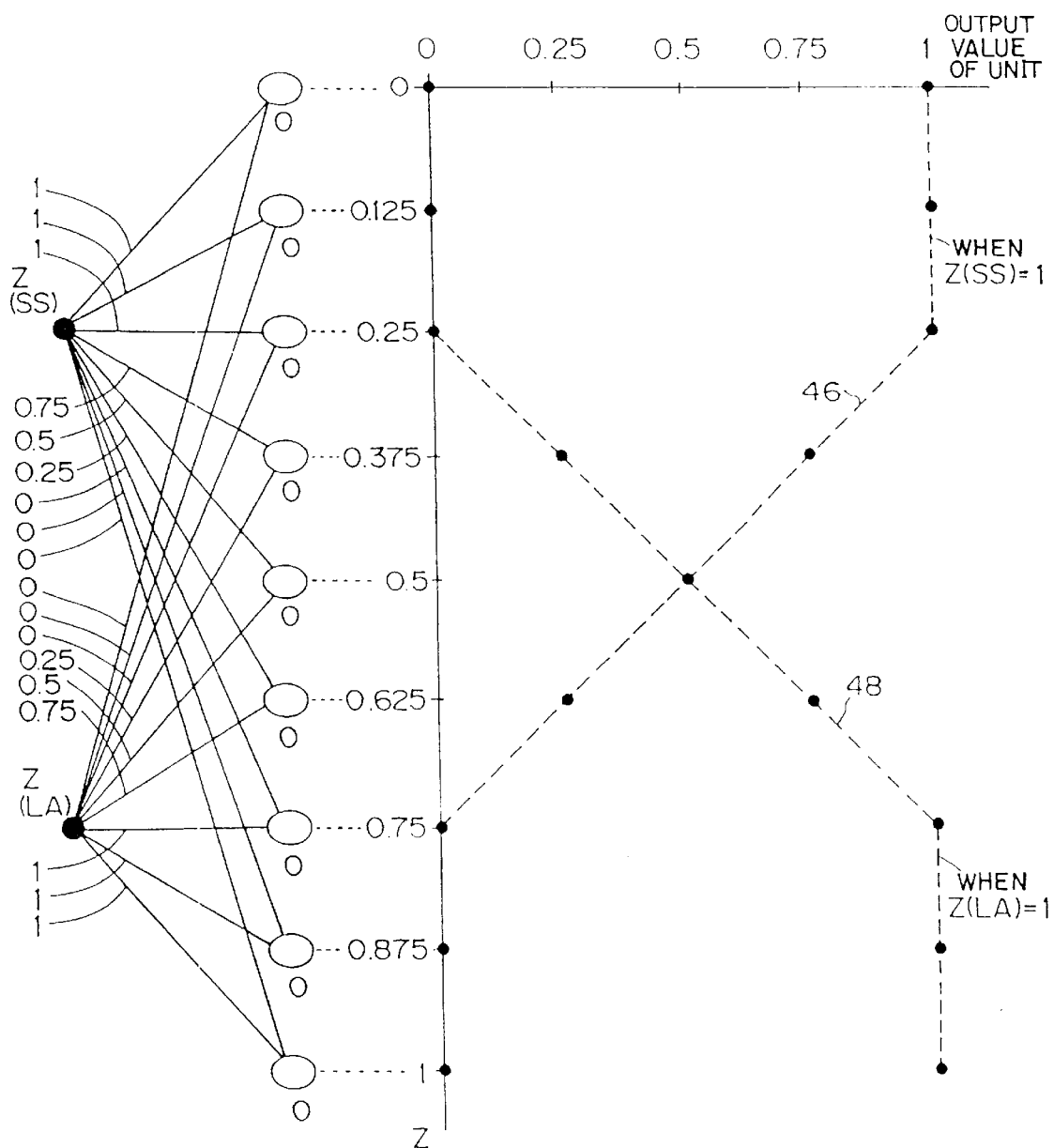
FIG. 80 shows an example of the initialization of a consequent membership function realizer.

A latter membership function is set according to the method shown in FIG. 11. FIG. 80 shows an example of setting the weight of the connection between the units 24a and 24b of the rule part and the units 25a–25n of the latter membership function realizer. A grade value of a latter membership function is set for the connection at each value of the abscissa.

Figure 81:
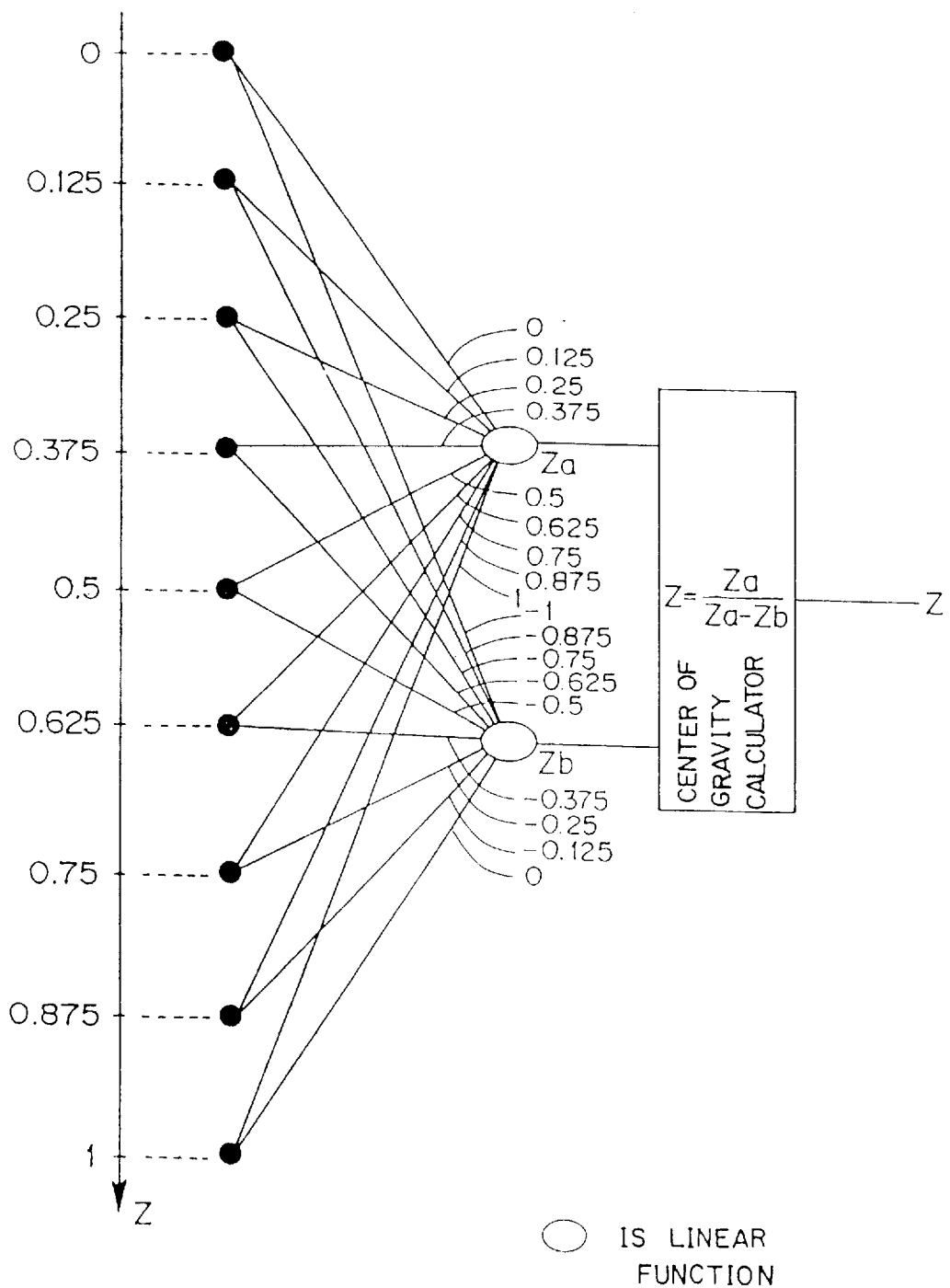
FIG. 81 shows an example of the initialization of a center-of-gravity calculator.

A weight value of the connection in the center-of-gravity calculation realizer is initialized in the method shown in FIG. 30. FIG. 81 shows an embodiment of this concept. A weight value of the connection corresponding to each value of the abscissa is determined according to the expression (14).

Finally, for performing fuzzy logic operation in the rule part, the weight values and thresholds of the Sigmoid function units 23a–23e in the rule part shown in FIG. 5 are determined in the method shown in FIGS. 12–15 according to the type of logical operation applicable to each fuzzy rule.

Figure 82:
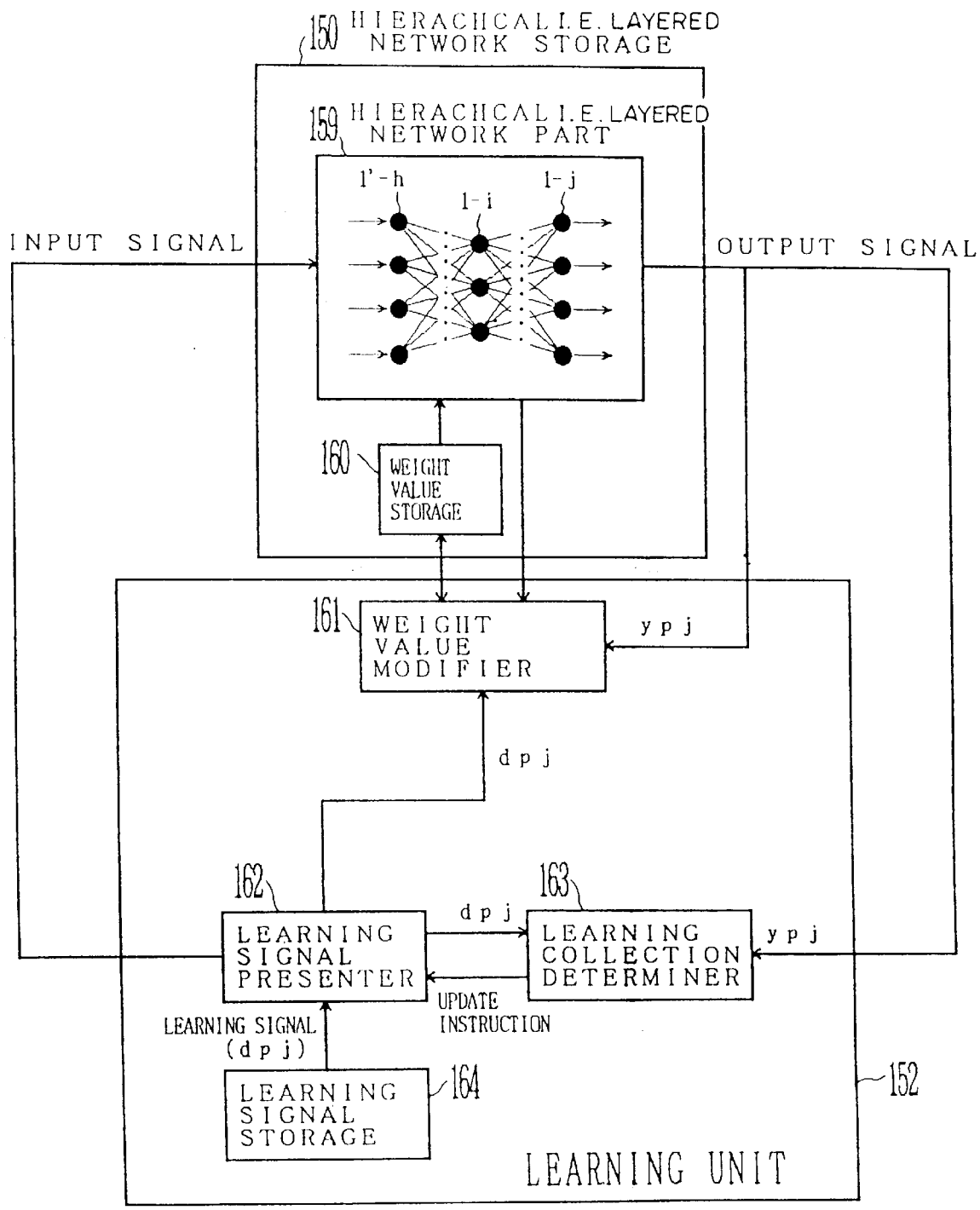
FIG. 82 shows a detailed configuration of a learning unit.

FIG. 82 shows a detailed explanation of the learning unit 152. In FIG. 82, l'-h in a hierarchical network 159 shows an input unit comprising an input layer; l-i shows a processing unit forming an intermediate layer (many layers can be provided); and l-j shows a processing unit forming an output layer. 160 shows a weight value manager for managing a weight value of the connection between layers. 161 shows a weight value modifier for updating a weight value based on the back propagation method according to an error value after the learning. 164 shows a learning signal storage unit for storing a learning signal comprising a pair of an input signal pattern and an output signal pattern determined by the input/output relationship of a target system. $d_{pj}$ in a learning signal shows a teacher signal to the jth unit in the jth layer in response to the pth input parameter.

162 shows a learning signal presenter for retrieving a learning signal from the learning signal storage 164 according to learning instruction, thus providing an input signal for the hierarchical network 159 as an input, and outputting the teacher signal $d_{pj}$ to the weight value modifier 161 and a learning collection determiner 163.

163 shows a learning collection determiner for receiving an output signal $y_{pj}$ of the hierarchical network part 159 and a teacher signal $d_{pj}$ from the learning signal presenter 162, determining whether or not an error of the data processing capabilities of the hierarchical network part 159 is within the allowable range, and notifying the learning signal presenter 162 of the determination result.

Next, the detailed explanation of the fuzzy teacher extractor 153 shown in FIG. 79 is given as follows in association with FIGS. 83–89.

Figure 83:
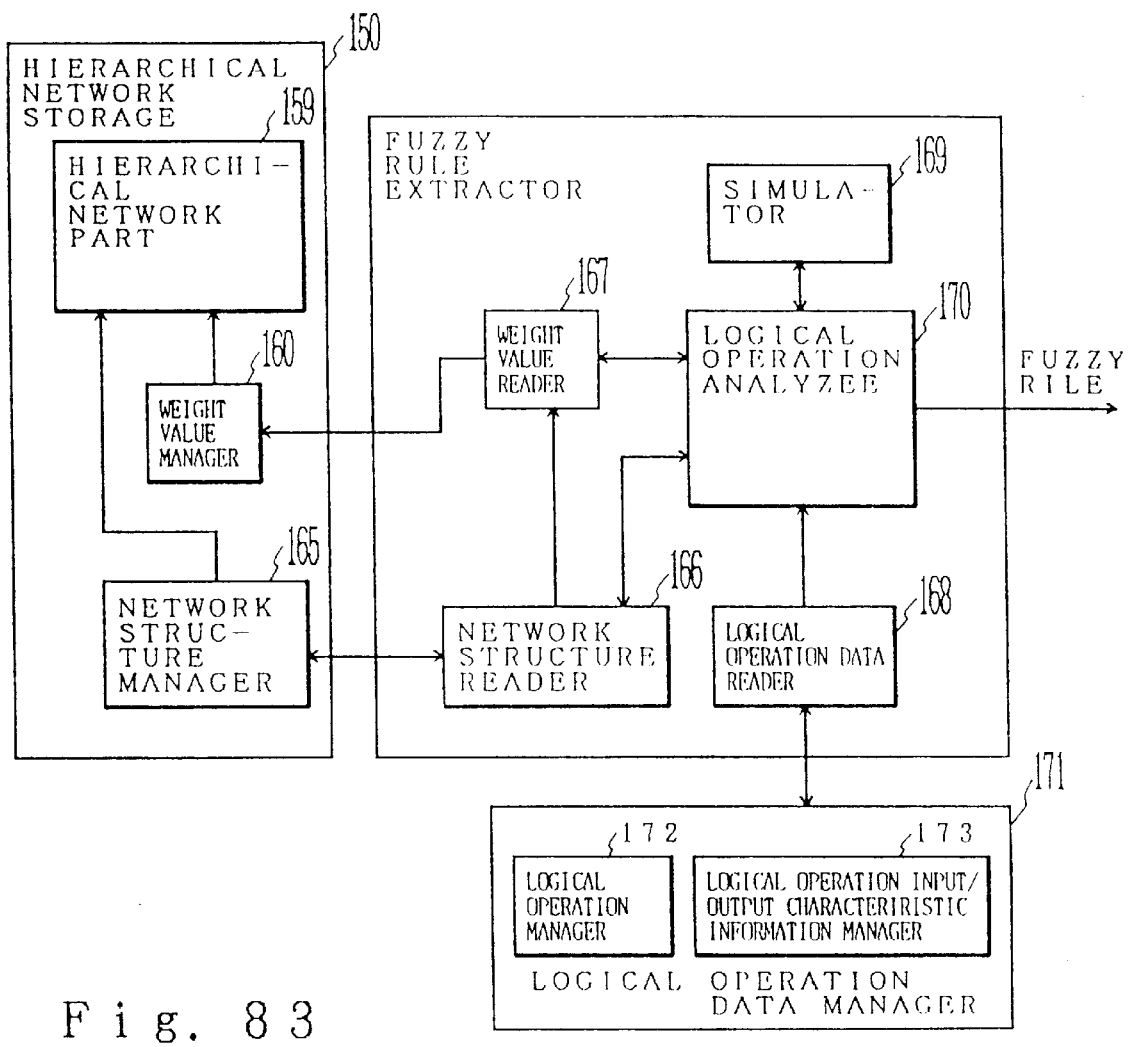
FIG. 83 shows a detailed configuration of a fuzzy rule extractor.

FIG. 83 shows a detailed configuration of the fuzzy rule extractor 157 in the fuzzy teacher extractor 153.

In FIG. 83, 159 shows a hierarchical network part, 157 shows a fuzzy rule extractor, 160 shows a weight value manager, 165 shows a network structure manager, 166 shows a network structure reader, 167 shows a weight value reader, 168 shows a logical operation data reader, 169 shows a simulator, 170 shows a logical operation analyzer, 171 shows a logical operation data manager, 172 shows a logical operation manager, and 173 shows a logical operation input/output characteristic information manager.

The fuzzy rule extractor 157 analyzes the state of the hierarchical network part 159 according to the information provided by the weight value manager 160 and the network structure manager 165, and identifies the type of the logical operation of a unit of the rule part for a logical element process. The logical operation data manager 171 provides for the fuzzy rule extractor 157 administrative data such as characteristic information, etc. of a specific logical element necessary for identifying the type of logical operation.

Figure 84:
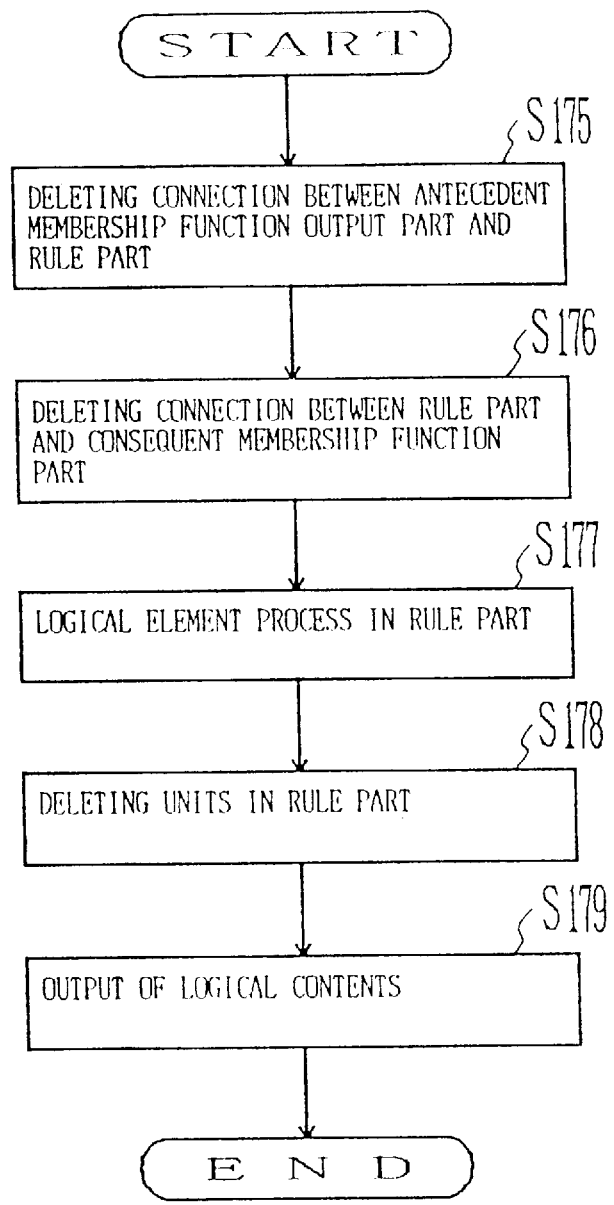
FIG. 84 shows a flowchart of an embodiment for extracting a fuzzy teacher.

FIG. 84 shows a flowchart of an operational procedure of the fuzzy teacher extractor 153.

First, administrative data to be managed by the logical operation manager 172 and the logical operation input/output characteristic information manager 173 in the logical operation data manager 171 is explained as follows:

When a unit 1 applies two input x and y ($0 \leq x$, $y \leq 1$), the unit 1 outputs an output value z as shown in FIG. 12:

$$z = 1/1 + \exp(-W_x X - W_y Y + \theta)$$

The unit 1 performs an input/output process equivalent to various logical operations such as logical product operation, logical sum operation, etc. using a weight value $W_x$, $W_y$, and a threshold $\theta$ as shown in FIG. 85. That is, the operation equivalent to the logical sum operation is performed where either x or y shows "1" as shown in FIG. 85A and, as a result, z outputs "1" when the following expression exists:

$$W_x = 12.0, W_y = 12.0, \theta = 6.0 \qquad (1)$$

On the other hand, the operation equivalent to the logical product operation is performed where x shows "0" and y shows "1" as shown in FIG. 85B and, as a result, z outputs "1" when the following expression exists:

$$W_x = -12.0, W_y = 12.0, \theta = 6.0 \qquad (2)$$

The operation is performed where any values are available for x and y as shown in FIG. 85C and, as a result, z outputs "0" when the following expression exists:

$$W_x = -12.0, W_y = -12.0, \theta = 6.0 \qquad (3)$$

The operation is performed where any values are available for x and y as shown in FIG. 85D and, as a result, z outputs "1" when the following expression exists:

$$W_x = 12.0, W_y = 12.0, \theta = 6.0 \qquad (4)$$

The operation is performed where any values are available for x and y as shown in FIG. 85E and, as a result, z outputs a value approximate to an average of x and y when the following expression exists:

$$W_x = 3.0, W_y = 3.0, \theta = 3.0 \qquad (5)$$

The operation (x operation) is performed where any values are available for x and y as shown in FIG. 85F and, as a result, z outputs a value approximate to the value of x when the following expression exists:

$$W_x = 5.0, W_y = 0.0, \theta = 2.5 \qquad (6)$$

The logical operation manager 172 in the logical operation data manager 171 manages which type of logical operation is performed by the unit 1 according to the logical operation corresponding to the unit 1 and original signs of a weight value and a threshold if the signs of two input of the unit 1, a weight value and a threshold, are adjusted to be positive for simplification of the operation.

FIG. 86 shows an example of administrative data of the logical operation manager 172.

FIG. 86A shows administrative data to be used when the addition is implied for the unit 1 with the signs of the weight value and the threshold of the unit 1 adjusted to be positive. FIG. 86B shows administrative data to be used when the multiplication is implied for the unit 1 with the signs of the weight value and the threshold of the unit 1 adjusted to be positive. FIG. 86C shows administrative data to be used when the averaging operation is implied for the unit 1 with the signs of the weight value and the threshold of the unit 1 adjusted to be positive. FIG. 86D shows administrative data to be used when the operation where a value of x is outputted "as is" is implied for the unit 1 with the signs of the weight value and the threshold of the unit 1 adjusted to be positive. FIG. 86E shows administrative data to be used when the operation (where a value of y is outputted) is implied for the unit 1 with the signs of the weight value and the threshold of the unit 1 adjusted to be positive.

In FIG. 86, "−x AND y" describes the multiplication shown in FIG. 85B; "permanently false" means the logical operation shown in FIG. 85C; "permanently true" means the logical operation shown in FIG. 85D; "MEAN (x,y)" means the averaging operation shown in FIG. 85E; "x" means the operation shown in FIG. 85F; and "−x" means the negation of x, that is, "1−x".

On the other hand, the logical operation input/output characteristic information manager 173 in the logical operation data manager 171, for example in the 2-input-to-1-output process, manages input/output data for various logical operation to be referred to in the matching process after the normalization by adjusting the signs of the weight value and the threshold of the unit 1 to be positive.

That is, as shown in FIGS. 87 and 88, the logical operation input/output characteristic information manager 173 manages input/output data for various logical operation such as:

logical product operation for outputting whichever is smaller between x and y;
logical sum operation for outputting whichever is larger between x and y;
algebraic product operation for outputting (xXy);
algebraic sum operation for outputting (x+y−xXy);
critical product operation for outputting (0v(x+y−1)) (v shows a logical-sum symbol);
critical sum operation for outputting (1Λ(x+y)) (Λ shows a logical-product symbol);
acuity product operation for outputting y when x equals 1, outputting x when y equals 1, and outputting 0 when neither x nor y equal 1;
acuity sum operation for outputting y when x equals 0, outputting x when y equals 0, and outputting 1 when neither x nor y equal 0;
averaging operation of the above described operation;
"x as is" operation;
"y as is" operation;
permanently false operation; and
permanently true operation.

Next, capabilities of the network structure manager 165, network structure reader 166 forming the fuzzy rule extractor 157, weight value reader 167, logical operation data reader 168, simulator 169, and logical operation analyzer 170 are explained as follows:

The network structure manager 165 manages all information associated with the hierarchical network configuration relative to, for example, which network structure the hierarchical network part 159 has, or which function operation capabilities are allocated to a unit 1.

The network structure reader 166 reads information stored in the network structure manager 165 and notifies the logical operation analyzer 170 of the information.

The weight value reader 167 refers to the management information of the network structure manager, reads learning values such as a weight value and a threshold of a unit 1 of the rule part from the weight value manager 160, and notifies the logical operation analyzer 170 of these values.

The logical operation data reader 168 reads management data of the logical operation manager 172 and the logical operation input/output characteristic information manager 173, and notifies the logical operation analyzer 170 of the data.

The simulator 169, when notified by the logical operation analyzer 170 of leaning values such as a weight value and a threshold with each sign arranged to be positive, simulates function operation capabilities of a unit 1 of the rule part and obtains an output value when an input value is applied within the input range managed by the logical operation input/output characteristic information manager 173, thus obtaining input/output data characteristic information of the unit 1.

The logical operation analyzer 170 analyzes the content of the logic being executed by each of unit 1 in the rule part according to input/output data characteristic information provided by the simulator 169 when notified by the logical operation data reader 168 of management data of the logical operation data manager 171, thus extracting a fuzzy rule from the hierarchical network part 159.

Then, according to the flowchart shown in FIG. 84, an embodiment of a process that is executed by the fuzzy model extractor 153 will be explained in detail.

The network structure converter 154 first deletes the connection (internal connection) between, for example, the antecedent membership function output part and the rule part shown in FIG. 49 as indicated by step S175 so that a fuzzy rule can be extracted from the hierarchical network part 159. The connection can be deleted in several ways.

In this case, the connection to a unit 1 in the rule part should be made by two lines which accept a different input variable and are selected as having the largest and the second largest absolute weight values.

Then, the network structure converter 154 deletes the connection between the rule part and the latter membership function output part as shown in S176.

When the connection is thus simplified, the logical operation analyzer 170 shown in FIG. 83 performs a logical element process on a unit of the rule part as shown in S177.

Figure 89:
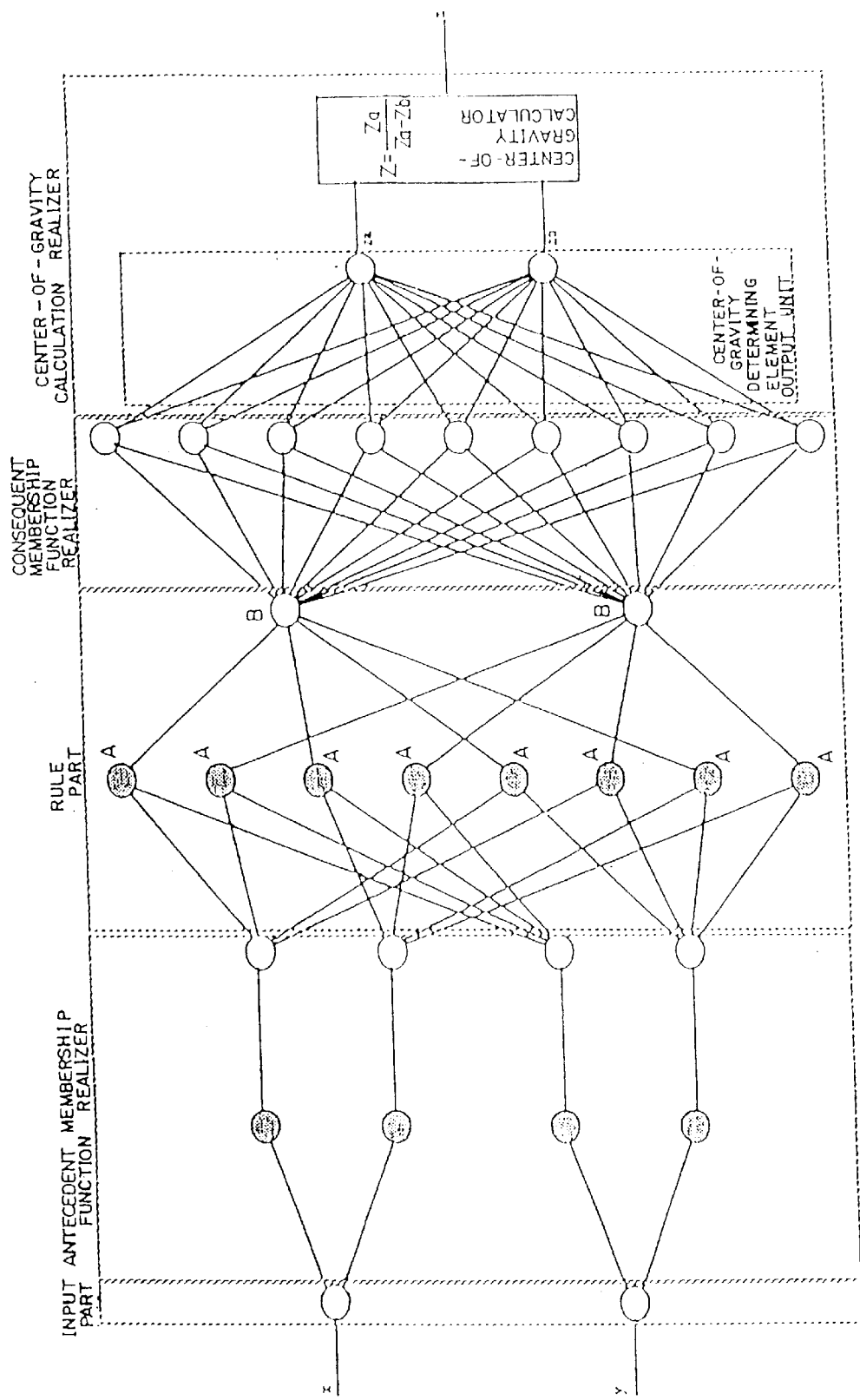
FIG. 89 shows units in the rule part in the pre-wired-rule-part neuro represented in logical element.
Figure 90:
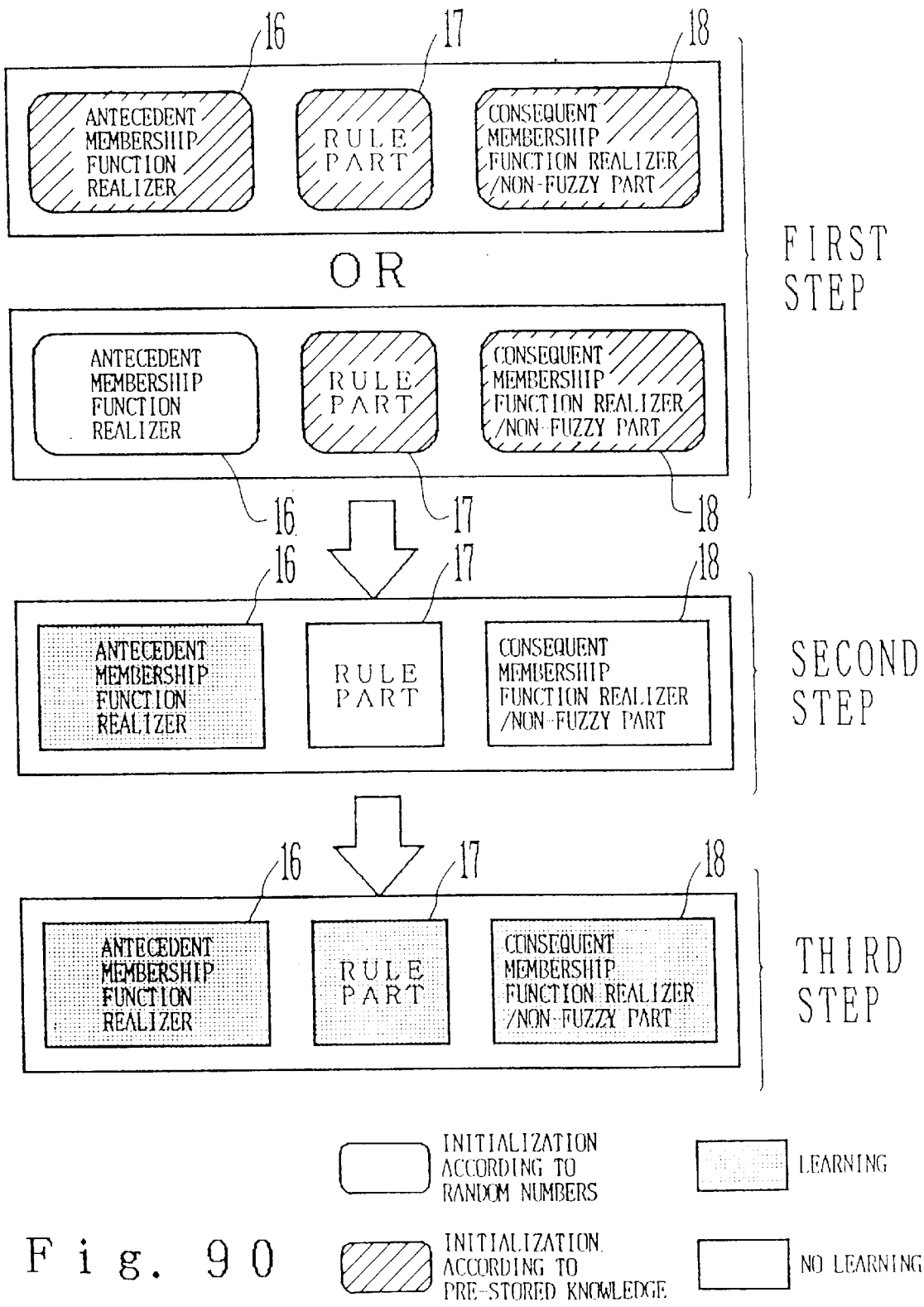
FIG. 90 shows a configuration of the first learning method.
Figure 91:
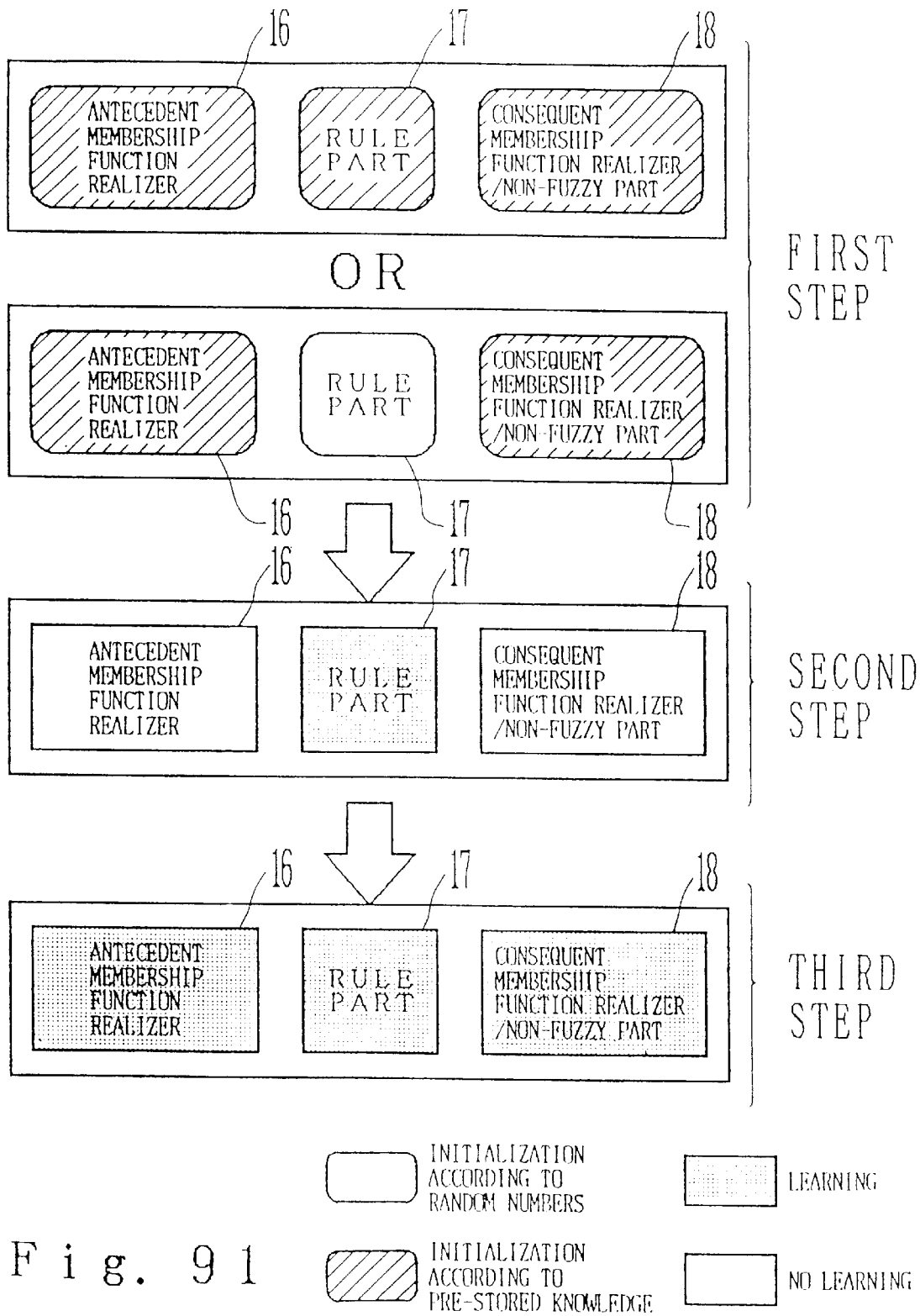
FIG. 91 shows a configuration of the second learning method.
Figure 92:
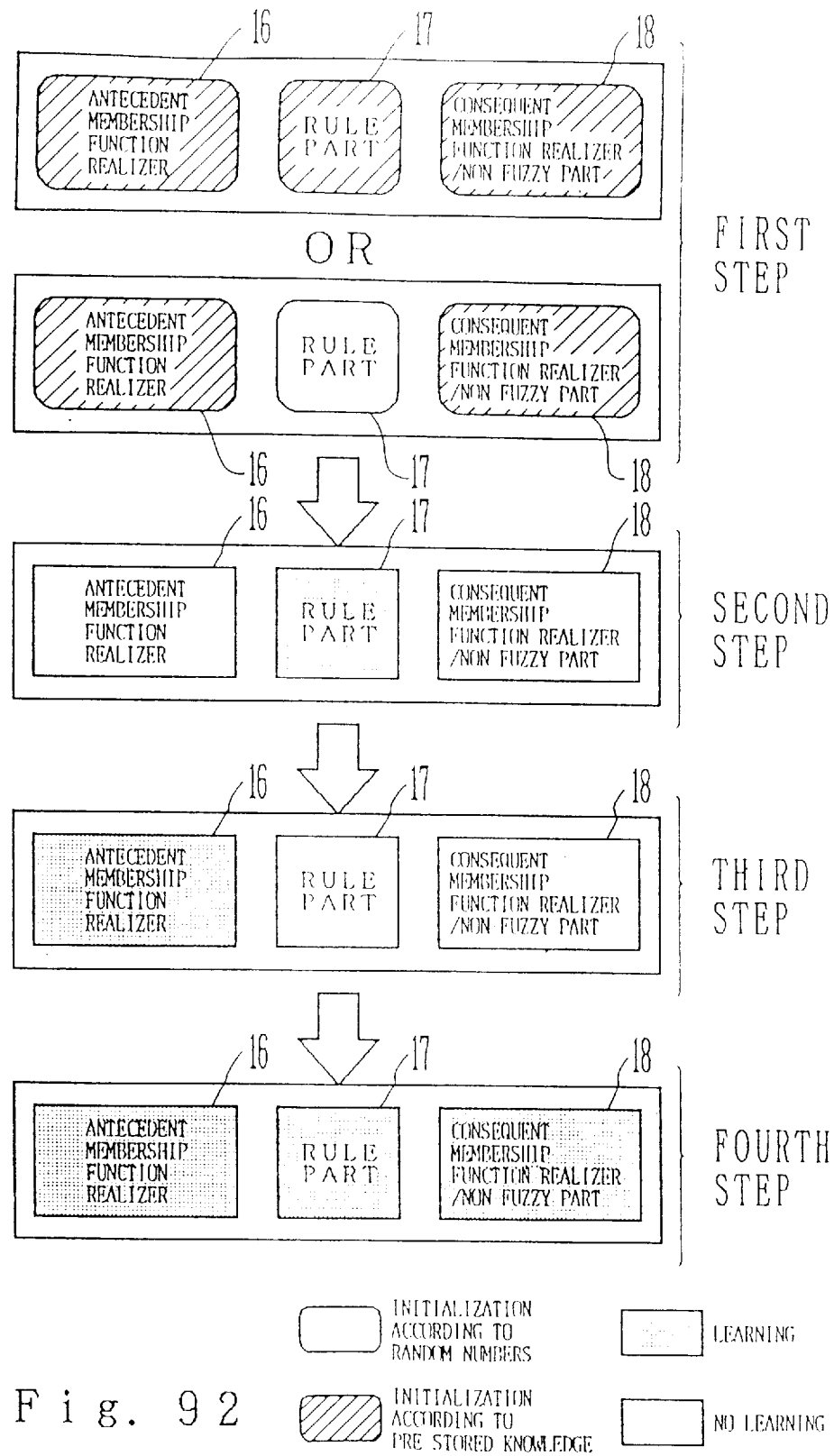
FIG. 92 shows a configuration of the third learning method.
Figure 93:
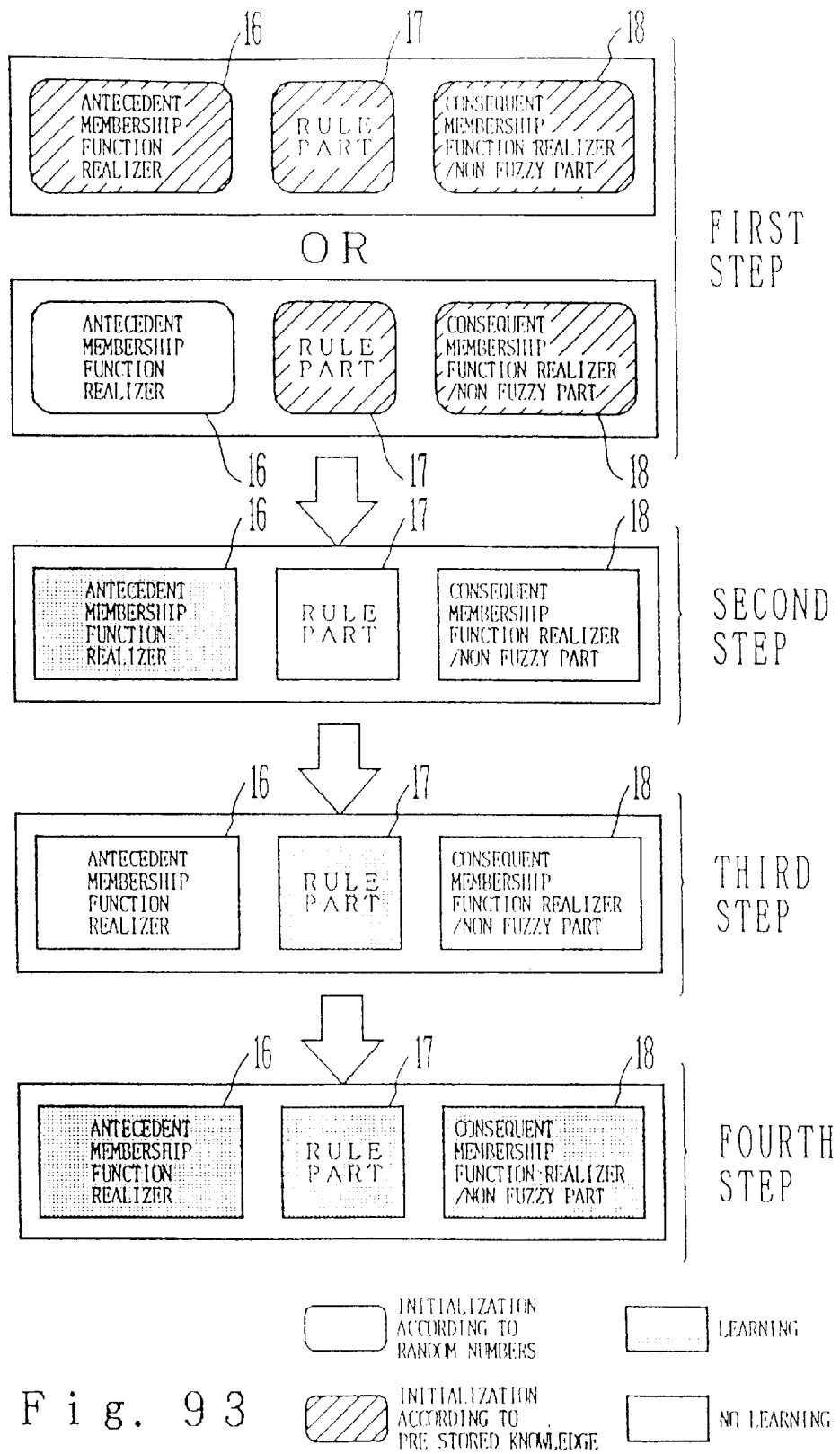
FIG. 93 shows a configuration of the fourth learning method.
Figure 94:
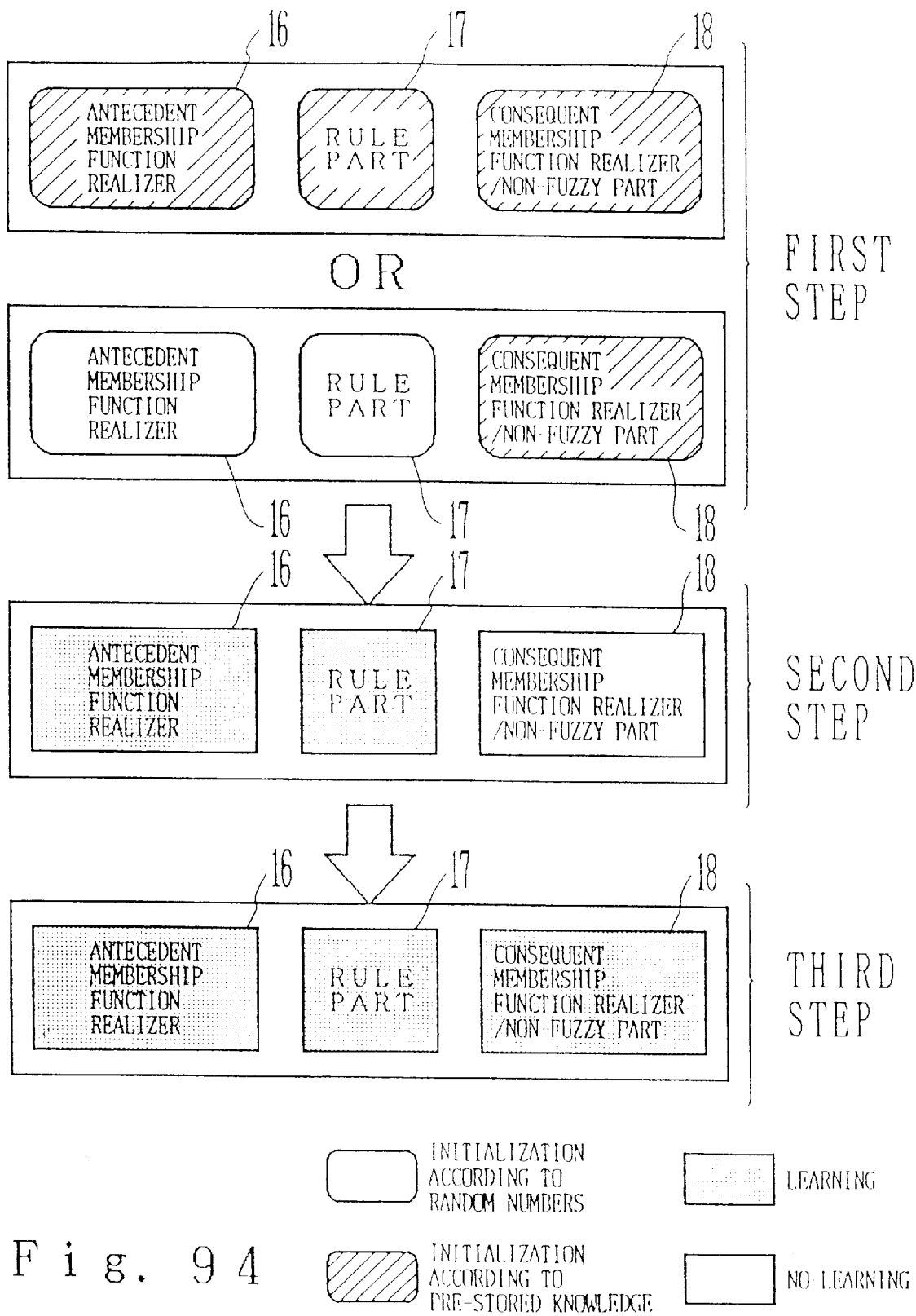
FIG. 94 shows a configuration of the fifth learning method.
Figure 95:
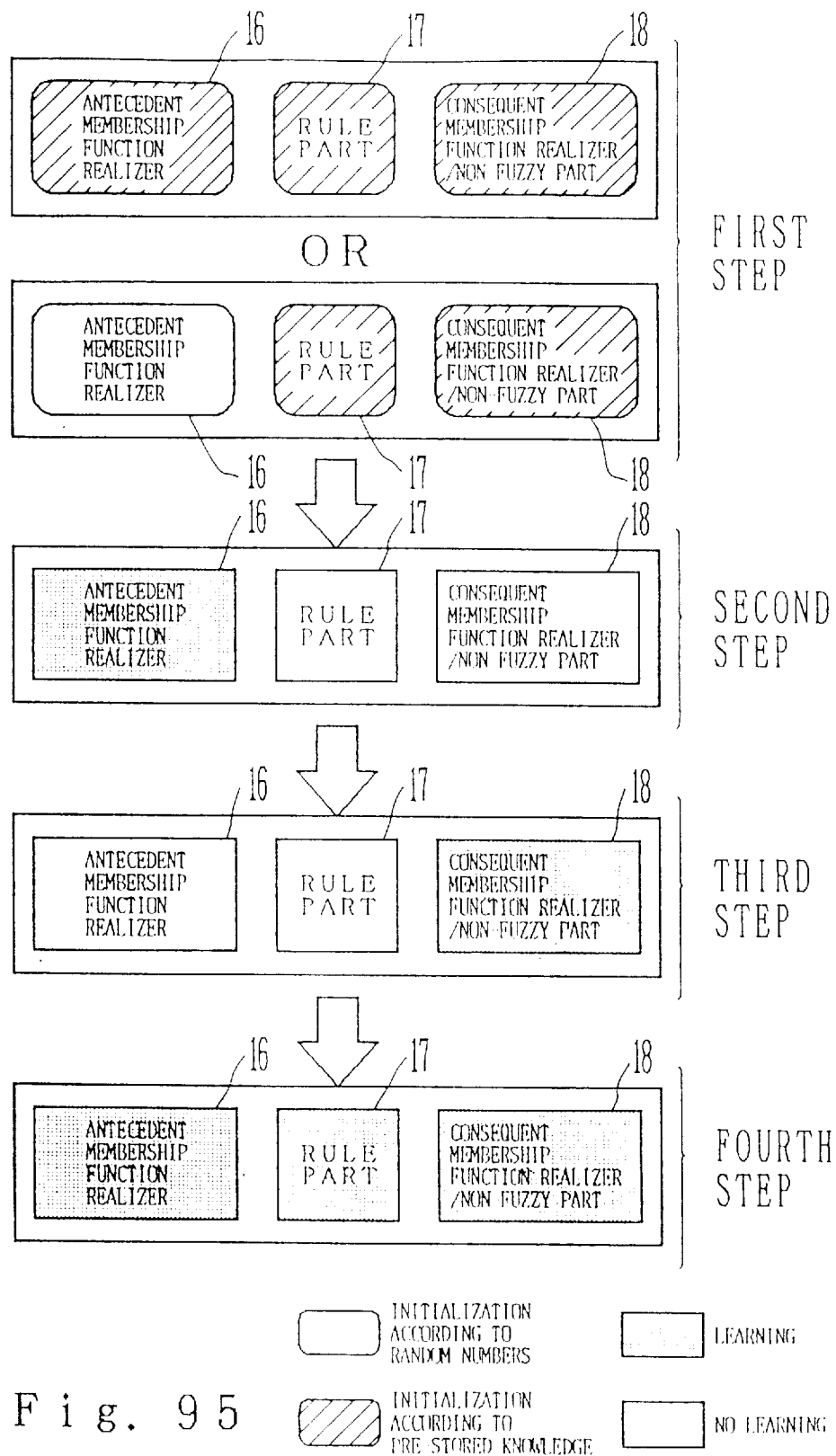
FIG. 95 shows a configuration of the sixth learning method.
Figure 96:
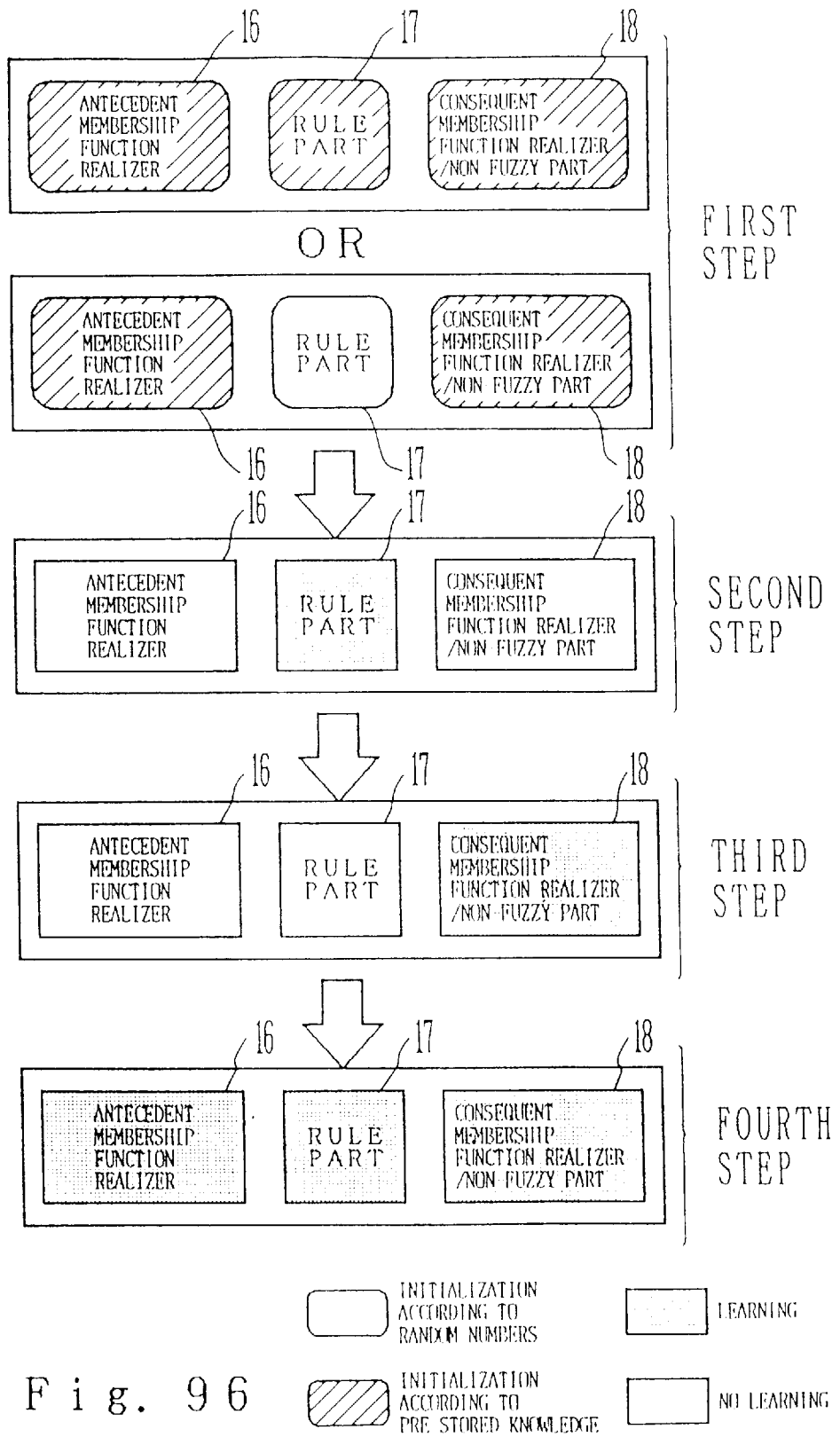
FIG. 96 shows a configuration of the seventh learning method.
Figure 97:
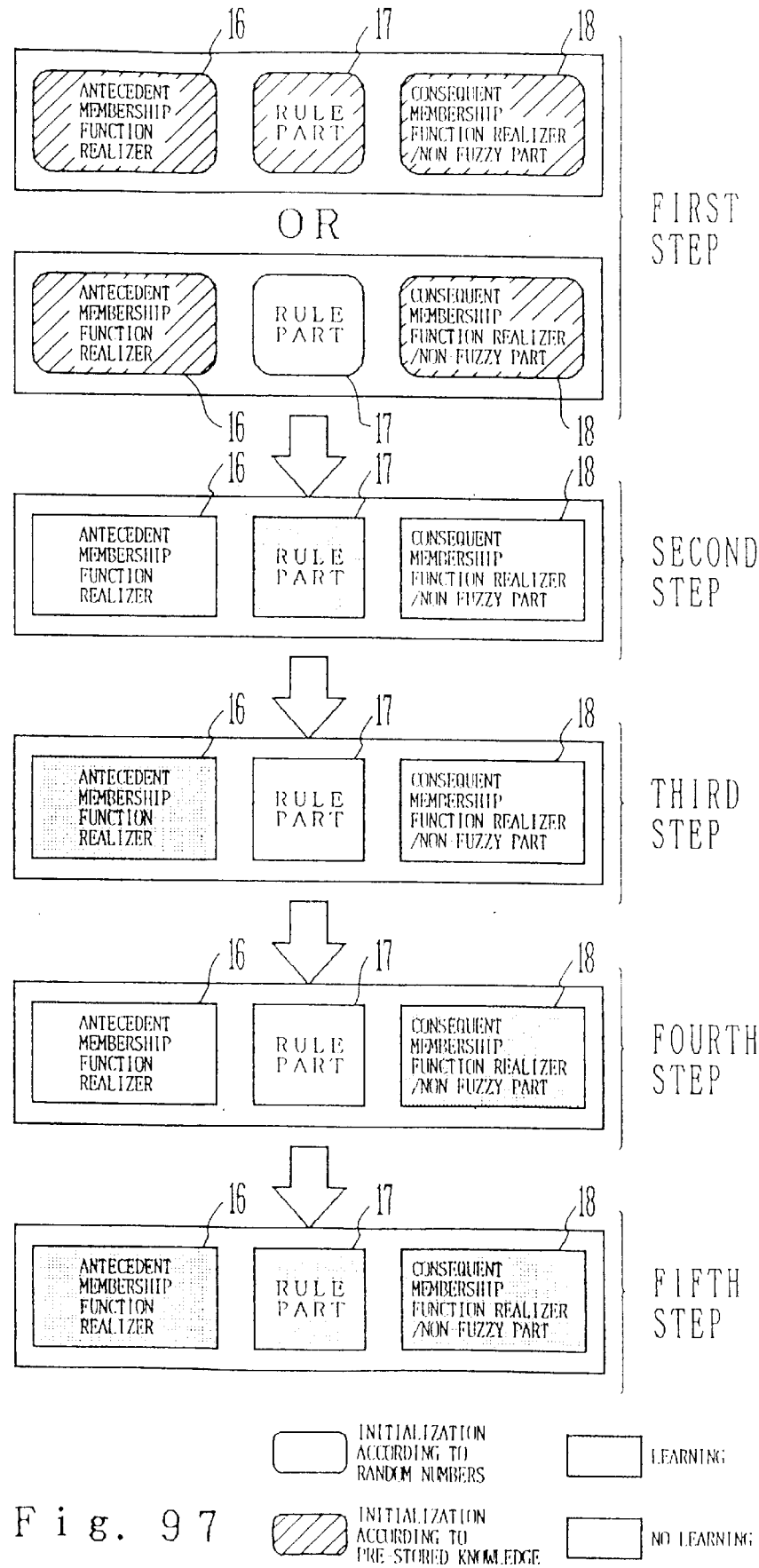
FIG. 97 shows a configuration of the eighth learning method.
Figure 98:
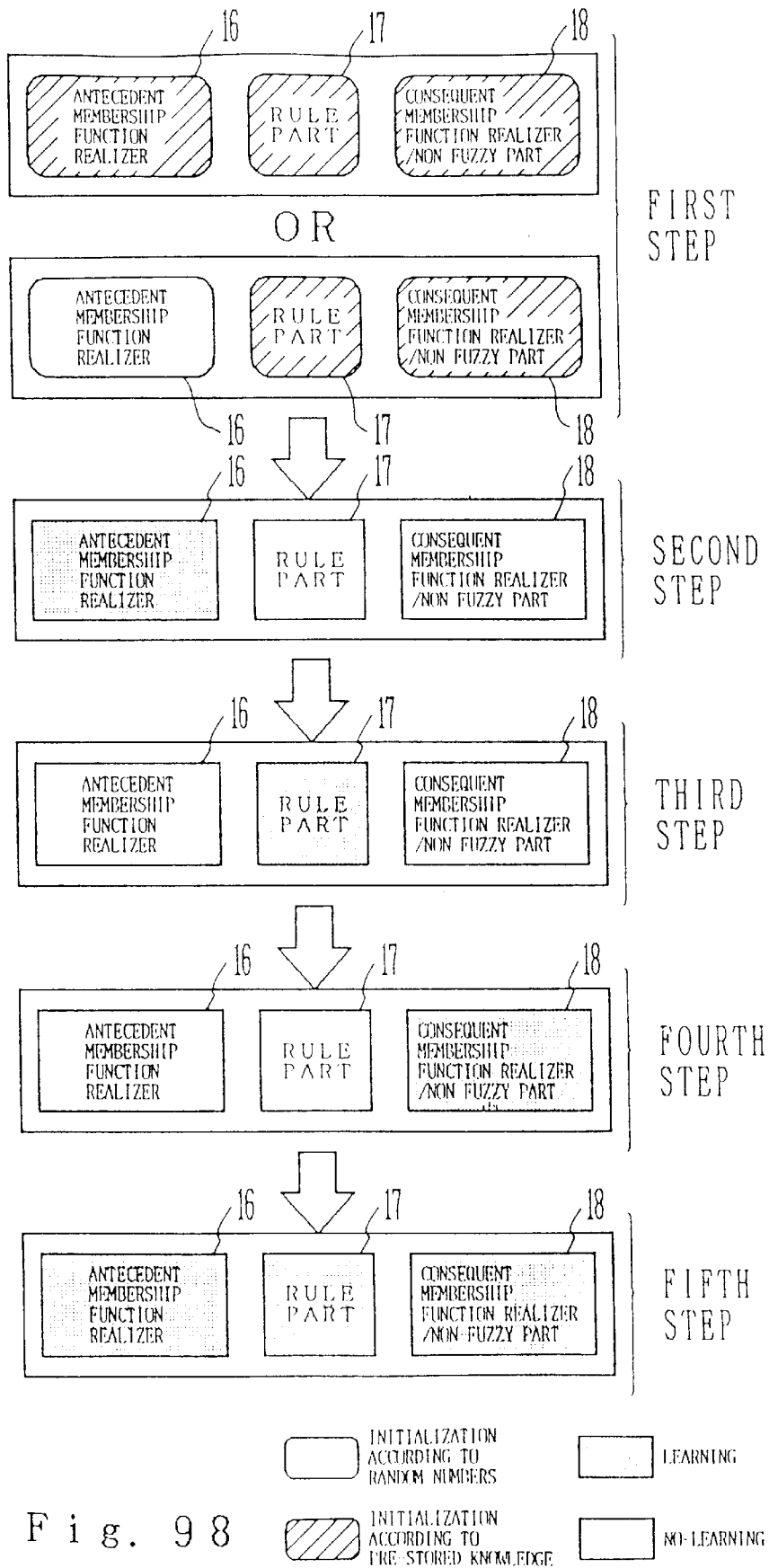
FIG. 98 shows a configuration of the ninth learning method.
Figure 99:
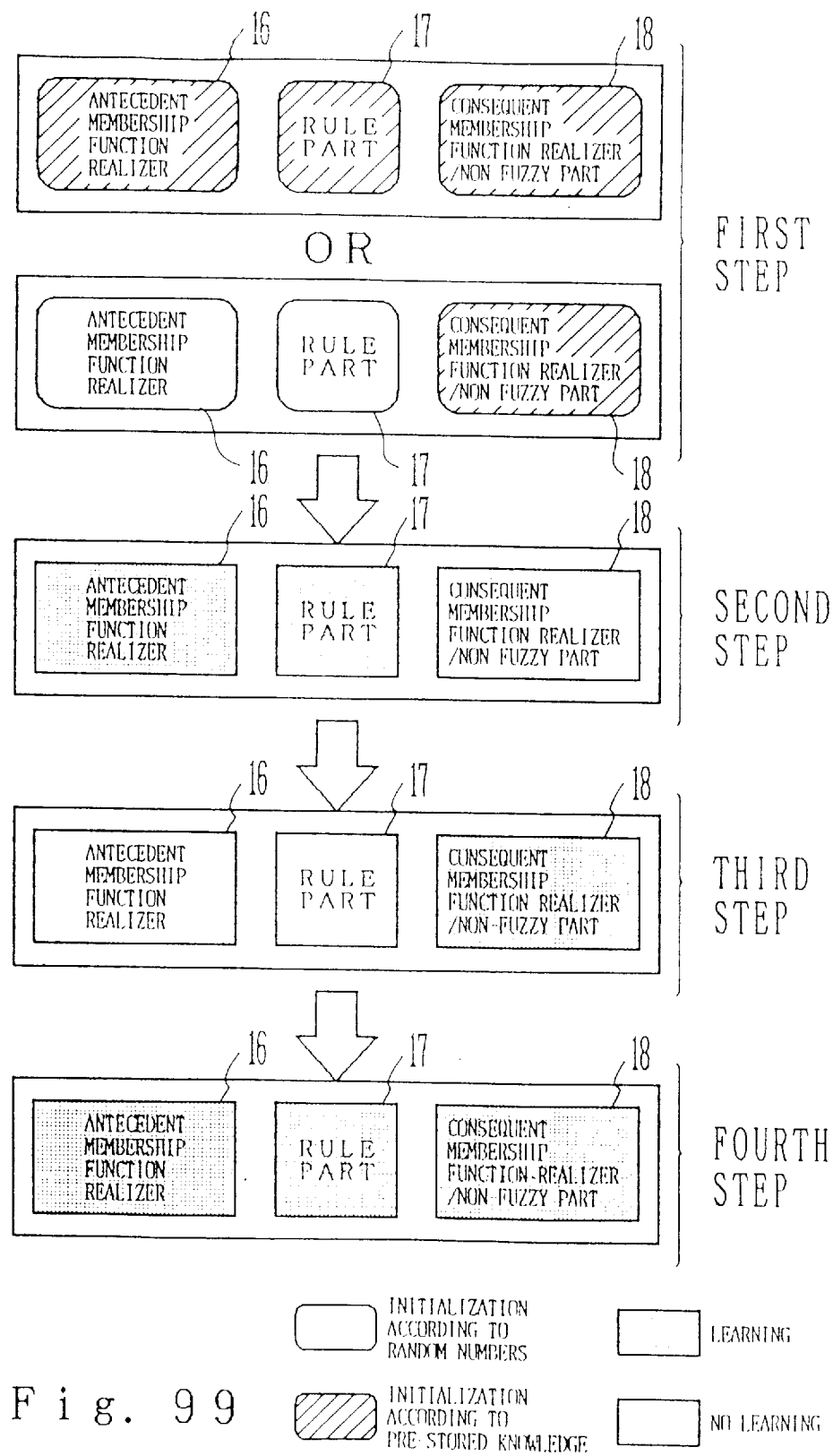
FIG. 99 shows a configuration of the tenth learning method.

First, in explaining the logical element process according to FIG. 89, a sign of a weight value of the connection between a unit in the rule part indicated by A and a unit in the latter membership function output part indicated by B is checked. If it is negative, it must be adjusted to be positive, and a sign of a weight value (including a threshold) of the connection between the unit A and a unit of the antecedent membership function output part must also be inverted.

Then, a sign of a weight value (including a threshold) of the connection between the unit A and a unit in the antecedent membership function output part is recorded and inverted to be positive if it is negative. Next, the simulator 169 is activated to obtain input/output data characteristic information of the unit A. Using the maximum and minimum output values, the output values are normalized in the following expression:

$$Z=(z-\min.)/(\max.-\min.)$$

where z shows an output value before the conversion and Z shows an output value after the conversion.

A weight value of the connection between the unit A and the unit B is converted in the following expression:

$$W=w\times(\max.-\min.)$$

where w shows a weight value before the conversion and W shows a weight value after the conversion.

Next, the most similar logical operation must be specified after measuring the similarity between the normalized input/output data and the input/output data managed by the logical operation input/output characteristic information manager. 173. The contents of the logic being executed by the unit A must be specified by referring to the management data of the logical operation manager 172 according to the logical operation and the sign data of the recorded weight values (including a threshold). Thus, units determined as permanently false or true are deleted.

When the logical element process is completed on a unit of the rule part, the network structure converter 154 deletes a unit in the rule part if necessary in step S178. Thus, the hierarchical network part 159 in the logical representation as shown in FIG. 57 can be obtained. The fuzzy rule extractor 157 finally outputs as a fuzzy rule, the logical operation description of processing data of this hierarchical network part 159 in step S179, then terminates the process.

Figure 4:
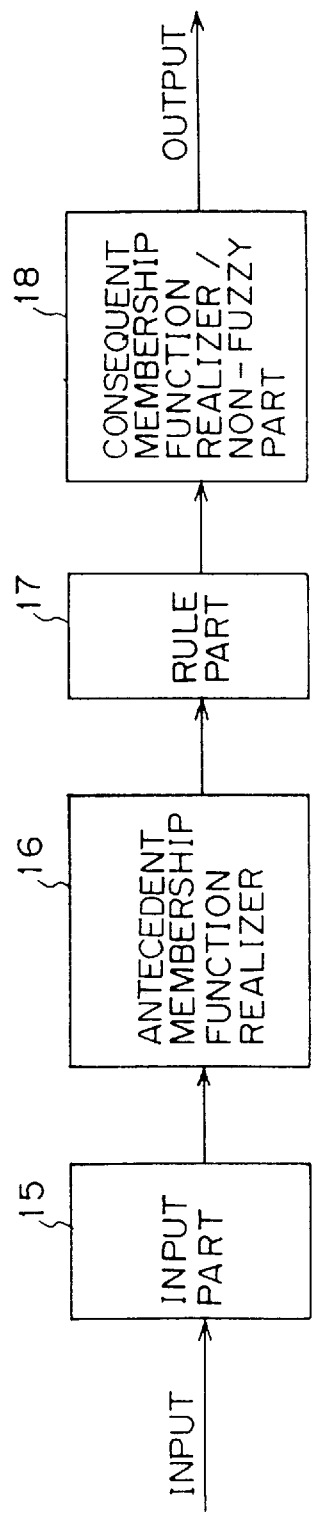
FIG. 4 shows a block diagram for explaining a basic configuration of a pre-wired-rule-part neuro and a completely-connected-rule-part neuro.

The above description mainly relates to the configuration of a pre-wired-rule-part neuro and a completely-connected-rule-part neuro, the conversion from a pure neuro to a pre-wired-rule-part neuro or a completely-connected-rule-part neuro, the extraction of a fuzzy teacher from a pre-wired-rule-part neuro, etc. The learning of a pre-wired-rule-part neuro is described as follows:

The basic configuration of a pre-wired-rule-part neuro is shown in FIG. 4. In FIG. 4, the input part 15 only distributes an input signal, and learning parts are the antecedent membership function realizer 16, rule part 17, and latter membership function realizer/non-fuzzy part 18. FIGS. 90–99 show ten learning procedures of these three parts. Each of a plurality of processes forming a learning procedure is described as follows:

1st learning procedure
(1st process)
A weight value is initialized according to the knowledge pre-stored in the antecedent membership function realizer 16 (referred to as "preliminary knowledge" in FIGS. 90–99) or using random numbers. Likewise, a weight value is initialized according to the knowledge pre-stored in the rule part 17 and the latter membership function realizer/non-fuzzy part 18.
(2nd process)
A weight value of the antecedent membership function realizer 16 is learned using learning data.
(3rd process)
A total weight value of the antecedent membership function realizer 16, rule part 17, and latter membership function realizer/non fuzzy part 18 is learned using learning data.
2nd learning procedure
(1st process)
A weight value is initialized according to the knowledge pre-stored in the rule part 17 or using random numbers. Likewise, a weight value is initialized according to the knowledge pre-stored in the antecedent membership function realizer 16 and latter membership function realizer/non-fuzzy part 18.
(2nd process)
A weight value of the rule part 17 is learned using learning data.
(3rd process)
A total weight value of the antecedent membership function realizer 16, rule part 17, and latter membership function realizer/non-fuzzy part 18 is learned using learning data.
3rd learning procedure
(1st process)
A weight value is initialized according to the knowledge pre-stored in the rule part 17 or using random numbers. Likewise, a weight value is initialized according to the knowledge pre-stored in the antecedent membership function realizer 16 and latter membership function realizer/non-fuzzy part 18.
(2nd process)
A weight value of the rule part 17 is learned using learning data.
(3rd process)
A weight value of the antecedent membership function realizer 16 is learned using learning data.
(4th process)
A total weight of the antecedent membership function realizer 16, rule part 17, and latter membership function realizer/non-fuzzy part 18 is learned using learning data.
4th learning procedure
(1st process)
A weight value is initialized according to the knowledge pre-stored in the antecedent membership function realizer 16 or using random numbers. Likewise, a weight value is initialized according to the knowledge pre-stored in the rule part 17 and latter membership function realizer/non-fuzzy part 18.
(2nd process)
A weight value of the antecedent membership function realizer 16 is learned using learning data.
(3rd process)
A weight value of the rule part 17 is learned using learning data.
(4th process)
A total weight value of the antecedent membership function realizer 16, rule part 17, and latter membership function realizer/non-fuzzy part 18 is learned using learning data.
5th learning procedure
(1st process)
A weight value is initialized according to the knowledge pre-stored in the antecedent membership function realizer 16 and rule part 17 or using random numbers. Likewise, a weight value is initialized according to the knowledge pre-stored in the latter membership function realizer/non-fuzzy part 18.
(2nd process)
Weight values of the antecedent membership function realizer 16 and rule part 17 are learned simultaneously using learning data.
(3rd process)
A total weight value of the antecedent membership function realizer 16, rule part 17 and latter membership function realizer/non-fuzzy part 18 is learned using learning data.
6th learning procedure (1st process)

A weight value is initialized according to the knowledge pre-stored in the antecedent membership function realizer 16 or using random numbers. Likewise, a weight value is initialized according to the knowledge pre-stored in the rule part 17 and latter membership function realizer/non-fuzzy part 18.

(2nd process)

A weight value of the antecedent membership function realizer 16 is learned using learning data.

(3rd process)

A weight value of the latter membership function realizer/non-fuzzy process 18 is learned using learning data.

(4th process)

A total weight value of the antecedent membership function realizer 16, rule part 17, and latter membership function realizer/non-fuzzy part 18 is learned using learning data.

7th learning procedure (1st process)

A weight value is initialized according to the knowledge pre-stored in the rule part 17 or using random numbers. Likewise, a weight value is initialized according to the knowledge pre-stored in the antecedent membership function realizer 16 and latter membership function realizer/non-fuzzy process 18.

(2nd process)

A weight value of the rule part 17 is learned using learning data.

(3rd process)

A weight value of the latter membership function realizer/non-fuzzy part 18 is learned using learning data.

(4th process)

A total weight value of the antecedent membership function realizer 16, rule part 17, and latter membership function realizer/non-fuzzy part 18 is learned using learning data.

8th learning procedure (1st process)

A weight value is initialized according to the knowledge pre-stored in the rule part 17 or using random numbers. Likewise, a weight value is learned according to the knowledge pre-stored in the function realizer 16 and latter membership function realizer/non-fuzzy part 18.

(2nd process)

A weight value of the rule part 17 is learned using learning data.

(3rd process)

A weight value of the antecedent membership function realizer 16 is learned using learning data.

(4th process)

A weight value of the latter membership function realizer/non-fuzzy part 18 is learned using learning data.

(5th process)

A total weight value of the antecedent membership function realizer 16, rule part 17, and latter membership function realizer/non-fuzzy process 18 is learned using learning data.

9th learning procedure (1st process)

A weight value is initialized according to the knowledge pre-stored in the antecedent membership function realizer 16 or using random numbers. Likewise, a weight value is initialized according to the knowledge pre-stored in the rule part 17 and latter membership function realizer/non-fuzzy part 18.

(2nd process)

A weight value of the antecedent membership function realizer 16 is learned using learning data.

(3rd process)

A weight value of the rule part 17 is learned using learning data.

(4th process)

A weight value of the latter membership function realizer/non-fuzzy part 18 is learned using learning data.

(5th process)

A total weight value of the latter membership function realizer 16, rule part 17, and latter membership function realizer/non-fuzzy part 18 is learned using learning data.

10th learning procedure (1st process)

A weight value is initialized according to the knowledge pre-stored in the antecedent membership function realizer 16 and rule part 17 or using random numbers. Likewise, a weight value is initialized according to the knowledge pre-stored in the latter membership function realizer/non-fuzzy process 18.

(2nd process)

Weight values of the antecedent membership function realizer 16 and rule part 17 are simultaneously learned using learning data.

(3rd process)

A weight value of the latter membership function realizer/non-fuzzy process 18 is learned using learning data.

(4th process)

A total weight of the antecedent membership function realizer 16, rule part 17, and latter membership function realizer/non-fuzzy process 18 is learned using learning data.

In the above described learning procedures 1–10, an initial weight value is set using the pre-stored knowledge in the 1st process where a weight value is first learned if the pre-stored knowledge is sufficient for setting an initial weight value. Otherwise, the initial weight value can be set using random numbers. Furthermore, as described later, at the beginning of learning in each process after initializing a weight value in the 1st process, a learning flag provided for each connection for connecting a learning part is turned ON among the antecedent membership function realizer 16, rule part 17, and latter membership function realizer/non-fuzzy part 18, while a learning flag provided for each connection for connecting a non-learning part is turned OFF. Thus, only weight values of the connection having an ON learning flag are optimized by the learning process.

These learning procedures for a pre-wired-rule-part neuro are executed as follows Among the antecedent membership function realizer, rule part, and latter membership function realizer/non-fuzzy part in the pre-wired-rule-part neuro, a weight value is initialized according to the pre-stored knowledge or using random numbers for the first learning part, while a weight value is initialized according to the pre-stored knowledge for the second and the following learning parts.

Then, after the learning process is activated and an input learning pattern is presented to the pre-wired-rule-part neuro, the initialized weight value is modified such that an output pattern provided by the pre-wired-rule-part neuro approximately corresponds to the output learning pattern (teacher signal) which is considered a desirable output pattern for an input pattern. For instance, weight value learning in the back propagation method is recommended.

The weight value learning is required for learning a total weight value of the pre-wired-rule-part neuro. Prior to the final stage of learning, the following weight value learning ①–⑩ is conducted as pre-processes at:

① The antecedent membership function realizer.
② The rule part.

③ The rule part and then the antecedent membership function realizer.

④ The antecedent membership function realizer and then the rule part.

⑤ The antecedent membership function realizer and the rule part simultaneously.

⑥ The antecedent membership function realizer and then the latter membership function realizer/non-fuzzy part.

⑦ The rule part and then the latter membership function realizer/non-fuzzy part.

⑧ The rule part, antecedent membership function realizer, and then the latter membership function realizer/non-fuzzy part.

⑨ The antecedent membership function realizer, rule part, and then the latter membership function realizer/non-fuzzy part.

⑩ The antecedent membership function realizer and the rule part simultaneously, and then the latter membership function realizer/non-fuzzy part.

Thus, after a weight value of one of the antecedent membership function realizer, rule part, or the latter membership function realizer/non-fuzzy part is learned, a total weight value of the pre-wired-rule-part neuro is learned, thereby rearranging the total weight value of the pre-wired-rule-part neuro according to a weight value learning result of at least one of those of the antecedent membership function realizer, rule part and the latter membership function realizer/non-fuzzy part.

Easy and efficient learning can be attained by initializing a weight value with pre-stored knowledge.

Additionally, the maximum learning capabilities can be derived from initializing a weight value using random numbers.

FIGS. 100–109 show a learning flowchart for describing procedures of embodiments 1–10 in the learning method of a pre-wired-rule-part neuro. The pre-wired-rule-part neuro learns in the method shown in FIGS. 100–109, has a hierarchical network structure for realizing a fuzzy control rule, and comprises a antecedent membership function realizer 16, rule part 17, and latter membership function realizer/non-fuzzy part 18 shown in FIG. 110.

A pre-wired-rule-part neuro has a network structure where all units of a rule part 17 are not connected internally to the preceding step "antecedent membership function realizer 16" or to the following step "latter membership function realizer/non-fuzzy part 18", but only a part of the units are connected internally to these steps. Therefore, it contrasts with a completely-connected-rule-part neuro where all units of the rule part are connected internally to the adjacent steps.

The learning procedure in the 1st–10th embodiment shown in FIGS. 100–109 comprises the following 6 steps:

(1st step)
Weight values Cab and Cbc of the antecedent membership function realizer 16 are initialized so that a specified membership function can be realized. Cab and Cbc are connection group numbers of the connection for initializing weight values.

(2nd step)
Weight values Ccd and Cde of the rule part 17 are initialized so that a specified fuzzy rule can be realized.

(3rd step)
A weight value Cef of the consequent membership function realizer/non-fuzzy part 18 is initialized so that a specified membership function can be realized.

(4th step)
A weight value Cfg of the center-of-gravity calculation realizer 18b is realized so that the calculation of center-of-gravity can be realized.

(5th step)
A phase-group reference list for listing neuron groups per phase of a learning process and a group-connection reference list for listing connection groups each belonging to a neuron group are set.

(6th step)
A learning process is performed in the back propagation method after activating a learning scheduler.

In the above described learning procedure comprising 6 steps, weight values are initialized in the 1st–3rd steps in each embodiment as follows: After activating a learning scheduler of the 6th step, a weight value is initialized for the first part, that is, the part where a weight value is learned at phase 1 by installing pre-stored knowledge, or by using random numbers for initializing random weight-values. On the other hand, a weight value is initialized only by installing the pre-stored knowledge for the parts where a weight value is learned at and following the second learning procedure (at and following the second phase).

A weight value is initialized for the center-of-gravity calculator 18b in the fourth step in all embodiments.

The phase-group reference list is uniquely produced in the 5th step by modifying a learning phase of the sixth step in each embodiment. On the other hand, a group-connection reference list is commonly produced in all embodiments.

Furthermore, in learning a weight value in the 6th step, a total weight value of a neuron comprising the former membership function realizer 16, rule part 17, and consequent membership function realizer/non-fuzzy part 18 is learned at the last step of the learning procedure, that is, at the last learning phase in all embodiments. In contrast with the total weight learning at the last phase, the previous weight learning is performed uniquely in a learning process specific to each embodiment.

Figure 100:
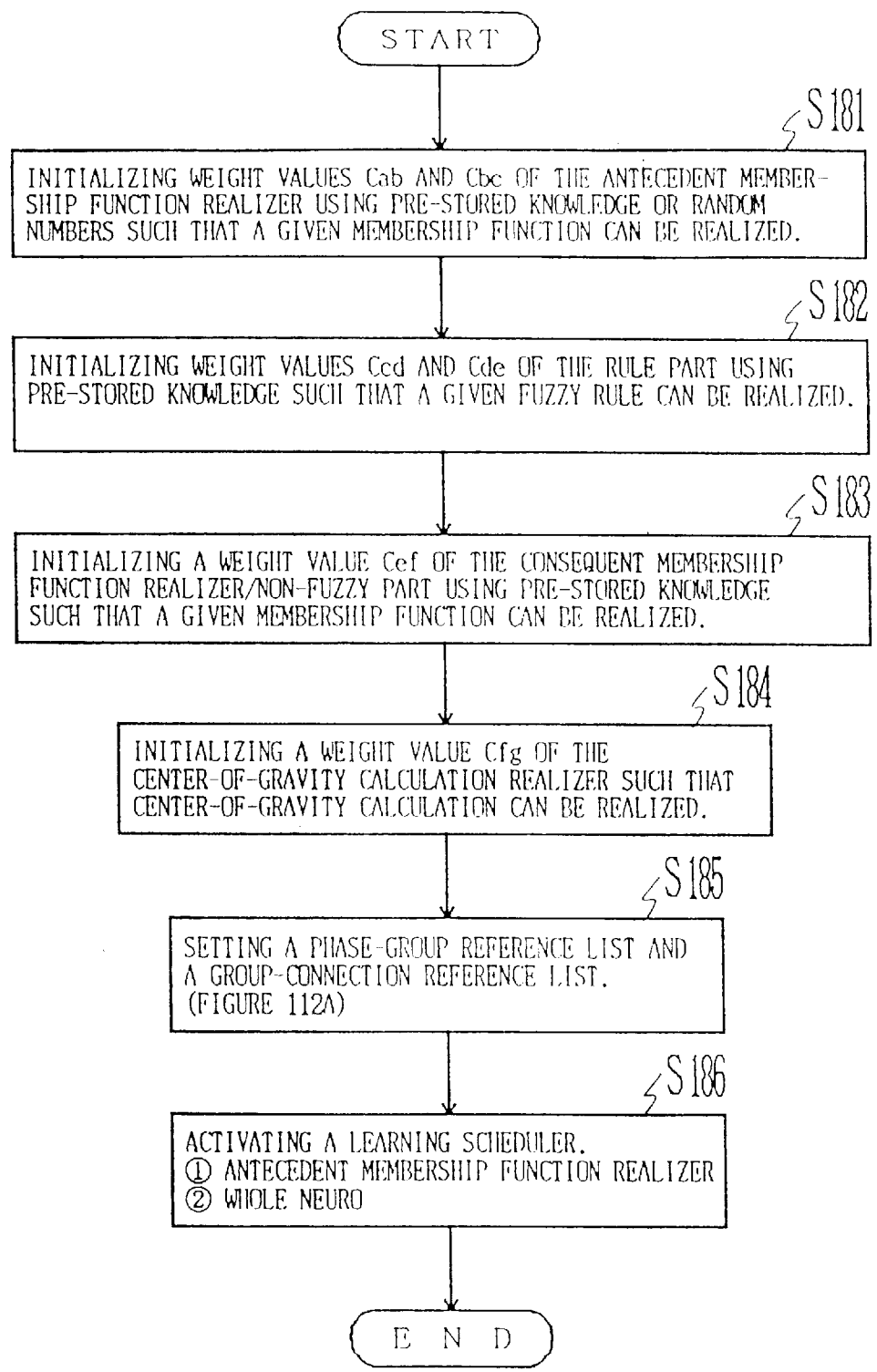
FIG. 100 shows a flowchart of a learning operation for learning information in the first embodiment.

A learning method of the pre-wired rule part neuro 12 is described in detail for the 1st–6th steps respectively in association with a learning operation flowchart in the 1st embodiment shown in FIG. 100.

Figure 110:
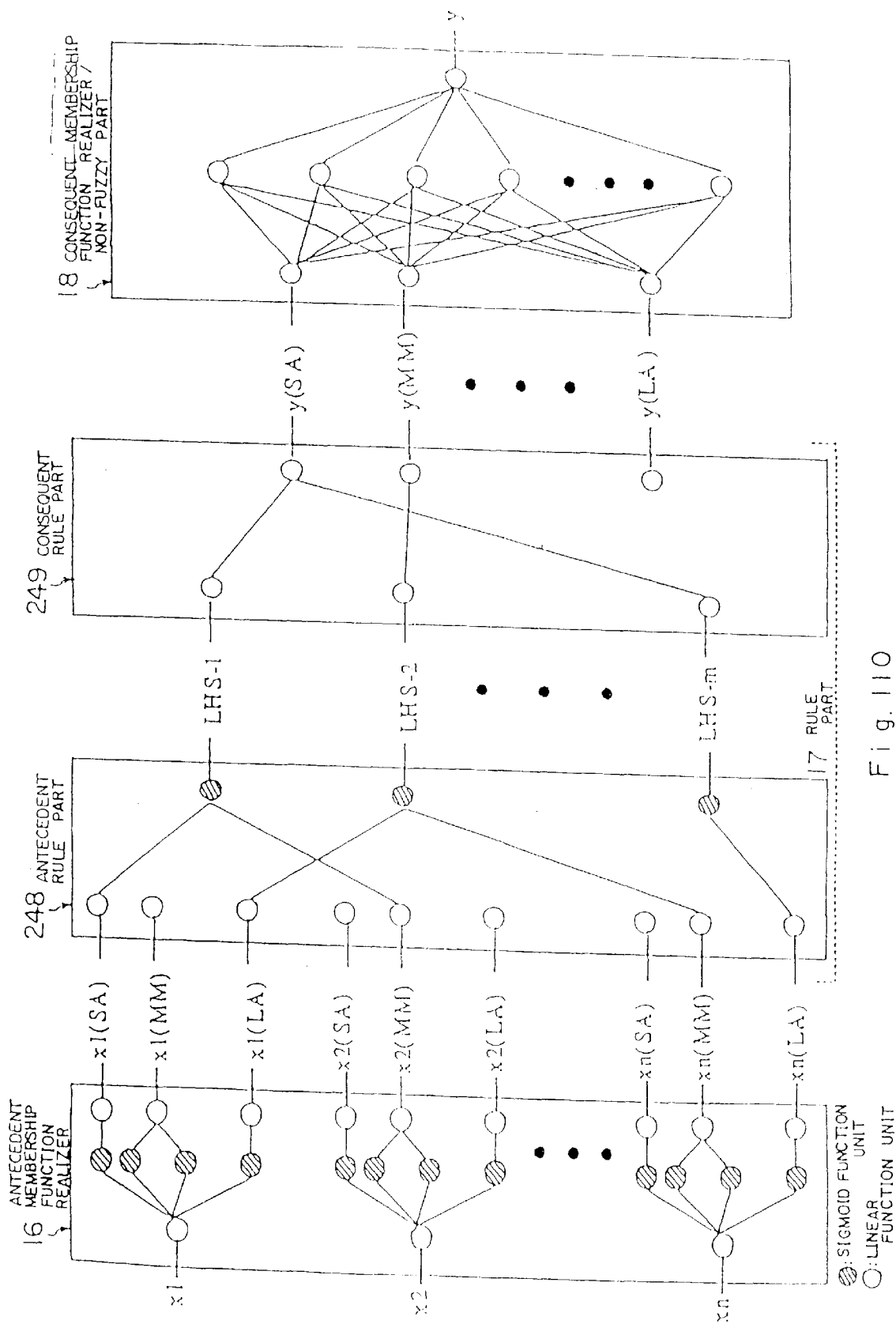
FIG. 110 shows a configuration of an embodiment of a pre-wired-rule-part neuro comprising antecedent and consequent proposition parts.

In the pre-wired rule part neuro shown in FIG. 110, the rule part 17 comprises an antecedent rule part 248 and a consequent rule part 249. The former rule part 248 outputs a grade value of each rule in response to a grade value (as an input value) of a membership function $X_1(SA)-X_n(LA)$ with an input variable $X_1-X_n$. The consequent rule part 249 outputs an enlargement/reduction rate of a membership function $y(SA)-y(LA)$ of an output variable in response to a grade value LHS-1–LHS-n of a rule.

The consequent membership function realizer/non-fuzzy part 18 (including the center-of-gravity calculator) outputs a value of an output variable Y in response to an enlargement/reduction rate of a membership function $y(SA)-y(LA)$ of an output variable.

As the input and output indicate a grade value of a membership function, the rule part 17 comprising the former rule part 248 and the consequent rule part 249 can perform cascade-connection, thereby performing multi-step presumption.

A neuron connecting each of the modules 16, 248, 249, and 18 can be shared. For instance, an output neuron of the former membership function realizer 16 and an input neuron of the former rule part 248 can be the same practically.

In FIG. 110, each unit is described as a neuro, but a unit whose capabilities can be specified may be a gate circuit, operating apparatus, etc. for realizing the unit capabilities, not a neuro.

Figure 111:
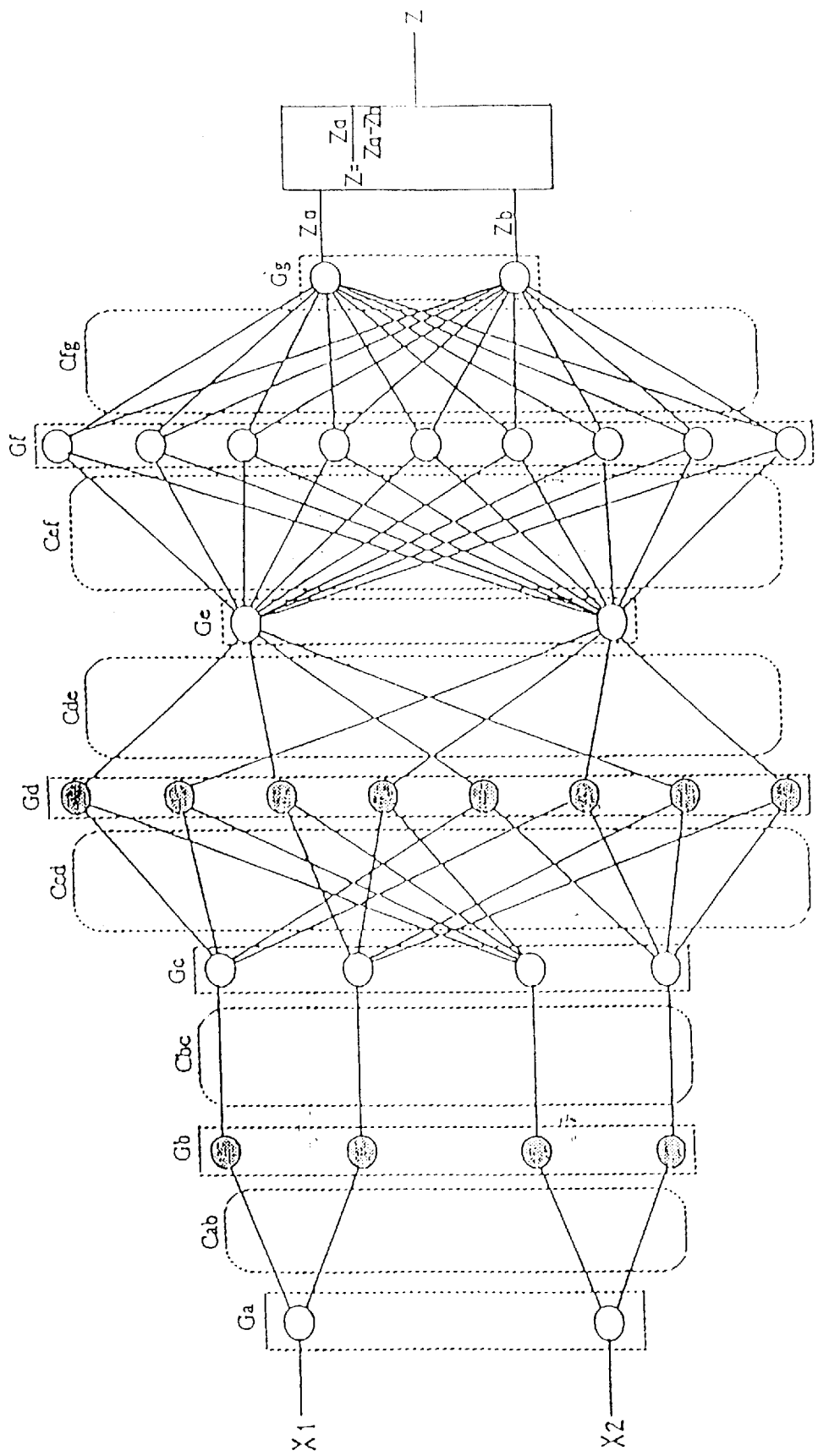
FIG. 111 shows a view for explaining a neuron group and a connection group in a pre-wired-rule-part neuro.

FIG. 111 shows a neuron group and a connection group for realizing a learning method of the pre-wired-rule-part neuro similar to the completely-connected-rule-part shown in FIG. 5.

In FIG. 111, there are seven neuron groups Ga–Gg. Among them, the neuron group Ga in the input part and the neuron group Gg of the center-of-gravity calculator 18b performs only a dividing and collecting process respectively. Therefore, they do not relate to the learning process in the back propagation method. Accordingly, neuron groups associated with the weight learning in the back propagation method comprise five groups Gb, Gc, Gd, Ge, and Gf. On the other hand, connection groups for indicating input connection,of each neuron group comprise six different connection Cab–Cfg, thereby permitting learning weight values of input connection prior to neuron groups to be learned in the back propagation method.

For the pre-wired-rule-part neuro shown in FIG. 111, each part is initialized in the 1st–4th steps S181–S184 shown in FIG. 100. As the detailed explanation of the initialization process is described above, it is skipped here. After the initialization, the 5th step S185 is performed.

(Setting a learning schedule)

In step S185 shown in FIG. 100, a learning plan, or a learning schedule, is set to allow the pre-wired-rule-part neuro to learn weight values after the termination of the initialization. The learning schedule is made for setting a phase-group reference list shown in FIG. 112A and a group-connection reference list shown in FIG. 112K.

First, the phase-group reference list specifies a neuron group to be learned in each phase in the process of a learning phase. In the first learning method, learning processes are performed in the former membership function realizer 16 and the whole neuro sequentially after the initialization of weight values, and the neuron groups Gb and Gc shown in FIG. 111 as belonging to the antecedent membership function realizer 16 are set as groups to be learned at phase 1. In phase 2, a weight value of the whole neuro can be learned, thereby setting five neuron groups Gb, Gc, Gd, Ge, and Gf shown in FIG. 111.

On the other hand, a group-connection reference list sets the correspondence between neuron groups Ga–Gg in the pre-wired-rule-part neuro and input connection groups Cab––Cfg as shown in FIG. 112K.

After setting the phase-group reference list and the group-connection reference list completely, a learning scheduler is activated in step S186 shown in FIG. 100, and the pre-wired-rule-part neuro is provided with learning data to learn weight values in the back propagation method.

(Process and configuration of a learning scheduler)

Figure 113:
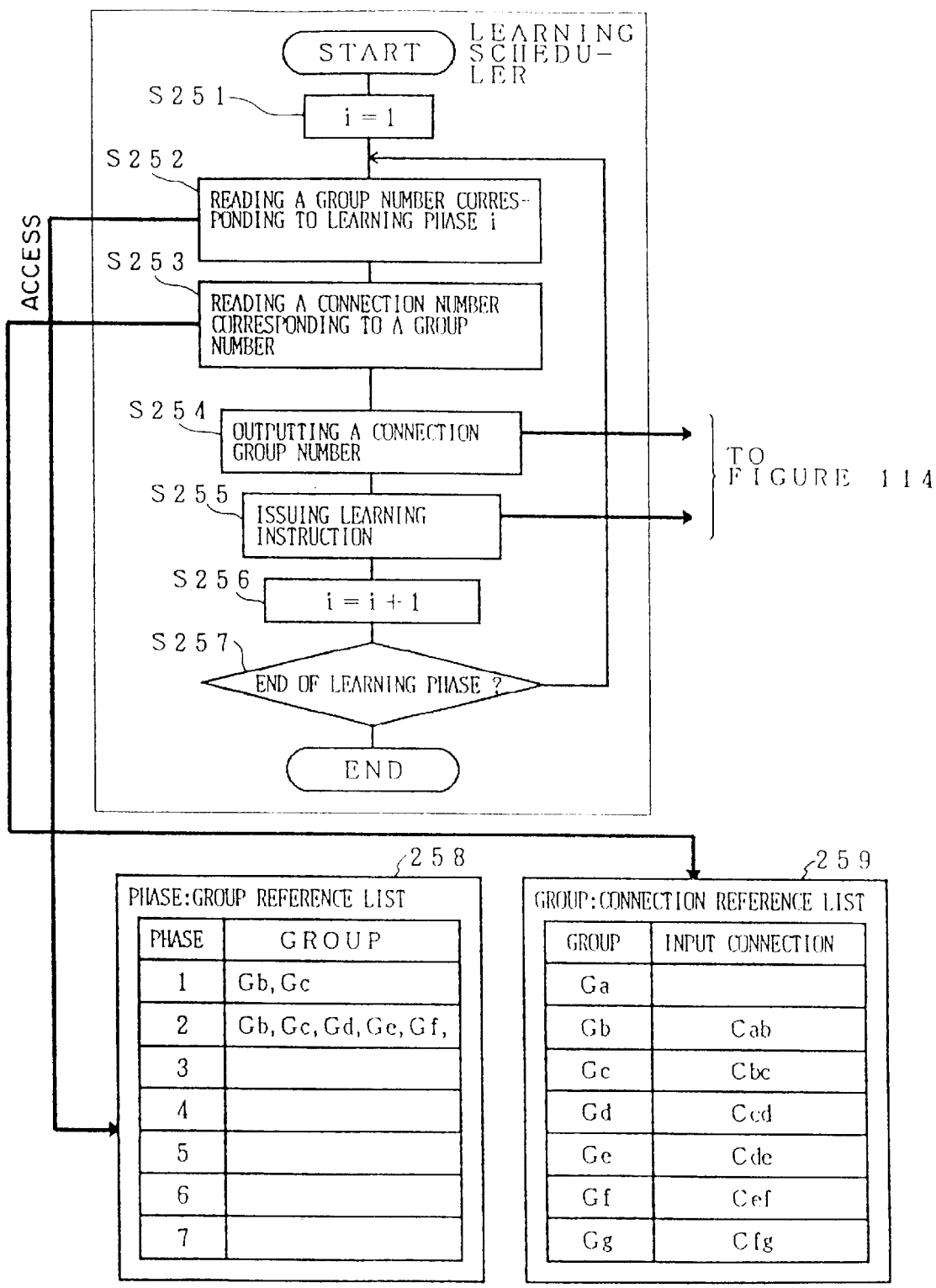
FIG. 113 shows a flowchart of a learning process of a pre-wired-rule-part neuro.

FIG. 113 shows a flowchart of a learning process of the pre-wired-rule-part neuro. The flowchart can be realized by the configuration shown in FIG. 114, for example.

Figure 114:
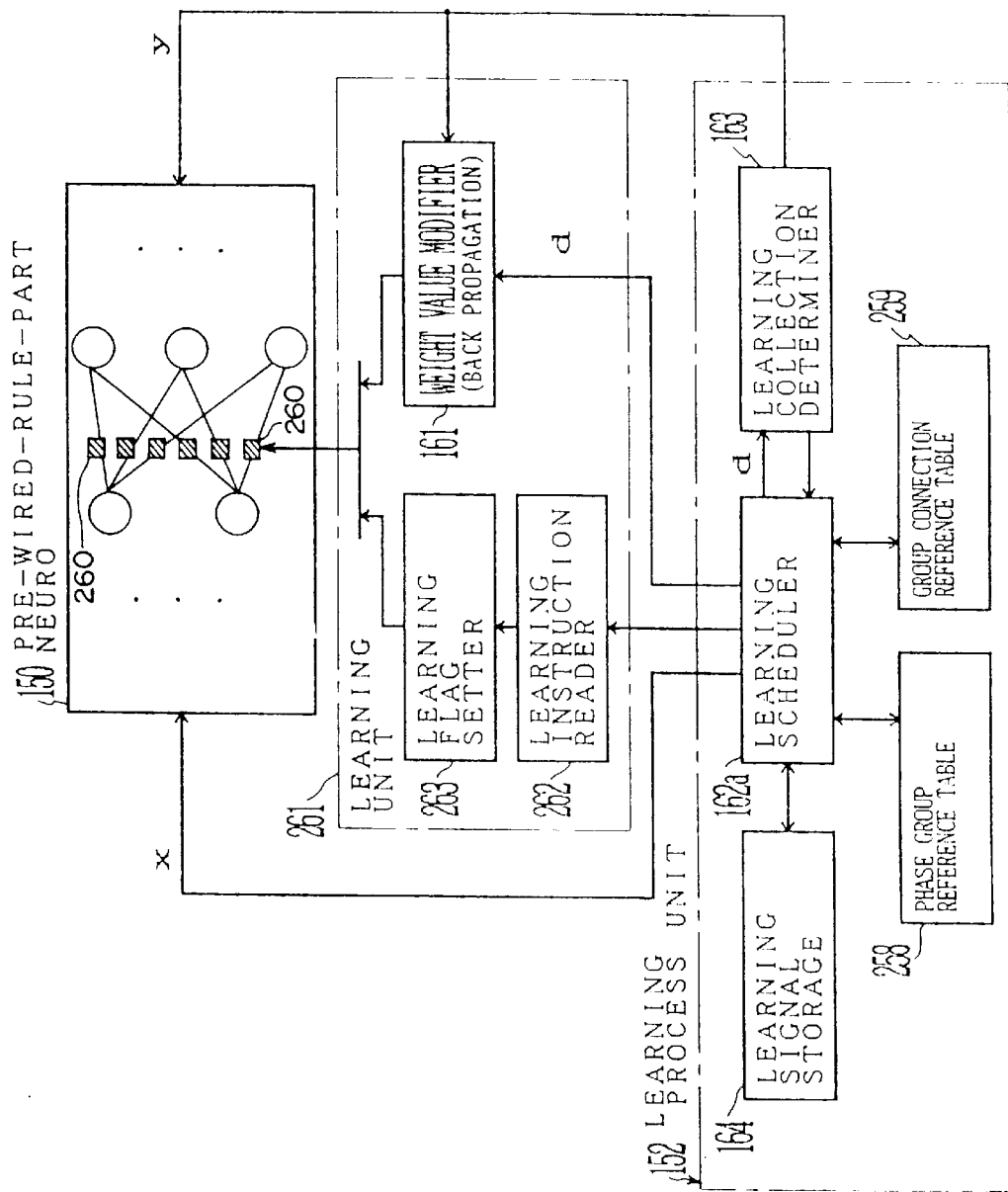
FIG. 114 shows a configuration of a learning unit.

As for the configuration for a learning process, as shown in FIG. 114, the pre-wired-rule-part 150 comprises a learning process unit 152 and a learning unit 261.

The learning process unit 152 has a learning scheduler 162a corresponding to a learning signal display 162 shown in FIG. 82. The learning scheduler 162a comprises a learning signal storage 164 for storing a learning signal comprising a pair of control input and desirable control output in response to the control input, a phase-group reference table 258 for storing a phase-group reference list shown in FIG. 112, a group-connection table 259 for storing a group-connection reference list, and a learning collection determiner 163.

The learning unit 261 comprises a learning instruction reader 262, a learning flag setter 263, and a weight value modifier 161 for modifying a weight value in the back propagation method.

The feature of the configuration shown in FIG. 114 resides in a learning adjuster 260 provided in each connection for connecting units in the pre-wired-rule-part neuro 150.

Figure 115:
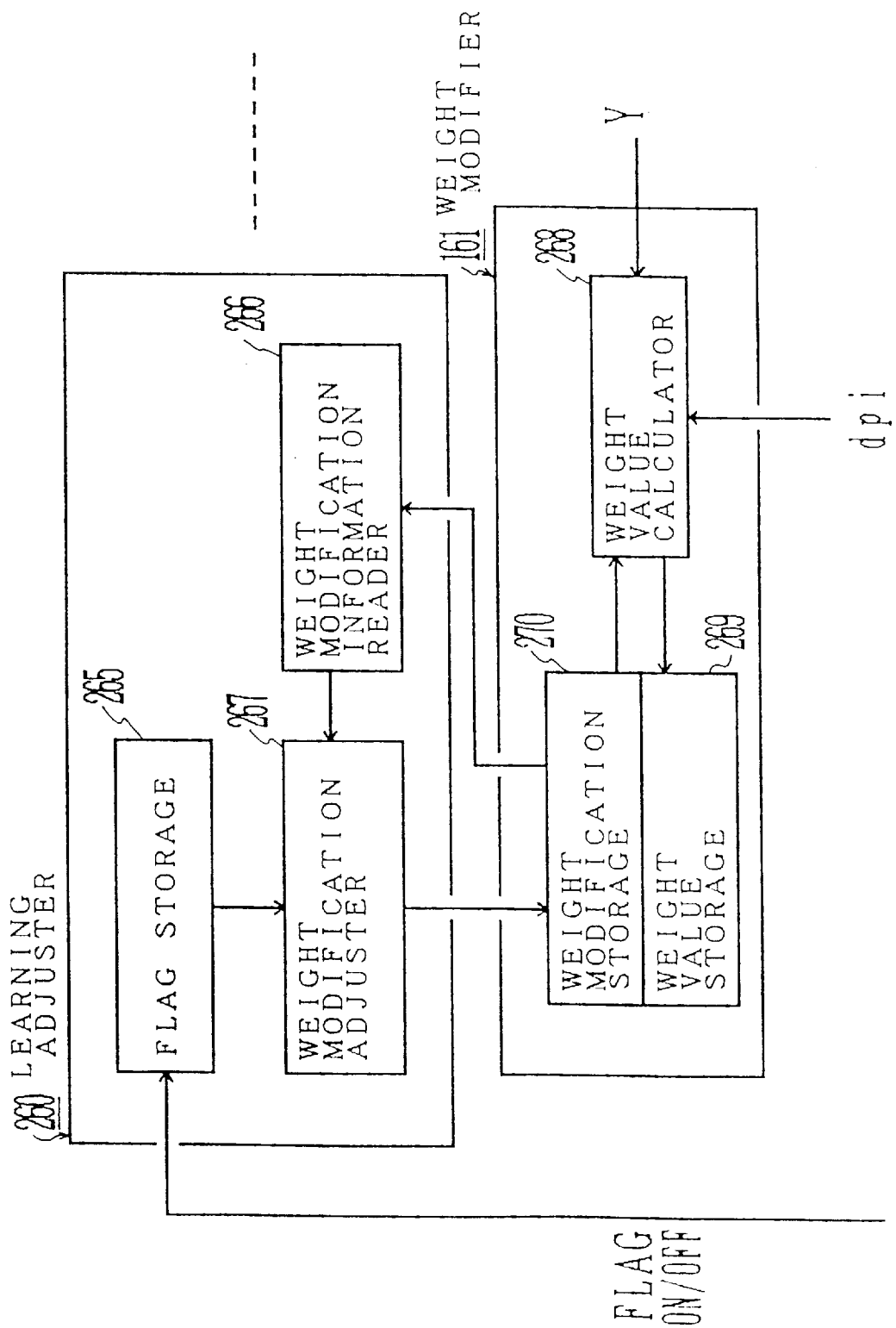
FIG. 115 shows a configuration of a learning

The learning adjuster 260 has a configuration shown in FIG. 115. The learning adjuster 260 is shown with the weight value modifier 161.

The learning adjuster 260 comprises a flag storage 265, a weight value modification information reader 266, and a weight value modification adjuster 267.

The weight value modifier 161 comprises a weight value operating unit 268 for performing weight value operation in the back propagation method, a weight value storage 269, and a weight value modification storage 270.

The learning adjuster 260 provided for each connection of the pre-wired-rule-part neuro 150 causes the learning scheduler 162a in the learning process unit 152 to set a learning flag for determining whether or not a weight value of the connection of the pre-wired-rule-part neuro 150 is modified. The weight-value learning process is effective only when a learning flag is valid, or set ON.

Flags are set for the learning adjuster 260 when a fuzzy-rule-applicable hierarchical network structure comprising a former membership function realizer, a rule part, and a consequent membership function realizer/non-fuzzy part is specified for a common hierarchical network having a fuzzy-rule-inapplicable network structure, for example, a pure neuro.

A weight value can be adjusted in the back propagation method with a fuzzy-rule-applicable hierarchical network during a practical learning process as follows:

In FIG. 115, The weight value modification information reader 266 in the learning adjuster 260 monitors whether or not modification of a weight value is written by the weight value operating unit 268 to the weight value modification storage 270 in the weight value modifier 161. When the weight value modification information reader 266 detects the modification of a weight value, it notifies the weight value modification adjuster 267 of the modification. The weight value modification adjuster 267 checks a learning flag in the flag storage 265, and takes no action if the learning flag is set ON. That is, the write to the weight value modification storage 270 is determined as valid. By contrast, when the learning flag is set OFF, the weight value modification adjuster 267 sets the weight value modification storage 270 in the weight value modifier 161 to zero, thereby determining the weight value modification as invalid. The hardware of the learning scheduler is disclosed in the Japanese Patent Application SHO-63-227825 "A learning method of a network configuration data processing unit".

(Processes of a Learning Scheduler)

Then, the learning process of the pre-wired-rule-part neuro in the first embodiment in the learning method depending on the configuration shown in FIGS. 114 and 115 is explained as follows in association with the learning flowchart shown in FIG. 113, wherein the learning process is divided into phases 1 and 2:

① Phase 1

When a learning scheduler in the learning process unit 152 is activated, a phase counter i for indicating the process of the learning phase in step S251 (hereinafter the word "step" is skipped) is set to i=1 and proceeds to S252 to refer to the phase-group reference table 258 and read neuron group numbers Gb and Gc corresponding to the learning phase i=1.

Then, in S253, connection group numbers Cab and Cbc corresponding to neuron group numbers Gb and Gc are read in association with the group-connection reference table 259.

Then, in S254, connection group numbers Cab and Cbc are outputted, and a learning flag of the learning adjuster 260 provided in the connection belonging to the connection group numbers Cab and Cbc is set ON.

Practically, the connection group numbers Cab and Cbc are outputted from the learning scheduler 162a in the learning process unit 152 to the learning instruction reader 262 in the learning unit 261. The learning flag setter 263 in response to the reading result by the learning instruction reader 262 instructs the flag storage 265 in the learning adjuster 260 provided in the connection belonging to the connection group numbers Cab and Cbc to set a learning flag ON.

Then, in S255, the learning scheduler 162a issues a learning execution instruction to initiate a learning process. This learning process reads from the learning signal storage 164 control input X and a teaching signal d which is a desirable control output in response to the control input X provides the control input for the pre-wired-rule-part neuro 150, and provides a teaching signal for the weight value modifier 161 and the learning collection determiner 163. Then, the control output Y provided by the pre-wired-rule-part neuro 150 responsive to the learning input is included in the weight value modifier 161 and the learning collection determiner 163; the weight value modifier 161 modifies a weight value in the back propagation method; and the learning collection determiner 163 determines the termination of learning in phase 1 when the difference between the teaching signal d and the control output Y is smaller than a predetermined value.

At the termination of the learning process in phase 1 based on the learning executing instruction in S255, the phase counter i is incremented by 1 in S256, and the end of learning is checked in S257. In the learning process of the first embodiment, the process terminates in phase 2, thus returning to S252 and starting the next phase 2.

② Phase 2

In the learning process of phase 2, a phase-group reference table 258 is referred to for reading five neuron group numbers Gb–Gf in S252. Next, in S253, a group-connection reference table 258 is referred to for reading connection group numbers Cab–Cef corresponding to the neuron groups Gb–Gf. Then, in S254, connection group numbers Cab–Cef are outputted and a learning flag provided in the connection is set ON.

Next, a weight learning process of phase 2 is performed in the back propagation method. Thus, when the weight value learning is terminated for the whole neuro, the phase counter i is incremented by one in S256, and the termination of the learning phase is checked in S257, thus terminating the process normally.

(A weight value learning process of the first embodiment)

Figure 116:
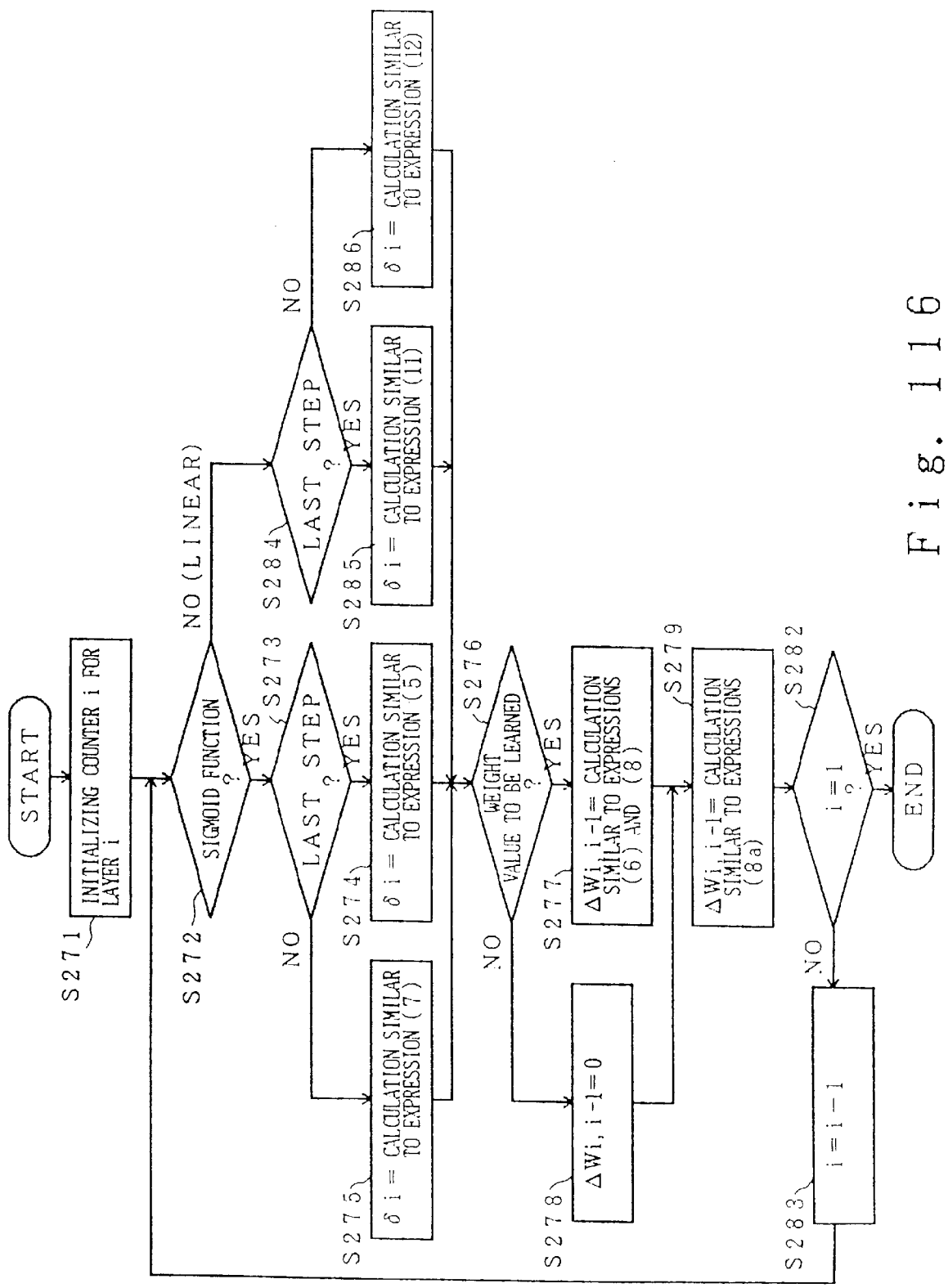
FIG. 116 shows a flowchart of a process for learning weight.
Figure 117:
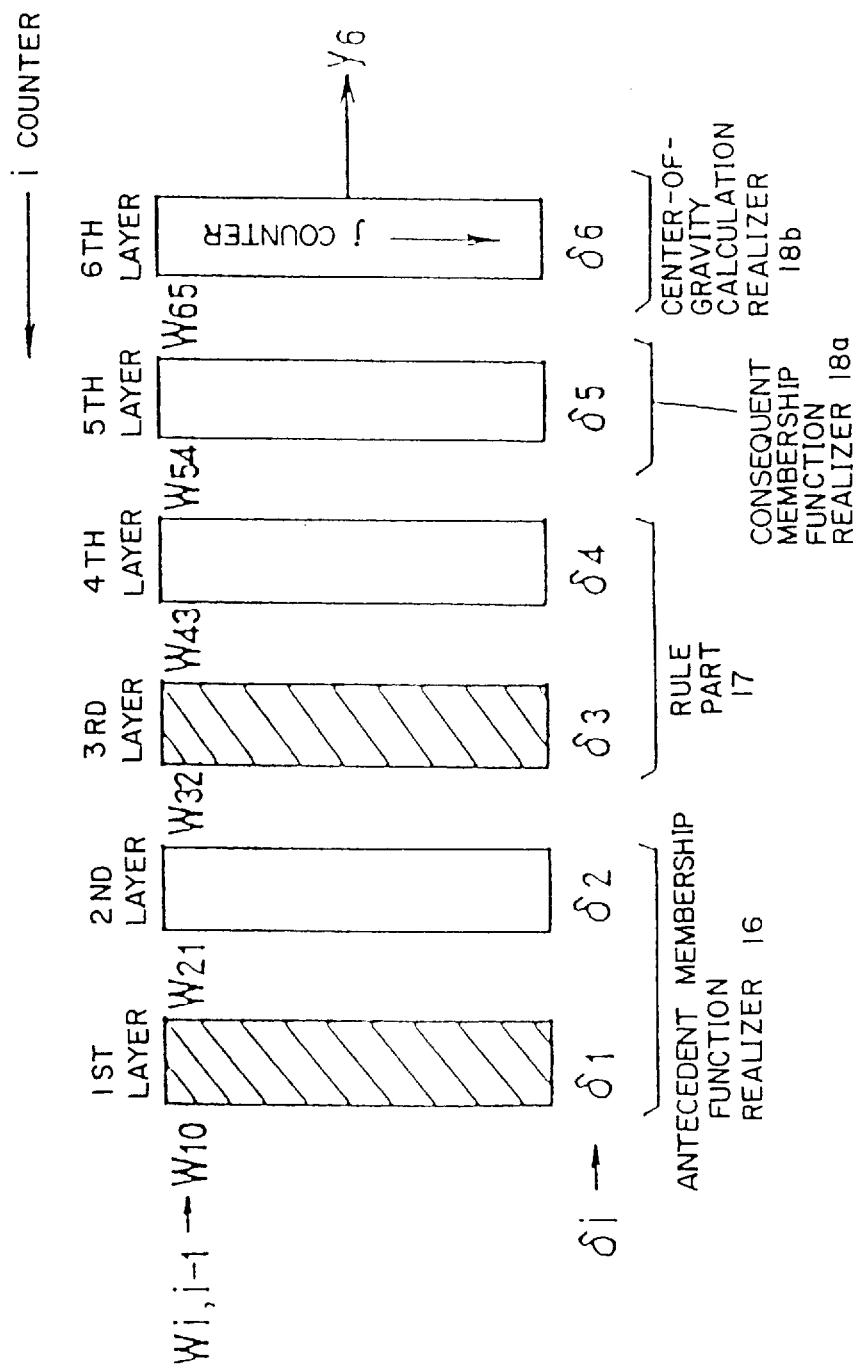
FIG. 117 shows an explanatory view of each parameter for use in learning weight shown in FIG. 116.

FIG. 116 shows a flowchart of weight value learning of the pre-wired-rule-part neuro in the back propagation method. FIG. 117 shows parameters for respective parts in the learning flowchart.

FIG. 117 roughly shows a hierarchical structure of the pre-wired-rule-part neuro shown in FIG. 111. The structure comprises six layers, wherein the 1st–3rd layers comprise Sigmoid function units and the other layers comprise linear function units. However, the input layer is not included. The 1st to 5th layers learn weight values in the back propagation method, and the center-of-gravity calculator 18b of the 6th layer is excluded from the weight value learning layers.

A fuzzy presumption value to be outputted by realizing a fuzzy rule by the pre-wired-rule-part neuro, that is, a control output value, is represented as $y_6$. A learning process in a phase is performed sequentially from the 6th layer to the 5th, 4th, 3rd, 2nd, and 1st. The hierarchical learning process is indicated by the i counter. That is, the i counter is initialized as i=6.

To further simplify the explanation, $W_{1,\ 1\text{-}1}$, $\Delta W_{1,\ 1\text{-}1}$ indicate a matrix, and its value is expressed in (number of neurons in the ith layer)×(i-number of neurons in the lth layer). $\delta i$ and $yi$ indicate a vector, and its value is equal to the number of neurons in the ith layer.

The weight value learning process in the first embodiment is explained as shown in FIG. 116 based on the premise of parameters shown in FIG. 117.

In the first embodiment of this learning method, weight values of the 1st and 2nd layers of the antecedent membership function realizer 16 are learned in phase 1, and then all weight values of the 1st–5th layers are learned in phase 2.

The learning process in phase 1 initializes the counter i for setting a learning layer in S271 to i=6. The initialization specifies a unit in the 6th layer as a learning unit.

Then, in S272, determination is made as to whether or not the unit is a Sigmoid function unit. As the 6th layer comprises a linear function unit, control is transferred to S284. In S284, determination is made as to whether or not the 6th layer is the last process step. As it is the last step, control is transferred to S285, and the difference $\delta_6$ is obtained according to an expression similar to the above described expression (11) using an available teaching signal d and control output y. $\delta$ corresponds to $\alpha$.

Next, in S276, determination is made as to whether or not the 6th layer comprises a weight value learning unit. As the 6th layer is excluded from learning units as shown by a learning flag OFF of the learning adjuster 260 provided in the connection, control is transferred to S278 and the update of a weight value indicates $\Delta W_{65}=0$, and then to S279 without updating the weight value $W_{65}$. Then, in S282, determination is made as to whether or not the counter i reaches E=1 indicating the last layer of the learning process in phase 1. As the counter shows i=6, control is transferred to S283 to decrease the counter i by one to i=5, and then to S272 to perform a learning process in the next 5th layer.

As the 5th layer comprises also linear function units, control is transferred from S272 to S284. However, since the 5th layer is not the last process step, control is transferred to S286. Then the difference $\delta_5$ is calculated according to an expression similar to the above described expression (12). In S276, determination is made as to whether or not the fifth layer comprises learning units. As the fifth layer units are excluded from learning units in phase 1, the update of a weight value $W_{54}=0$ obtained in S279 is invalidated with update of a weight value set to $\Delta W_{54}=0$ in S278. Likewise, processes are performed up to the last unit in the fifth layer. Control is passed to the fourth layer on completion of all the processes in the fifth layer.

As the fourth layer comprises linear function units excluded from learning units in phase 1, identical processes to those in the fifth layer are performed in the fourth layer. Further, as the third layer comprises Sigmoid function units, control is transferred to S272–S273. However, as it is not the last process step, the different $\delta_3$ specific to a Sigmoid function unit is obtained based on an expression similar to the above described expression (7). As the third layer units are excluded from learning units, control is transferred to S276 and then to S278, and the update of the weight value $W_{32}$ in S279 is invalidated with the update of a weight value set to $\Delta W_{32}=0$.

Control is transferred to the second layer on completion of all processes in the third layer. As the second layer comprises linear function units, control is transferred to S272 and S284, and the difference $\delta_2$ is obtained in S286. Since the second layer comprises learning units and belongs to the antecedent membership function realizer 16 in phase 1, control is transferred to S276 and S277 and the update of a weight value $\Delta W_{21}$ is obtained in expressions similar to the above described expressions (6) and (8). Then, in S279, the weight value $W_{21}$ is updated according to an expression similar to the above described expression (8a). Identical processes are repeated up to the last unit of the second layer, and control is transferred to the first layer.

As the first layer comprises Sigmoid function units but is not the last process step, control is transferred to S275 where the difference $\delta_1$ is obtained following the processes in S272 and S273. Then, the update of a weight value $\Delta W_{10}$ is obtained in S277 following S276, updating the weight value $W_{10}$ in step 279. Thus, similar processes are repeated up to the last unit in the first layer. When all the processes are completed, control is transferred to S282 where a counter i corresponds to the last hierarchical layer E=1. Therefore, the completion of learning in phase 1 is assumed, terminating the whole process.

Next, in phase 2 where a weight value of the whole neuro is learned, only the difference $\delta_6$ is calculated, but a weight value $W_{65}$ is not updated. However, when control is transferred to the fifth layer, a weight value $\Delta W_{54}$ is calculated effectively and then it is updated. Likewise, weight values are learned in the remaining 4th, 3rd, 2nd, and first layers sequentially. Thus, a series of learning processes terminate when the process of the last unit in the first layer is finished.

(A learning process of the second embodiment)

Figure 101:
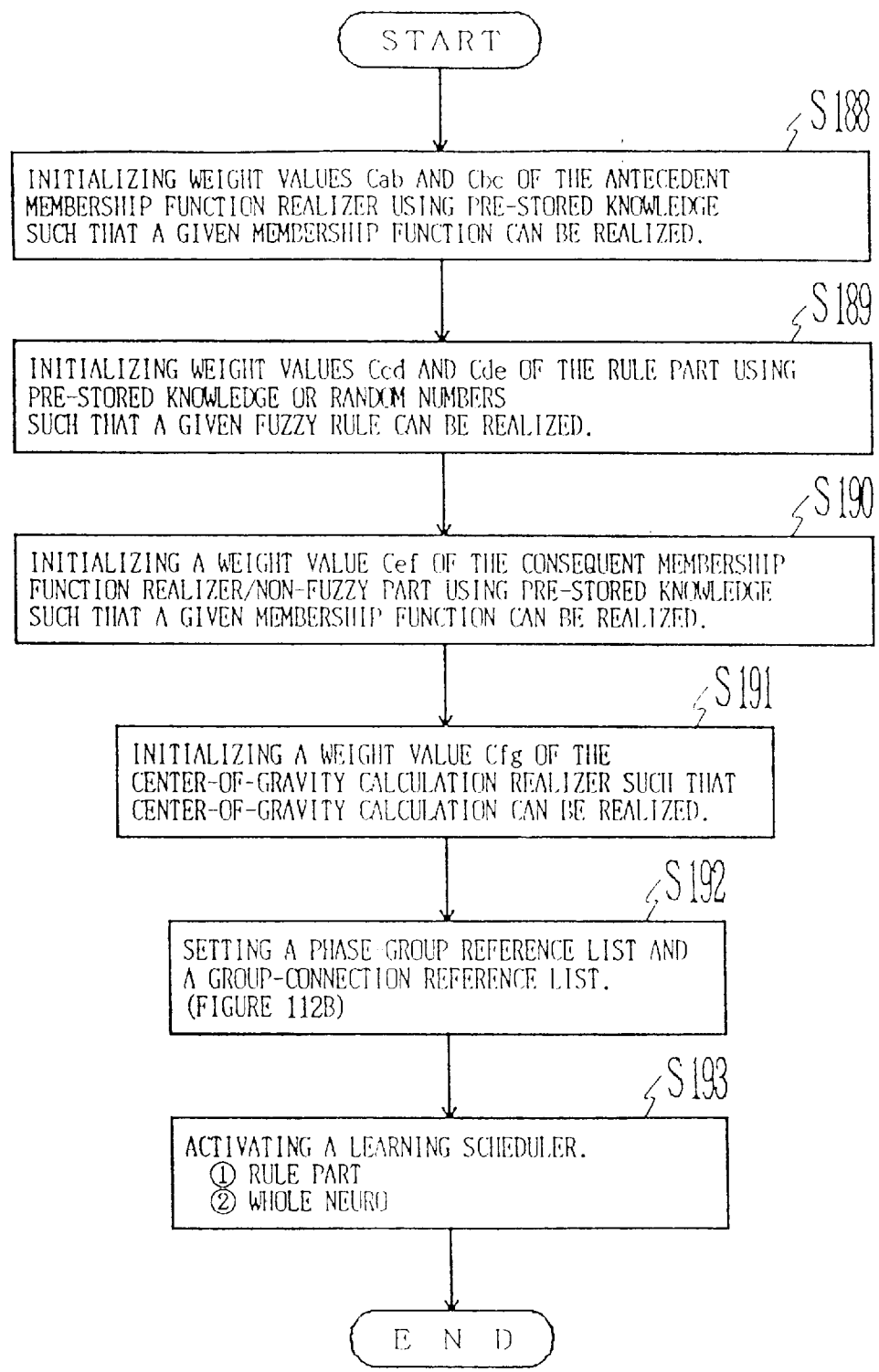
FIG. 101 shows a flowchart of a learning operation for learning information in the second embodiment.

A learning process of the second embodiment is performed for:

1 the rule part 17
2 the whole neuro as shown in step S193 in FIG. 101. As indicated in step S189 in the sequence of the weight value learning process, the initialization of a weight value for the rule part 17 is conducted depending on the installation of pre-stored knowledge, on random numbers for random initialization, or on the combination of these. On the other hand, in the antecedent membership function realizer 16 and consequent membership function realizer/non-fuzzy part 18 where a weight value learning process is performed in the second and the following process of phase 2, the initialization of a weight value is conducted only depending on the installation of the pre-stored knowledge as shown in steps S188 and S190.

A phase group reference table indicated in step S192 is established by setting neuron group numbers Gd and Ge which belong to the rule part 17 in phase 1 as shown in FIG. 112B, and by setting five neuron group numbers Gb–Gf in phase 2. In a learning process in the second embodiment, the whole pre-wired-rule-part neuro is learned after a weight value of the rule part 17 is learned, thereby re-adjusting the weight value of the whole pre-wired-rule-part neuro according to the result of the weight value learning process of the rule part.

(A Learning Process of the 3rd Embodiment)

Figure 102:
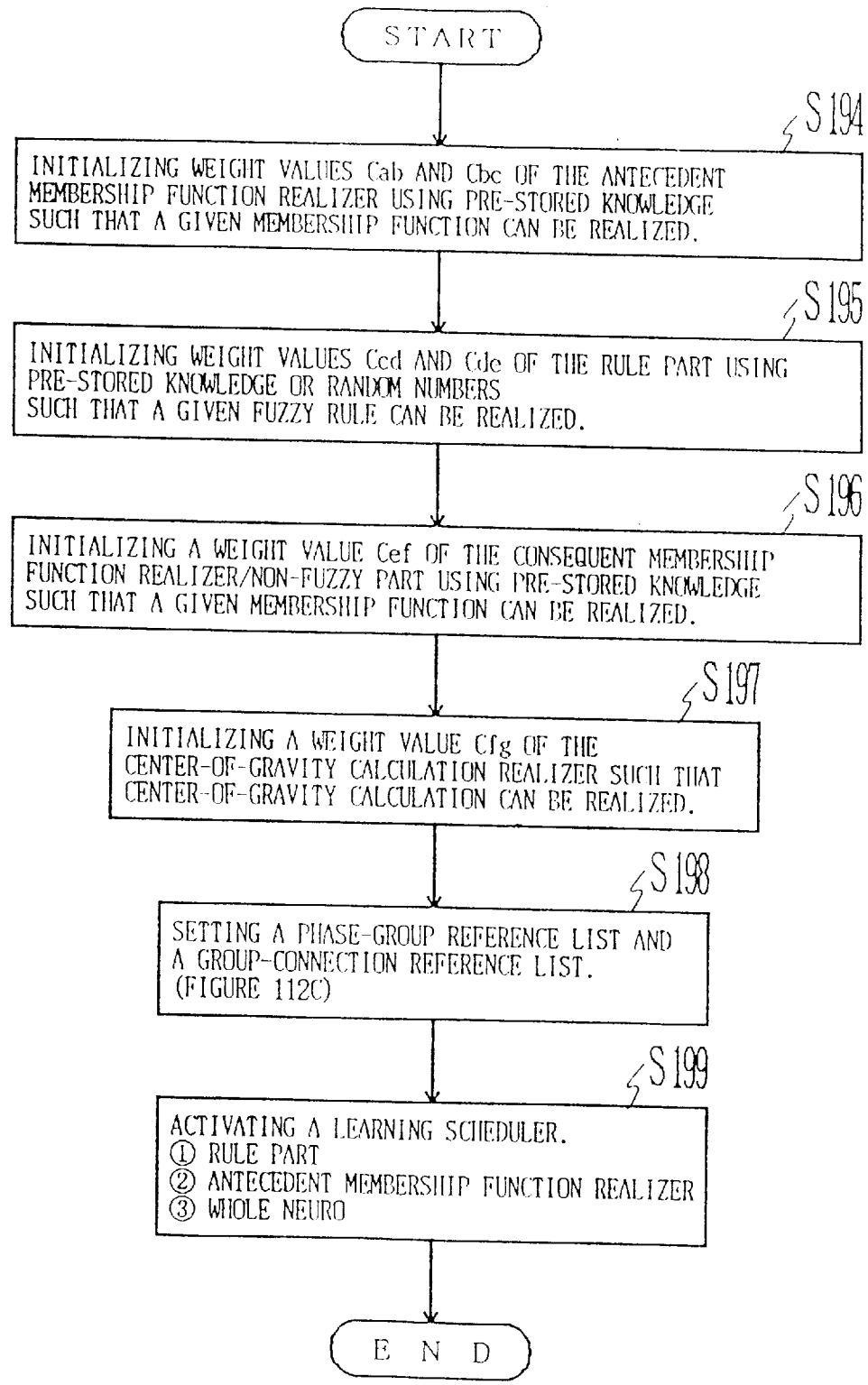
FIG. 102 shows a flowchart of a learning operation for learning information in the third embodiment.

A learning process of the third embodiment is performed sequentially for:

1 the rule part 17
2 the former membership function realizer 16
3 the whole neuro as shown in step S199 in FIG. 102. In the sequence of the weight value learning process, the rule part 17 is processed first. As indicated in step S195, the initialization of a weight value for the rule part 17 is conducted depending on the installation of pre-stored knowledge, on random numbers for random initialization, or on the combination of these. On the other hand, in the antecedent membership function realizer 16 and consequent membership function realizer/non-fuzzy part 18 where a weight value learning process is performed in the second and the following process, the initialization of a weight value is conducted only depending on the installation of the pre-stored knowledge as shown in steps S194 and S196.

A phase group reference table indicated in step S198 is established by setting neuron group numbers Gd and Ge which belong to the rule part 17 in phase 1 as shown in FIG. 112C, setting neuron group numbers Gb and Gc in phase 2 which belong to the former membership function realizer 16, and by setting five group numbers Gb–Gf in phase 3 for the whole neuro. In the third embodiment, the whole pre-wired-rule-part neuro is learned after weight values of the rule part 17 and the former membership function realizer 16 are learned, thereby re-adjusting the weight value of the whole pre-wired-rule-part neuro according to the results of the weight value learning processes of the rule part 17 and the antecedent membership function realizer 16.

(A Learning Process of the 4th Embodiment)

Figure 103:
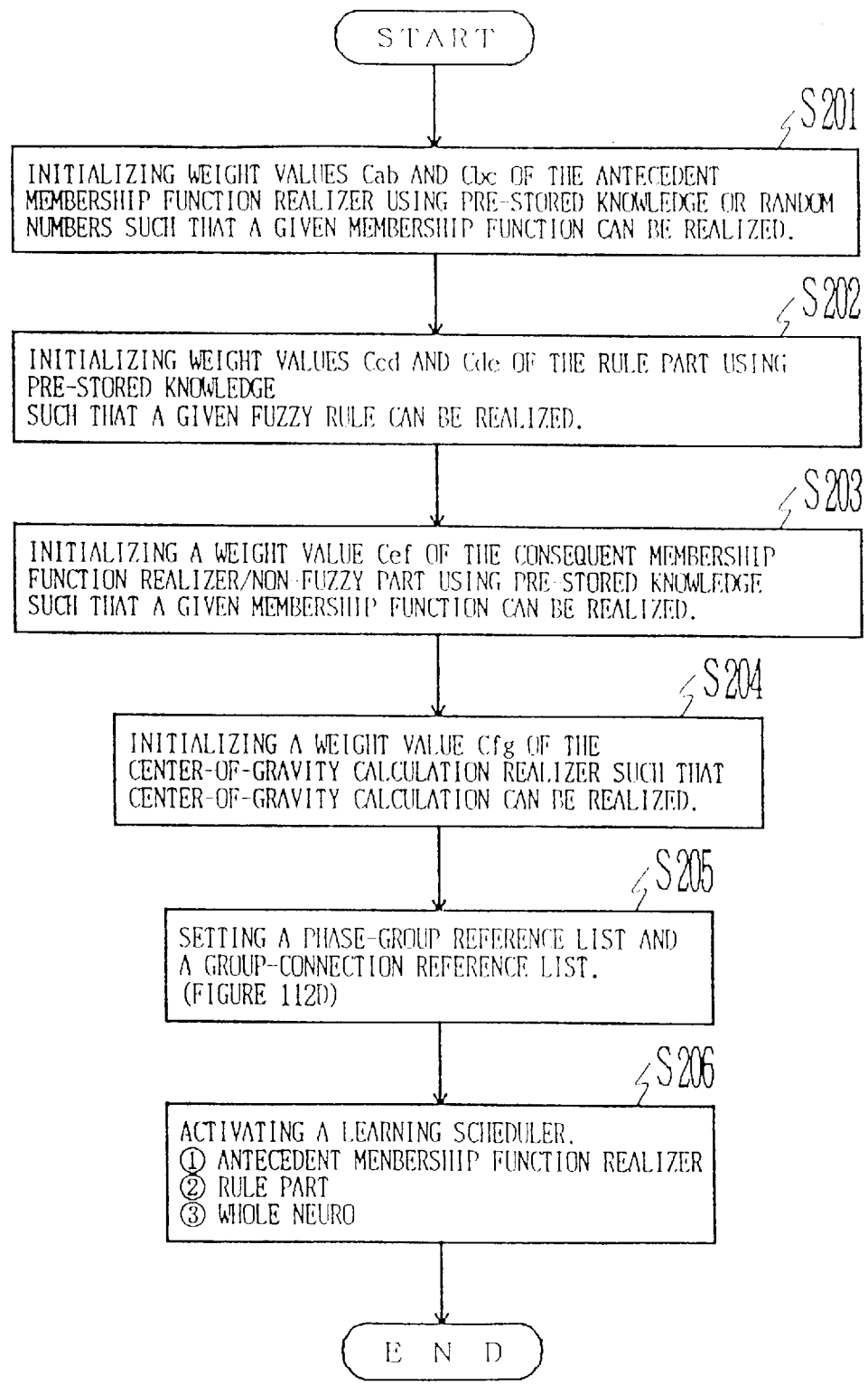
FIG. 103 shows a flowchart of a learning operation for learning information in the fourth embodiment.

A learning process of the fourth embodiment is performed sequentially for:

① the former membership function realizer 16
② the rule part 17
③ the whole neuro as shown in step 206 in FIG. 103. In the sequence of the weight value learning process, the antecedent membership function realizer 16 is processed first. As indicated in step S201, the initialization of a weight value for the antecedent membership function realizer 16 is conducted depending on the installation of pre-stored knowledge, on random numbers for random initialization, or on the combination of these. On the other hand, in the rule part 17 and the consequent membership function realizer/non-fuzzy part 18 where a weight value learning process is performed in the second and the following process, the initialization of a weight value is conducted only depending on the installation of the pre-stored knowledge as shown in steps S202 and S203.

A phase group reference table indicated in step S205 is established by setting neuron group numbers Gb and Gc which belong to the antecedent membership function realizer 16 in phase 1 as shown in FIG. 112D, setting neuron group numbers Gd–Ge in phase 2 which belong to the rule part 17, and by setting five group numbers Gb–Gf in phase 3 for the whole neuro. In the fourth embodiment, the whole pre-wired-rule-part neuro is learned after weight values of the antecedent membership function realizer 16 and the rule part 17 are learned, thereby re-adjusting the weight value of the whole pre-wired-rule-part neuro according to the results of the weight value learning processes of the former membership function realizer 16 and the rule part 17.

(A Learning Process of the 5th Embodiment)

Figure 104:
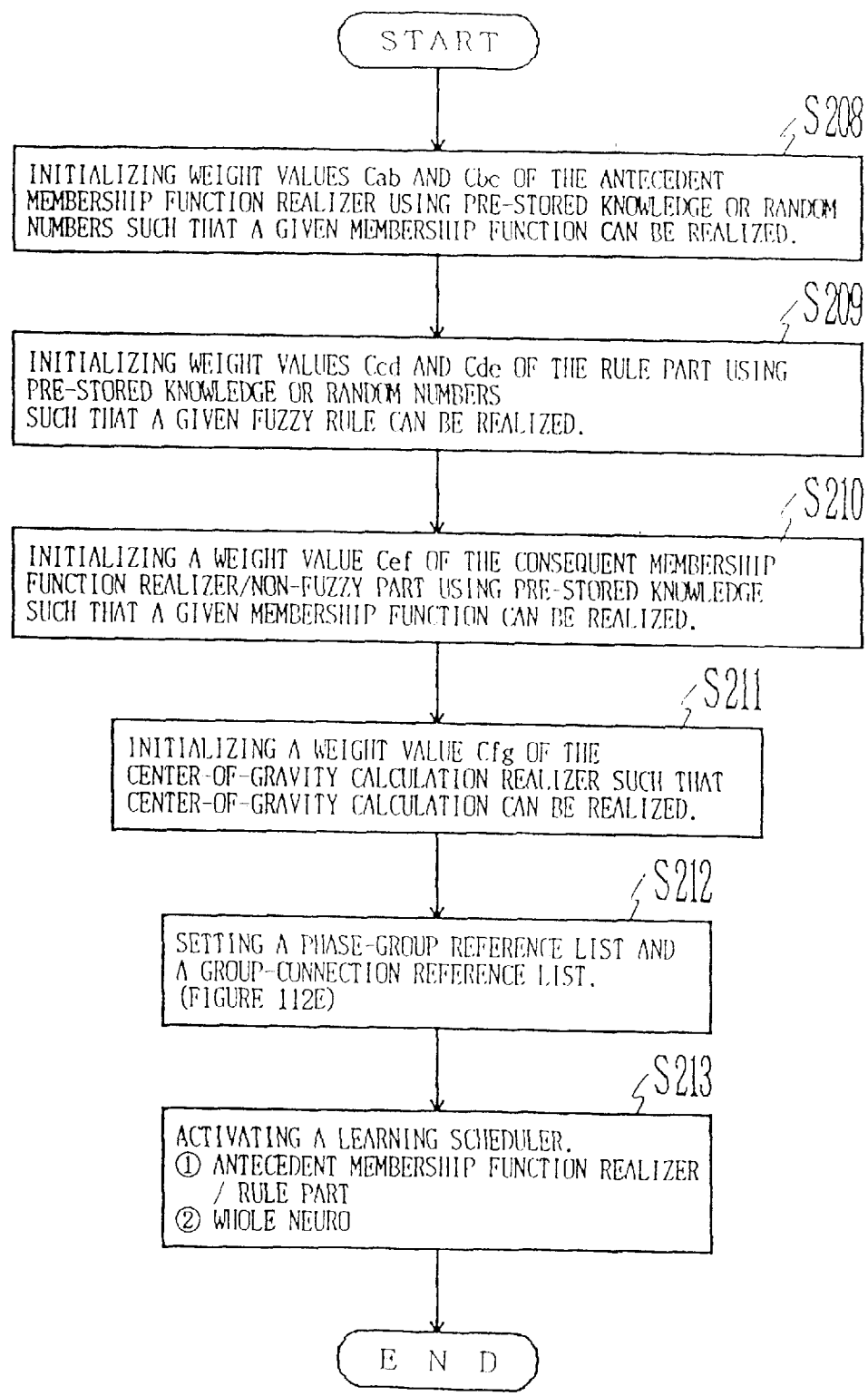
FIG. 104 shows a flowchart of a learning operation for learning information in the fifth embodiment.

A learning process of the fifth embodiment is performed sequentially for:

① the former membership function realizer 16 and the rule part 17
② the whole neuro as shown in step 213 in FIG. 104. In the sequence of the weight value learning process, the antecedent membership function realizer 16 and the rule part 17 are processed first simultaneously. As indicated in steps S208 and S209, the initialization of a weight value for the former membership function realizer 16 and the rule part 17 is conducted depending on the installation of pre-stored knowledge, on random numbers for random initialization, or on the combination of these. On the other hand, in the consequent membership function realizer/non-fuzzy part 18 where a weight value learning process is performed in the second and the following process, the initialization of a weight value is conducted only depending on the installation of the pre-stored knowledge as shown in steps S210. A phase group reference table indicated in step S212 is established by setting four neuron group numbers Gb, Gc, Gd, and Ge which belong to the former membership function realizer 16 and the rule part 17 in phase 1 as shown in FIG. 112E, and by setting five group numbers Gb–Gf in phase 2 for the whole neuro. In the fifth embodiment, the whole pre-wired-rule-part neuro is learned after weight values of the antecedent membership function realizer 16 and the rule part 17 are learned simultaneously, thereby re-adjusting the weight value of the whole pre-wired-rule-part neuro according to the results of the weight value learning processes of the antecedent membership function realizer 16 and the rule part 17.

(A Learning Process of the 6th Embodiment)

Figure 105:
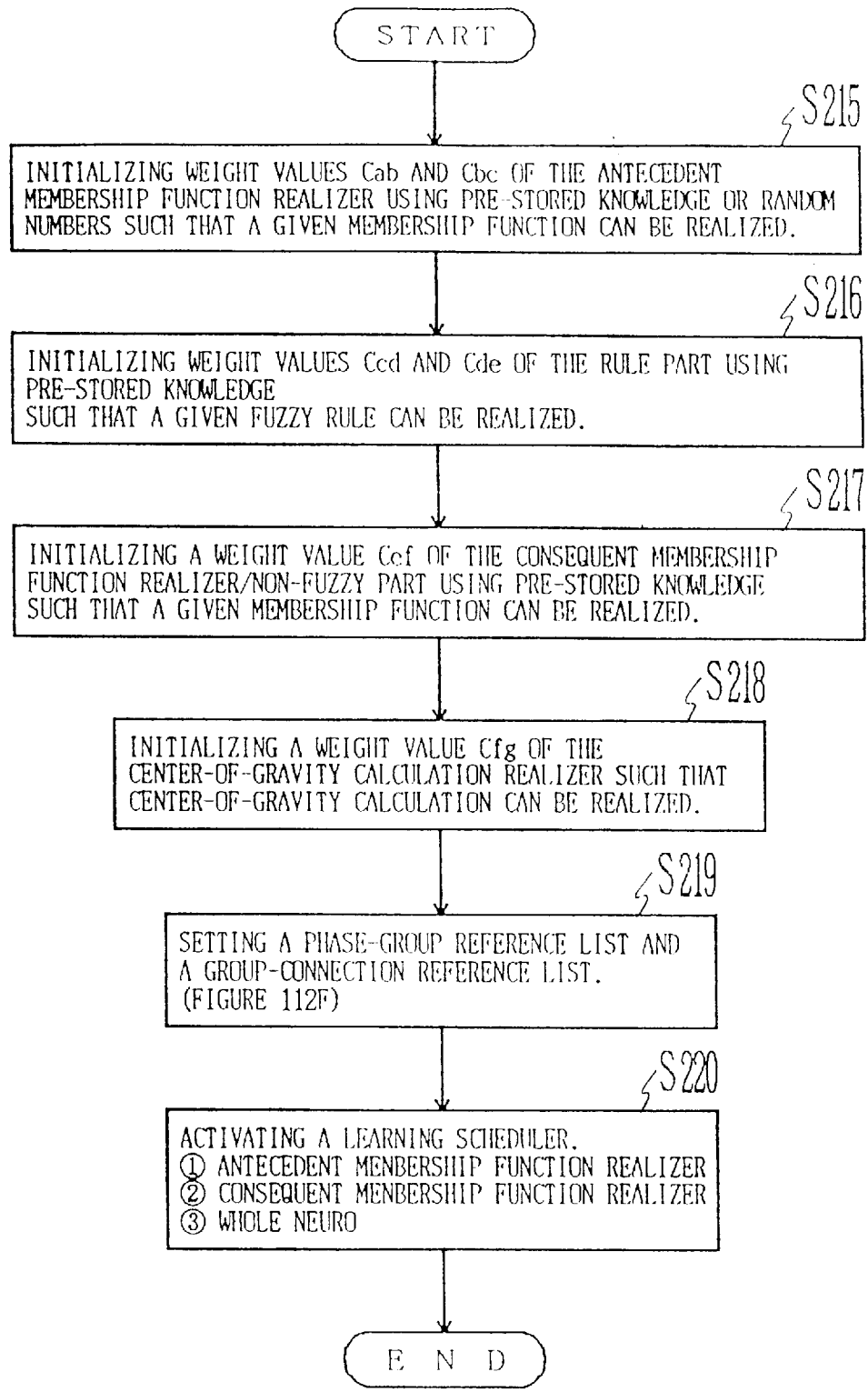
FIG. 105 shows a flowchart of a learning operation for learning information in the sixth embodiment.

A learning process of the sixth embodiment is performed sequentially for:

① the former membership function realizer 16
② the consequent membership function realizer/non-fuzzy part 18
③ the whole neuro as shown in step 220 in FIG. 105. In the sequence of the weight value learning process, the antecedent membership function realizer 16 is processed first. As indicated in step S215, the initialization of a weight value for the antecedent membership function realizer 16 is conducted depending on the installation of pre-stored knowledge, on random numbers for random initialization, or on the combination of these. On the other hand, in the rule part 17 and the consequent membership function realizer/non-fuzzy part 18 where a weight value learning process is performed in the second and the following process, the initialization of a weight value is conducted only depending on the installation of the pre-stored knowledge as shown in steps S216 and S217.

A phase group reference table indicated in step S219 is established by setting neuron group numbers Gb and Gc which belong to the antecedent membership function realizer 16 in phase 1 as shown in FIG. 112F, setting a neuron group number Gf in phase 2 which belongs to the consequent membership function realizer/non-fuzzy part 18, and by setting five group numbers Gb–Gf in phase 3 for the whole neuro. In the sixth embodiment, the whole pre-wired-rule-part neuro is learned after weight values of the former membership function realizer 16 and the consequent membership function realizer/non-fuzzy part 18 are learned, thereby re-adjusting the weight value of the whole pre-wired-rule-part neuro according to the results of the weight value learning processes of the former membership function realizer 16 and the consequent membership function realizer/non-fuzzy part 18.

(A Learning Process of the 7th Embodiment)

Figure 106:
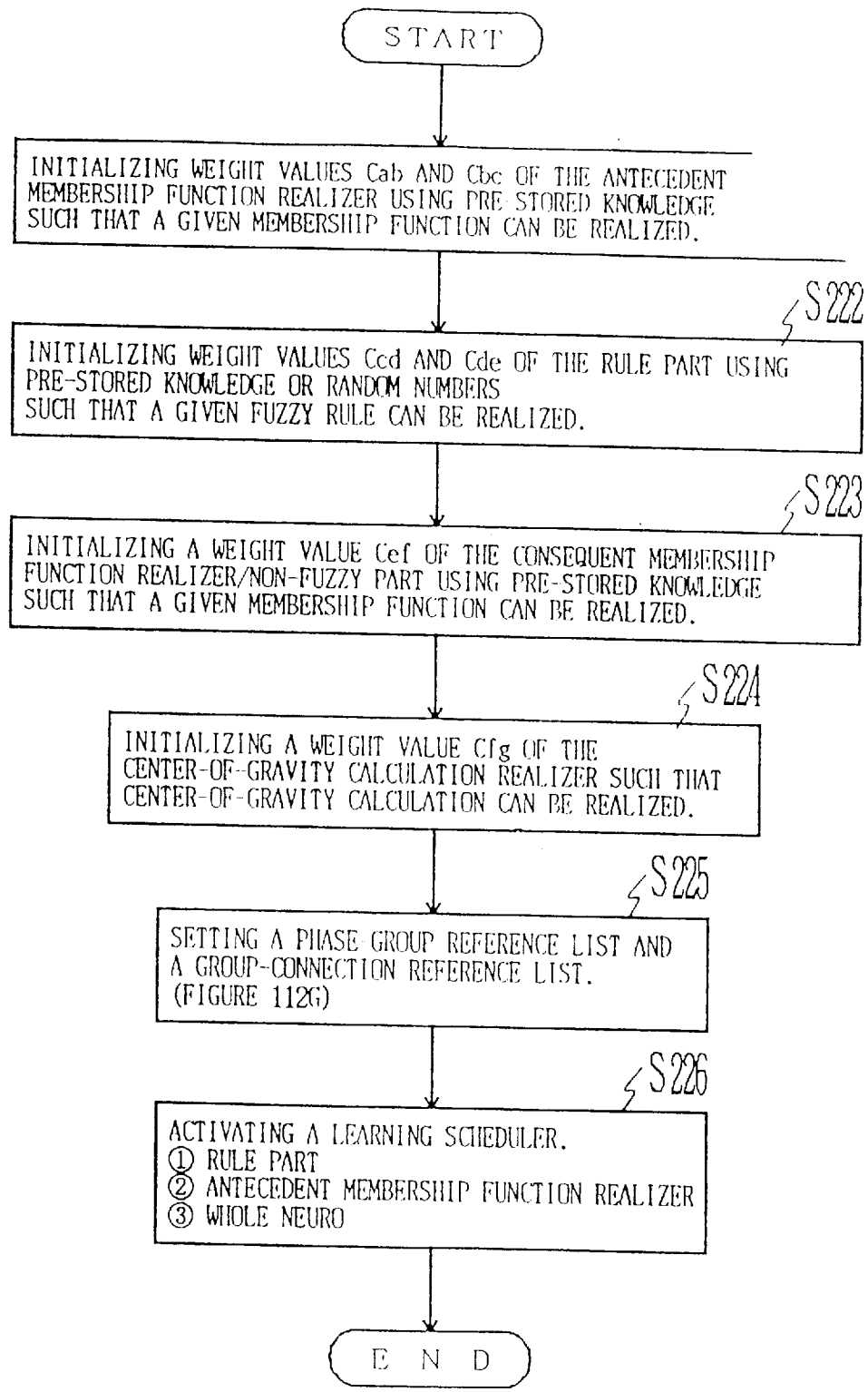
FIG. 106 shows a flowchart of a learning

A learning process of the seventh embodiment is performed sequentially for:

① the rule part 17
② the consequent membership function realizer/non-fuzzy part 18
③ the whole neuro as shown in step 226 in FIG. 106. In the sequence of the weight value learning process, the rule part 17 is processed first. As indicated in step S222, the initialization of a weight value for the rule part 17 is conducted depending on the installation of pre-stored knowledge, on random numbers for random initialization, or on the combination of these. On the other hand, in the former membership function realizer 16 and the consequent membership function realizer/non-fuzzy part 18 where a weight value learning process is performed in the second and the following process, the initialization of a weight value is conducted only depending on the installation of the pre-stored knowledge as shown in steps S221 and S223.

A phase group reference table indicated in step S225 is established by setting neuron group numbers Gd and Ge which belong to the rule part 17 in phase 1 as shown in FIG. 112G, setting a neuron group number Gf in phase 2 which belongs to the consequent membership function realizer/non-fuzzy part 18, and by setting five neuron group numbers Gb–Gf in phase 3 for the whole neuro.

In the seventh embodiment, the whole pre-wired-rule-part neuro is learned after weight values of the rule part 17 and the consequent membership function realizer/non-fuzzy part 18 are learned, thereby re-adjusting the weight value of the whole pre-wired-rule-part neuro according to the results of the weight value learning processes of the rule part 17 and the consequent membership function realizer/non-fuzzy part 18.

(A Learning Process of the 8th Embodiment)

Figure 107:
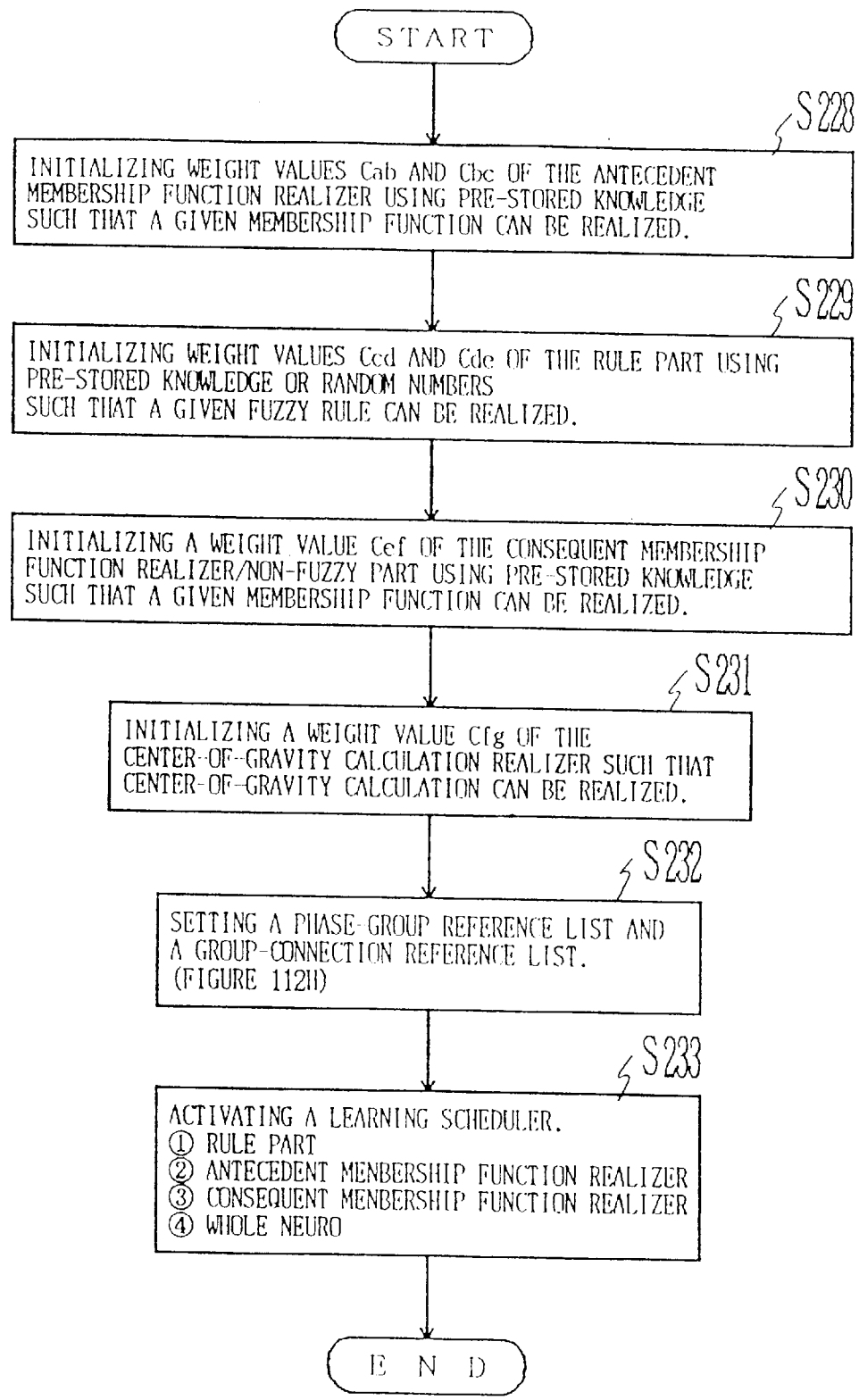
FIG. 107 shows a flowchart of a learning operation for learning information in the eighth embodiment.

A learning process of the eighth embodiment is performed sequentially for:

① the rule part 17
② the former membership function realizer 16
③ the consequent membership function realizer/non-fuzzy part 18
④ the whole neuro as shown in step 233 in FIG. 107. In the sequence of the weight value learning process, the rule part 17 is processed first. As indicated in step S229, the initialization of a weight value for the rule part 17 is conducted depending on the installation of pre-stored knowledge, on random numbers for random initialization, or on the combination of these. On the other hand, in the antecedent membership function realizer 16 and the consequent membership function realizer/non-fuzzy part 18 where a weight value learning process is performed in the second and the following process, the initialization of a weight value is conducted only depending on the installation of the pre-stored knowledge as shown in steps S228 and S230.

A phase group reference table indicated in step S232 is established by setting neuron group numbers Gd and Ge which belong to the rule part 17 in phase 1 as shown in FIG. 112H, setting neuron group numbers Gb and Gc in phase 2 which belong to the antecedent membership function realizer 16, setting a neuron group number Gf in phase 3 which belongs to the consequent membership function realizer/non-fuzzy part 18, and by setting five neuron group numbers Gb–Gf in phase 3 for the whole neuro. In the eighth embodiment, the whole pre-wired-rule-part neuro is learned after weight values of the rule part 17, the former membership function realizer 16, and the consequent membership function realizer/non-fuzzy part 18 are learned, thereby re-adjusting the weight value of the whole pre-wired-rule-part neuro according to the results of the weight value learning processes of the former membership function realizer 16, the rule part 17 and the consequent membership function realizer/non-fuzzy part 18.

(A Learning Process of the 9th Embodiment)

Figure 108:
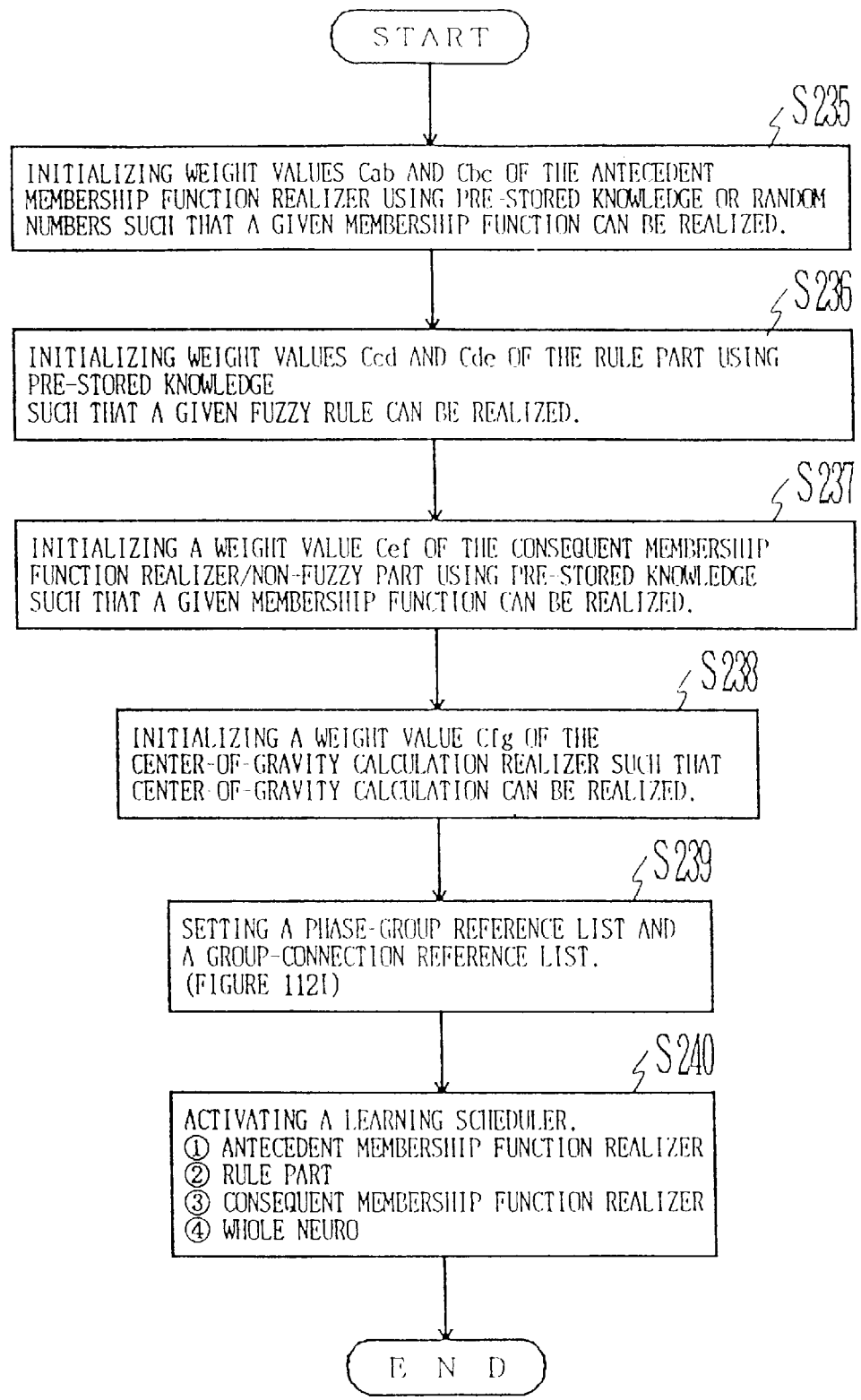
FIG. 108 shows a flowchart of a learning operation for learning information in the ninth embodiment.

A learning process of the ninth embodiment is performed sequentially for:

① the former membership function realizer 16
② the rule part 17
③ the consequent membership function realizer/non-fuzzy part 18
④ the whole neuro as shown in step 240 in FIG. 108. In the sequence of the weight value learning process, the antecedent membership function realizer 16 is processed first. As indicated in step S235, the initialization of a weight value for the antecedent membership function realizer 16 is conducted depending on the installation of pre-stored knowledge, on random numbers for random initialization, or on the combination of these. On the other hand, in the rule part 17 and the consequent membership function realizer/non-fuzzy part 18 where a weight value learning process is performed in the second and the following process, the initialization of a weight value is conducted only depending on the installation of the pre-stored knowledge as shown in steps S236 and S237.

A phase group reference table indicated in step S239 is established by setting neuron group numbers Gb and Gc which belong to the antecedent membership function realizer 16 in phase 1 as shown in FIG. 112I, setting neuron group numbers Gd and Ge in phase 2 which belong to the rule part 17, setting a neuron group number Gf in phase 3 which belongs to the consequent membership function realizer/non-fuzzy part 18, and by setting five neuron group numbers Gb–Gf in phase 3 for the whole neuro. In the ninth embodiment, the whole pre-wired-rule-part neuro is learned after weight values of the former membership function realizer 16, rule part 17, and the consequent membership function realizer/non-fuzzy part 18 are learned, thereby re-adjusting the weight value of the whole pre-wired-rule-part neuro according to the results of the weight value learning processes of the former membership function realizer 16, the rule part 17 and the consequent membership function realizer/non-fuzzy part 18.

(A Learning Process of the 10th Embodiment)

Figure 109:
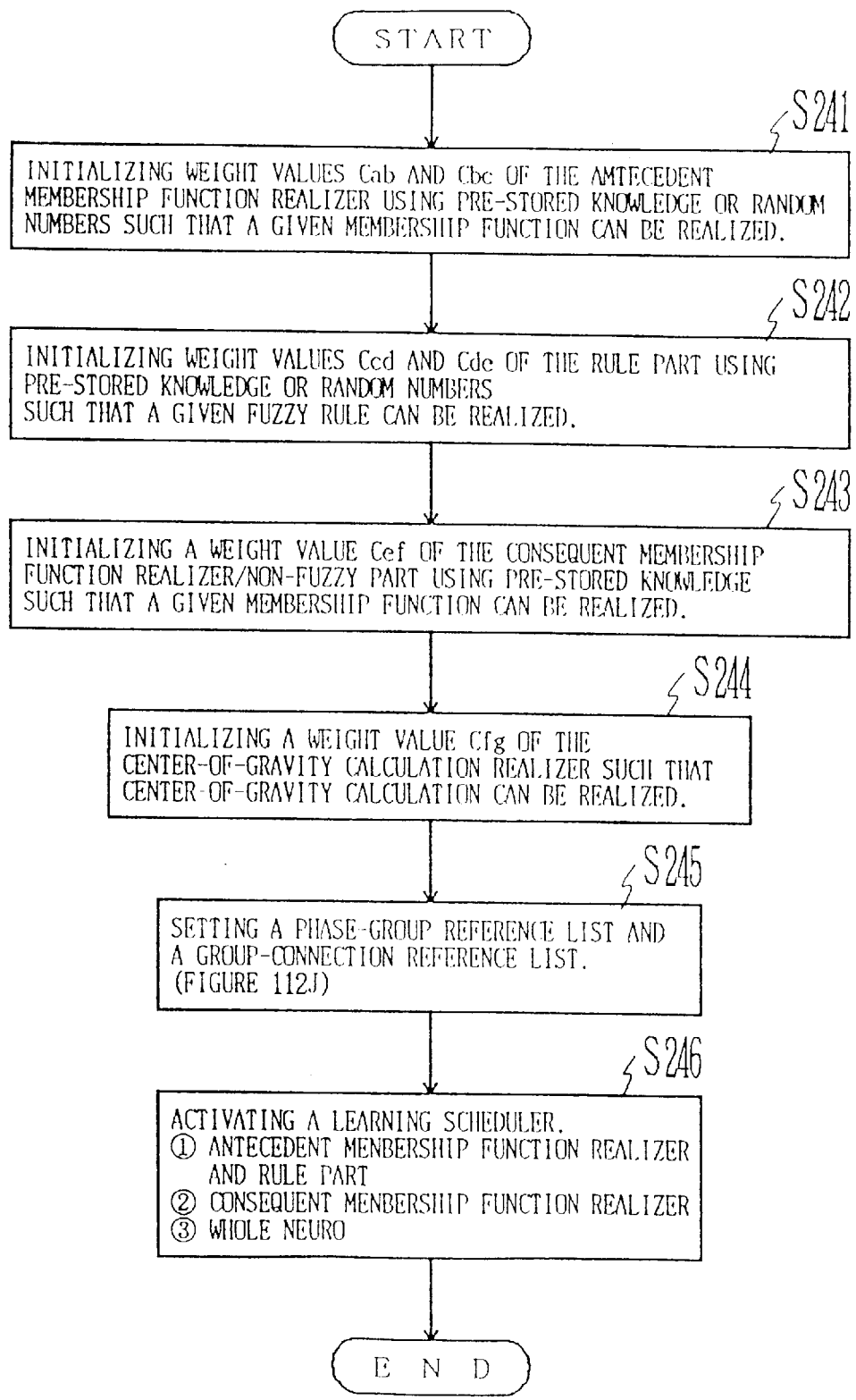
FIG. 109 shows a flowchart of a learning operation for learning information in the tenth embodiment.

A learning process of the tenth embodiment is performed sequentially for:

① the former membership function realizer 16 and the rule part 17
② the consequent membership function realizer/non-fuzzy part 18
③ the whole neuro as shown in step 246 in FIG. 109. In the sequence of the weight value learning process, the antecedent membership function realizer 16 and the rule part 17 are processed first simultaneously. As indicated in steps S241 and S242, the initialization of a weight value for the former membership function realizer 16 and the rule part 17 is conducted depending on the installation of pre-stored knowledge, on random numbers for random initialization, or on the combination of these. On the other hand, in the consequent membership function realizer/non-fuzzy part 18 where a weight value learning process is performed in the second and the following process, the initialization of a weight value is conducted only depending on the installation of the pre-stored knowledge as shown in steps S243.

A phase group reference table indicated in step S245 is established by setting neuron group numbers Gb, Gc, Gd, and Ge which belong to the former membership function realizer 16 and the rule part 17 in phase 1 as shown in FIG. 112J, setting a neuron group number Gf in phase 2 which belongs to the consequent membership function realizer/non-fuzzy part 18, and by setting five group numbers Gb–Gf in phase 3 for the whole neuro. In the tenth embodiment, the whole pre-wired-rule-part neuro is learned after weight values of the antecedent membership function realizer 16 and the rule part 17 are learned simultaneously and after a weight value of the consequent membership function realizer/non-fuzzy part 18 is learned, thereby re-adjusting the weight value of the whole pre-wired-rule-part neuro according to the results of the weight value learning processes of the antecedent membership function realizer 16, the rule part 17, and the consequent membership function realizer/non-fuzzy part 18. Next, another example of conversion of a fuzzy teacher to a pre-wired-rule-part neuro or a completely-connected-rule-part neuro is explained. Such conversion can be explained as a simulation where data processing capabilities of a data processing system work on a pre-wired-rule-part neuro, a completely-connected-rule-part neuro, and a pure neuro.

Figure 118:
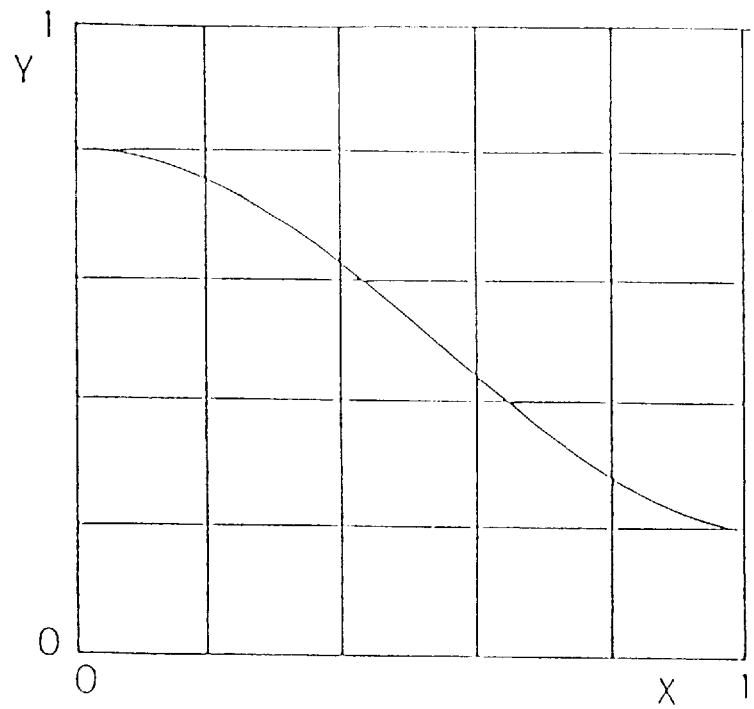
FIG. 118 shows an explanatory view of an input signal associated with data processing capabilities where data are obtained by simulation.
Figure 119A:
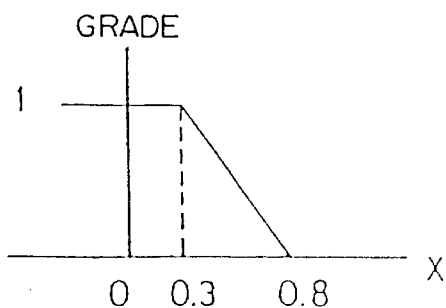
FIGS. 119A–119D show an explanatory view of a membership function described in a fuzzy teacher generated by simulation.
Figure 119B:
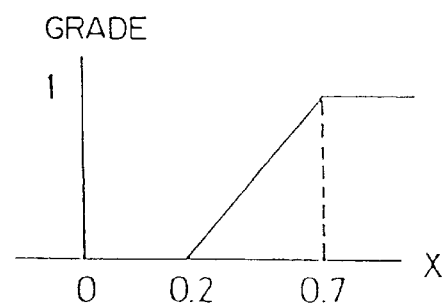
Figure 119C:
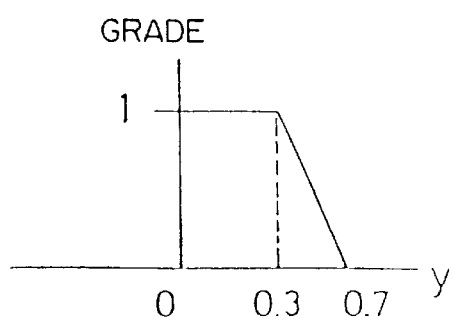
Figure 119D:
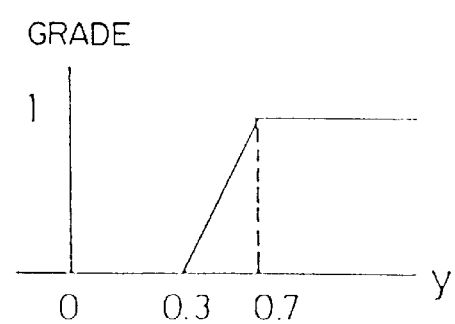

The simulation comprises data processing capabilities having the input/output signal relation shown in FIG. 118 in a hierarchical network part 159. In FIG. 118, a horizontal line x indicates an input signal, and a vertical line y indicates an output signal. Based on this input/output signal relation, an input signal x shows a membership function indicating "small 1" as shown in FIG. 119A and "big 1" as shown in FIG. 119B; and an output signal shows a membership function indicating "small 2"0 as shown in FIG. 119C and "big 2" as shown in FIG. 119D. The connection between these membership functions is defined as follows:

L1: if x is big ① then y is small ②
L2: if x is small ① then y is big ②

According to the above described two rules a fuzzy teacher 10 is generated.

Figure 120:
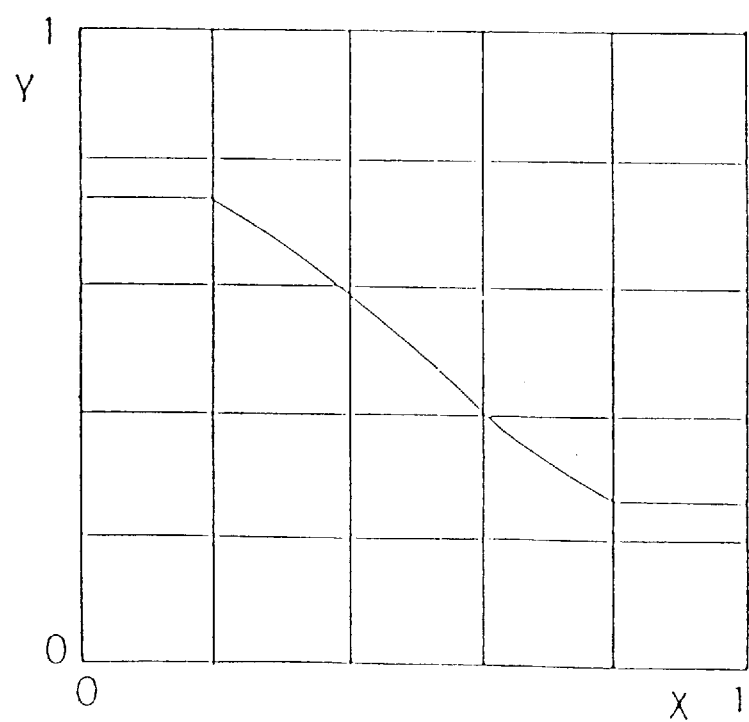
FIG. 120 shows an explanatory view of an input/output signal of a generated fuzzy teacher.

In FIG. 120, the input/output signal relation of the generated fuzzy teacher 10 is illustrated, where an output signal y, that is, a fuzzy presumption value, can be determined according to the above described expression (21). As shown in FIG. 120, a generated fuzzy teacher 10 shows an approximation, though rough, of input/output signals of data processing capabilities shown in FIG. 118.

Figure 121:
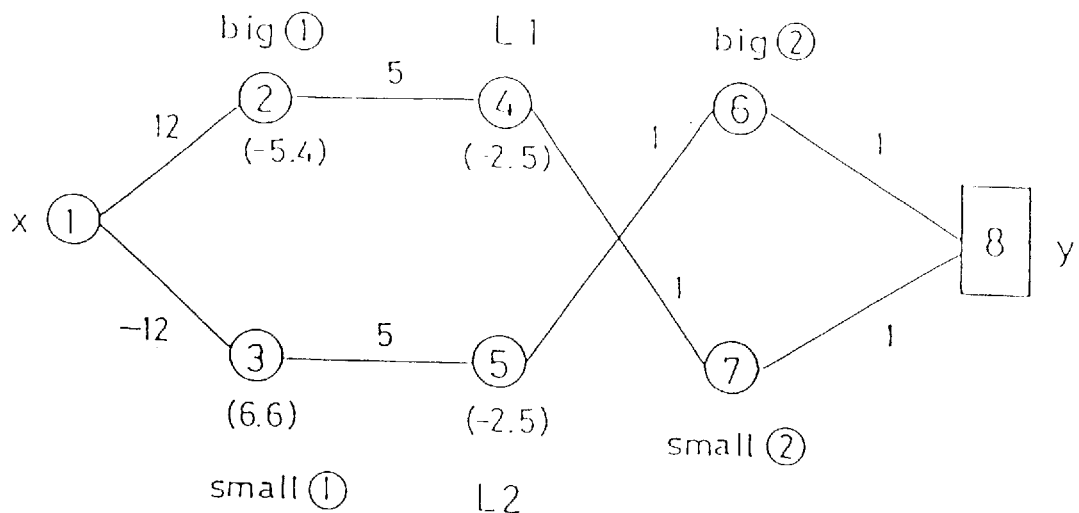

FIG. 121 shows an example of a hierarchical network part 159 generated by a fuzzy teacher 10 shown in FIG. 120, where the hierarchical network part 159 corresponds to the pre-wired-rule part neuro 12. In FIG. 121, a basic unit 1 of "2" is assigned a weight value 12 and a threshold −5.4 to have a configuration that calculates a grade value of a membership function indicating "big 1" shown in FIG. 119B. A basic unit 1 of "3" is assigned a weight value −12 and a threshold 6.6 to have a configuration that calculates a grade value of a membership function indicating "small 1" shown in FIG. 119A. Basic units 1 of "4" and "5" respectively are assigned a weight value 5 and a threshold −2.5 to have a configuration where the relation between a sum of input values and a threshold approximately shows a line. In a unit 6 provided corresponding to a membership function indicating "big 2" as shown in FIG. 119D and a unit 7 provided corresponding to a membership function indicating "small 2" as shown in FIG. 119C, a linear element is used to output an input value just as inputted. A weight value of the internal connection between the unit "6" and the basic unit 1 of "5", and a weight value of the internal connection between the unit "7" and the basic unit 1 of "4" is 1 respectively. Then, a weight value of the internal connection between a center-of-gravity determining module "8" and each of units "6" and "7" is also 1 respectively.

Figure 122:
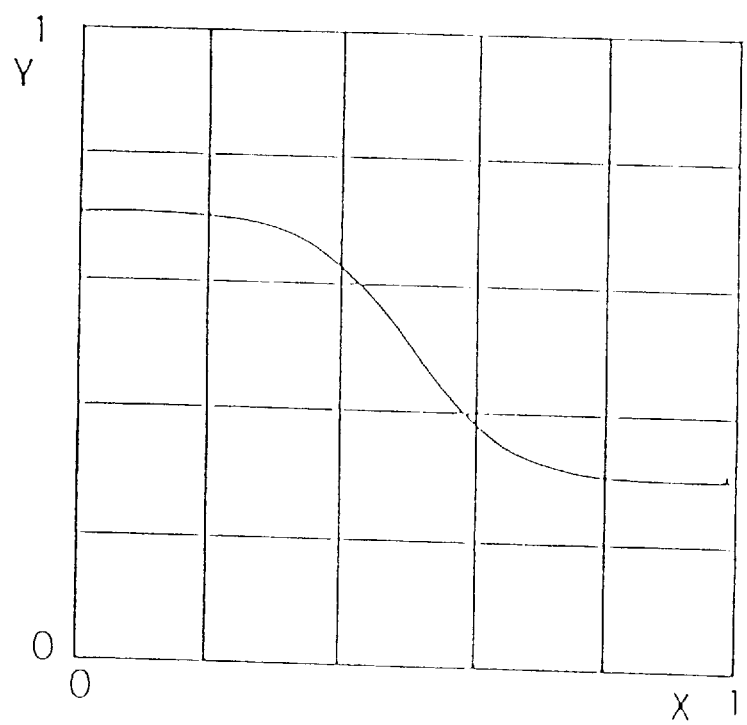

FIG. 122 shows the input/output signal relation in the hierarchical network part 159 shown in FIG. 121. As shown in FIG. 122, the hierarchical network part 159 shown in FIG. 121, that is, a pre-wired-rule-part neuro has data processing capability of outputting input/output signals quite similar to input/output signals shown in FIG. 118 without learning at all. Therefore, the data processing capabilities can be much more improved in precision after learning weight values and thresholds.

Figure 123A:
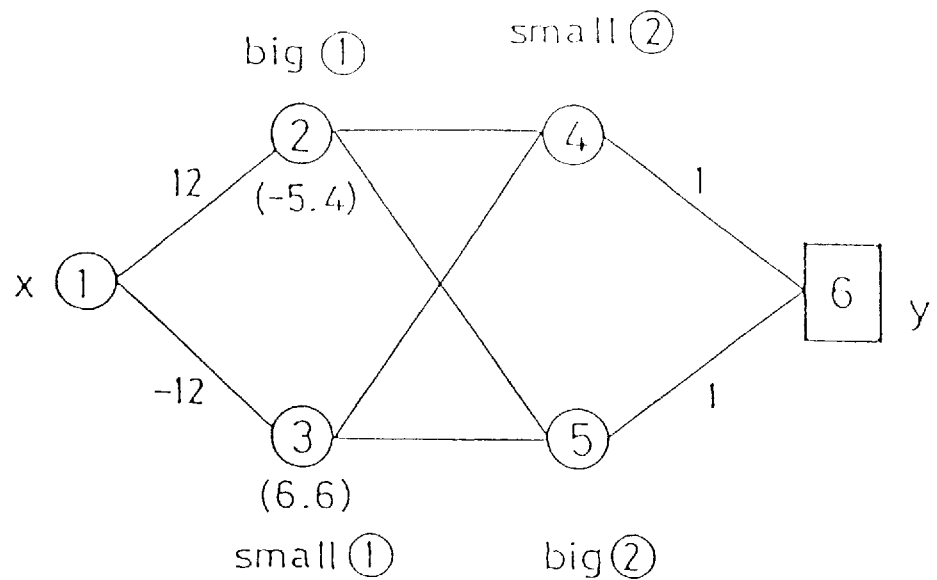
Figure 123B:
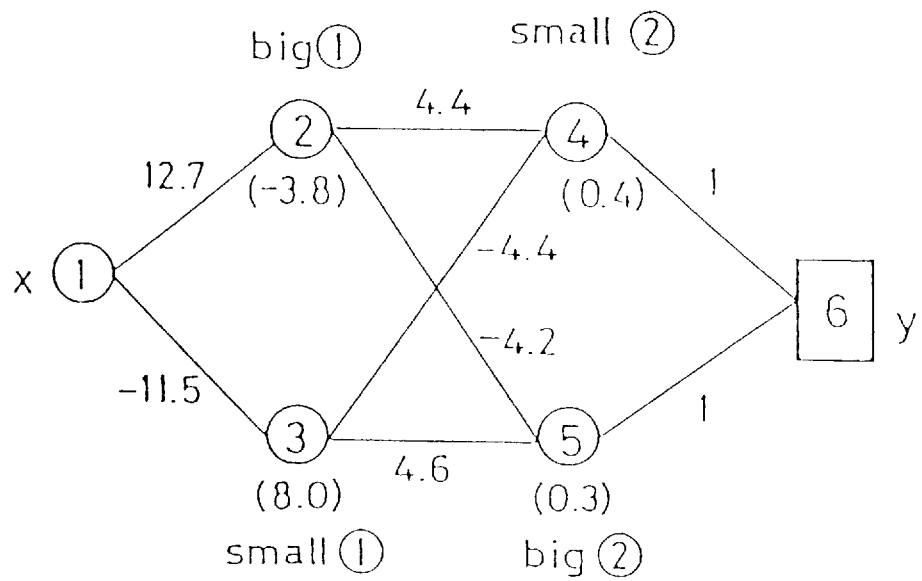

FIG. 123A shows another example of the hierarchical network part 159 generated from the fuzzy teacher 10 shown in FIG. 120. The hierarchical network 159 corresponds to the completely-connected-rule-part neuro 13. In FIG. 123A, the basic unit 1 of "2" is assigned a weight value 12 and a threshold −5.4 to have a configuration that calculates a grade value of a membership function indicating "big 1" shown in FIG. 119B. The basic unit 1 of "3" is assigned a weight value −12 and a threshold 6.6 to have a configuration that calculates a grade value of a membership function indicating "small 1" shown in FIG. 119A. The internal connection between the basic unit 1 of "4" corresponding to a membership function indicating "small 2" as shown in FIG. 119C and the basic units 1 of "2" and "3" respectively is established, while the internal connection between the unit "5" corresponding to a membership function indicating "big 2" as shown in FIG. 119D and the basic units 1 of "2" and "3" respectively is established. Since weight values associated with input and thresholds of the basic units 1 of "4" and "5" can be obtained by learning, random numbers are set as initial values and a weight value of the internal connection between a module "6" for determining a center of gravity and units "4" and "5" respectively is set to 1. A threshold and a weight value, associated with input, of a basic units 1 of "4" and "5" are treated based on the input/output signal relation established with a generated fuzzy teacher 10 as learning signals. FIGS. 124 and 125 show learning signals generated according to the above described fuzzy teacher 10 represented as follows:

L1: if x is big ① then y is small ②
L2: if x is small ① then y is big ② where teacher signals are obtained as grade values to "small 2" and "big 2". FIG. 123B shows a threshold and a weight value, associated with an input, of basic units 1 of "4" and "5" of the hierarchical network part 159 shown in FIG. 123A which are learned using these learning signals and a threshold and a weight value, associated an input, of basic units 1 of "2" and "3", which are updated by the learning.

Figure 126:
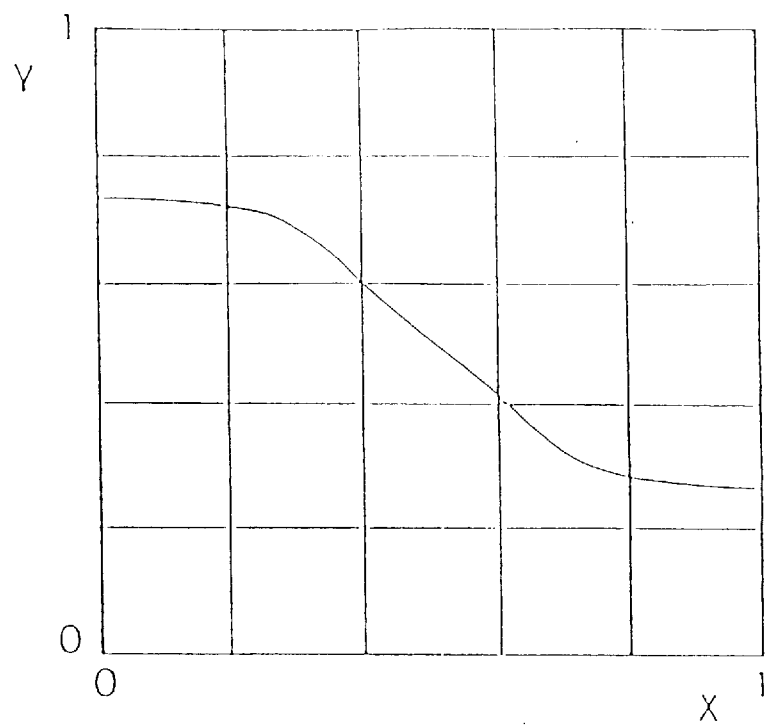
Figure 127:
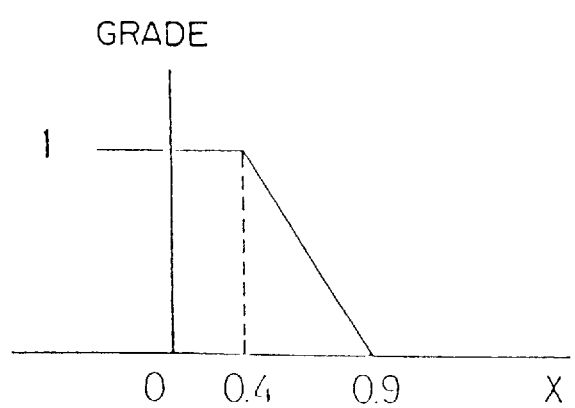

FIG. 126 shows the hierarchical network part 159, that is, the input/output signal relation of the completely-connected-rule-part neuro, established by the above described learning and shown in FIG. 123B. As shown in FIG. 126, the hierarchical network part 159 established and shown in FIG. 123B has data processing capabilities of setting the input/output signal relation quite similar to the input/output signal relation shown in FIG. 118. According to a new threshold and a weight value, associated with input, of basic units 1 of "2" and "3", more appropriate membership functions indicating "small 1" and "big 1" can be obtained. FIG. 127 shows a membership function indicating "small 1" after learning.

Then, an applicable type data processing unit 11 having data processing capabilities based on the input/output signal relation shown in FIG. 118, that is, a pure neuro, is simulated. The simulation assumes a configuration comprising a one-step intermediate layer with ten basic units 1. FIG. 128 shows learning signals used for learning weight values of internal connection and thresholds of the applicable data processing unit 11. These learning signals are generated based on the input/output signal relation shown in FIG. 118, but they can be also generated with the above described fuzzy teacher 10.

Figure 129:
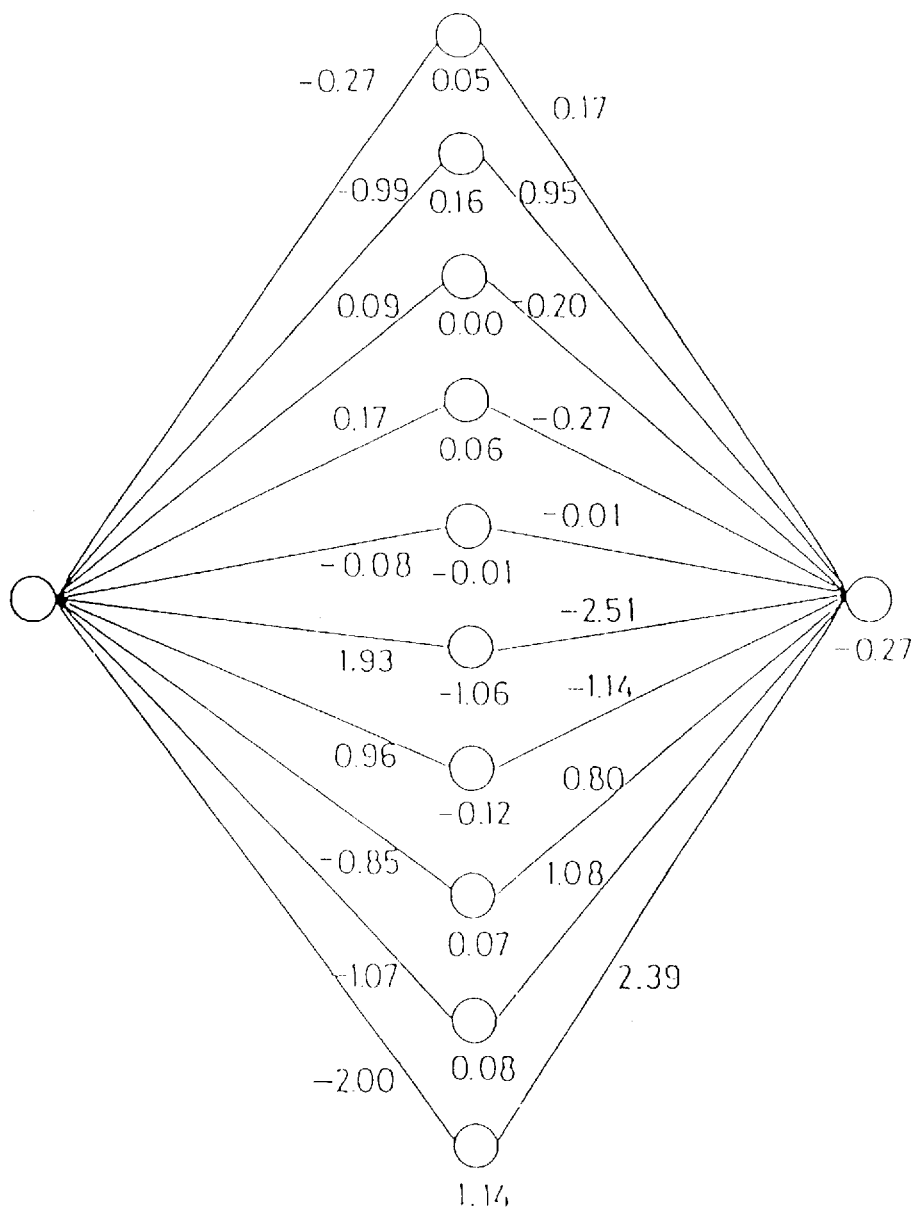
Figure 130:
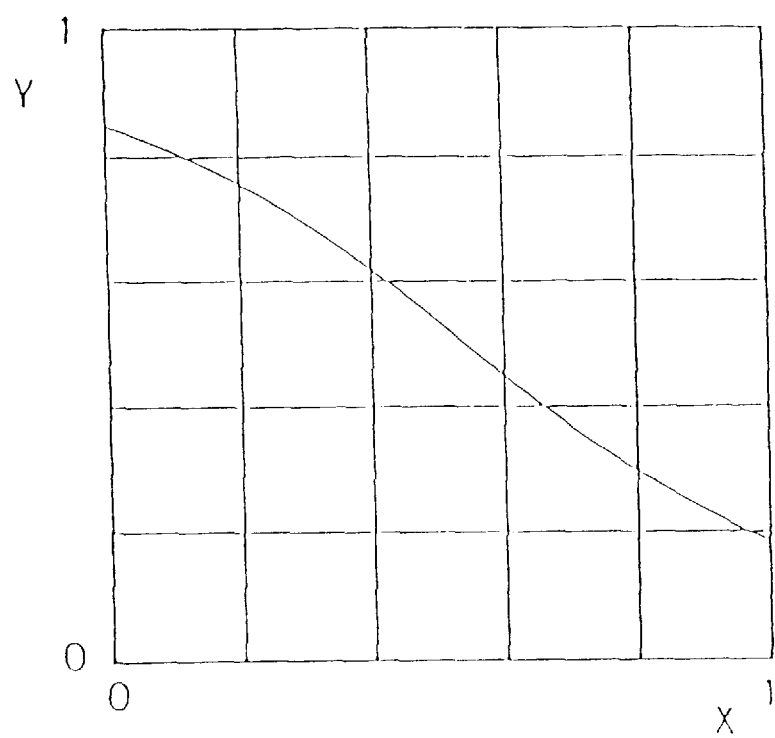

FIG. 129 shows learning values of thresholds and weight values, associated with input, of each basic unit 1 of the applicable type data processing unit 11 for learning with these learning signals. FIG. 130 shows the input/output signal relation of the applicable type data processing unit 11 shown in FIG. 129 generated by learning. In FIG. 129, a threshold is described corresponding to each basic unit 1, and a weight value is described corresponding to each internal connection. As shown in FIG. 130, the applicable type data processing unit 11 formed as shown in FIG. 129 has data processing capabilities of establishing the input/output signal relation quite similar to the input/output signal relation shown in FIG. 118.

Figure 131:
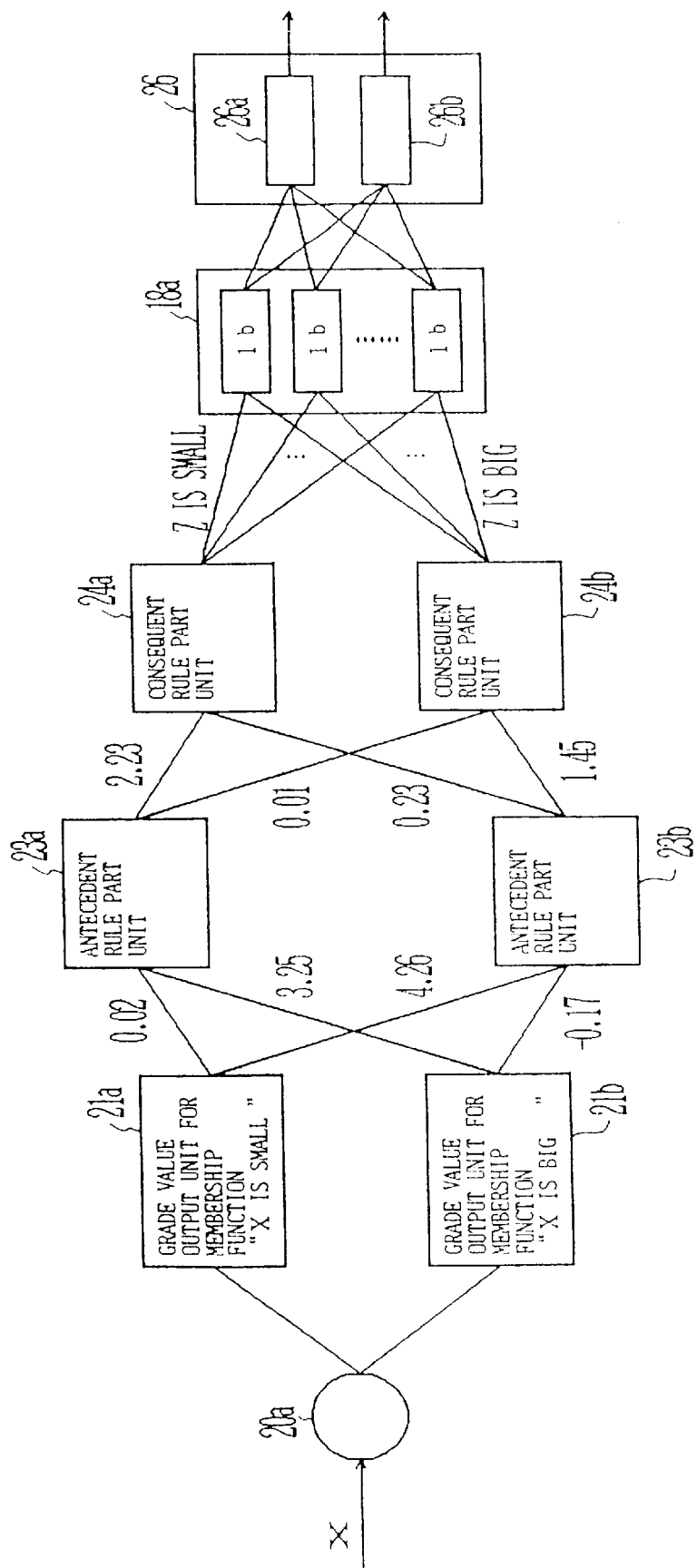

Next, the simulation of generating a fuzzy control rule is explained. The simulation is performed with two units 21a and 21b for outputting a grade value of a former membership function and two Sigmoid function units in the rule part 23a and 23b as shown in FIG. 131. In FIG. 131, output units 22a–22d in the former membership function realizer are skipped, and each unit is indicated as a block.

Figure 132A:
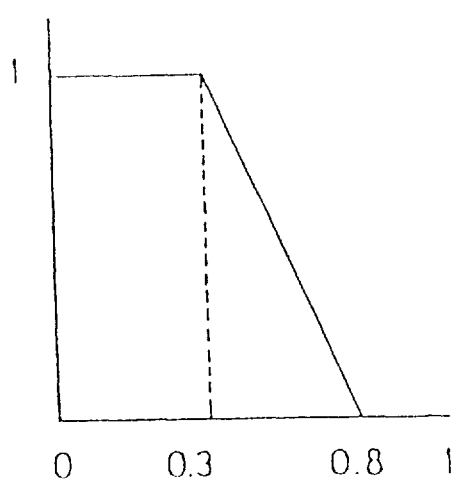
Figure 132B:
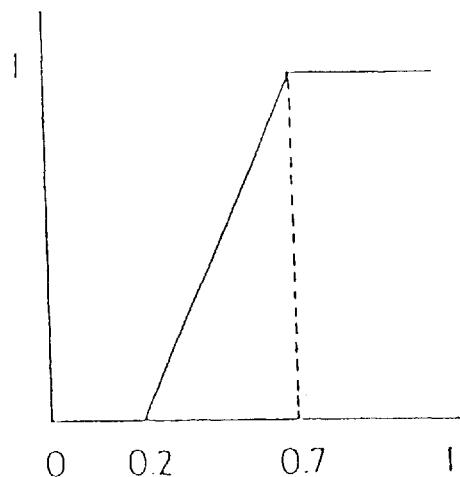
Figure 132C:
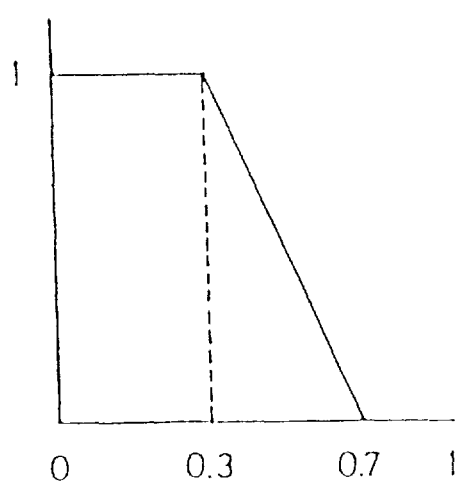
Figure 132D:
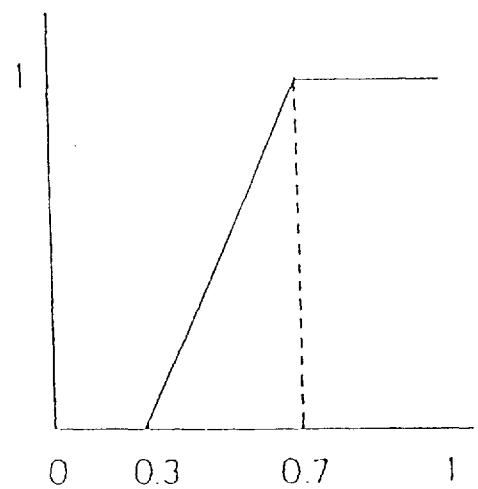

FIG. 132A shows an antecedent membership function assigned by the processing unit 21a, FIG. 132B shows a former membership function assigned by the processing unit 21b, FIG. 132C shows a consequent membership function corresponding to the output of the processing unit 24a, and FIG. 132D shows a membership function corresponding to the output of the processing unit 24b. In these figures, the processing units 23a and 23b are assigned a fuzzy operation function for calculating and outputting an average value of input values, while the processing units 24a and 24b are assigned a fuzzy operation function for calculating and outputting a sum of inputted values.

A weight value is learned assuming that control data are obtained from a control target as shown in FIG. 133. Values in FIG 131 indicate weight values of learning results. Thick lines in FIG. 131 indicate large values of internal connection, thus extracting the following fuzzy rules:

if X is BIG then Z is SMALL
if X is SMALL then Z is BIG

Next, an example of tuning a weight value of a membership function of a fuzzy control rule and of a rule itself is given. That is, the tuning simulation of a weight value of a former membership function or a rule itself by instructing the pre-wired-rule-part neuro converted with a fuzzy teacher to learn data obtained from a control target. FIG. 134 shows fuzzy rules used for the above described simulation.

Control state values describing the antecedent part of fuzzy control rules consist of seven values "TU1, ALK, TEMP, TUSE, TUUP, FLOC, and STAT" as shown in FIG. 135, and there is one control operation value "DDOS" describing the consequent part as shown in FIG. 135.

As shown in the description of the former part of fuzzy control rules shown in FIG. 134, "TU1" corresponds to membership functions SA (small), MM (medium), LA (large), and ST (smaller than); "ALK" corresponds to SA (small) and LA (large); "TEMP" corresponds to IS (not small) and SA (small); "TUSE" corresponds to LA (large) and IL (not large); "TUUP" corresponds to MM (medium), ML (a little large), and LA (large); "FLOC" corresponds to SA (small); and STAT corresponds to LA (large).

In this simulation, the processing units 21 (21a, . . . ) use basic units 1 as described above (but different in the definition of signs of thresholds) have a configuration for realizing an antecedent membership function, that is, a membership function indicating a control state value according to the following operation:

$$y = \frac{1}{1 + \exp(-(\omega x + \theta))}$$

or $$y = \frac{1}{1 + \exp(-(\omega_1 x + \theta_1))} - \frac{1}{1 + \exp(-(\omega_2 x + \theta_2))}$$

Columns "former" in FIGS. 136 and 137 show weight values $\omega_1$ and $\omega_2$ (weight values of internal connection to the input unit 12) for regulating function forms of membership functions of these control state values and thresholds $\theta_1$ and $\theta_2$.

Likewise, as described in the consequent part of fuzzy control rules shown in FIG. 134, "DDOS" corresponds to a membership function PM (positive and medium), NM (negative and medium), PB (positive and large), and PS (positive and small) respectively. FIG. 138 shows the definition of function forms of these membership functions; and FIG. 139 shows settings of a parameter Pi (i=1, 2, and 3) in the function form of these membership parameters.

FIG. 140 shows fuzzy control rules shown in FIG. 134 mapped on the pre-wired-rule-part neuro 12. In FIG. 140, input units 20 (20a, . . . ) are skipped. As shown in FIG. 140, the processing units 21 (21a, . . . ) are 15 in all corresponding to the number of membership functions of control state values; the processing units 23 (23a, . . . ) are 10 in all corresponding to the number of fuzzy control rules; and the processing units 24 (24a, . . . ) are 4 in all corresponding to the number of membership functions of control operation values. The processing units 23 have fuzzy operation capabilities of calculating an average value of input values; and the processing units 24 have fuzzy operation capabilities of calculating a sum of input values.

In this simulation, a weight value is learned with a value of a learning constant set to 0.5 and a value of momentum set to 0.4 assuming that thirty (30) control data shown in FIG. 141 are obtained from a control target.

Columns "consequent" in FIGS. 136 and 137 show weight values $\omega_1$ and $\omega_2$ of the internal connection between the input unit 20 and the processing unit 21, and $\theta_1$ and $\theta_2$ which are learned by simulation. That is, a membership function determined by a value described in a "former" column shown in FIGS. 136 and 137 is tuned to a membership function determined by a value described in a "consequent" column by a learning process using control data of a control target. FIG. 142 shows an example of a variation of a function form of a tuned membership function. In FIG. 142, a broken line shows a function form of a membership function before tuning, while a continuous line shows a function form of a membership function after tuning. FIG. 142A shows variation of a function before and after tuning of a membership function indicating "TEMP (water temperature) is IS (not small)", FIG. 142B shows variation of a function before and after tuning of a membership function indicating "FLOC (flock form state) is SA (small)", and FIG. 142C shows variation of a function before and after tuning of a membership function indicating "TUUP (turbidity increase) is MM (medium)".

Thus, the present invention maps fuzzy control rules on the hierarchical network part 159, learns weight values of the hierarchical network by using control data obtained from a control target as learning signals, and realizes tuning of a function form of a membership function described in fuzzy control rules using obtained weight values of the hierarchical network. Accordingly, the present invention enables mechanical and objective tuning of membership functions in fuzzy control rules. During the tuning of an antecedent membership function, learning is performed by turning on a learning flag in a learning adjuster 260 shown in FIG. 114 for a unit corresponding to the antecedentmembership function. However, the tuning of a weight value of a rule can be conducted by turning on a learning flag of the learning adjuster for the connection from the unit 21 in FIG. 140 to the unit 23 in the antecedent rule part and the connection from the unit 23 to the unit 24 in the consequent rule part. Using data shown in FIG. 141, the tuning simulation of a rule weight value is performed with a learning constant and momentum set as described above.

FIG. 143 shows a learning data of a weight value obtained at the update cycle of 1000 with the smallest error value. In FIG. 143, "1.667528" in No.2 fuzzy control rules indicates learning data of a weight value of the internal connection between the processing unit 21 for processing "TU1 is MM" in No.2 fuzzy control rules shown in FIG. 134 and the processing unit 23 for performing the operation of the former part in No.2 fuzzy control rules. Thus, learning data of weight values indicating internal connection between the processing unit 21 and the processing unit 23 according to the order they appear in the IF part of the fuzzy control rules shown in FIG. 134 are provided. For example, "0.640026" in No.2 fuzzy control rules indicates a weight value of the connection between the processing unit 23 and the processing unit 24, for instance, between the processing unit 23 for conducting fuzzy operation of No.2 fuzzy control rules and the processing unit 24 for conducting fuzzy operation of No.2 fuzzy control rules.

As shown in FIG. 143, when No.4 fuzzy control rules shown in FIG. 134 are applied, a grade value obtained by a membership function indicating "ALK is SA" is multiplied by 0.417323 and a grade value obtained by a membership function indicating "TU1 is LA" is multiplied by 2.010990. Then, a smaller value is selected, multiplied by 2.166885, and is compared with the value obtained by No.2 fuzzy control rules. A larger value between them is used to calculate a grade value of a membership function indicating "DDOS is NM". As shown in FIG. 143, No.7 or No.10 fuzzy control rules contribute only on a smaller scale than other fuzzy control rules to obtaining presumption values of control amount; and a grade value of "TU1 is SA" in No.3 fuzzy control rules contributes only on a smaller scale than a grade value of "ALK is LA" to a presumption value of control amount.

Fuzzy control rules can become more similar to control targets by using learned values as described above as weight values of fuzzy control rules.

The hierarchical network part 159 can be realized by a software means or by a hardware means. When it has a configuration with a hardware means, it can be configured with what is disclosed in the Japanese Patent Application SHO-63-216865 ("A Network Configuration Data Processing Unit") applied on Aug. 31, 1988 by the Applicant.

That is, a basic unit 1 comprises, as shown in FIG. 144, a multiplying D/A converter 302 for multiplying output of a previous layer inputted through an input switch 301 by a weight value stored in a weight value storage 308, an analog adder 303a for calculating a new accumulated value by adding an output value provided by the multiplying D/A converter 302 to the last accumulated value, a sample hold circuit 303b for storing addition results provided by an analog adder 303a, a non-linear function generating circuit 304 for non-linearly converting data stored in the sample hold circuit 303b when the accumulating operation terminates, an output storage 305 for holding analog signal values, that is, output to the following layer, provided by a non-linear function generating circuit 304, an output switch 306 for outputting data stored in the output storage 305, and a control circuit 309 for controlling each of the above described processing parts.

The hierarchical network part 159 is realized by a configuration where basic units 1 are electrically connected through an analog bus 310 as shown in FIG. 145. In FIG. 145, 311 is a weight output circuit for outputting a weight value to the weight value storage 308 of the basic unit 1, 312 is an initial signal output circuit corresponding to an input unit 1', 313 is a synchronous control signal line for transmitting a synchronous control signal, that is, a data transmission control signal, to a weight value output circuit 311, an initial signal output circuit 312, and control circuit 309, and 314 is a main control circuit for sending a synchronous control signal.

In the hierarchical network part 159 in the above described configuration, the main control circuit 314 sequentially selects a basic unit 1 in the previous layer in time series. Synchronously with the selection of a basic unit 1, final output stored in the output storage 305 of the selected basic unit 1 is outputted to the multiplying D/A converter 302 of a basic unit 1 in the following layer through the analog bus 310 according to the time divisional transmission format. On receiving the final output, the multiplying D/A converter 302 of the basic unit 1 in the following layer sequentially selects corresponding weight values to perform multiplication of an input value by a weight value. Then, an accumulator 303 comprising the analog adder 303a and the sample hold circuit 303b accumulates the products sequentially. Next, on completion of all the accumulation, the main control circuit 314 activates the non-linear function generating circuit 304 of the basic unit 1 in the following layer to obtain the final output, and the output storage 305 stores the final output of the conversion results. The main control circuit 314 repeats these processes as treating the "following" layer as a new "previous" layer, thus outputting an output pattern corresponding to an input pattern.

Though all explanation is made in association with illustrated embodiments, the present invention is not limited only to them. For example, the Applicant disclosed the invention Japanese Patent Application SHO-63-227825 "A Learning Method of a Network Configuration Data Processing Unit" applied on Sep. 12, 1988 for learning a weight value within a short time as an improvement of the back propagation method. In addition, the present invention enables learning weight values both in the improved back propagation method and in other methods than the back propagation method.

FIELD OF THE APPLICATION IN INDUSTRY

As described above in detail, the present invention performs a process based on a comprehensible fuzzy teacher and establishes a neuro-fuzzy integrated data processing system capable of utilizing high precision and learning capabilities of a neuro-system. Therefore, the present invention can be applied not only in a fuzzy control system but in various fields in data processing systems.

What is claimed is:

1. A neuro-fuzzy integrated data processing system, comprising:

an input part for receiving at least one input;

an antecedent membership function realizing part receiving an input from the input part and outputting at least one grade value indicating the applicability of a previous membership function corresponding to at least one of said input signals;

a rule part operatively coupled to said antecedent membership function realizing part for forming a network having at least one layer, receiving a grade value of said membership function, and for outputting an enlargement/reduction rate of at least one consequent membership function corresponding to at least one system output signal as a grade value of a fuzzy rule; and a consequent membership function realizing/non-fuzzy-processing part operatively coupled to said rule part for receiving said enlargement/reduction rate of a consequent membership function, calculating a non-fuzzy process after enlarging/reducing a consequent membership function according to said enlargement/reduction rate, and outputting a system output signal.

2. A neuro-fuzzy integrated data processing system according to claim 1, wherein said rule part has a plurality of layers and is pre-wired between adjacent layers in said rule part, between said antecedent membership function realizing part and said rule part, and between said rule part and said consequent membership function realizing/non-fuzzy-processing part, wherein the existence of a connection and one of a part and the whole of a weight value are set according to a fuzzy rule.

3. A neuro-fuzzy integrated data processing system according to claim 1, wherein said rule part has a plurality of layers and is completely connected between adjacent layers in said rule part, between said antecedent membership function realizing part and said rule part, and between said rule part and said consequence membership function realizing/non-fuzzy-processing part, wherein the existence of connection and a part or the whole of a weight value are set according to a fuzzy rule.

4. A neuro-fuzzy integrated data processing system according to claim 1 wherein said antecedent membership function realizing part comprises a hierarchical layered network.

5. A neuro-fuzzy integrated data processing system according to claim 4, wherein said antecedent membership function realizing part includes a unit for outputting a grade value of the applicability of said antecedent membership function, and outputs a grade value of a membership function indicating "an input signal is SMALL", with a sign of a weight value of the input connection to said unit and a sign of a threshold assumed as negative.

6. A neuro-fuzzy integrated data processing system according to claim 4, wherein said antecedent membership function realizing part includes a unit for outputting a grade value of the applicability of said antecedent membership function, and outputs a grade value of a membership function indicating "an input signal is LARGE", with a sign of a weight value of input connection to said unit and a sign of a threshold assumed as positive.

7. A neuro-fuzzy integrated data processing system according to claim 4, wherein said antecedent membership function realizing part includes a unit to output a grade value of a membership function indicating "an input signal is NORMAL", said unit comprising:

two units for receiving said input signal and outputting a Sigmoid function of said input signal corresponding to a weight value and a threshold of each input signal; and a unit for obtaining the difference in the output of said two units and for outputting said grade value of said antecedent membership function.

8. A neuro-fuzzy integrated data system according to claim 1, wherein said rule part includes a part of a unit to calculate one of a logical operation, in response to two input values, a logical product, a logical sum, an acuity product, an acuity sum, an average, a permanent TRUE, and a permanent FALSE, and to calculate in a logical operation in response to one of two input values.

9. A neuro-fuzzy integrated data processing system according to claim 1, wherein said rule part includes a part of a unit for setting S as positive and t as between 0 and 1 in response to a plurality of input values $X_1, X_2, \ldots, X_n$ and for determining each of weight values $W_1, W_2, \ldots, W_n$ of connection and a threshold $\theta$ in response to a plurality of said input values as follows:

$$W_i = S[X_i] (i = 1, 2, \ldots, n),$$

$$\theta = -S((\text{number of negative input}) - t) = 0.5S \left( \sum_{i=1}^{n} [X i] - (n - 2t) \right),$$

where $$[X_i] = +1 X_i: \text{when positive}$$
$$= -1 X_i: \text{when negative},$$

and thereby performing addition of a plurality of said input values as follows:

$$f(X_1, X_2, \ldots X_n) = 1 / \left( 1 + \exp\left( - \sum_{i=1}^{n} W_i X_i + \theta \right) \right)$$

10. A neuro-fuzzy integrated data processing system according to claim 1, wherein said rule part includes a part of a unit for setting S as positive and t as between 0 and 1 in response to a plurality of input values $X_1, X_2, \ldots, X_n$ and for determining each of weight values $W_1, W_2, \ldots, W_n$ of connection and a threshold $\theta$ in response to a plurality of said input values as follows:

$$W_i = S[X_i](i = 1, 2, \ldots, n),$$

$$\theta = S((\text{numer of positive input}) - t) = 0.5S \left( \sum_{i=1}^{n} [X i] + (n - 2t) \right),$$

where $$[X_i] = +1 X_i: \text{when positive}$$
$$= -1 X_i: \text{when negative},$$

and thereby performing multiplication of a plurality of said input values as follows:

$$f(X_1, X_2, \ldots, X_n) = 1 / \left( 1 + \exp\left( - \sum_{i=1}^{n} W_i X_i + \theta \right) \right)$$

11. A neuro-fuzzy integrated data processing system according to claim 1, wherein said consequent membership function realizing/non-fuzzy-processing part comprises:

at least one consequent membership function realizing part for enlarging/reducing said consequent membership function corresponding to each of at least one of system output signals according to said enlargement/reduction rate of a consequent membership function provided by said rule part; and at least one non-fuzzy-process calculation realizing part for calculating, using output values provided by said at least one consequent membership function realizing part, a representative value as said corresponding system output signal.

12. A neuro-fuzzy integrated data processing system according to claim 11, wherein said at least one consequent membership function realizing part comprises a hierarchical neural network having at least one layer where connection between adjacent layers in said hierarchical neural network, and a weight value of said connection is set corresponding to a consequent membership function.

13. A neuro-fuzzy integrated data processing system according to claim 12, wherein said at least one consequent membership function realizing part comprises a plurality of units each corresponding to a plurality of abscissa values of a curve of said consequent membership function; and a grade value of said consequent membership function at each of said abscissa values is set, in said rule part, as a weight value of each connection between each unit for outputting an enlargement/reduction rate of at least one consequent membership function related to said corresponding system output signals and a plurality of said units.

14. A neuro-fuzzy integrated data processing system according to claim 12, wherein said at least one consequent membership function realizing part comprises a plurality of units each corresponding to a plurality of abscissa values of a curve of said consequent membership function; and in said rule part, a value of 1 is set for the connection to a unit corresponding to an abscissa value of a consequent membership function curve specified by the consequent part of each of said fuzzy rules, and a value of 0 is set for other connection as a weight value of each connection between each unit for outputting a grade value of a fuzzy rule of at least one consequent membership function related to said corresponding system output signals and a plurality of said units.

15. A neuro-fuzzy integrated data processing system according to claim 14, wherein some of said plurality of units provided in said consequent membership function realizing part output a logical sum of a plurality of input values applied to said units.

16. A neuro-fuzzy integrated data processing system according to claim 14, wherein
some of said plurality of units provided in said consequent membership function realizing part output an algebraic sum of a plurality of input values applied to said units.

17. A neuro-fuzzy integrated data processing system as recited in claim 11, wherein
said at least one non-fuzzy-process calculation realizing part comprises:
a center-of-gravity determining element output part comprising two units for receiving a plurality of signals as a result of the enlargement/reduction of a consequent membership function provided by said consequent membership function realizing part; and
a center-of-gravity calculating part for outputting a center-of-gravity value as said system output signal, that is, a representative value, using two center-of-gravity determining elements provided by said center-of-gravity determining element output part.

18. A neuro-fuzzy-integrated data processing system according to claim 17, wherein
a first unit of said two units in said center-of-gravity determining element output part outputs ④ the sum of products obtained by multiplying the difference, that is, a weight value (a weight value=②-①) between the minimum value ① in the abscissa values of a consequent membership function curve corresponding to a plurality of output values as a result of the enlargement/reduction of said consequent membership function and values ② corresponding to each of a plurality of said output values by output values in a plurality of said output values; and
a second unit of said two units outputs a sum of products obtained by multiplying the difference, that is, a weight value (a weight value=②-③) between the maximum value ③ in the abscissa values corresponding to a plurality of output values and values ② corresponding to each of a plurality of output values by output values in a plurality of said output values, thus obtaining said center-of-gravity values as follows:

$$\frac{④ \times ③ - ⑤ \times ①}{④ - ⑤} = \text{a center-of-gravity value}$$

19. A neuro-fuzzy integrated data processing system according to claim 18, wherein
said first and second units output a result by multiplying each of said sums by a constant.

20. A neuro-fuzzy integrated data processing system according to claim 17, wherein
a center-of-gravity determining element output unit as said center-of-gravity determining element output part comprises:
an endpoint coordinate and oblique storing means for storing coordinates of two endpoints, that is, the maximum and minimum values, in a plurality of abscissa values of said consequent membership function curve and for storing the oblique of a line passing through said center of gravity;
a teaching signal calculating means for obtaining and outputting teaching signals for two center-of-gravity determining elements used to obtain center-of-gravity values using a true center-of-gravity value, said endpoint values stored in said endpoint coordinate and oblique storing means, and an oblique of a line passing through the center-of-gravity; and
a teaching signal determining unit for determining said teaching signals according to an expression of a line passing through a center-of-gravity having a predetermined oblique.

21. A neuro-fuzzy integrated data processing system according to claim 17, wherein
a center-of-gravity determining element output unit as said center-of-gravity determining element output part comprises:
an endpoint coordinate storing means for storing coordinates of two endpoints, that is, the maximum and minimum abscissa values of said consequent membership function curve;
a teaching signal calculating means for obtaining and outputting teaching signals for two center-of-gravity determining elements used to obtain center-of-gravity values using true center-of-gravity values, two center-of-gravity determining element values, and endpoint coordinates stored in said endpoint coordinate storing means; and
a teaching signal determining unit for determining said teaching signals according to an expression of a line passing through true center-of-gravity values having the same oblique as the line determined by output values of said two center-of-gravity determining elements.

22. A neuro-fuzzy integrated data processing system according to claim 1, wherein
said consequent membership function realizing/non-fuzzy-processing part comprises a hierarchical neural network having a plurality of layers.

23. A neuro-fuzzy integrated data processing system according to claim 22, wherein
said consequent membership function realizing/non-fuzzy-processing part comprises:
a consequent membership function realizing part for enlarging/reducing said consequent membership function where the connections of adjacent layers are set corresponding to said consequent membership functions; and
a center-of-gravity calculation realizing part as a hierarchical neural network having at least one intermediate layer for calculating a center-of-gravity value as said output signal according to the output of said consequent membership function realizing part.

24. A neuro-fuzzy integrated data processing system according to claim 23, wherein
an input normalizing unit is provided between said consequent membership function realizing part and said center-of-gravity calculation realizing part for mapping the output of said consequent membership function realizing part within the predetermined range of an input unit in said center-of-gravity calculation realizing part using an appropriate function; and
an output restoring unit is provided between the consequent step of said center-of-gravity calculation realizing part for copying a center-of-gravity coordinate as the output of said center-of-gravity calculation realizing part within an appropriate range of coordinates.

25. A neuro-fuzzy integrated data processing system according to claim 24, wherein
said input normalizing unit uses the linear function for mapping according to the following expression:

function value=0.6×(output of consequent membership function realizing part)/10+0.2;

and said output restoring unit uses other linear functions for mapping according to the following expression:

function value=4×(output of center-of-gravity calculation realizing part−0.2)/0.6+1.

26. A neuro-fuzzy integrated data processing system according to claim 23, wherein random numbers are used as values corresponding to the abscissa of said consequent membership function curve;

teaching data are generated by mapping said random numbers by a linear function within the input range of a hierarchical neural network as said center-of-gravity calculation realizing part, and are supplied as learning data; and a center-of-gravity learning unit is provided for learning said hierarchical neural network.

27. A neuro-fuzzy integrated data processing system according to claim 26, wherein said center-of-gravity learning unit comprises:

a random number generating part for generating random numbers as values corresponding to the abscissa of said consequent membership function curve and a constant storing part for storing constants including a plurality of abscissa values of said consequent membership function curve and teaching data values; and a teaching data generating part generates, according to constants stored in said constant storing part and random numbers generated by said random number generating part, teaching data by mapping said random numbers by a linear function within the input range of a hierarchical neural network as said center-of-gravity calculation realizing part.

28. A neuro-fuzzy integrated data processing system according to claim 1, wherein said consequent membership function realizing/non-fuzzy-processing part forms a division network comprising one output unit and at least one intermediate layer;

a weight value of the connection between a unit for outputting a grade value of a fuzzy rule as an enlargement/reduction rate of at least one consequent membership function outputted by said rule part and a first unit of said two input units is set as a value of the abscissa of a consequent membership function curve specified in the consequent part of each fuzzy rule;

a weight value of the connection between a unit for outputting a grade value of said fuzzy rule and a second unit of said two input units is set to 1; and said division network outputs a result of a sum of input to said first unit divided by a sum of input to the second unit.

29. A neuro-fuzzy integrated data processing system according to claim 28, wherein a weight value of the connection between the input of two input units in said division network can be learned in the back propagation method during the learning process of said consequent membership function realizing/non-fuzzy-processing part.

30. A neuro-fuzzy integrated data processing system according to claim 1, wherein the approximation of a membership function obtained by a neuro-process can be realized with the upper limit of the sensitivity determined and with a weight value W and a threshold $\theta$ defined as follows:

$$W=4/(b-a),\ \theta=2(a+b)/(b-a)$$

where said antecedent membership function is defined as having the relation between an input X and an output Y as follows:

$Y=0$ when $X \leq a$, $Y=(X-a)/(b-a)$ when $a<X<b$, $Y=1$ when $b \leq X$ and the characteristic of a neuron is defined as follows:

$Y=1/(1+\exp(-WX+\theta))$.

31. A neuro-fuzzy integrated data processing system according to claim 1, wherein approximation of a membership function obtained by a neuro-process can be realized with the upper limit of the sensitivity determined and with a weight value W and a threshold $\theta$ defined as follows:

$$W=2/(b-a),\ \theta=(a+b)/(b-a)$$

where said antecedent membership function is defined as having the relation between an input X and an output Y as follows:

$Y=0$ when $X \leq a$, $Y=(X-a)/(b-a)$ when $a<X<b$, $Y=1$ when $b \leq X$ and the characteristic of a neuron is defined as follows:

$Y=0.5+0.5 \tanh(WX-\theta)$.

32. A neuro-fuzzy integrated data processing system according to claim 1, wherein the approximation of a membership function obtained by a neuro-process can be realized with the integration of an absolute value of an error minimized and with a weight value W and a threshold $\theta$ defined as follows:

$$W=5.3605/(b-a),\ \theta=2.6802(a+b)/(b-a)$$

where said antecedent membership function is defined as having the relation between an input X and an output Y as follows:

$Y=0$ when $X \leq a$, $Y=(X-a)/(b-a)$ when $<X<b$, $Y=1$ when $b \leq X$ and the characteristic of a neuron is defined as follows:

$Y=1/(1+\exp(-WX+\theta))$.

33. A neuro-fuzzy integrated data processing system according to claim 1, wherein the approximation of a membership function obtained by a neuro-process can be realized with the integration of an absolute value of an error minimized and with a weight value W and a threshold $\theta$ defined as follows:

$$W=2.6802/(b-a),\ \theta=1.3401(a+b)/(b-a)$$

where said antecedent membership function is defined as having the relation between an input X and an output Y as follows:

$Y=0$ when $X \leq a$, $Y=(X-a)/(b-a)$ when $a<X<b$, $Y=1$ when $b \leq X$ and the characteristic of a neuron is defined as follows:

$Y=0.5+0.5 \tanh (WX-\theta)$.

34. A neuro-fuzzy integrated data processing system according to claim 1, wherein the approximation of a membership function obtained by a neuro-process can be realized with the integration of two square of an error minimized and with a weight value W and a threshold $\theta$ defined as follows:

$W=5.3012/(b-a)$, $\theta=2.6506(a+b)/(b-a)$ where said antecedent membership function is defined as having the relation between an input X and an output Y as follows:

$Y=0$ when $X \leq a$, $Y=(X-a)/(b-a)$ when $a<X<b$, $Y=1$ when $b<X$ and the characteristic of a neuron is defined as follows:

$Y=1/(1+\exp(-WX+\theta))$.

35. A neuro-fuzzy integrated data processing system according to claims 1, 2, or 3, wherein the approximation of a membership function obtained by a neuro-process can be realized with the integration of two square of an error minimized and with a weight value W and a threshold $\theta$ defined as follows:

$W=2.6506/(b-a)$, $\theta=1.3253(a+b)/(b-a)$ where said antecedent membership function is defined as having the relation between an input X and an output Y as follows:

$Y=0$ when $X \leq a$, $Y=(X-a)/(b-a)$ when $a<X<b$, $Y=1$ when $b \leq x$ and the characteristic of a neuron is defined as follows:

$Y=0.5+0.5 \tanh (WX-\theta)$.

36. A neuro-fuzzy integrated data processing system according to claim 1, wherein the approximation of a membership function obtained by a neuro-process can be realized with the maximum error minimized and with a weight value W and a threshold $\theta$ defined as follows:

$W=5.648/(b-a)$, $\theta=2.824(a+b)/(b-a)$ where said antecedent membership function is defined as having the relation between an input X and an output Y as follows:

$Y=0$ when $X \leq a$, $Y=(X-a)/(b-a)$ when $a<X<b$, $Y=1$ when $b \leq X$ and the characteristic of a neuron is defined as follows:

$Y=1/(1+\exp(-WX+\theta))$.

37. A neuro-fuzzy integrated data processing system according to claim 1, wherein the approximation of a membership function obtained by a neuro-process can be realized with the maximum error minimized and with a weight value W and a threshold $\theta$ defined as follows:

$W=2.824/(b-a)$, $\theta=1.412(a+b)/(b-a)$ where said antecedent membership function is defined as having the relation between an input X and an output Y as follows:

$Y=0$ when $X \leq a$, $Y=(X-a)/(b-a)$ when $a<X<b$, $Y=1$ when $b \leq X$ and the characteristic of a neuron is defined as follows:

$Y=0.5+0.5 \tanh (WX-\theta)$.

38. A neuro-fuzzy integrated data processing system according to claim 1, wherein a weight value W and a threshold $\theta$ of one of two units in the second layer is defined as follows:

$W=4/C$, $\theta=2(2a-2b-c)/C$ and a weight value W and a threshold $\theta$ of the other unit are defined as follows:

$W=-4/C$, $\theta=-2(2a+2b+c)/C$ where said antecedent membership function is defined as having the relation between an input X and an output Y as follows:

$Y=0$ when $X \leq a-b-c$, $Y=(X-(a-b-c))/C$ when $a-b-c<X \leq a-b$, $Y=1$ when $a-b<X \leq a+b$, $Y=-(X-(a+b+c))/C$ when $a+b<X \leq a+b+c$, $Y=0$ when $a+b+c<X$, and a three layer hierarchical neural network for realizing the approximation of said membership function with the upper limit of the sensitivity determined as $\pm 1/C$, said network comprising:
a first layer of one unit for outputting an input value as is;
a second layer of two units having a non-linear characteristic; and
a third layer of one neuron for outputting a result obtained by subtracting 1 from a sum of the output of two neurons in the second layer, wherein the characteristic of a unit in the second layer is:

$Y=1/(1+\exp(-WX+\theta))$.

39. A neuro-fuzzy integrated data processing system according to claim 1, wherein a weight value W and a threshold $\theta$ of one of two units in the second layer is defined as follows:

$W=2/C$, $\theta=(2a-2b-c)/C$ and a weight value W and a threshold $\theta$ of the other unit are defined as follows:

$W=-2/C, \theta=-(2a+2b+c)/C$ where said antecedent membership function is defined as having the relation between an input X and an output Y as follows:

$Y=0$ when $X \leq a-b-c$, $Y=(X-(a-b-c))/C$ when $a-b-c<X \leq a-b$, $Y=1$ when $a-b<X \leq a+b$, $Y=-(X-(a+b+c))/C$ when $a+b<X \leq a+b+c$, $Y=0$ when $a+b+c<X$, and a three layer hierarchical neural network for approximating said membership function with the upper limit of the sensitivity determined as $\pm 1/C$, said network comprising:
a first layer of one unit for outputting an input value as is;
a second layer of two units having a non-linear characteristic; and
a third layer of one neuron for outputting a result obtained by subtracting 1 k from a sum of the output of two neurons in the second layer, wherein
the characteristic of a unit in the second layer is:

$Y=0.5+0.5 \tanh (WX-\theta))$.

40. A neuro-fuzzy integrated data processing system according to claim 1, wherein
a weight value W and a threshold $\theta$ of one of two units in the second layer is defined as follows:

$W=5.468/C, \theta=2.824(2a-2b-c)/C$ and a weight value W and a threshold $\theta$ of the other unit are defined as follows:

$W=-5.468/C, \theta=-2.824(2a+2b+c)/C$ where said antecedent membership function is defined as having the relation between an input X and an output Y as follows:

$Y=0$ when $X \leq a-b-c$, $Y=(X-(a-b-c))/C$ when $a-b-c<X \leq a-b$, $Y=1$ when $a-b<X \leq a+b$, $Y=-(X-(a+b+c))/C$ when $a+b<X \leq a+b+c$, $Y=0$ when $a+b+c<X$, and a three layer hierarchical neural network for realizing the approximation of said membership function with the maximum error minimized, said network comprising:
a first layer of one unit for outputting an input value as is;
a second layer of two units having a non-linear characteristic; and
a third layer of one neuron for outputting a result obtained by subtracting 1 from a sum of the output of two neurons in the second layer, wherein the characteristic of a unit in the second layer is:

$Y=1/(1+\exp(-WX+\theta))$.

41. A neuro-fuzzy integrated data processing system according to claim 1, wherein
a weight value W and a threshold $\theta$ of one of two units in the second layer is defined as follows:

$W=2.824/C, \theta=1.412(2a-2b-c)/C$ and a weight value W and a threshold $\theta$ of the other unit are defined as follows:

$W=-2.824/C, \theta=1.412(2a+2b+c)/C$ where said antecedent membership function is defined as having the relation between an input X and an output Y as follows:

$Y=0$ when $X \leq a-b-c$, $Y=(X-(a-b-c))/C$ when $a-b-c<X \leq a-b$, $Y=1$ when $a-b<X \leq a+b$, $Y=-(X-(a+b+c))/C$ when $a+b<X \leq a+b+c$, $Y=0$ when $a+b+c<X$, and a three layer hierarchical neural network for realizing the approximation of said membership function with the maximum error minimized, said network comprising:
a first layer of one unit for outputting an input value as is;
a second layer of two units having a non-linear characteristic; and
a third layer of one neuron for outputting a result obtained by subtracting 1 from a sum of the output of two neurons in the second layer, wherein
the characteristic of a unit in the second layer is:

$Y=0.5+0.5 \tanh(WX-\theta))$.

42. A network structure conversion system in a hierarchical layered network in a neuro-fuzzy integrated data processing system for calculating and outputting according to a fuzzy control rule the amount of control operation corresponding to the inputted control state value, said system comprising:
an input part for receiving one or a plurality of input signals;
a antecedent membership function realizing part preceded by said input part for outputting one or a plurality of grade values of a antecedent membership function;
a rule part preceded by said antecedent membership function realizing part for forming a network having one or a plurality of layers, receiving a grade value of said membership function, and for outputting an enlargement/reduction rate of one or a plurality of consequent membership functions corresponding to one or a plurality of system output signals as a grade value of a fuzzy rule; and
a consequent membership function realizing/non-fuzzy-processing part preceded by said rule part for receiving said enlargement/reduction rate of a consequent membership function, calculating a non-fuzzy process after enlarging/reducing a consequent membership function according to said enlargement/reduction rate, and outputting a system output signal, wherein
at least said rule part comprises a hierarchical neural network; and
the network structure can be simplified by detecting and eliminating insignificant connection to the whole data process between the specified adjacent layers in said hierarchical neural network.

43. A network structure conversion system in a hierarchical network according to claim 42, wherein said hierarchical neural network is a pure neuro at first where all adjacent layers are completely connected; and said pure neuro is converted to a completely-connected-rule-part neuro where complete connection is made only between said antecedent membership function realizing part and said rule part, between adjacent parts in said rule part, and between said rule part and said consequent membership function realizing/non-fuzzy-processing part; while insignificant connection to the whole data process is deleted between all the other parts in said antecedent membership function realizing part and consequent membership function realizing/non-fuzzy-processing part.

44. A hierarchical network structure conversion system according to claim 42, wherein said hierarchical neural network is a pure neuro at first where all adjacent layers are completely connected; and said pure neuro is converted to a pre-wired-rule part neuro where complete connection is made betweensaid antecedent membership function realizing part and said rule part, between adjacent parts in said rule part, and between said rule part and said consequent membership function realizing/non-fuzzy-processing part; while insignificant connection to the whole data process is deleted between all the other parts in said antecedent membership function realizing part and consequent membership function realizing/non-fuzzy-processing part.

45. A hierarchical network structure conversion system according to claim 42, wherein said hierarchical neural network comprises a neural network at least in said rule part at first, and is a completely-connected-rule-part neuro where complete connection is made only between said antecedent membership function realizing part and said rule part, between adjacent parts in said rule part, and between said rule part and said consequent membership function realizing/non-fuzzy-processing part; and said completely-connected-rule-part neuro is converted to a pre-wired-rule-part neuro with the insignificant connection to the whole process deleted between said antecedent membership function realizing part and said rule part, between adjacent parts in said rule part, and between said rule part and said consequent membership function realizing/non-fuzzy-processing part.

46. A fuzzy model extracting system comprising:

an input part for receiving one or a plurality of input signals;

a antecedent membership function realizing part preceded by said input part for outputting one or a plurality of grade values of a antecedent membership function;

a rule part preceded by said antecedent membership function realizer for comprising a network having one or a plurality of layers, receiving a grade value of said membership function, and for outputting an enlargement/reduction rate of one or a plurality of consequent membership functions corresponding to one or a plurality of system output signals as a grade value of a fuzzy rule; and a consequent membership function realizing/non-fuzzy-processing part preceded by said rule part for receiving said enlargement/reduction rate of a consequent membership function, calculating a non-fuzzy process after enlarging/reducing a consequent membership function according to said enlargement/reduction rate, and outputting a system output signal, wherein said neuro-fuzzy integrated data processing system for calculating and outputting the control operation value corresponding to the inputted control state value according to a fuzzy control rule has a configuration in which:

at least said rule part has a hierarchical neural network;

said hierarchical neural network is a pre-wired-rule-part neuro; and a fuzzy rule can be extracted from a pre-wired-rule-part by analyzing capabilities of each unit of said rule part forming said pre-wired-rule-part neuro and then associating them with the capabilities of a specific logical element.

47. A fuzzy model extracting system comprising:

an input part for receiving one or a plurality of input signals;

a antecedent membership function realizing part preceded by said input part for outputting one or a plurality of grade values of a antecedent membership function;

a rule part preceded by said antecedent membership function realizer for comprising a network having one or a plurality of layers, receiving a grade value of said membership function, and for outputting an enlargement/reduction rate of one or a plurality of consequent membership functions corresponding to one or a plurality of system output signals as a grade value of a fuzzy rule; and a consequent membership function realizing/non-fuzzy-processing part preceded by said rule part for receiving said enlargement/reduction rate of a consequent membership function, calculating a non-fuzzy process after enlarging/reducing a consequent membership function according to said enlargement/reduction rate, and outputting a system output signal, wherein said neuro-fuzzy integrated data processing system for calculating and outputting the control operation value corresponding to the inputted control state value according to a fuzzy control rule has a configuration in which:

said input part, antecedent membership function realizing part, rule part, and a part of at least said consequent membership function realizing/non-fuzzy-processing part have a hierarchical neural network;

said hierarchical neural network is a completely-connected-rule-part neuro that is completely connected only between said antecedent membership function realizing part and said rule part, between layers of said rule part, and between said rule part and said consequent membership function realizing/non-fuzzy-realizing part, while insignificant connection is deleted between all the other parts in said antecedent membership function realizing part and consequent membership function realizing/non-fuzzy/processing part; and a membership function is extracted by analyzing said completely-connected-rule-part neuro.

48. A fuzzy model extracting system comprising:

an input part for receiving one or a plurality of input signals;

a antecedent membership function realizing part preceded by said input part for outputting one or a plurality of grade values of a antecedent membership function;

a rule part preceded by said antecedent membership function realizing part for forming a network having one or a plurality of layers, receiving a grade value of said membership function, and for outputting an enlargement/reduction rate of one or a plurality of consequent membership functions corresponding to one or a plurality of system output signals as a grade value of a fuzzy rule; and a consequent membership function realizing/non-fuzzy-processing part preceded by said rule part for receiving said enlargement/reduction rate of a consequent membership function, calculating a non-fuzzy process after enlarging/reducing a consequent membership function according to said enlargement/reduction rate, and outputting a system output signal, wherein said neuro-fuzzy integrated data processing system for calculating and outputting the control operation value corresponding to the inputted control state value according to a fuzzy control rule has a configuration in which:

said input part, antecedent membership function realizing part, rule part, and a part of at least said consequent membership-function realizing/non-fuzzy-processing part have a hierarchical neural network;

said hierarchical neural network is a pure neuro at first where all adjacent layers are completely connected; and said pure neuro is converted to a completely-connected-rule-part neuro where complete connection is made only between said antecedent membership function realizing part and said rule part, between adjacent parts in said rule part, and between said rule part and said consequent membership function realizing/non-fuzzy-processing part; while insignificant connection to the whole data process is deleted between all the other parts in said antecedent membership function realizing part and consequent membership function realizing/non-fuzzy-processing part; and a membership function is extracted by analyzing said completely-connected-rule-part neuro.

49. A fuzzy model extracting system comprising:

an input part for receiving one or a plurality of input signals;

a antecedent membership function realizing part preceded by said input part for outputting one or a plurality of grade values of a antecedent membership function;

a rule part preceded by said antecedent membership function realizer for comprising a network having one or a plurality of layers, receiving a grade value of said membership function, and for outputting an enlargement/reduction rate of one or a plurality of consequent membership functions corresponding to one or a plurality of system output signal as a grade value of a fuzzy rule; and a consequent membership function realizing/non-fuzzy-processing part preceded by said rule part for receiving said enlargement/reduction rate of a consequent membership function, calculating a non-fuzzy process after enlarging/reducing a consequent membership function according to said enlargement/reduction rate, and outputting a system output signal, wherein said neuro-fuzzy integrated data processing system for calculating and outputting the control operation value corresponding to the inputted control state value according to a fuzzy control rule has a configuration in which:

said input part, antecedent membership function realizing part, rule part, and a part of at least said consequent membership function realizing/non-fuzzy-processing part have a hierarchical neural network;

said hierarchical neural network is a pure neuro at first where all adjacent layers are completely connected; and said pure neuro is converted to a pre-wired-rule-part neuro where insignificant connection to the whole data process is deleted between layers of said antecedent membership function realizing part and said rule part, and between said rule part and said consequent membership function realizing/non-fuzzy-processing part; and a membership function is extracted by analyzing said pre-wired-rule-part neuro.

50. A fuzzy model extracting method comprising:

an input part for receiving one or a plurality of input signals;

a antecedent membership function realizing part preceded by said input part for outputting one or a plurality of grade values of a antecedent membership function;

a rule part, preceded by said antecedent membership function realizing part for forming a network having one or a plurality of layers, receiving a grade value of said membership function, and for outputting an enlargement/reduction rate of one or a plurality of consequent membership functions corresponding to one or a plurality of system output signals as a grade value of a fuzzy rule; and a consequent membership function realizing/non-fuzzy-processing part preceded by said rule part for receiving said enlargement/reduction rate of a consequent membership function, calculating a non-fuzzy process after enlarging/reducing a consequent membership function according to said enlargement/reduction rate, and outputting a system output signal, wherein said neuro-fuzzy integrated data processing system for calculating and outputting the control operation value corresponding to the inputted control state value according to a fuzzy control rule has a configuration-in which:

said input part, antecedent membership function realizing part, rule part, and a part of at least said consequent membership function realizing/non-fuzzy-processing part have a hierarchical neural network;

said hierarchical neural network is a pure neuro at first where all adjacent layers are completely connected; and said pure neuro is converted to a pre-wired-rule-part neuro where insignificant connection to the whole data process is deleted between layers of said antecedent membership function realizing part and said rule part, and between said rule part and said consequent membership function realizing/non-fuzzy-processing part; and a fuzzy rule is extracted by analyzing said pre-wired-rule-part neuro.

51. A fuzzy-model extracting system comprising:

an input part for receiving one or a plurality of input signals;

a antecedent membership function realizing part preceded by said input part for outputting one or a plurality of grade values of a antecedent membership function;

a rule part preceded by said antecedent membership function realizing part for forming a network having one or a plurality of layers, receiving a grade value of said-membership function, and for outputting an enlargement/reduction rate of one or a plurality, of consequent membership functions corresponding to one or a plurality of system output signals as a grade value of a fuzzy rule; and a consequent membership function realizing/non-fuzzy-processing part preceded by said rule part for receiving said enlargement/reduction rate of a consequent membership function, calculating a non-fuzzy process after enlarging/reducing a consequent membership function according to said enlargement/reduction rate, and outputting a system output signal, wherein said neuro-fuzzy integrated data processing system for calculating and outputting the control operation value corresponding to the inputted control state value according to a fuzzy control rule has a configuration in which:

at least said rule part has a hierarchical neural network;

said hierarchical neural network comprises a completely-connected-rule-part neuro where complete connection is made only between said antecedent membership function realizing part and said rule part, between adjacent layers in said rule part, and between said rule part and said consequent membership function realizing/non-fuzzy-processing part; and said completely-connected-rule-part neuro is converted to a pre-wired-rule-part neuro with the insignificant connection to the whole process deleted between said antecedent membership function realizing part and said rule part, between adjacent layers in said rule part, and between said rule part and said consequent membership function realizing/non-fuzzy-processing part, and a fuzzy rule is extracted by analyzing said pre-wired-rule-part neuro.

52. A neuro-fuzzy integrated data processing system comprising:

an input part for receiving one or a plurality of input signals;

a antecedent membership function realizing part preceded by said input part for outputting one or a plurality of grade values of a antecedent membership function;

a rule part preceded by said antecedent membership function realizing part for forming a network having one or a plurality of layers, receiving a grade value of said membership function, and for outputting an enlargement/reduction rate of one or a plurality of consequent membership functions corresponding to one or a plurality of system output signals as a grade value of a fuzzy rule; and a consequent membership function realizing/non-fuzzy-processing part preceded by said rule part for receiving said enlargement/reduction rate of a consequent membership function, calculating a non-fuzzy process after enlarging/reducing a consequent membership function according to said enlargement/reduction rate, and outputting a system output signal, wherein said rule part comprises neurons.

53. A neuro-fuzzy integrated data processing system comprising:

an input part for receiving one or a plurality of input signals;

a antecedent membership function realizing part preceded by said input part for outputting, in response to one or a plurality of said input signals, one or a plurality of grade values indicating the applicability of a antecedent membership function;

a rule part preceded by said antecedent membership function realizing part for forming a network having one or a plurality of layers, receiving a grade value of said membership function, and for outputting transformation information for transforming one or a plurality of consequent membership functions corresponding to one or a plurality of system output signals as a grade value of a fuzzy rule; and a consequent membership function realizing/non-fuzzy-processing part preceded by said rule part for receiving said transformation information of a consequent membership function, calculating a non-fuzzy process after transforming a consequent membership function according to said transformation information, and outputting a system output signal.

54. A neuro-fuzzy integrated data processing system, comprising:

an applicable type data processing unit in a hierarchical network configuration having complete connection;

a pre-wired rule part neuro including a rule part, an antecedent membership function part and a consequent membership function part having only necessary connections;

a completely connected rule part neuro including a rule part, an antecedent membership function part and a consequent membership function part having pre-wired connections;

a fuzzy teacher unit having rules and a membership function; and a conversion unit to convert the fuzzy teacher unit to the pre-wired rule part neuro when the rules of the fuzzy teacher are definite, and to convert the fuzzy teacher unit to the completely connected rule part neuro when the rules of the fuzzy teacher unit are not definite.

* * * * *